US011760293B2

(12) United States Patent
Kobayashi et al.

(10) Patent No.: US 11,760,293 B2
(45) Date of Patent: Sep. 19, 2023

(54) TRACTOR AND WORKING VEHICLE

(71) Applicant: Kubota Corporation, Osaka (JP)

(72) Inventors: Kumiko Kobayashi, Sakai (JP); Misako Kawai, Sakai (JP); Kunihiko Nishino, Sakai (JP); Yasuaki Morioka, Sakai (JP); Shunsuke Miyashita, Sakai (JP); Yuki Kubota, Sakai (JP); Manabu Togo, Sakai (JP); Kenichi Iwami, Sakai (JP); Hiroki Suga, Sakai (JP); Toru Tambo, Sakai (JP)

(73) Assignee: Kubota Corporation, Osaka (JP)

( * ) Notice: Subject to any disclaimer, the term of this patent is extended or adjusted under 35 U.S.C. 154(b) by 457 days.

(21) Appl. No.: 16/764,277

(22) PCT Filed: Dec. 14, 2018

(86) PCT No.: PCT/JP2018/046127
§ 371 (c)(1),
(2) Date: May 14, 2020

(87) PCT Pub. No.: WO2019/124258
PCT Pub. Date: Jun. 27, 2019

(65) Prior Publication Data

US 2020/0398780 A1 Dec. 24, 2020

(30) Foreign Application Priority Data

Dec. 18, 2017 (JP) ................................ 2017-241946
Jan. 23, 2018 (JP) ................................ 2018-009128
Jan. 23, 2018 (JP) ................................ 2018-009217

(51) Int. Cl.
*B62D 49/06* (2006.01)
*B60R 21/13* (2006.01)
(Continued)

(52) U.S. Cl.
CPC ........... *B60R 21/131* (2013.01); *B60K 35/00* (2013.01); *B60R 16/005* (2013.01);
(Continued)

(58) Field of Classification Search
CPC . B60R 21/131; B60R 16/005; B60R 16/0215; B60R 11/02; B60K 35/00;
(Continued)

(56) References Cited

U.S. PATENT DOCUMENTS 10,714,816 B2 * 7/2020 Foster ..................... G01S 19/14
2010/0007566 A1 1/2010 Kobayashi et al.
(Continued)

FOREIGN PATENT DOCUMENTS

JP 200326058 A 1/2003
JP 2007145143 A 6/2007
(Continued)

*Primary Examiner* — Toan N Pham
(74) *Attorney, Agent, or Firm* — THE WEBB LAW FIRM

(57) ABSTRACT

A tractor includes: a driver seat on which a driver can sit; a hood 5 provided in front of the driver seat; and an antenna unit that receives satellite positioning information. When viewed from the front, an upper end portion of a ROPS and at least part of the antenna unit overlap with each other.

12 Claims, 78 Drawing Sheets

(51) Int. Cl.

| | |
|---|---|
| ***B60K 35/00*** | (2006.01) |
| ***B60R 16/00*** | (2006.01) |
| ***B60R 16/02*** | (2006.01) |
| ***B62D 1/04*** | (2006.01) |
| ***B62D 15/02*** | (2006.01) |
| ***G01S 19/36*** | (2010.01) |
| ***H01Q 1/12*** | (2006.01) |

(52) U.S. Cl.
CPC ............ *B60R 16/0215* (2013.01); *B62D 1/04* (2013.01); *B62D 15/025* (2013.01); *G01S 19/36* (2013.01); *H01Q 1/1235* (2013.01); *B60K 2370/172* (2019.05)

(58) Field of Classification Search
CPC ........ B60K 2370/172; B60K 2370/152; B60K 2370/782; B62D 1/04; B62D 15/025; B62D 49/00; B62D 6/007; G01S 19/36; G01S 19/40; G01S 19/49; H01Q 1/1235; H01Q 1/325; H01Q 1/12; A01B 69/008; A01B 69/00; B60Y 2200/221
See application file for complete search history.

(56) References Cited

U.S. PATENT DOCUMENTS

| | | | | |
|---|---|---|---|---|
| 2011/0022267 | A1 * | 1/2011 | Murphy ................ | B60W 50/14 701/124 |
| 2017/0339822 | A1 * | 11/2017 | Gresch ................... | B62D 6/002 |
| 2019/0077333 | A1 * | 3/2019 | Abe ...................... | E02F 9/0858 |

FOREIGN PATENT DOCUMENTS

| | | | |
|---|---|---|---|
| JP | 20096843 | A | 1/2009 |
| JP | 201021657 | A | 1/2010 |
| JP | 2011111022 | A | 6/2011 |
| JP | 2014182453 | A | 9/2014 |
| JP | 20167198 | A | 1/2016 |
| JP | 201621893 | A | 2/2016 |
| JP | 201716562 | A | 1/2017 |
| JP | 2017123803 | A | 7/2017 |
| WO | 2016043344 | A1 | 3/2016 |

* cited by examiner

Fig.58A

| NUMBER OF TIMES OF OPERATION | CORRECTION AMOUNT (cm) | |
|---|---|---|
| | LEFT CORRECTION AMOUNT | RIGHT CORRECTION AMOUNT |
| FIRST TIME | 2 | 2 |
| SECOND TIME | 4 | 4 |
| THIRD TIME | 6 | 6 |
| FOURTH TIME | 8 | 8 |
| FIFTH TIME | 10 | 10 |
| ⋮ | ⋮ | ⋮ |

Fig.58B

| OPERATION AMOUNT (DISPLACEMENT AMOUNT) | CORRECTION AMOUNT (cm) | |
|---|---|---|
| | LEFT CORRECTION AMOUNT | RIGHT CORRECTION AMOUNT |
| 5mm | 2 | 2 |
| 10mm | 4 | 4 |
| 15mm | 6 | 6 |
| 20mm | 8 | 8 |
| 25mm | 10 | 10 |
| ⋮ | ⋮ | ⋮ |

TRACTOR AND WORKING VEHICLE

CROSS-REFERENCE TO RELATED APPLICATIONS

This application is the United States national phase of International Application No. PCT/JP2018/046127 filed Dec. 14, 2018, and claims priority to Japanese Patent Application No. 2017-241946 filed Dec. 18, 2017 and Japanese Patent Application Nos. 2018-009128 and 2018-009217 filed Jan. 23, 2018, the disclosures of which are hereby incorporated by reference in their entirety.

TECHNICAL FIELD

The present invention relates to a tractor, and a working vehicle including a tractor.

BACKGROUND ART

Background Art 1

There are tractors that are configured to receive satellite positioning information transmitted from a GPS (Global Positioning System) satellite with an antenna unit, and are able to obtain the position, bearing and the like of the tractor through calculation. Among tractors of this type, a tractor that is not provided with a driving cabin is conventionally provided with an antenna unit configured to be accommodated inside a control panel unit of the vehicle body (for example, see Patent Literature 1).

Background Art 2

Conventionally, a working vehicle disclosed in Patent Literature 2 is known.

The working vehicle disclosed in Patent Literature 2 is provided with a GPS position calculating device that receives a radio wave transmitted from a GPS satellite and calculates a position of a vehicle body, a steering driving device that rotates a steering device, an engine revolutions control device, a change speed device, and a control unit that controls these. This working vehicle includes an automatic traveling mode in which the vehicle body is enabled to travel automatically by controlling the steering driving device, the engine revolutions control device, and the change speed device based on the position of the vehicle body such that the vehicle body travels along a set route, and a manual traveling mode in which the vehicle body is enabled to travel according to manual operation of a change speed operating device, a steering operating device, and an engine revolutions operating device.

PRIOR ART DOCUMENTS

Patent Literatures

Patent Literature 1: JP 2017-016562A
Patent Literature 2: JP 2014-182453A

SUMMARY OF THE INVENTION

Problem to be Solved by the Invention

Problem 1

Problem corresponding to Background Art 1 is as follows.

In the above conventional configuration, the antenna unit is provided at a low position in the vehicle body and in an area covered by a hood or the like, so there is a risk that the satellite positioning information transmitted from a GPS satellite or the like may be obstructed by an obstacle such as the hood or a case of the vehicle body. Further, in the above conventional configuration, the antenna unit is provided at a position close to the engine, so there is a risk that an error may occur in positioning data due to being adversely affected by vibration generated by the engine.

In order to address these problems, it is conceivable to provide the antenna unit at a high position in the vehicle body. However, for example, in a configuration in which the antenna unit is provided at an upper end of a column standing on the vehicle body, it is possible to imagine that the antenna unit will come into contact with tree branches or the like when traveling, or that the antenna unit will come into contact with a ceiling when parking the tractor inside a barn, thus damaging the antenna unit.

For such reasons, there is a demand for a tractor that can satisfactorily receive satellite positioning information transmitted from a GPS satellite or the like, and in which it is also possible to suppress damage to the antenna unit.

Problem 2

A problem corresponding to Background Art 2 is as follows.

The above working vehicle includes an automatic/manual switching switch serving as a mode switching operating device that switches between the automatic traveling mode and the manual traveling mode. However, although the automatic/manual switching switch can perform an operation of switching between the automatic traveling mode and the manual traveling mode, the automatic/manual switching switch cannot perform other operations related to automatic steering, so it is necessary to separately operate another switch in order to perform another operation, and therefore operability is poor.

In consideration of the above problem, there are demands for a working vehicle in which a plurality of operations related to automatic steering can be performed with good operability.

Solution to the Problem

Solution 1

Solution corresponding to Problem 1 is as follows.

A tractor includes:

a driver seat on which a driver can sit; and an antenna unit that receives satellite positioning information, wherein when viewed from the front, an upper end portion of a rollover protection structure (ROPS) and at least part of the antenna unit overlap with each other.

According to this configuration, satellite positioning information can be received with high sensitivity by disposing the antenna unit in the upper end portion of the ROPS. In addition, by reducing the amount of upward protrusion of the antenna unit with respect to the upper end of the ROPS due to adopting a positional relationship such that part of the antenna unit protrudes upward from the upper end of the ROPS, it is possible to suppress an inconvenience that the antenna unit comes into contact with tree branches or the like when traveling, and an inconvenience that the antenna unit comes into contact with a ceiling when parking the tractor inside a barn.

In addition, since the antenna unit is supported by the ROPS, even in a positional relationship such that the antenna unit comes into contact with tree branches or the like when traveling, the tree branches contact the ROPS, so it is possible to suppress a phenomenon in which a strong force acts on the antenna unit from the branches or the like.

As a result, a tractor is configured that can satisfactorily receive satellite positioning information transmitted from a GPS satellite or the like, and in which it is also possible to suppress damage to the antenna unit.

In one preferred embodiment, the ROPS has right and left vertical frame portions and a lateral frame portion that joins upper ends of the right and left vertical frame portions to each other, and when viewed from the front, at least part of the antenna unit and at least part of the lateral frame portion overlap with each other.

According to this embodiment, a positional relationship is adopted such that when viewed from the front, the lateral frame portion and the antenna unit overlap, and therefore the antenna unit is supported with respect to the lateral frame portion that forms the ROPS and is strong and located at a high position, and the antenna unit can also be protected by the lateral frame portion.

In one preferred embodiment, the ROPS is provided to the rear of the driver seat.

According to this embodiment, by disposing the ROPS to the rear of the driver seat, the antenna unit can be supported by the ROPS while utilizing a favorable surface that does not narrow the field of view of the driver.

In one preferred embodiment, the tractor includes right and left raising/lowering link mechanisms that are provided in a rear part of the vehicle body and raise/lower a working device, wherein the antenna unit is provided between a rear end portion of the driver seat and a rear end portion of the right and left raising/lowering link mechanisms in a side view.

According to this embodiment, by disposing the antenna unit between a rear end portion of the driver seat and a rear end portion of the raising/lowering link mechanisms in a side view, it is possible to utilize a space that is originally a dead space.

In one preferred embodiment, the antenna unit is provided between the right and left raising/lowering link mechanisms in a plan view.

According to this embodiment, the antenna unit can be disposed near the center in the width direction of the vehicle body, so even if tree branches or the like contact the ROPS from either the left or right direction, it is possible to suppress a phenomenon in which branches or the like contact the antenna unit.

In one preferred embodiment, the tractor includes a support member extending forward or rearward from the lateral frame portion and supporting the antenna unit, wherein wiring that connects the antenna unit and a controller for traveling control is drawn out from a wiring take-out position of the antenna unit at a high position, and this wiring is held by the support member or the lateral frame portion at an intermediate position between the antenna unit and the lateral frame portion.

According to this embodiment, by supporting the antenna unit on the support member extending forward or rearward from the lateral frame portion, it possible to adopt a positional relationship in which the lateral frame portion and part of the antenna unit overlap with each other. Also, wiring is drawn out from a wiring take-out position of the antenna unit at a high position, and therefore, even in a case where, for example, water attaches to wiring from the antenna unit, it is possible to cause the attached rainwater to flow in a predetermined direction and drop off from the wiring early.

In one preferred embodiment, the support member has a mounting face on which the antenna unit is mounted, reinforcement frames are erected on both right and left ends of the mounting face, and the antenna unit is disposed at an intermediate position between the right and left reinforcement frames.

According to this embodiment, even when working in an environment where tree branches or the like contact the antenna unit from the side, it is possible for the reinforcement frame to prevent contact with the antenna unit and increase the strength of the support member.

In one preferred embodiment, the tractor includes wiring that connects the antenna unit and a controller for traveling control, wherein the wiring is routed along the vertical frame portion.

According to this embodiment, the wiring that connects the antenna unit and the controller can be easily managed in a mode where sagging of the wiring is suppressed by a process such as supporting the wiring along the vertical frame portion.

In one preferred embodiment, the vertical frame portion is hollow, and the wiring is routed so as to pass through the inside of the vertical frame portion.

According to this embodiment, by passing the wiring through the inside of the vertical frame portion, the outer periphery of a harness is covered by the vertical frame portion. Therefore, noise that affects the harness can be blocked by the vertical frame. As a result, it is possible to perform positioning that is less likely to be affected by noise without taking any special measures against noise.

Also, according to this embodiment, by passing the wiring through the inside of the vertical frame portion, the position of the wiring can be easily managed at the same time as protecting the wiring.

In one preferred embodiment, the vertical frame portion is configured to be foldable by swinging around a laterally oriented swing pivot, and the wiring is routed so as to pass through the inside of a movable portion of the vertical frame portion above the swing pivot.

According to this embodiment, by passing the wiring through the inside of the vertical frame portion, the wiring is protected by the vertical frame portion, and the position of the wiring can be easily managed without disturbing the position of the wiring even when swinging the vertical frame around a swing pivot.

In one preferred embodiment, the wiring is routed inside the vertical frame portion, and is routed from the inside of the vertical frame portion to the outside through a through hole provided above the swing pivot.

According to this embodiment, the wiring is drawn out through the through hole provided above the swing pivot, so tension does not act on the wiring even if the vertical frame portion swings around the swing pivot.

In one preferred embodiment, a roof that covers above the driver seat is attached to the ROPS.

According to this embodiment, it is possible to use the ROPS to provide a roof that covers above the driver seat without separately providing a column or the like.

In one preferred embodiment, the ROPS has right and left vertical frame portions and a lateral frame portion that joins upper ends of the right and left vertical frame portions to each other, and when viewed from the front, the antenna unit is provided in a center portion of the lateral frame portion, and the roof is fixed to the lateral frame portion at locations closer to the vertical frame portions than the location where the antenna unit is provided in the lateral frame portion.

According to this embodiment, the roof can be fixed to the lateral frame portion of the ROPS while preventing interference with the antenna unit.

Solution 2

Solution corresponding to Problem 2 is as follows.

A working vehicle includes:

a steering wheel;

a steering shaft that rotatably supports the steering wheel;

a vehicle body capable of traveling by either manual steering by the steering wheel or automatic steering of the steering wheel based on a planned travel line; and a steering switching switch that is disposed in the vicinity of the steering shaft; wherein, using a base end portion provided on the steering shaft side as a pivot, the steering switching switch is capable of swinging between a first direction for switching between starting and ending the automatic steering, and a second direction for setting a start point and an end point of a travel reference line that serves as a reference for the planned travel line.

In one preferred embodiment, the steering switching switch is configured such that: swinging in the first direction is swinging upward or downward, and swinging in the second direction is swinging forward or rearward.

In one preferred embodiment, the steering switching switch is configured such that: starting of automatic steering is commanded by swinging downward and ending of automatic steering is commanded by swinging upward, and the start point of the travel reference line is set by swinging rearward and the end point of the travel reference line is set by swinging forward.

In one preferred embodiment, the working vehicle includes a setting switch that is disposed in the vicinity of the steering shaft, and at least switches to a setting mode for performing settings prior to starting the automatic steering.

In one preferred embodiment, the working vehicle includes:

a position detection device that detects a position of the vehicle body based on a signal from a positioning satellite; and a correction switch that is disposed in the vicinity of the steering shaft, and corrects the position detected by the position detection device.

In one preferred embodiment, the working vehicle includes a screen switching switch that is disposed in the vicinity of the steering shaft, and selectively switches a display of a display device between a first screen that displays a driving situation in the setting mode and a second screen that explains a setting operation in the setting mode.

According to the above working vehicle, a plurality of operations related to automatic steering can be performed with good operability. More specifically, by only changing the swinging direction of the steering switching switch, it is possible to switch the starting or ending of automatic steering, and to set the start point and the end point of the travel reference line that serves as a reference for the planned travel line, and therefore this working vehicle has excellent operability. Also, the installation space of the steering switching switch can be reduced compared to a case where a plurality of switches are provided as steering switching switches.

Other features and advantages achieved thereby will be apparent from the following description.

BRIEF DESCRIPTION OF THE DRAWINGS

FIG. 8 is a front view of a ROPS according to another embodiment a.

FIG. 9 is a side view of the ROPS of to another embodiment a.

FIG. 10 is a side view showing the structure of an attachment bracket according to another embodiment a.

FIG. 11 is a side view showing the structure of the attachment bracket according to another embodiment a.

FIG. 12 is a side view showing the structure of the attachment bracket according to another embodiment a.

FIG. 58A is an explanatory diagram illustrating a correction amount in a push switch.

FIG. 58B is an explanatory diagram illustrating a correction amount in a slide switch.

FIG. 66 is a rear view showing a steering wheel, a cover and the like.

FIG. 72 is a right rear perspective view showing a steering wheel, a gear mechanism and the like.

EMBODIMENTS OF THE INVENTION

First Embodiment

A first embodiment will be described hereinafter.

Basic Configuration of Tractor

Figure 1:
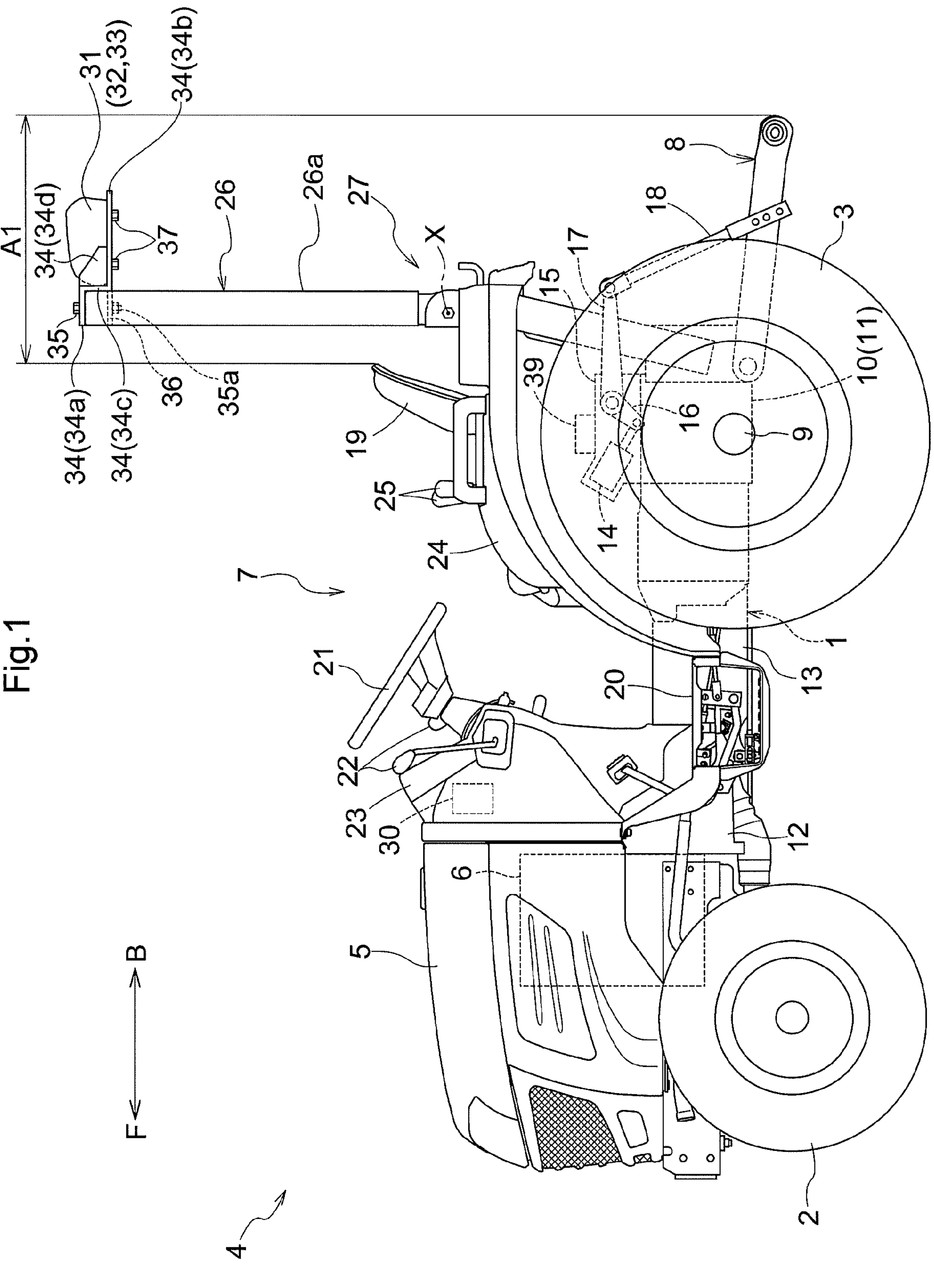
FIG. 1 shows a first embodiment (true up to FIG. 55), being a side view of a tractor.
Figure 2:
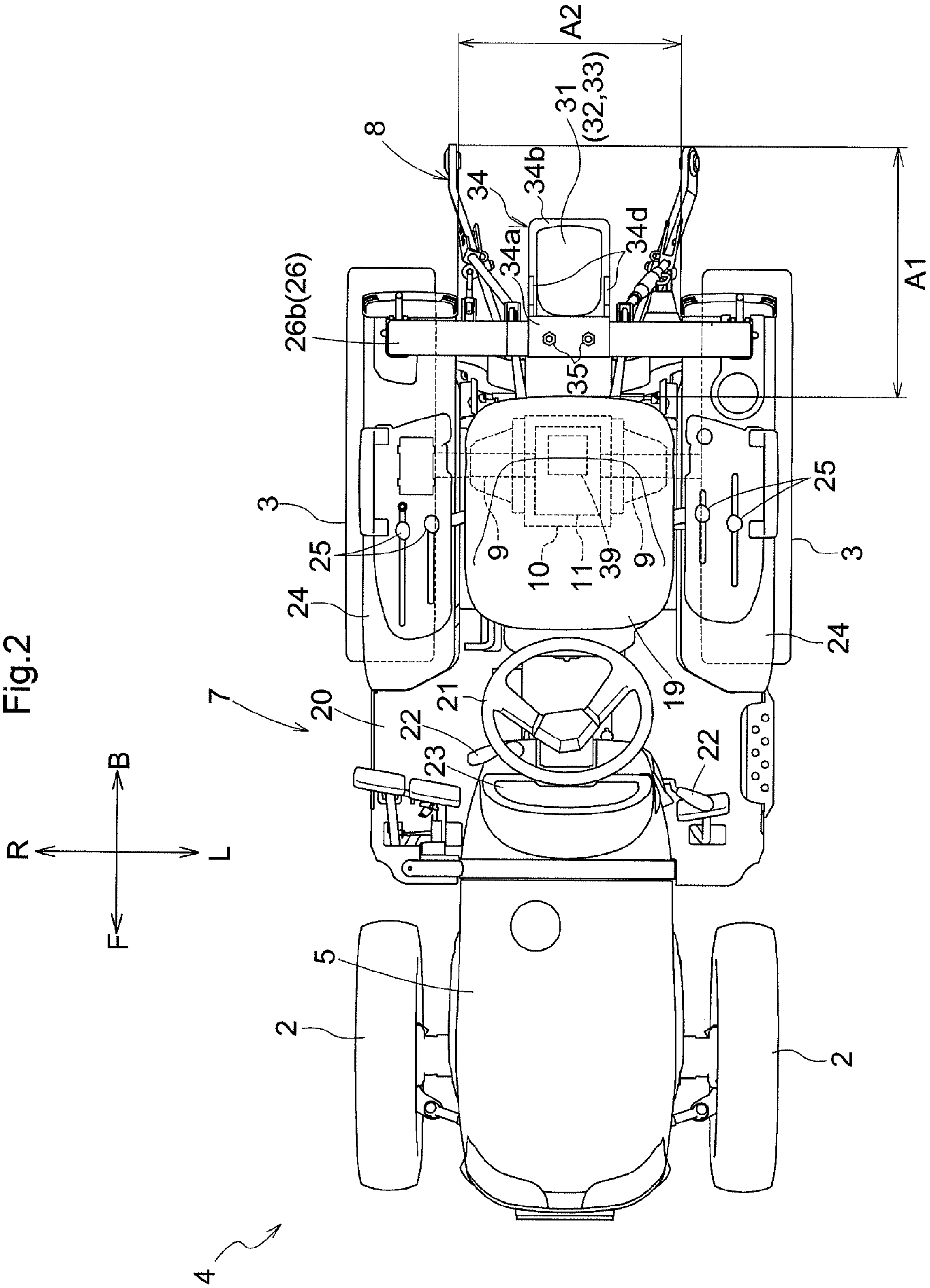
FIG. 2 is a plan view of the tractor.
Figure 3:
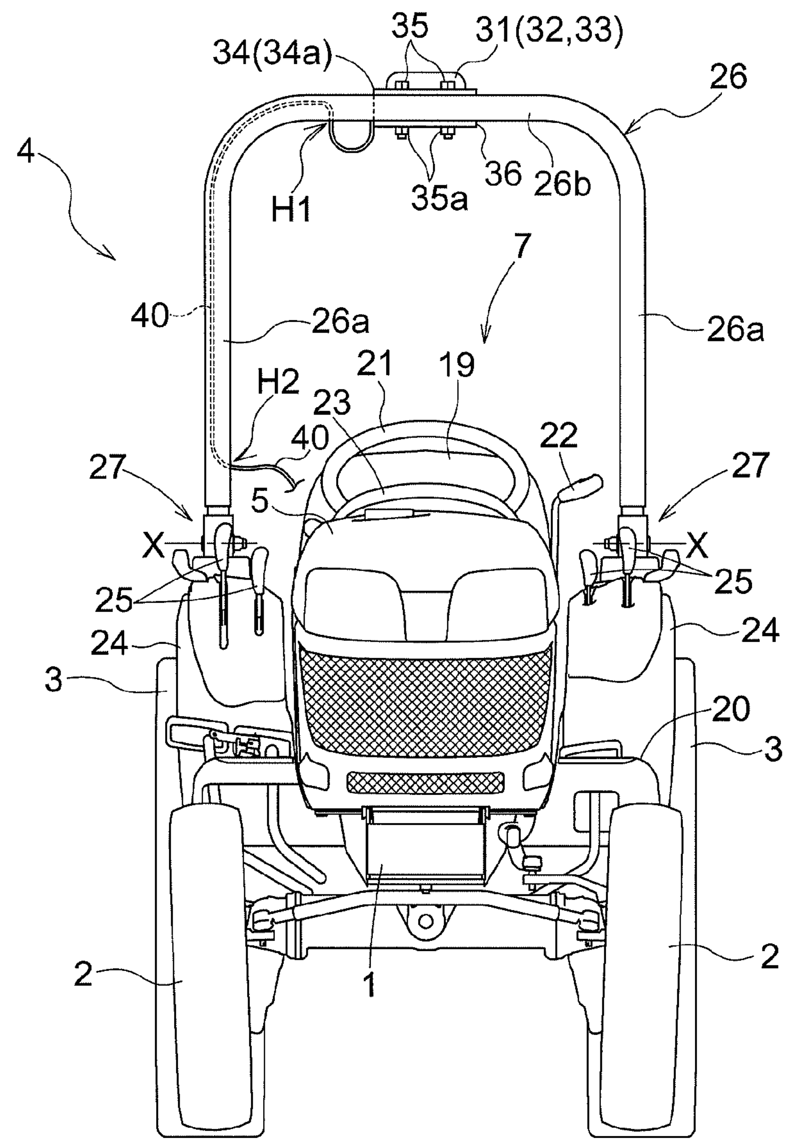
FIG. 3 is a front view of the tractor.
Figure 4:
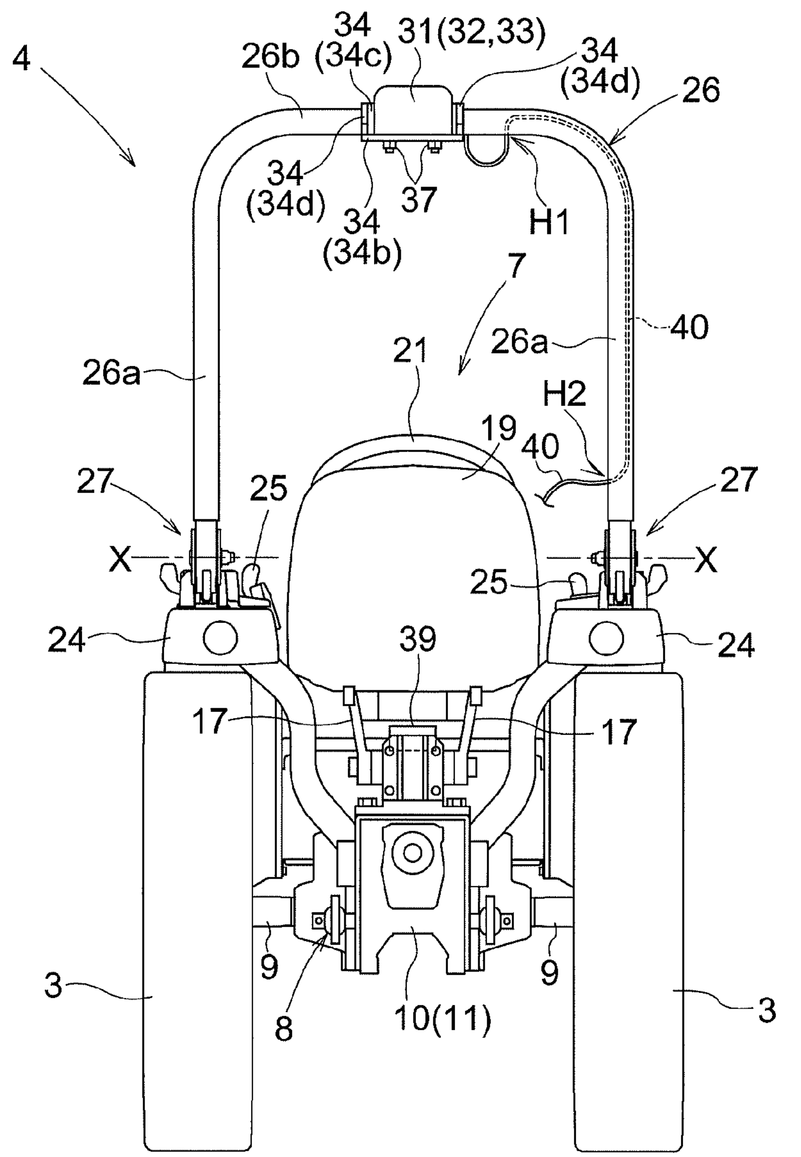
FIG. 4 is a rear view of the tractor.

FIGS. 1 to 4 show a tractor according to the present invention. In this embodiment, the direction indicated by reference sign F shown in FIGS. 1 and 2 is the front side of the tractor, and the direction indicated by reference sign B is the rear side of the tractor. Further, the direction indicated by reference sign R shown in FIG. 2 is the right side of the tractor, and the direction indicated by the reference sign L is the left side of the tractor.

As shown in FIG. 1, in the tractor, an entire vehicle body is supported by a vehicle body frame 1, and a traveling vehicle body 4 is configured by providing right and left front wheels 2 drivable in a state where an operation can be performed to change the direction in which these wheels point, and right and left rear wheels 3 drivable in a state where the direction in which these wheels point is fixed. An engine 6 is mounted inside a hood 5 at the front of the vehicle body, and a driving portion 7 is provided on the rear side of the vehicle body.

As shown in FIGS. 1 and 2, the traveling vehicle body 4, in a rear portion thereof, is provided with a raising/lowering link mechanism 8 that is capable of attaching/detaching a working device (not shown) such as a tilling device with respect to the rear portion of the vehicle body, and that is capable of a raising/lowering operation in a state with the working device connected. A transmission case 10 that transmits power transmitted by the engine 6 from rear axles 9 to the right and left rear wheels 3 is provided below the driving portion 7. Inside the transmission case 10, there is provided a differential device 11 capable of applying a speed difference to the driving speed of the right and left rear axles 9, and power from the engine 6 is transmitted through the differential device 11 in a manner distributed to the right and left rear wheels 3. The transmission case 10 rotatably supports the rear axles 9.

In this embodiment, the engine 6 located at the front of the vehicle body, a clutch housing 12 configured to be connected to the rear of the engine 6, an intermediate frame 13, the transmission case 10 located at the rear of the vehicle body and the like are integrally connected to each other, thereby forming the highly rigid vehicle body frame 1.

A hydraulic raising/lowering cylinder 14 that drives the working device to raise or lower through the raising/lowering link mechanism 8 is provided in an upper portion of the transmission case 10. The raising/lowering cylinder 14 is housed in a cylinder case 15. A swinging arm 16 operated so as to swing by expansion/contraction operation of the raising/lowering cylinder 14 is provided inside the cylinder case 15. A lifting arm 17 that swings together with the swinging arm 16 as a single body, and the raising/lowering link mechanism 8, are pivotally connected through a lifting rod 18.

The driving portion 7 includes a driver seat 19 on which a driver can sit, a boarding step 20 located in front of the driving seat 19 to form a floor surface of the driving portion 7, and a steering panel unit 23 located in front of the driver seat 19 and provided with a steering wheel 21 for front wheel steering and other control levers 22. On both right and left sides of the driver seat 19, rear wheel fenders 24 that cover above the right and left rear wheels 3 are provided, and in the rear wheel fenders 24, there are also provided a plurality of operation tools 25 for performing work.

The driver seat 19 may be configured so as to be capable of swinging forward in a mode where a rear portion is lifted around a pivot at the front of the seat. With this configuration, it is possible to swing the driver seat 19 to expose the transmission case 10.

To the rear of the driving portion 7, there is provided a rollover protection structure (ROPS) 26 for rollover protection. Both right and left sides of the ROPS 26 are connected and fixed to the rear end portion of the vehicle body frame, that is, these are connected and fixed to the rear end portion of the transmission case 10. The ROPS 26 extends upward so as to cover above the rear side of the driver seat 19. That is, the ROPS 26 has a right-left pair of vertical frame portions 26*a* that extend in the vertical direction, and a lateral frame portion 26*b* that joins upper ends of the right and left vertical frame portions 26*a* to each other and extends in the lateral direction. The ROPS 26 is formed substantially in a gate shape when viewed from the front of the vehicle body. The ROPS 26 has a structure in which the internal space is continuous by bending a hollow square pipe material to integrally form the right and left vertical frame portions 26*a* and the lateral frame portion 26*b*, and has substantially a gate shape when viewed from the front. That is, the lower ends of the vertical frame portions 26*a* of the ROPS 26 may be fixed to highly rigid members such as the transmission case 10, the vehicle body frame 1, the axle cases of the rear axles 9 and the like. Also, when the lower ends of the vertical frame portions 26*a* of the ROPS 26 are fixed to the transmission case 10, the vertical frame portions 26*a* may be fixed at a plurality of locations in the right-left direction of the vehicle body and the front-rear direction of the vehicle body, and with this sort of fixing the ROPS 26 can be firmly fixed.

The ROPS 26 is configured to be foldable around a laterally oriented swing pivot X in folding portions 27 provided below the right and left vertical frame portions 26*a*. With this sort of configuration, by folding the movable portions (the upper portion of the right and left vertical frame portions 26*a* above the swing pivot and the lateral frame portion 26*b*) of the ROPS 26 during transportation of the vehicle body or the like by swinging to the rear side of the vehicle body around the swing pivot X, it is possible to reduce the amount of upward protrusion and prevent transportation from being hindered. Also, by lowering the lateral frame portion 26*b* in the folded state, maintenance of a positioning unit 31 by a worker can be easily performed.

The traveling vehicle body 4 includes a controller 30 for traveling control, a steering motor (not shown) capable of steering the front wheels 2, and the positioning unit 31, which measures the position and bearing of the traveling vehicle body 4 using a well-known GPS (Global Positioning System) that is an example of a GNSS (Global Navigation Satellite System).

The positioning unit 31 includes a satellite navigation antenna unit 32 that receives a radio wave transmitted from a GPS satellite (not shown) and data transmitted from a reference station (not shown) installed at a known position, and a satellite navigation device 33 that measures the position and bearing of the traveling vehicle body 4 based on the positioning data of the positioning unit 31. As a positioning method using GPS, in the present embodiment, a D-GPS (Differential GPS) method is adopted in which the position of the vehicle body is measured using GPS positioning data and error correction information transmitted from a reference station whose position is known in advance on the ground side. The reference station transmits, by wireless communication, error correction information obtained by receiving a radio wave from a GPS satellite. The satellite navigation device 33 calculates the position and bearing of the traveling vehicle body 4 based on positioning data obtained by receiving a radio wave from a GPS satellite and information from a reference station. Also, as a positioning method using GPS, another positioning method such as an RTK (Real Time Kinematic) method may be used.

The positioning unit 31 including the antenna unit 32 is provided in the lateral frame portion 26*b*, which is located at the top (the highest position) of the ROPS 26, such that the reception sensitivity of radio waves from GPS satellites is increased. The positioning unit 31 is attached through an attachment bracket 34 (an example of a support member) in the vicinity of the lateral center of the lateral frame 26*b*. That is, the antenna unit 32 is provided at a position higher than the upper end of the driver seat 19 and above the swing pivot X of the ROPS 26.

As described above, the antenna unit 32 is provided at a location separated upward away from the traveling vehicle body 4, so the position and bearing of the traveling vehicle body 4 measured using GPS include positioning errors caused by displacement of the antenna unit 32 due to yawing, pitching or rolling of the traveling vehicle body 4.

Therefore, in the traveling vehicle body 4, by providing a three-axis gyroscope (not shown) and a three-direction acceleration sensor (not shown) in order to enable correction that removes the positioning errors described above, an inertial measurement device (IMU) 39 that measures a yaw angle, a pitch angle, a roll angle and the like of the traveling vehicle body 4 is provided. By providing the inertial measurement device 39, information regarding the position and bearing of the traveling vehicle body 4 measured by the positioning unit 31 can be corrected using information regarding displacement of the antenna 32 due to yawing, pitching or rolling of the traveling vehicle body 4 measured by the inertial measurement device 39.

As shown in FIG. 2, the inertial measurement device 39 is disposed at a location overlapping the transmission case 10 in a plan view. More specifically, the inertial measurement device 39 is disposed at a location below the driver seat 19 and above a drive shaft of the rear axles 9, and is disposed above the cylinder case 15 provided above the transmission case 10. More specifically, the inertial measurement device 39 is disposed at a location overlapping the rear wheels 3 in a side view. This is a location with high rigidity and is unlikely to be deformed, and furthermore, this location is separated away from the engine 6, and is unlikely to be affected by the vibration of the engine 6, so measurement can be performed at this location with few errors. Also, in this tractor, the transmission case 10 can be exposed by swinging the driver seat 19 forward, so by swinging the driver seat 19, access to the inertial measurement device 39 is facilitated, and maintenance can be performed in a good state.

Also, since the inertial measurement device 39 is disposed at a location overlapping with the transmission case 10, the inertial measurement device 39 is close to the position of the center of gravity of the traveling vehicle body 4, which is a traveling body. Therefore, it is easy to measure a representative value of the change in the posture of the traveling vehicle body 4 (which can represent the change in the posture of the traveling vehicle body 4), and it is possible to quickly and accurately calculate the position of the traveling vehicle body 4 by following the change in the posture of the traveling vehicle body 4. That is, since the inertial measurement device 39 is disposed in the traveling vehicle body 4 at a location where the weight balance is good in the front-rear direction, the right-left direction, and with respect to height, the accuracy of the location of the traveling vehicle body 4 can be improved. Since there is no deviation, the value of the inertial measurement device 39 is easy to use as a representative value of the traveling vehicle body 4. Also, when a working device (an implement) is mounted on the raising/lowering link mechanism 8, the position of the center of gravity of the traveling vehicle body 4 and the working device is closer to the rear axles 9. That is, also in a case where a working device (an implement) is mounted on the raising/lowering link mechanism 8, the inertial measurement device 39 approaches the position of the center of gravity of the traveling vehicle body 4, so likewise, it is possible to quickly and accurately calculate the position of the traveling vehicle body 4.

In this tractor, the inertial measurement device 39 is provided on the upper side of the cylinder case 15 on the upper side of the transmission case 10, as a specific example of a position adjacent to the vehicle body frame 1, which is configured as a rigid member by connecting the engine 6, the clutch housing 12, and the transmission case 10. Also, the inertial measurement device 39 is disposed at an intermediate position between the right and left rear wheel fenders 24 when viewed from the front.

As shown in FIG. 1, the controller 30 is provided in a state accommodated inside the steering panel unit 23. Also, the controller 30 is configured to execute automatic steering control that controls a steering motor or the like such that the traveling vehicle body 4 travels along a traveling route for performing work, based on information regarding a traveling route in a field set in advance and positioning results of the positioning unit 31.

Arrangement of Positioning Unit

Figure 5:
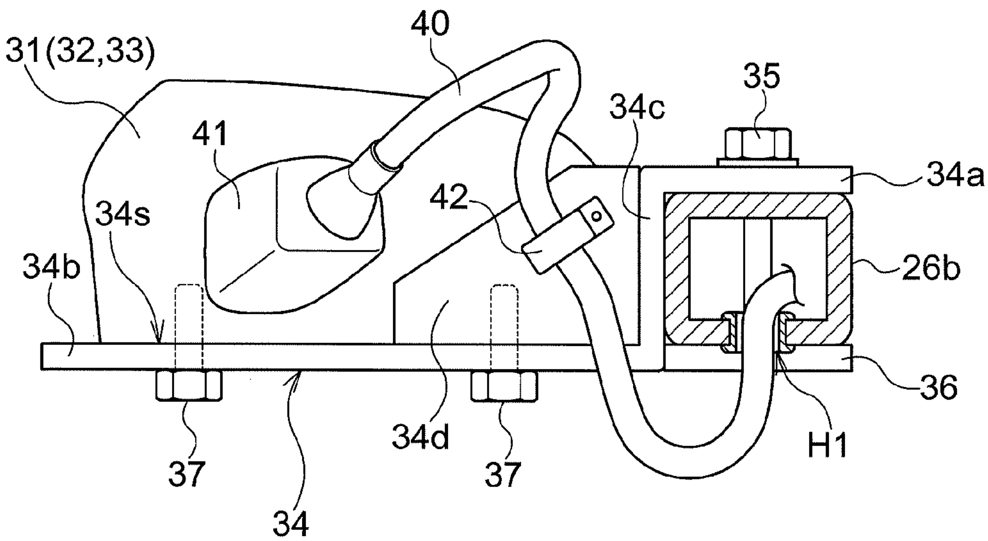
FIG. 5 is a side view showing wiring between a positioning unit and a lateral frame portion.
Figure 6:
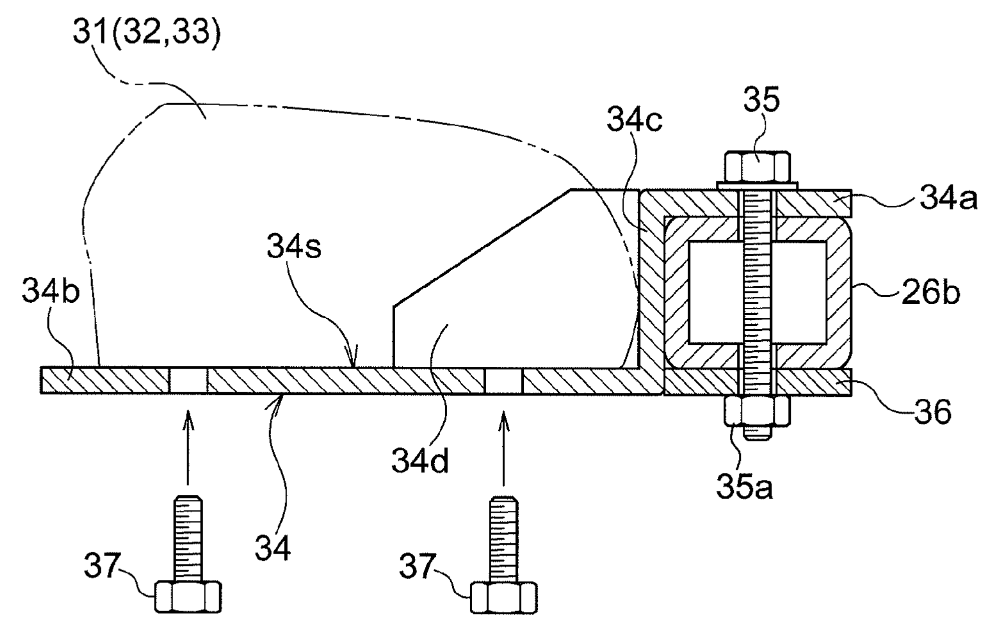
FIG. 6 is a view in cross section of an attachment bracket and a lateral frame.

As shown in FIGS. 5 and 6, the attachment bracket 34 serving as a support member that supports the positioning unit 31 is a step-like molded product in which in a side view, a front attachment portion 34*a* is located at a high position and a rear mounting portion 34*b* is located a low position, and a vertical wall portion 34*c* is integrally formed in between these. A mounting face 34*s* is formed on the upper face of the mounting portion 34*b*, and reinforcement frames 34*d* (see FIGS. 2 and 4) are provided standing at both right and left ends of the mounting face 34*s*.

A plurality of bolt insertion holes are formed in the attachment portion 34*a* of the attachment bracket 34, and similarly, a plurality of bolt insertion holes are formed in the mounting portion 34*b*. Bolt insertion holes through which fixing bolts 35 are inserted are formed vertically through the lateral frame portion 26*b* corresponding to the insertion holes of the attachment portion 34*a*, and a fixing plate 36 is disposed having nut portions 35*a* where the fixing bolts 35 are screwed into the lower face of the lateral frame portion 26*b*.

According to this configuration, the attachment portion 34*a* of the attachment bracket 34 abuts against the upper face of the lateral frame portion 26*b*, and the vertical wall portion 34*c* of the attachment bracket 34 abuts against the rear face of the lateral frame portion 26*b*. The attachment bracket 34 is fixed to the lateral frame portion 26*b* by inserting the fixing bolts 35 that pass through the plurality of bolt insertion holes of the attachment portion 34*a* through the bolt insertion holes of the lateral frame portion 26*b*, and further screwing the nut portions 35*a* of the fixing plate 36.

Also, the positioning unit 31 is disposed such that the positioning unit 31 is mounted on the mounting portion 34*b* of the attachment bracket 34, and is supported in a state where connecting bolts 37, which are inserted from below up through insertion holes of the mounting portion 34*b*, are mounted. In such a supported state, the positioning unit 31 is disposed at a location sandwiched between the right and left reinforcement frames 34*d* in a state mounted on the mounting face 34*s*.

Accordingly, the attachment bracket 34 (an example of a support member) is disposed at the center in the right-left direction of the lateral frame portion 26*b* in when viewed from the front, and at a location where the rear end protrudes rearward from the rear end of the lateral frame portion 26*b* in a plan view.

In this configuration, when viewed from the front, the positioning unit 31 is disposed at a location that partially overlaps with the lateral frame portion 26*b*, and the upper end of the positioning unit 31 protrudes upward from the upper face of the lateral frame portion 26*b*. With this configuration, when performing work in an environment where tree branches or the like can contact the positioning unit 31, the attachment bracket 34 or the ROPS 26 eliminates the inconvenience that the branches or the like contact the positioning unit 31.

Wiring 40 that connects the positioning unit 31 including the antenna unit 32 with the controller 30 is routed along the vertical frame portion 26*a*. Specifically, as shown in FIG. 5, a position for taking out the wiring 40 is set on a side face of the positioning unit 31 (hereinafter, this position is referred to as a wiring take-out position), and a waterproof cover 41 is disposed at a position outside the wiring taking-out position. The take-out posture of the wiring 40 is set to an oblique posture such that the wiring 40 drawn out from the waterproof cover 41 reaches a position higher than the wiring take-out position.

Figure 7:
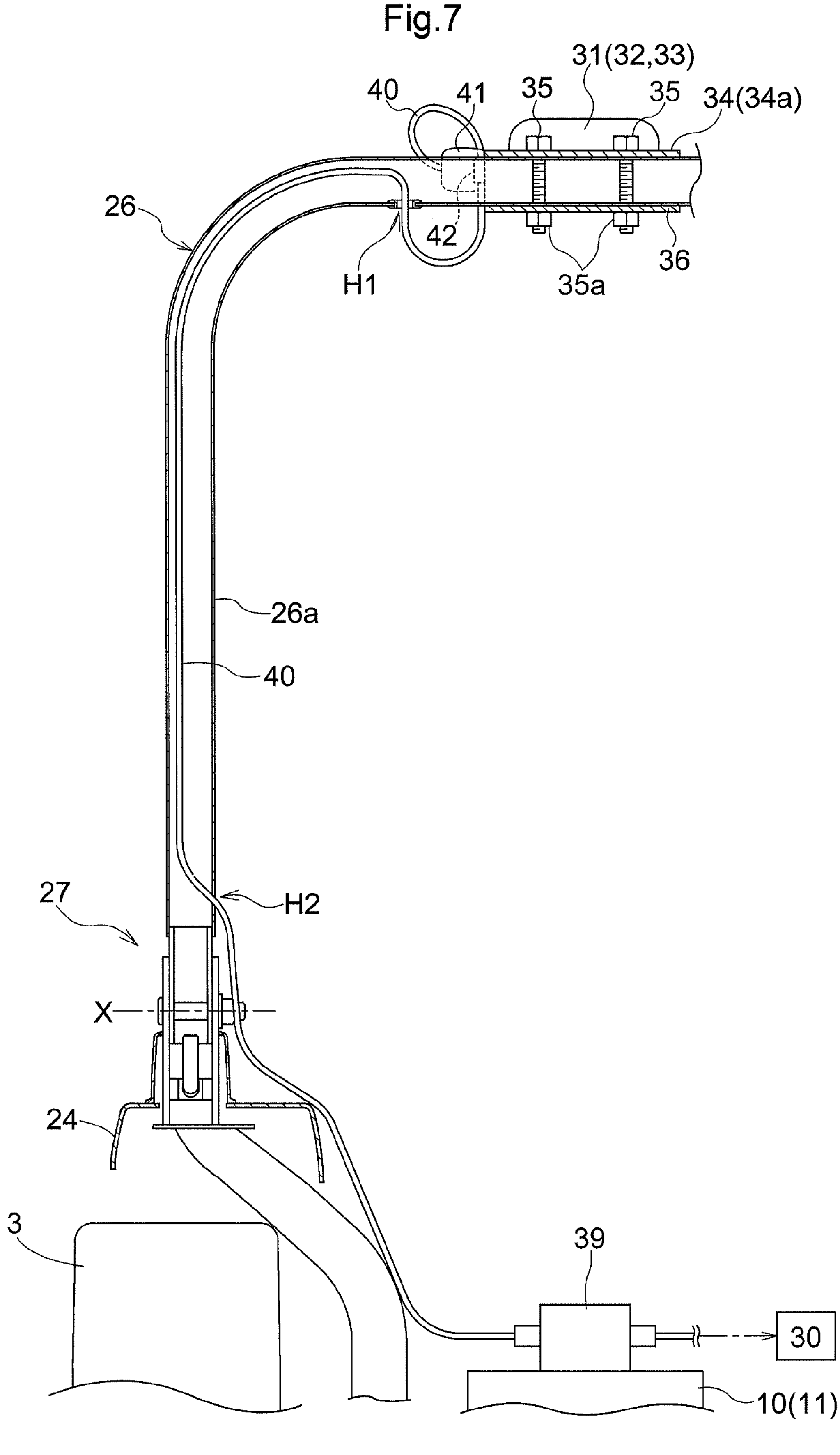
FIG. 7 is a view in cross section showing wiring within a rollover protection structure (ROPS).

The intermediate position of the drawn out wiring 40 between the waterproof cover 41 and the lateral frame portion 26*b* is supported by a clamp 42 provided on the outer face of the reinforcement frame 34*d*. Also, as shown in FIG. 7, the wiring 40 is routed so as to be inserted from a first through hole H1 on the lower face of the lateral frame portion 26*b* into the internal space of the lateral frame portion 26*b*, and in a lower portion of one of the vertical frame portions 26*a* and above the folding portion 27 (the upper side relative to the swing pivot X), is drawn out from a second through hole H2 (an example of a "through hole") on the inner face side (the side opposing the right and left vertical frame portions 26*a*) of this vertical frame portion 26*a*.

Since the wiring 40 from the waterproof cover 41 is drawn out obliquely upward as described above, even if rainwater attaches to the wiring 40, it is possible to cause the attached rainwater to flow in a predetermined direction from the highest position of the wiring 40 and drop off from the wiring early. Note that the clamp 42 may also be provided on the lateral frame 26*b*.

The wiring 40 extends to the inertial measurement device 39 located on the upper side of the transmission case 10 and merges with wiring from the inertial measurement device 39. Further, the merged wiring 40 passes between the rear wheel fenders 24 and the driver seat 19, and further passes between the boarding step 20 and a floor mat and extends to the controller 30 provided in the steering panel unit 23.

As shown in FIGS. 1 and 2, in a side view, the positioning unit 31 is provided in a first area A1 between the rear end of the driver seat 19 and the rear ends of the right and left raising/lowering link mechanisms 8, and in a plan view, is provided in a second area A2 between the right and left raising/lowering link mechanisms 8.

Other Embodiments of First Embodiment

Besides the above-described embodiment, the present invention may also be configured as other embodiments described below. In each of the other embodiments described below, those having the same functions as the above-described embodiment are denoted by the same reference numerals and signs as those of the above-described embodiment.

Other Embodiment a (a-1)

Figure 8:
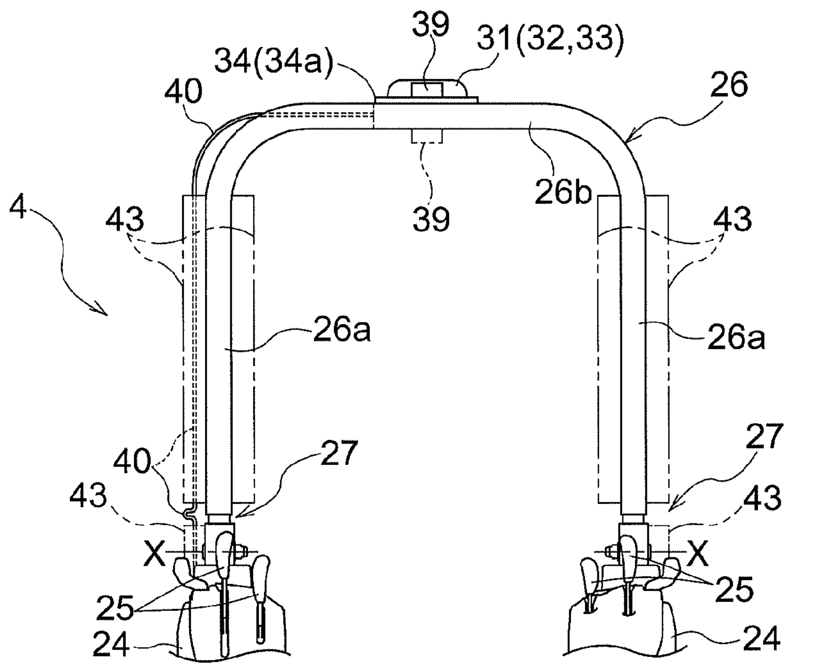

As shown in FIG. 8, the positioning unit 31 including at least one of the antenna unit 32 and the satellite navigation device 33 is provided on the lateral frame portion 26*b* by the attachment bracket 34, and the inertial measurement device 39 is provided on the lateral frame portion 26*b* of the ROPS 26. FIG. 8 shows a configuration in which the inertial measurement device 39 is provided on the upper face of the lateral frame portion 26*b*.

In the other embodiment (a-1), it is conceivable that the inertial measurement device 39 and the positioning unit 31 are disposed in vertical positions relative to each other. As a specific example, as shown by a double-dotted chained line in FIG. 8, the inertial measurement device 39 can be provided on the lower face of the lateral frame portion 26*b*. By providing the inertial measurement device 39 on the lower face of the lateral frame portion 26*b* in this way, it is conceivable to suppress effects due to vibration of the traveling vehicle body 4 on the inertial measurement device 39.

(a-2)

As shown in FIG. 8, the wiring 40 that connects the positioning unit 31 including the antenna unit 32 with the controller 30 is routed along the outer face of the vertical frame portion 26*a*, and decorative covers 43 are provided on the vertical frame portions 26*a* so as to cover the wiring routed in this manner.

Figure 9:
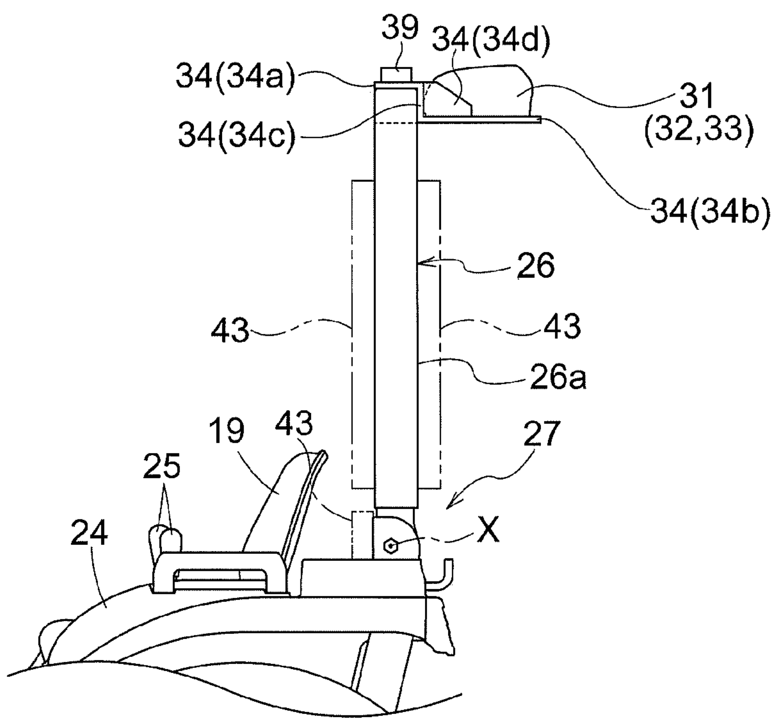

FIGS. 8 and 9 show a configuration in which the decorative covers 43 are provided on the outer side face of the vertical frame portions 26*a* above the folding portion 27 and below the folding portion 27. Further, below the folding portion 27, the wiring 40 may be held in a mode clamped to a portion of the folding portion 27 that is supported by the traveling vehicle body 4. Thus, it is not necessary to form a through hole as in a configuration in which the wiring is routed inside the internal space of the vertical frame portion 26*a*, so it is possible to suppress a decrease in the strength of the ROPS 26. Further, in addition to the fact that substantially all of the wiring 40 disposed on the vehicle body outer side of the vertical frame portion 26*a* is covered and protected by the decorative covers 43, also the wiring 40 can be suppressed from sagging, and disturbance of the posture of the wiring 40 can be suppressed.

In this other embodiment (a-2), as shown by a double-dotted chained line in FIGS. 8 and 9, the routing target may be any of the right and left vertical frame portions 26*a*, and among the vertical frame portions 26*a*, may be any of an outer face that is outside with respect to the traveling vehicle body 4, an inner face that is inside with respect to the traveling vehicle body 4, and the front and rear faces of the vertical frame portions 26*a*. The decorative covers 43 can be provided corresponding to the routing target.

(a-3)

Figure 10:
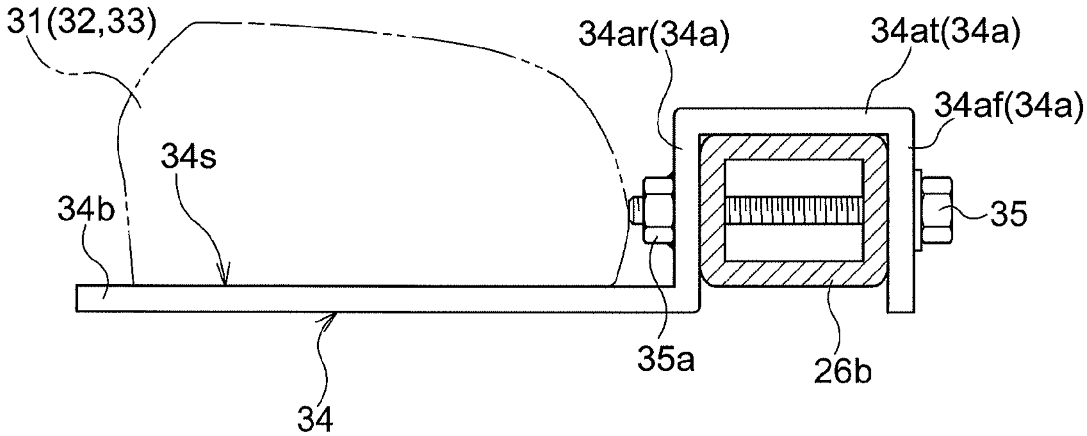
Figure 11:
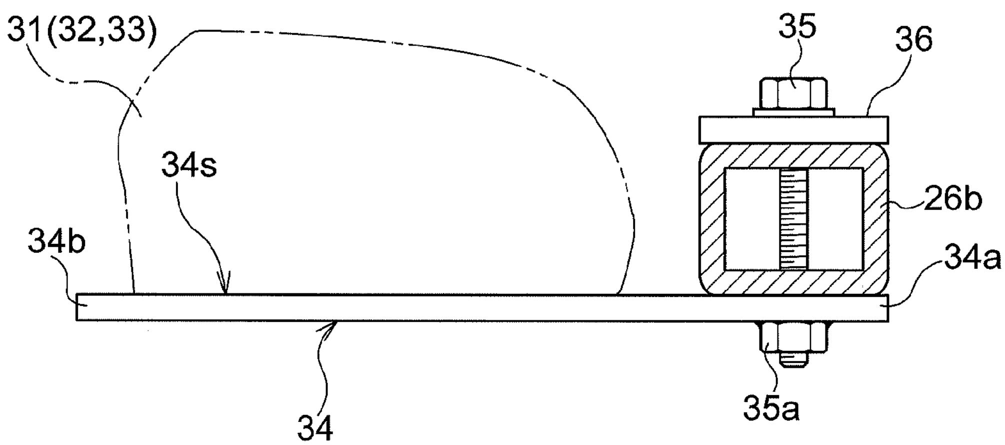
Figure 12:
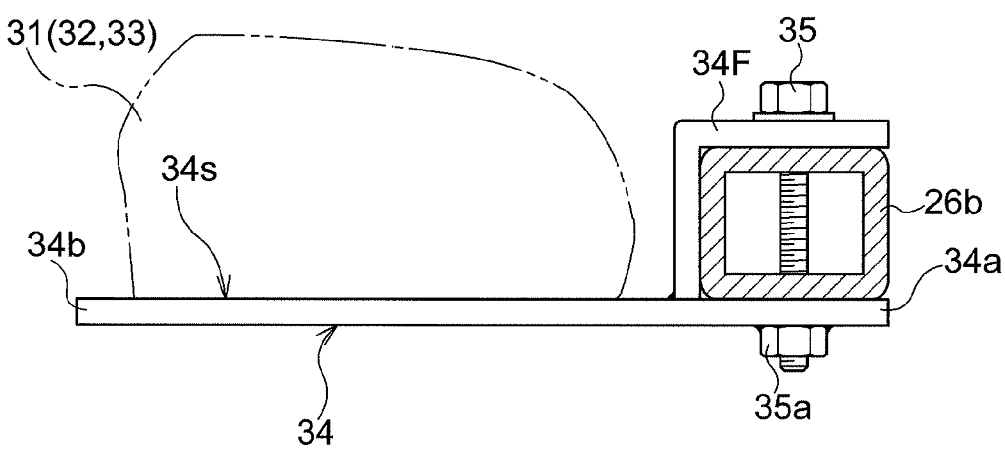

It is also possible to configure the attachment bracket 34 serving as a support member as shown in any of FIGS. 10 to 12. That is, in the configuration shown in FIG. 10, the attachment portion 34*a* of the attachment bracket 34 is configured by a front wall 34*af*, an upper wall 34*at*, and a rear wall 34*ar* so as to be embrace the lateral frame portion 26*b* from above. In this structure, the fixing bolts 35 pass through the front wall 34*af*, the lateral frame portion 26*b*, and the rear wall 34*ar* in the front-rear direction, and are screwed into the nut portion 35*a* of the rear wall 34*ar*, thereby fixing the attachment bracket 34 to the lateral frame portion 26*b*.

Further, in the configuration shown in FIG. 11, as the attachment portion 34*a* of the attachment bracket 34, the upper face of the front end of the attachment bracket 34 is brought into contact with the lower face of the lateral frame portion 26*b*, the fixing plate 36 is disposed on the upper face of the lateral frame portion 26*b*, the fixing bolts 35 pass through the fixing plate 36, the lateral frame portion 26*b*, and the attachment portion 34*a* in the vertical direction, and the fixing bolts 35 are screwed into the nut portion 35*a* on the lower face of the attachment portion 34*a*, thereby fixing the attachment bracket 34 to the lateral frame portion 26*b*.

Further, in the configuration shown in FIG. 12, as the attachment portion 34*a* of the attachment bracket 34, a fitting member 34F having a shape capable of contacting the rear face and the upper face of the lateral frame portion 26*b* is provided. The fitting member 34F is brought into contact with the upper face and the rear face of the lateral frame portion 26*b*, and is brought into contact with the lower face of the lateral frame portion 26*b*. The fixing bolts 35 pass through an upper wall portion of the fitting member 34F, the lateral frame portion 26*b*, and the attachment portion 34*a* in the vertical direction, and the fixing bolts 35 are screwed into the nut portion 35*a* on the lower face of the attachment portion 34*a*, thereby fixing the attachment bracket 34 to the lateral frame portion 26*b*.

(a-4)

In this other embodiment (a-4), since the attachment bracket 34 is disposed in a posture extending rearward from the lateral frame portion 26*b*, the positioning unit 31 is disposed behind the lateral frame portion 26*b*. Alternatively, the attachment bracket 34 may be disposed in a posture extending forward from the lateral frame portion 26*b*, and the positioning unit 31 may be supported by the attachment bracket 34. In this case, the positioning unit 31 is disposed on the front side of the lateral frame portion 26*b*.

(a-5)

Instead of providing wiring between the positioning unit 31 or the antenna unit 32 and the controller 30, a configuration may be adopted in which information is transmitted therebetween by wireless communications.

Other Embodiment b (b-1)

Figure 13:
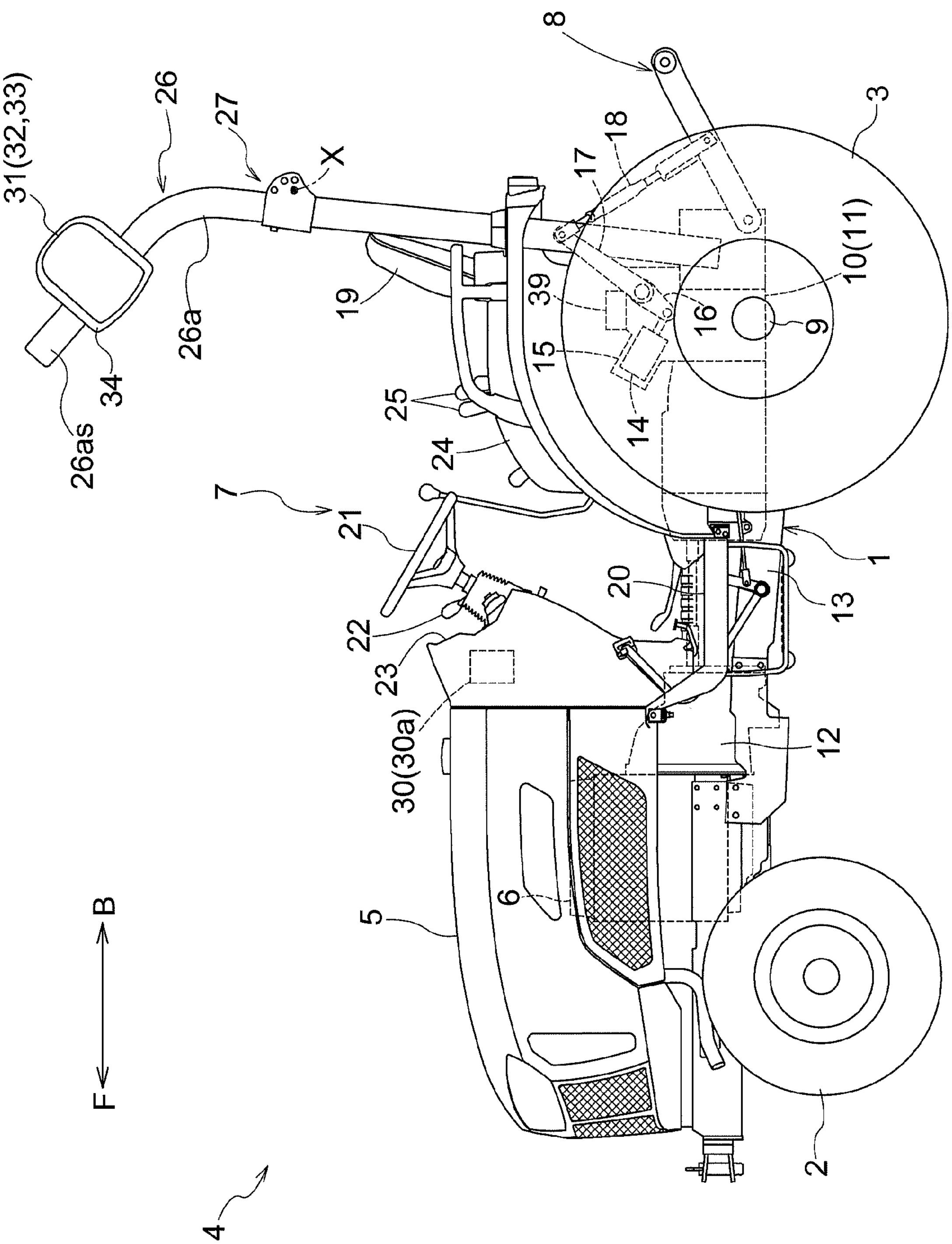
FIG. 13 is a side view of a tractor according to another embodiment b.
Figure 14:
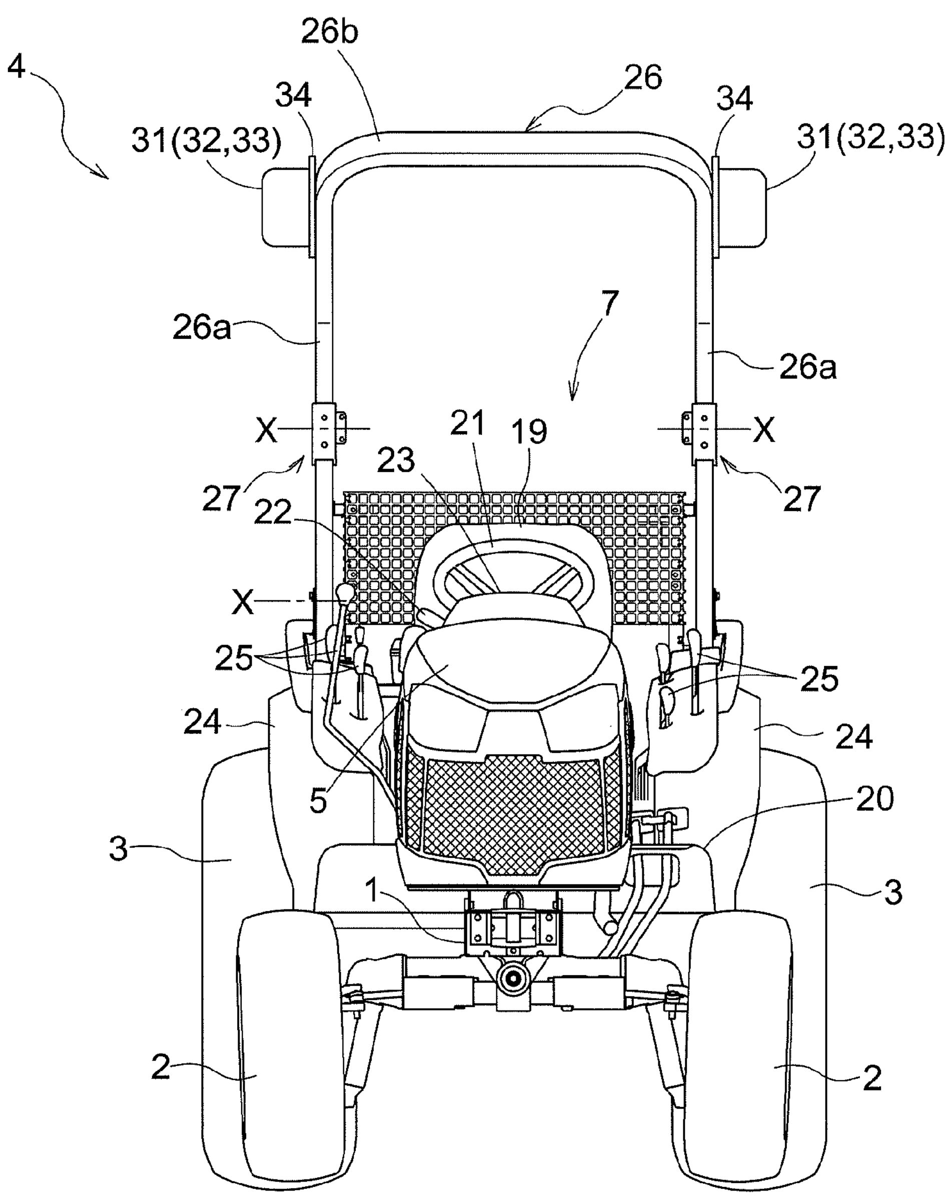
FIG. 14 is a front view of the tractor according to another embodiment b.

As shown in FIGS. 13 and 14, folding portions 27 are provided at intermediate portions in the vertical direction of the vertical frame portions 26*a*. Thus, the ROPS 26 is configured to be foldable around the laterally oriented swing pivot X above the folding portions 27, and in a portion of each vertical frame portion 26*a* above the folding portion 27, an inclined portion 26*as* is formed that inclines to the front side toward the upper end side. A positioning unit 31 is provided on each of the outer faces of the right and left inclined portions 26*as*. In this other embodiment b, a configuration may also be adopted in which three or more of the positioning units 31 are provided.

In this other embodiment (b-1), the positioning units 31 are provided at a position higher than the upper end of a backrest of the driver seat 19 on both the right and left vertical frame portions 26*a* of the ROPS 26. Specifically, attachment brackets 34 serving as support members are mounted on outer faces of the inclined portions 26*as* that is located above the folding portions 27, and the positioning units 31 are provided on the attachment brackets 34.

The positioning units 31 include a satellite navigation antenna unit 32 that receives a radio wave transmitted from a GPS satellite (not shown) and data transmitted from a reference station (not shown) installed at a known position, and a satellite navigation device 33 that measures the position and bearing of the traveling vehicle body 4 based on the positioning data of the positioning unit 31.

Figure 15:
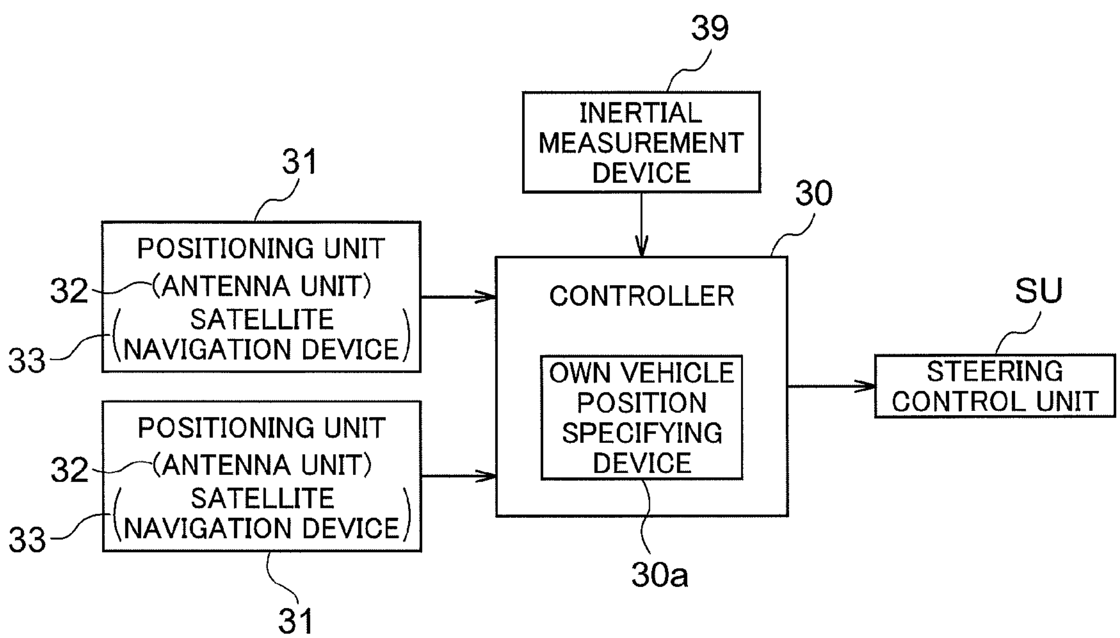
FIG. 15 is a block circuit diagram of a control configuration according to another embodiment b.

As shown in FIG. 15, the controller 30 includes an own vehicle position specifying device 30*a* that specifies an own vehicle position by input of positioning information from the two positioning units 31. The own vehicle position specifying device 30*a* corrects the own vehicle position based on the information from the inertial measurement device 39. Then, the controller 30 outputs a control signal to a steering control unit SU so as to travel along a travel route based on the own vehicle position and information regarding the travel route that has been set in advance.

With this configuration, satellite positioning information transmitted from a GPS satellite or the like can be satisfactorily received without being hindered by the hood 5 or a part of the traveling vehicle body 4, or affected by obstacles. Based on the positioning information from the two positioning units 31, the controller 30 performs processing that reduces errors and processing that acquires average values, thus enabling autonomous travel with high accuracy.

(b-2)

Figure 16:
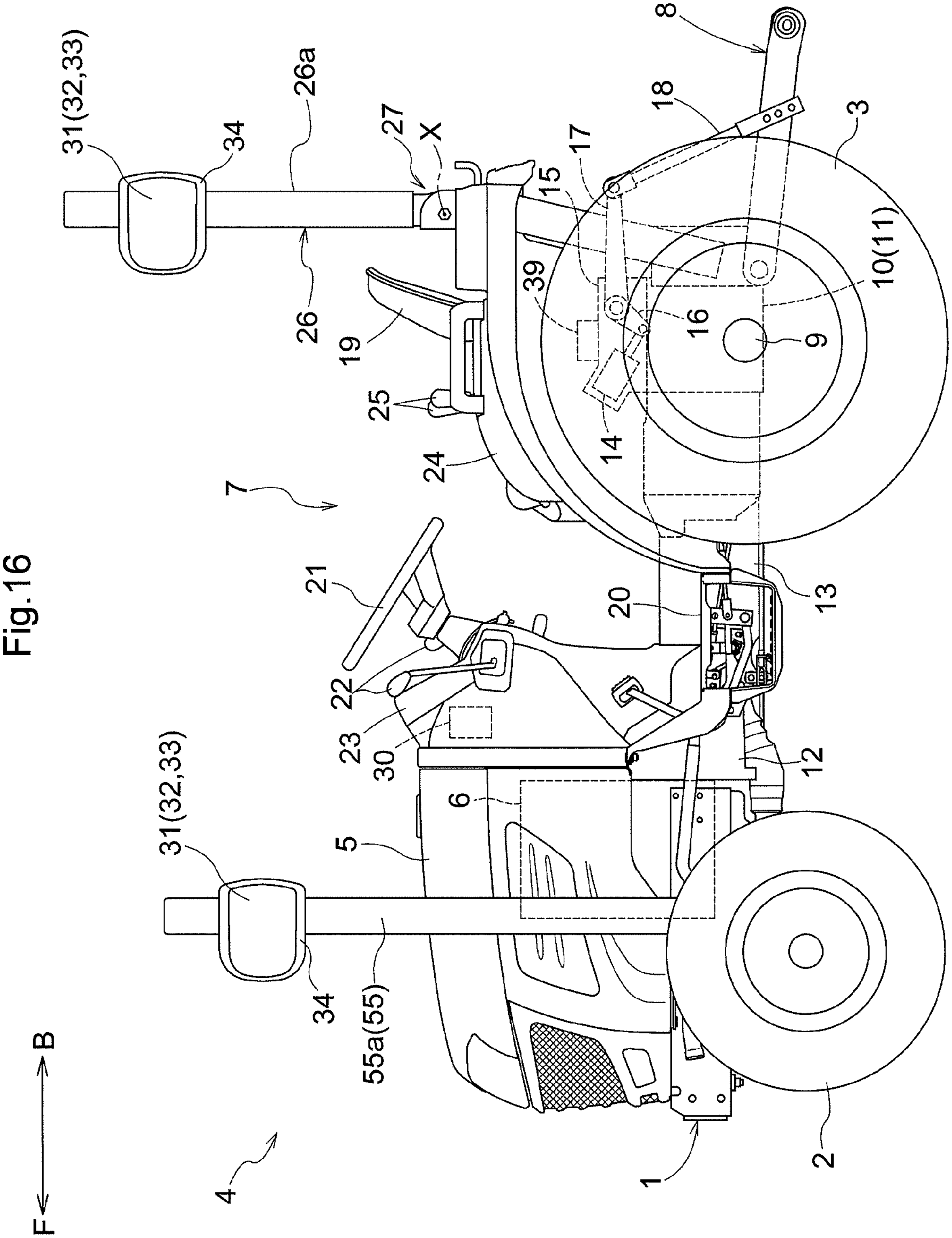
FIG. 16 is a side view of the tractor according to another embodiment b.
Figure 17:
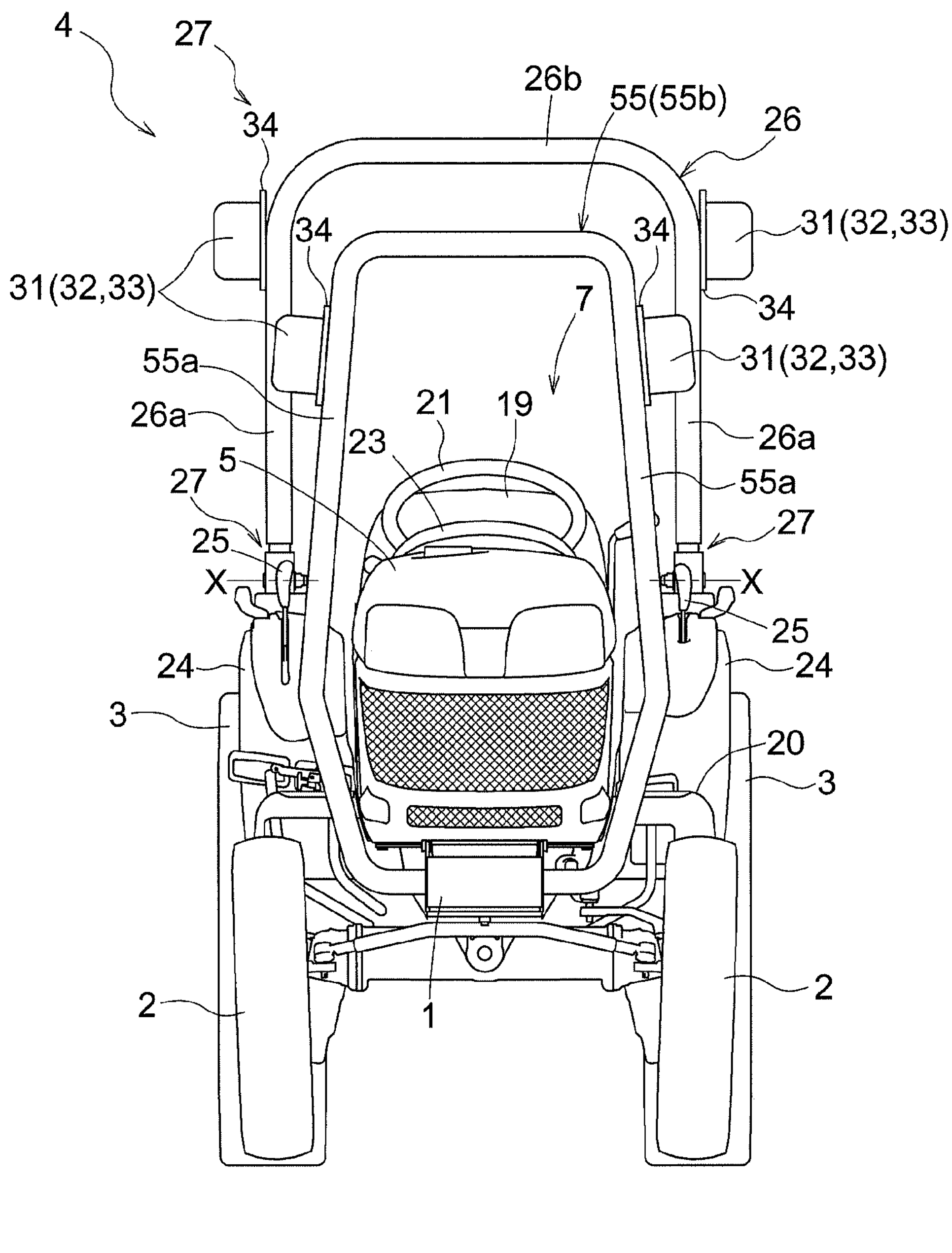
FIG. 17 is a front view of the tractor according to another embodiment b.

As shown in FIGS. 16 and 17, a ROPS 26 for rollover protection (referred to as a rear ROPS 26 in this other embodiment) is provided to the rear of the driver seat 19, and at the same time, a front ROPS 55 is provided in front of the driver seat 19, and a positioning unit 31 is provided at right and left positions respectively of the rear ROPS 26 and the front ROPS 55.

The front ROPS 55, by bending a hollow square pipe material, has a right-left pair of front vertical frame portions 55*a* that extend in the vertical direction, and a front lateral frame portion 55*b* that joins upper ends of the right and left front vertical frame portions 55*a* to each other and extends in the lateral direction. The front ROPS 55 is formed substantially in a gate shape when viewed from the front of the vehicle body. In this sort of configuration, the positioning units 31 are provided on the right and left front vertical frame portions 55*a* through attachment brackets 34.

Each positioning unit 31 has an antenna unit 32 for satellite navigation and a satellite navigation device 33 that measures the position and bearing of the traveling vehicle body 4.

In this other embodiment (b-2), as in the other embodiment (b-1), by acquiring positioning information from the plurality of positioning units 31, it is possible to perform processing that reduces errors and processing that acquires average values, thus enabling autonomous travel with high accuracy.

(b-3)

Even in a configuration in which positioning information can be acquired from a plurality of positioning units 31, it is not necessary to use a plurality of items of positioning information at the same time. For example, processing that specifies the own vehicle position may be performed based on positioning information of the positioning units 31 that satisfies a predetermined reception status. Also, in a case where reception information of the plurality of positioning units 31 is compared, and reception information of a predetermined positioning unit 31 deviates from reception information of the other positioning units 31, a control mode may be set such that the positioning information of that positioning unit 31 is not used.

In this other embodiment b, a configuration may be adopted in which three or more of the positioning units 31 are provided, or a configuration may be adopted in which the own vehicle position is specified based on three or more items of positioning information.

Other Embodiment c (c-1)

Figure 18:
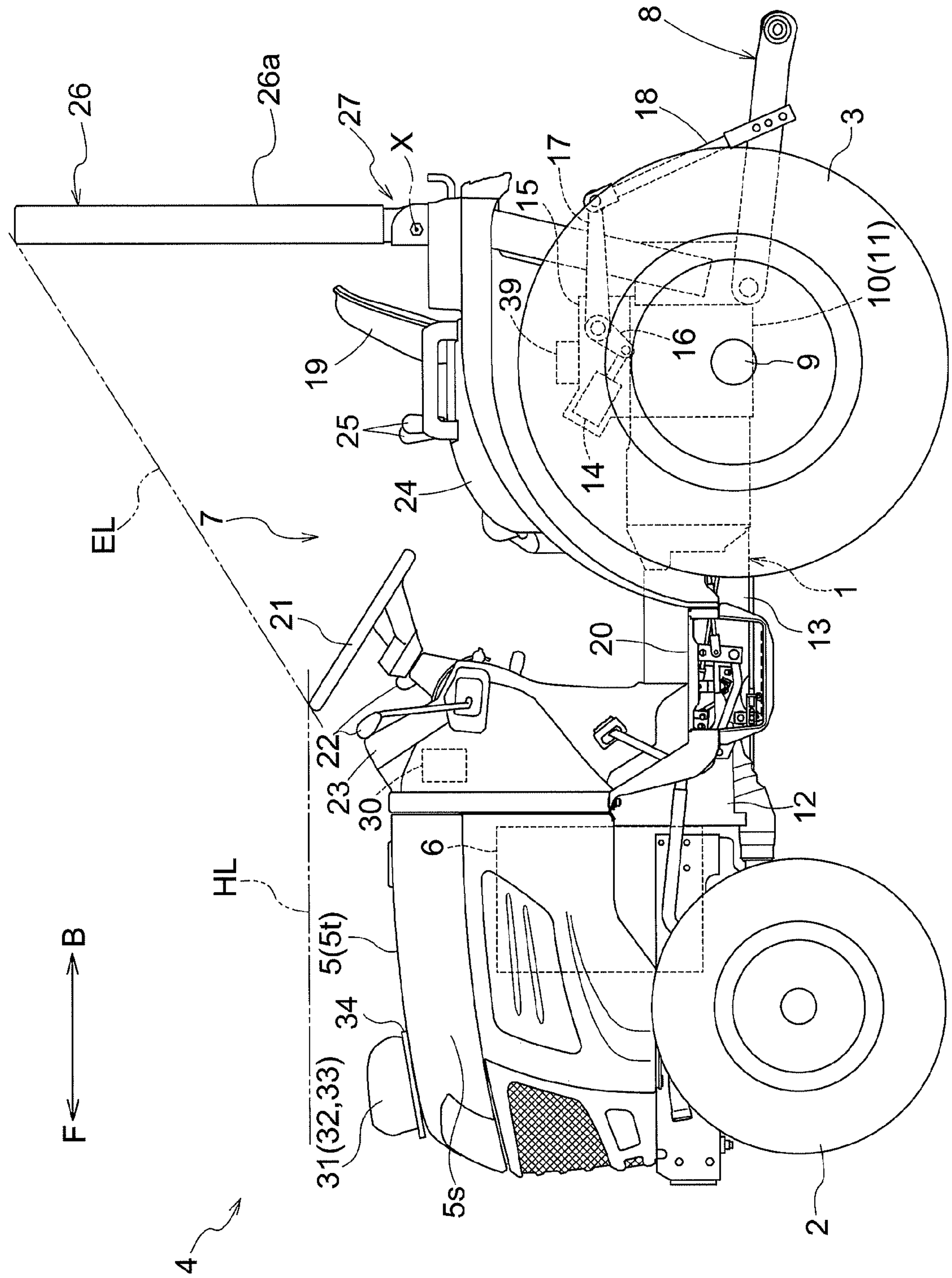
FIG. 18 is a side view of a tractor according to another embodiment c.
Figure 19:
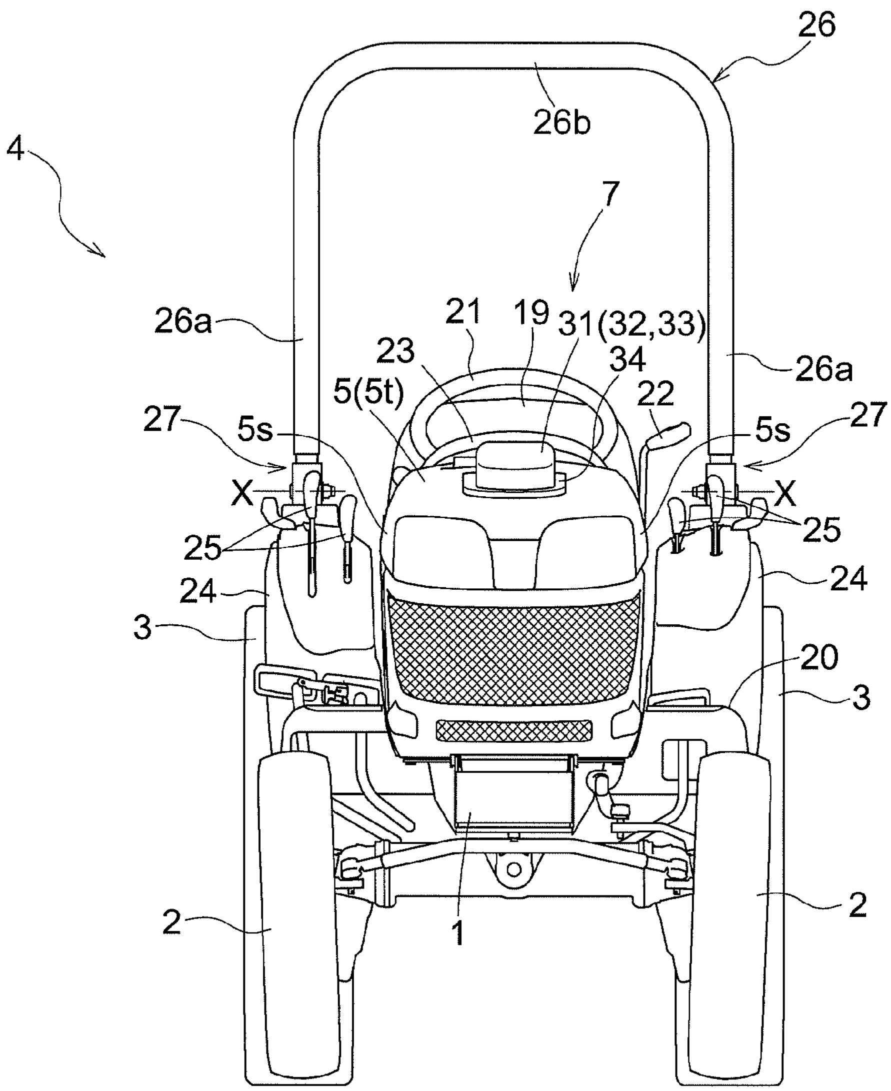
FIG. 19 is a front view of the tractor according to another embodiment c.

As shown in FIGS. 18 and 19, the hood 5 has an upper face portion 5*t* and right and left side face portions 5*s*. A positioning unit 31, having an antenna unit 32 in front of a center portion in the front-rear direction of the vehicle body in the upper face portion 5*t* of the hood 5, is attached through an attachment bracket 34 serving as a support member at a center position in the right-left direction.

Also, as shown in FIG. 18, in a side view, the antenna unit 32 is located above an area line EL connecting the upper end of the lateral frame portion 26*b* of the ROPS 26 and the upper end of the steering wheel 21, and also is located below a horizontal line HL in a horizontal posture passing through the upper end of the steering wheel 21. Note that when the positioning unit 31 is provided, a part or the whole of the positioning unit 31 may be disposed at a location protruding forward from the front end of the hood 5.

By disposing the positioning unit 31 having the antenna unit 32 in this manner, satellite positioning information transmitted from a GPS satellite or the like can be satisfactorily received without being affected by obstacles such as vehicle body components such as the ROPS 26. Furthermore, since the positioning unit 31 is disposed below the horizontal line HL, the field of vision of a driver sitting on the driver seat 19 is not disturbed.

(c-2)

Figure 20:
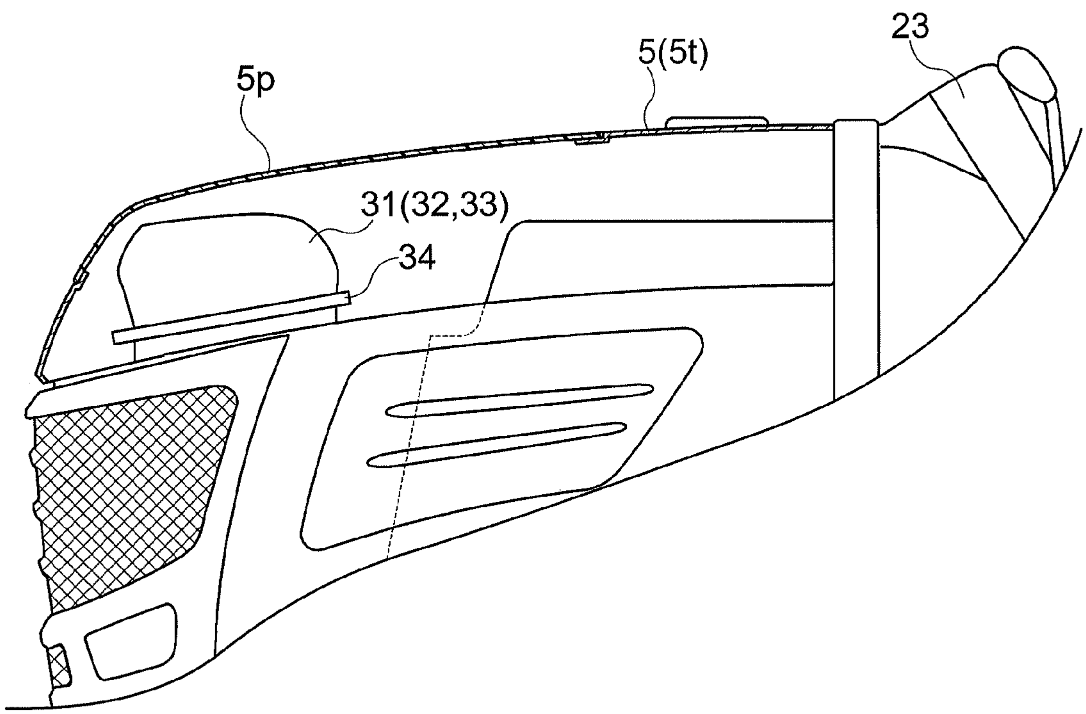
FIG. 20 is a partially cut away side view of a hood according to another embodiment c.

As shown in FIG. 20, a positioning unit 31 having an antenna unit 32 is provided inside the hood 5, through an attachment bracket 34 at a center position in the right-left direction. A resin wall 5*p* is provided in part of a portion of the hood 5 that faces the upper side of the positioning unit 31.

Since the positioning unit 31 is provided in this manner, satellite positioning information transmitted from a GPS satellite or the like can be satisfactorily received without any inconvenience of damage to the positioning unit 31 by wind and rain, and without being affected by obstacles such as vehicle body components such as the ROPS 26. Further, since the resin wall 5*p* is provided above the positioning unit 31, satellite positioning information transmitted from a GPS satellite or the like can be received without being disturbed.

Other Embodiment d (d-1)

Figure 21:
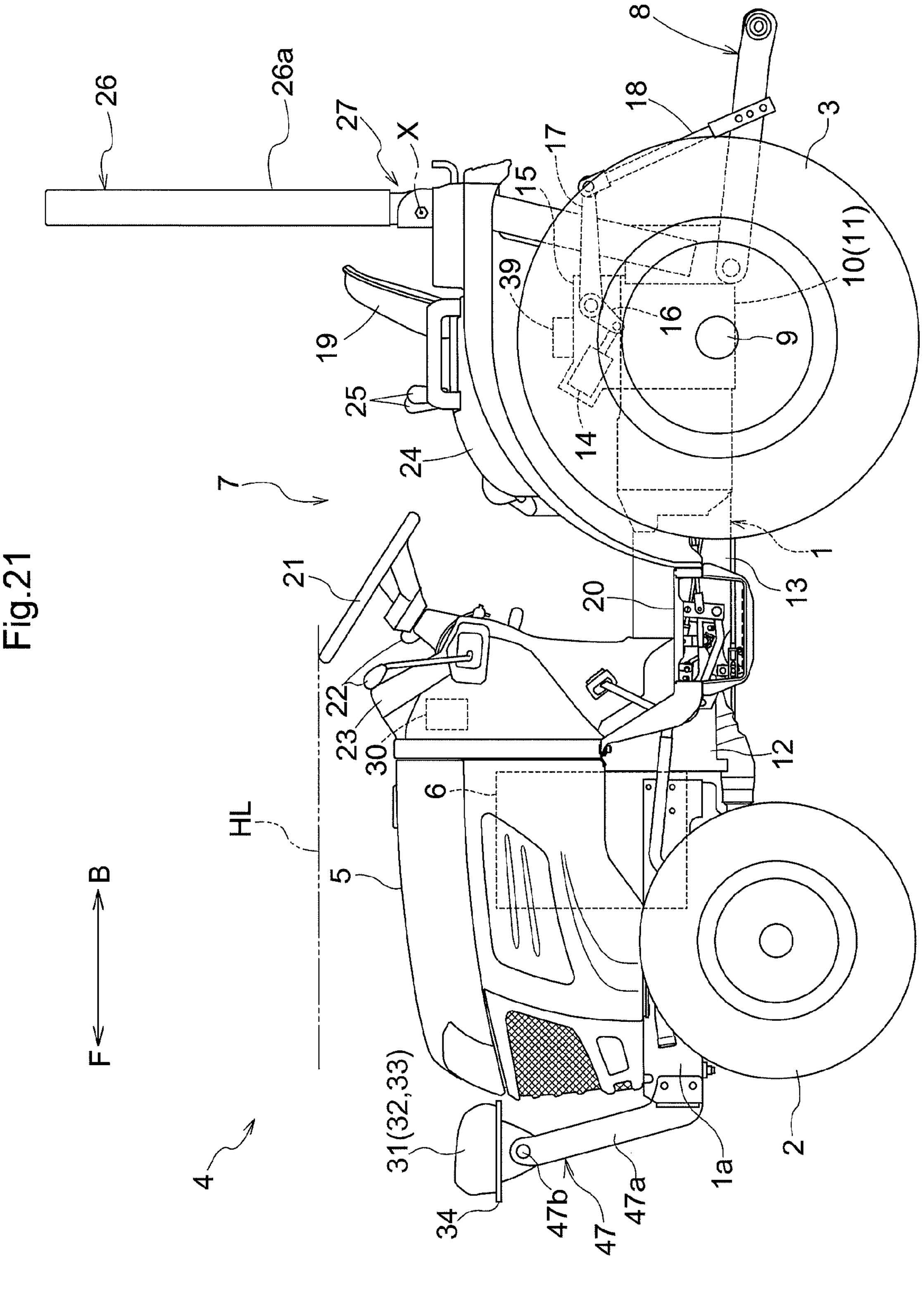
FIG. 21 is a side view of a tractor according to another embodiment d.
Figure 22:
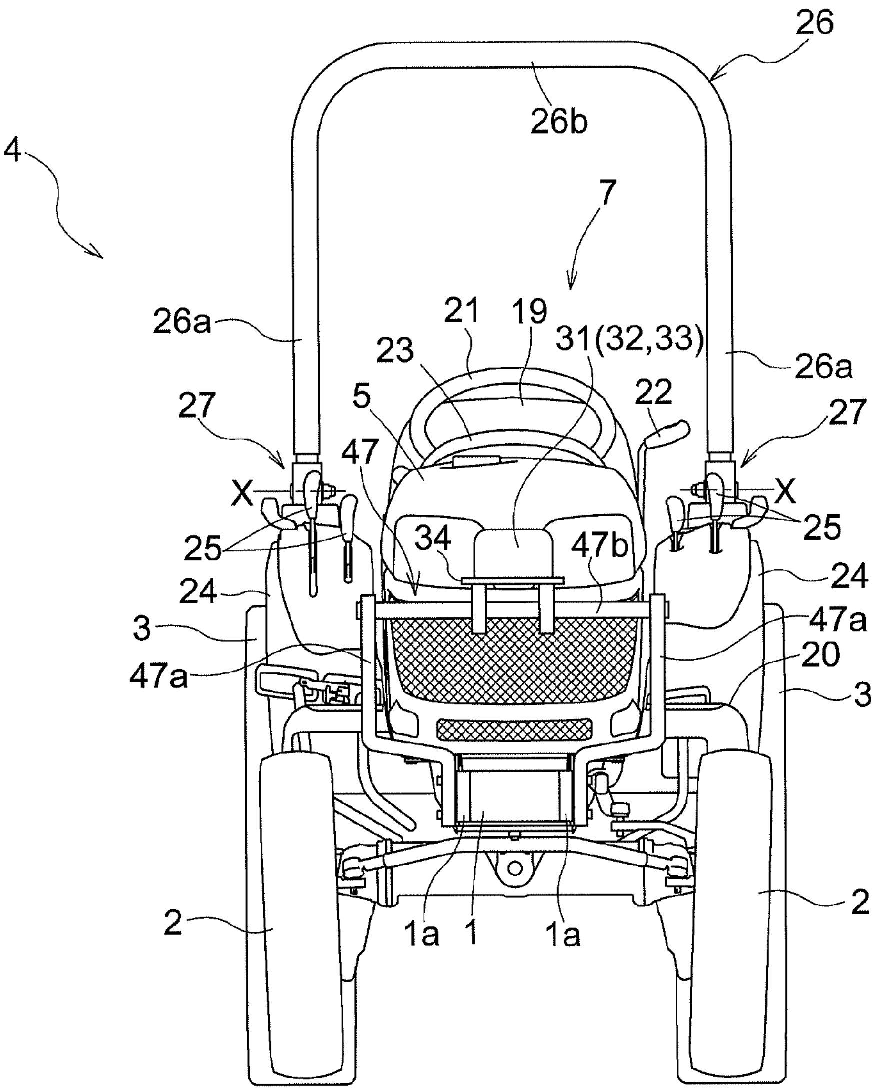
FIG. 22 is a front view of the tractor according to another embodiment d.

As shown in FIGS. 21 and 22, a front guard 47 (an example of a front support member) is fixed on right and left frame members 1*a* forming the vehicle body frame 1 of the traveling vehicle body 4. The front guard 47 has an attachment bracket 34, and the attachment bracket 34 is provided with a positioning unit 31 having an antenna unit 32. The front guard 47 is disposed on the front side of the front end of the hood 5 so as to prevent the hood 5 from contacting an outer wall of a building, a tree or the like when traveling and thus being damaged.

The front guard 47 is configured with a right-left pair of vertical members 47*a* in a vertically long posture, each having a base end connected to the right and left frame members 1*a*, and a lateral member 47*b* connected to the upper ends thereof. The attachment bracket 34 is provided in the center of the lateral member 47*b* in the right-left direction, and the positioning unit 31 is provided so as to be mounted on the upper face of the attachment bracket 34. Thus, the upper end portion of the positioning unit 31 is provided above the upper ends of the vertical members 47*a* at a center position of the front guard 47 in the right-left direction.

In this other embodiment (d-1), as shown in FIG. 21, in a side view, the positioning unit 31 is disposed below a horizontal line HL in a horizontal posture passing through the upper end of the steering wheel 21.

As described above, the positioning unit 31 is disposed in the open space in front of the hood 5, so satellite positioning information transmitted from a GPS satellite or the like can be satisfactorily received without being affected by obstacles. Furthermore, since the positioning unit 31 is disposed below the horizontal line HL, the field of vision of a driver sitting on the driver seat 19 is not disturbed.

(d-2)

Figure 23:
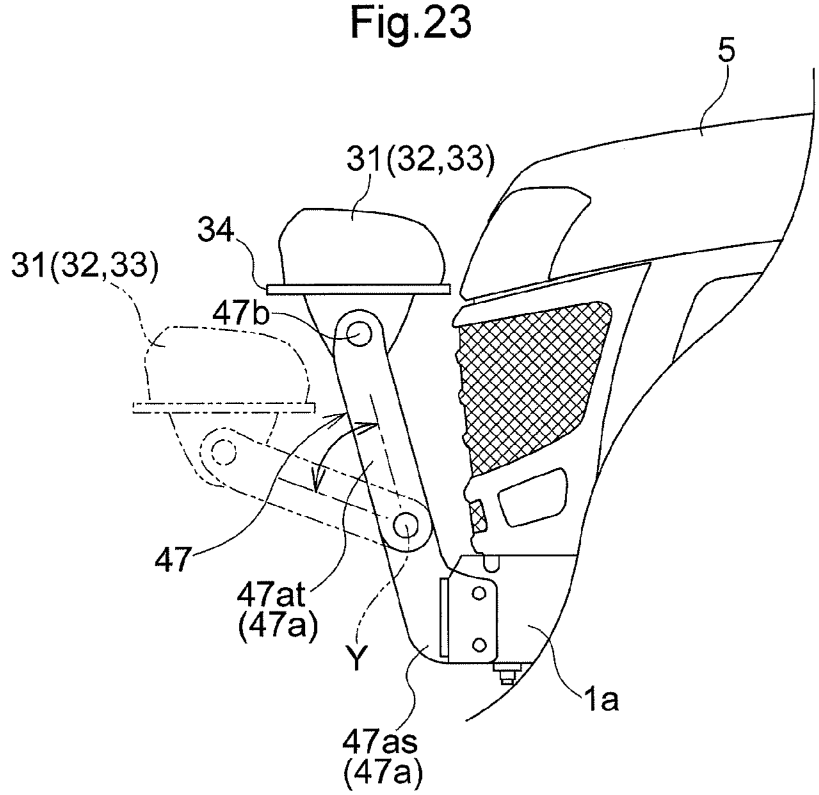
FIG. 23 is a side view of a front guard according to another embodiment d.

As shown in FIG. 23, a part of the front guard 47 serving as a front support member is supported so as to be swingable in the front-rear direction around a switching axis Y in a laterally oriented posture. A positioning unit 31 having an antenna unit 32 with the same configuration as that of the other embodiment (d-1) is provided on the front guard 47.

In this other embodiment (d-2), vertical members 47*a* of the front guard 47 are configured with a lower base member 47*as* and vertical swinging members 47*at* that are supported so as to be able to swing around the switching axis Y. A lateral member 47*b* is connected to the upper ends of the right and left vertical swing members 47*at*, and the positioning unit 31 is provided at the center of the lateral member 47*b* in the right-left direction through the attachment bracket 34.

With this configuration, the positioning unit 31 is further displaced forward from the front end of the hood 5 by swinging the vertical swinging members 47*at* forward around the switching axis Y, and therefore satellite positioning information transmitted from a GPS satellite or the like can be satisfactorily received. Also, in this other embodiment (d-2), a configuration may be adopted in which, when the vertical swinging members 47*at* have been swung forward as indicated by the double-dotted chained line in FIG. 23, the posture of the positioning unit 31 can be maintained in a horizontal posture.

Other Embodiment e (e-1)

Figure 24:
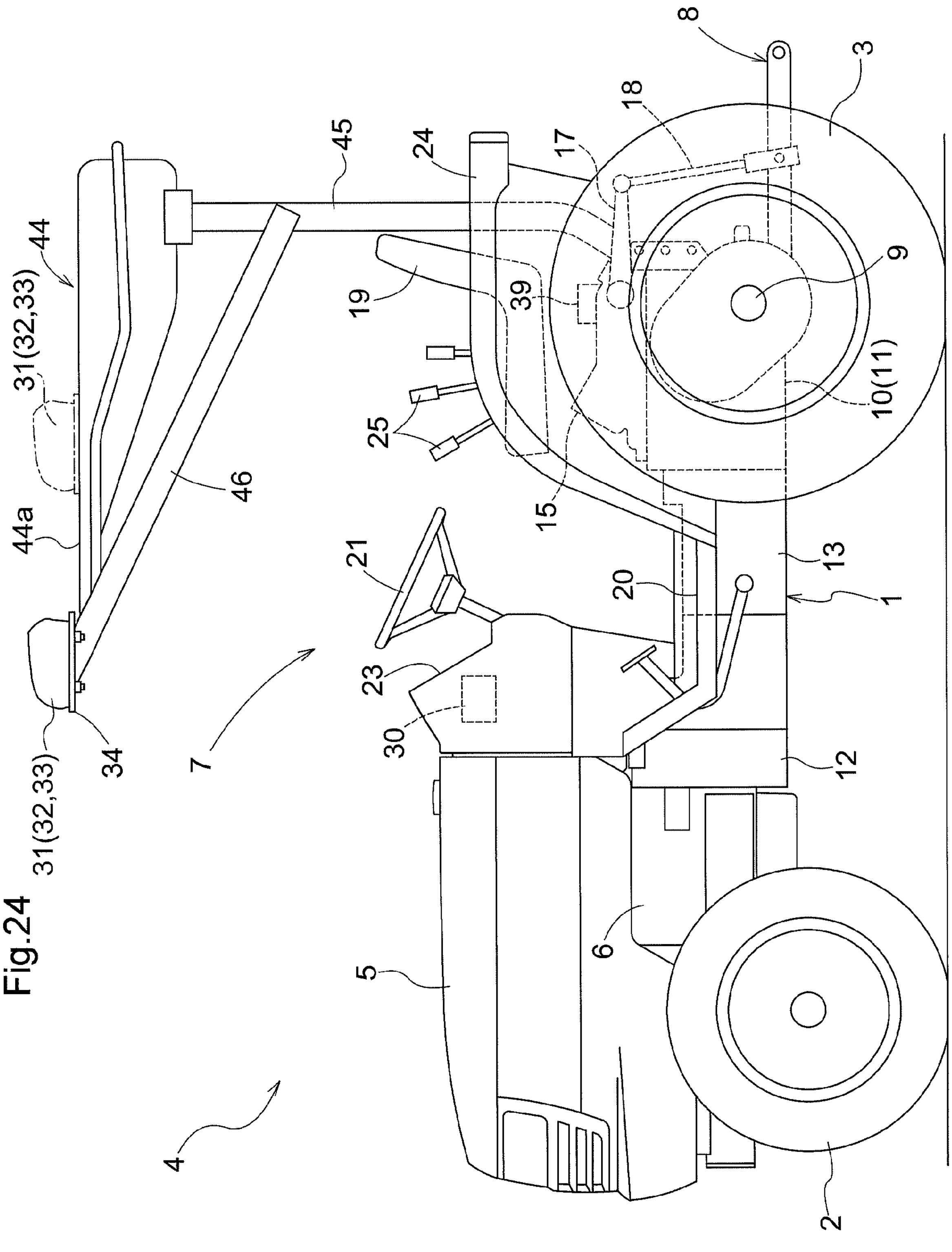
FIG. 24 is a side view of a tractor according to another embodiment e.

As shown in FIG. 24, the antenna unit 32 may be provided in a canopy 44 that covers above the driving portion 7. That is, the canopy 44 has a resin roof member 44*a* that extends in a cantilever manner toward the front of the vehicle body with respect to column members 45 erected on the right and left at positions to the rear of the driver seat 19. On the upper face of the roof member 44*a* of the canopy 44, the antenna unit 32 is provided in an area between the center and the front end in the front-rear direction through an attachment bracket 34.

In particular, when the antenna unit 32 is provided at the front end of the roof member 44*a* of the canopy 44, the support strength may be improved by providing a beam member 46 between each column member 45 and the front end of the roof member 44*a*, as shown in FIG. 24. That is, in this configuration, by disposing the positioning unit 31 having the antenna unit 32 (the antenna unit 32) on an extension line in the longitudinal direction of the beam member 46, the antenna unit 32 is supported with high strength.

In this other embodiment (e-1), by providing the antenna unit 32 at a central position in the front-rear direction of the canopy 44 as shown by the double-dotted chained line in FIG. 24, or providing the antenna unit 32 between this central position and the front end position, satellite positioning information transmitted from a GPS satellite or the like can be satisfactorily received at a high position.

Note that, in this other embodiment (e-1), the canopy 44 may be provided at the upper end of the ROPS 26 without using the column members 45. FIG. 24 shows a configuration in which the beam members 46 are connected at the front end of the roof member 44*a*, but it is not necessary to connect at the front end, and a configuration may also be adopted in which the beam members 46 are connected at an intermediate position in the front-rear direction of the canopy 44.

(e-2)

Figure 25:
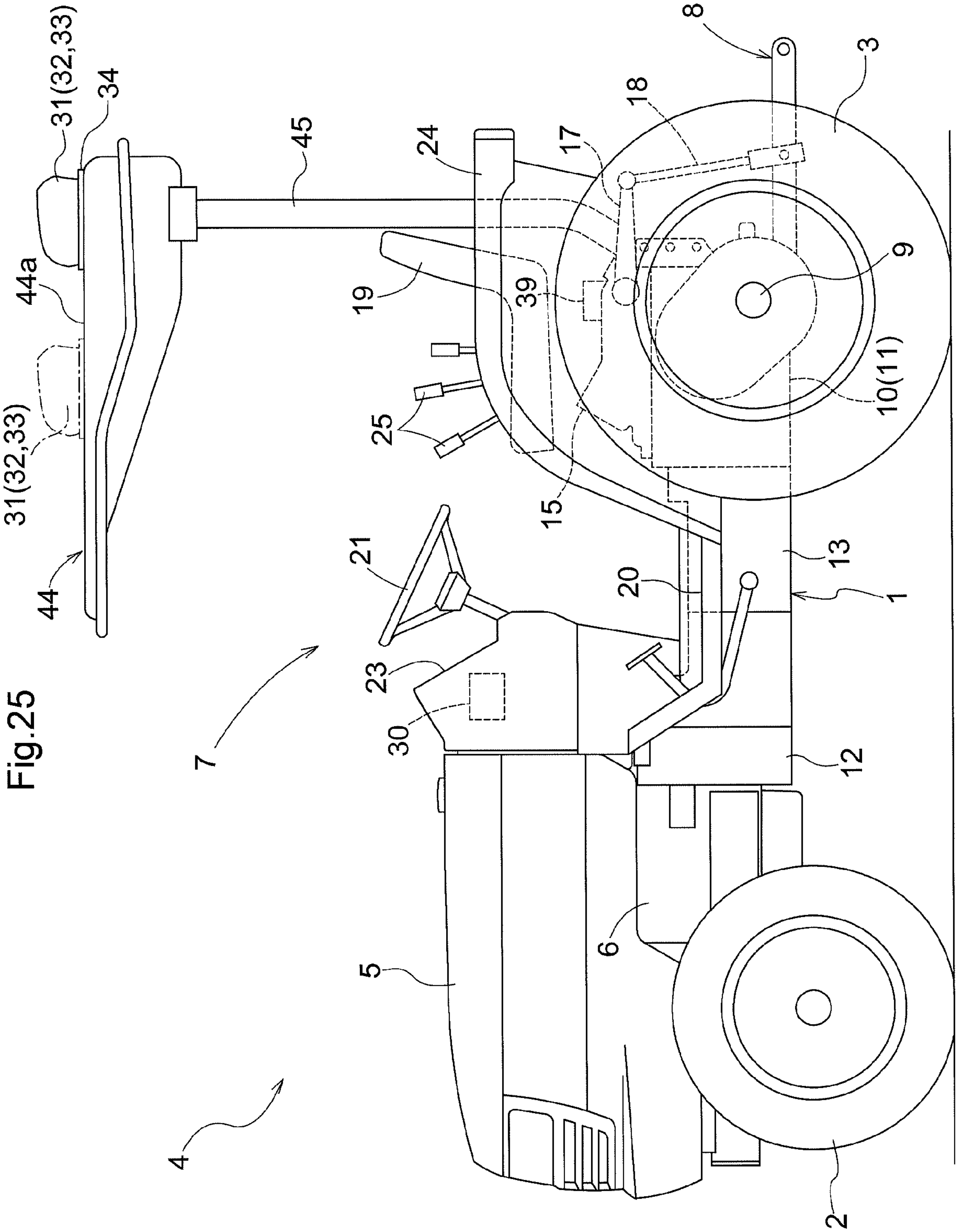
FIG. 25 is a side view of the tractor according to another embodiment e.

As shown in FIG. 25, the antenna unit 32 is provided between the center (a position indicated by a double-dotted chained line in FIG. 25) and the rear end in the front-rear direction of the roof member 44*a* of the canopy 44. FIG. 25 shows a configuration in which the antenna unit 32 is provided at the rear end of the canopy 44. By providing the antenna unit 32 at this position, the antenna unit 32 is disposed on an extension line in the longitudinal direction of the column members 45, so even when the column members 45 receive vibration in the vertical direction and the traveling vehicle body 4 vibrates up and down, the vibration is received by the column members 45, so it is possible to receive satellite positioning from above in a state where the vibration is suppressed.

(e-3)

Figure 26:
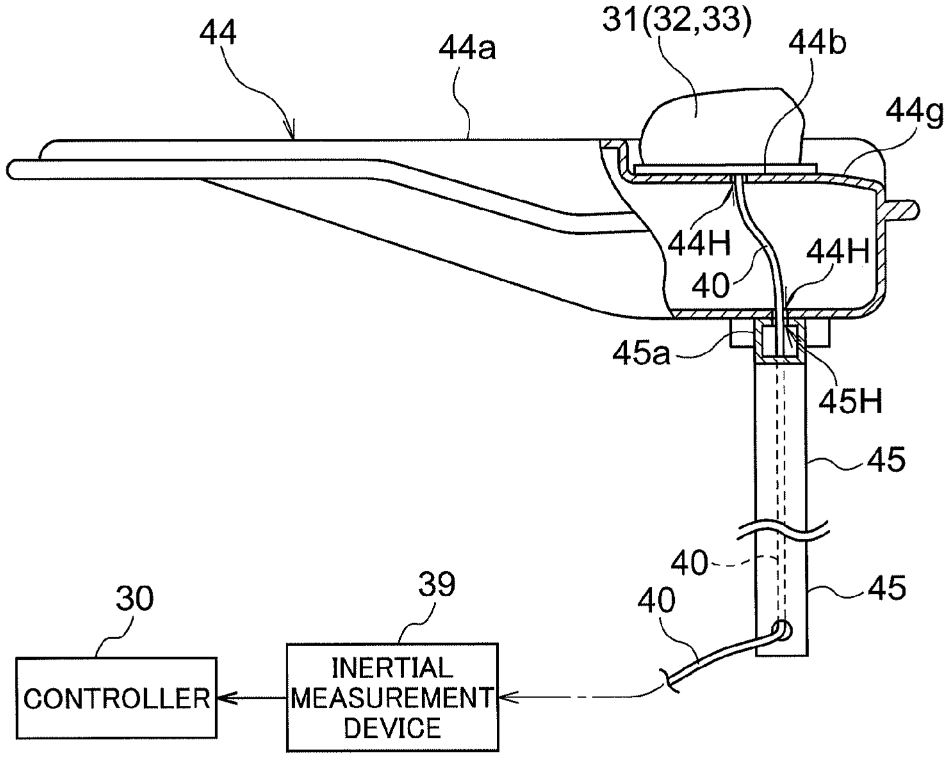
FIG. 26 is a partially cut away side view of a canopy according to another embodiment e.
Figure 27:
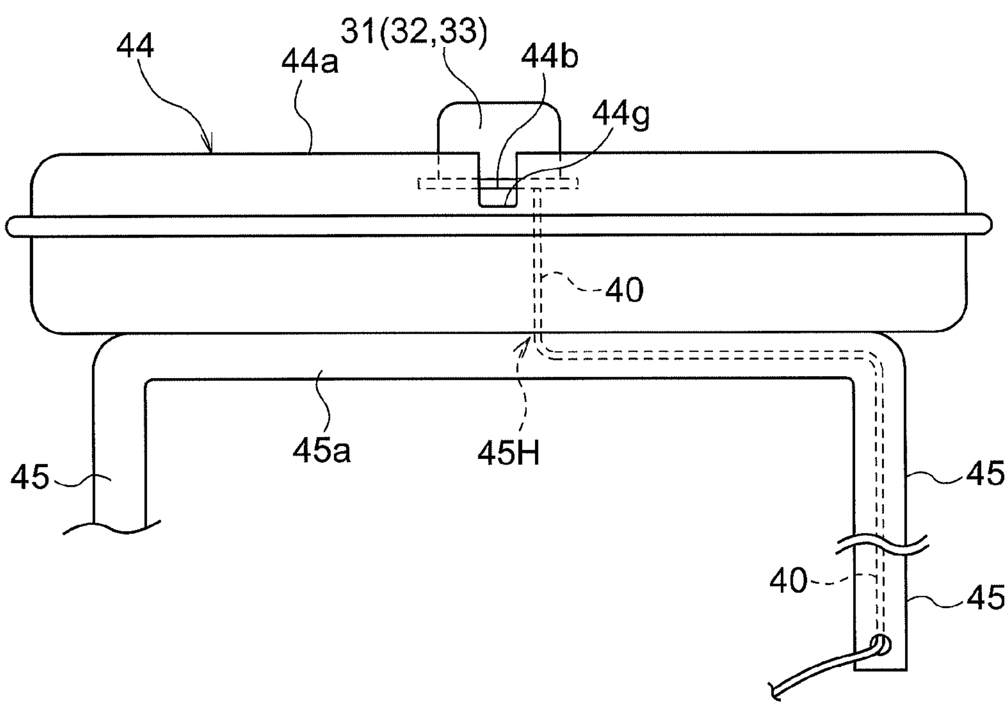
FIG. 27 is a rear view of the canopy according to another embodiment e.

As shown in FIGS. 26 and 27, the antenna unit 32 is provided in a mode in which a mounting recess 44*b* is formed on the upper face of the roof member 44*a* of the canopy 44, and the antenna unit 32 is fitted into the mounting recess 44*b*. In addition, a drain groove 44*g* (an example of a draining device) connected to the mounting recess 44*b* is formed.

In this configuration, the right and left column members 45 are formed in a hollow square pipe shape, and by bending the upper ends thereof, a square pipe-like connection column 45*a* is provided that connects the upper ends of the right and left column members 45 to each other. An insertion hole 44H is provided at the upper end of the bottom of the mounting recess 44*b* and the bottom wall of the roof member 44*a*, and an introduction hole 45H into which the wiring 40 to be inserted into the insertion hole 44H is introduced is formed on the upper face of the connection column 45*a*.

According to this configuration, the wiring 40 from the antenna unit 32 is inserted into the insertion hole 44H, inserted into the inside of the column members 45 from the introduction hole 45H on the upper face of the connection column 45*a*, and drawn out from the lower portion of the column members 45 to the outside. Thus, positioning information can be transmitted to the controller 30 through the inertial measurement device 39.

In the other embodiment (e-3), since the antenna unit 32 is provided in a mode fitted in the mounting recess 44*b*, the antenna unit 32 can be stably supported. However, since it is conceivable that rainwater accumulates in the mounting recess 44*b*, the drain groove 44*g* communicating with the mounting recess 44*b* is formed so that the rainwater can be satisfactorily discharged, and the inconvenience of rainwater remaining in the mounting recess 44*b* is eliminated.

In this other embodiment (e-3), the wiring 40 from the antenna unit 32 may be disposed along the drain groove 44*g*. By disposing the wiring 40 in this manner, it is easy to dispose the wiring 40. Also, although the attachment bracket 34 is not shown in FIGS. 26 and 27, the antenna unit 32 may be supported through the attachment bracket 34.

Other Embodiment f

Figure 28:
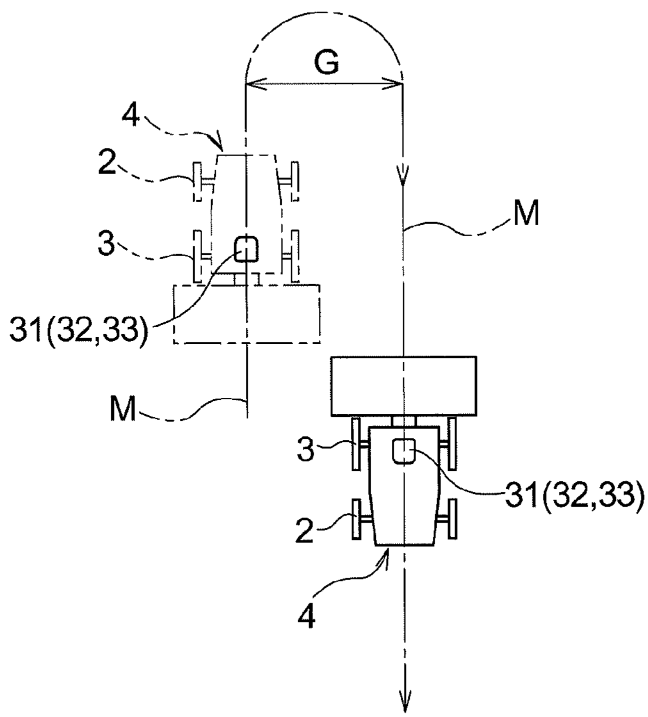
FIG. 28 is a plan view showing a travel route according to another embodiment f.

FIG. 28 shows a configuration in which a positioning unit 31 having an antenna unit 32 and a satellite navigation device 33 is provided in the traveling vehicle body 4, and shows a travel route M of a traveling vehicle body 4 when performing plowing work based on positioning of the positioning unit 31. Based on the positioning of the positioning unit 31, the traveling vehicle body 4 is caused to travel straight, and when the traveling vehicle body 4 reaches unplowed land and turns, an interval G of a predetermined distance is created between the travel route M before turning and the travel route M after turning.

The interval G is ideally the same value when turning right at the ridge shown on the upper side of the drawing as shown in FIG. 28, or when turning left at the lower side of the drawing shown in FIG. 28. When plowing work is performed based on the positioning by the positioning unit 31, this interval G is set to a fixed value. However, when the positioning unit 31 is deviated from the center in the right-left direction of the traveling vehicle body 4 in either the left or right direction, the interval G does not become an equal value, so it is desired to provide the positioning unit 31 at the center position in the right-left direction of the traveling vehicle body 4 with high accuracy. In order to address such a problem, the configuration described below is adopted in this other embodiment f.

(f-1)

Figure 29:
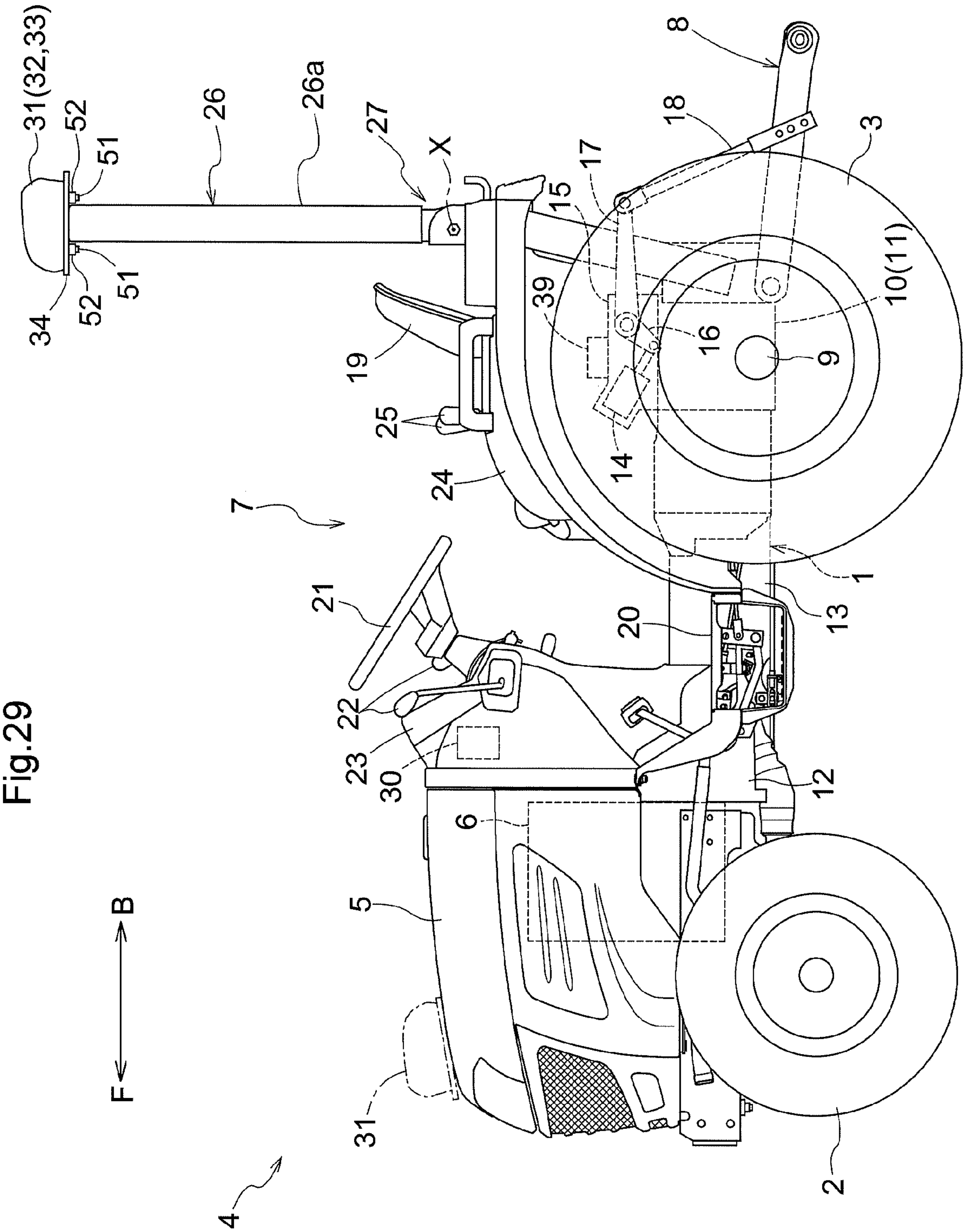
FIG. 29 is a side view of a tractor according to another embodiment f.
Figure 30:
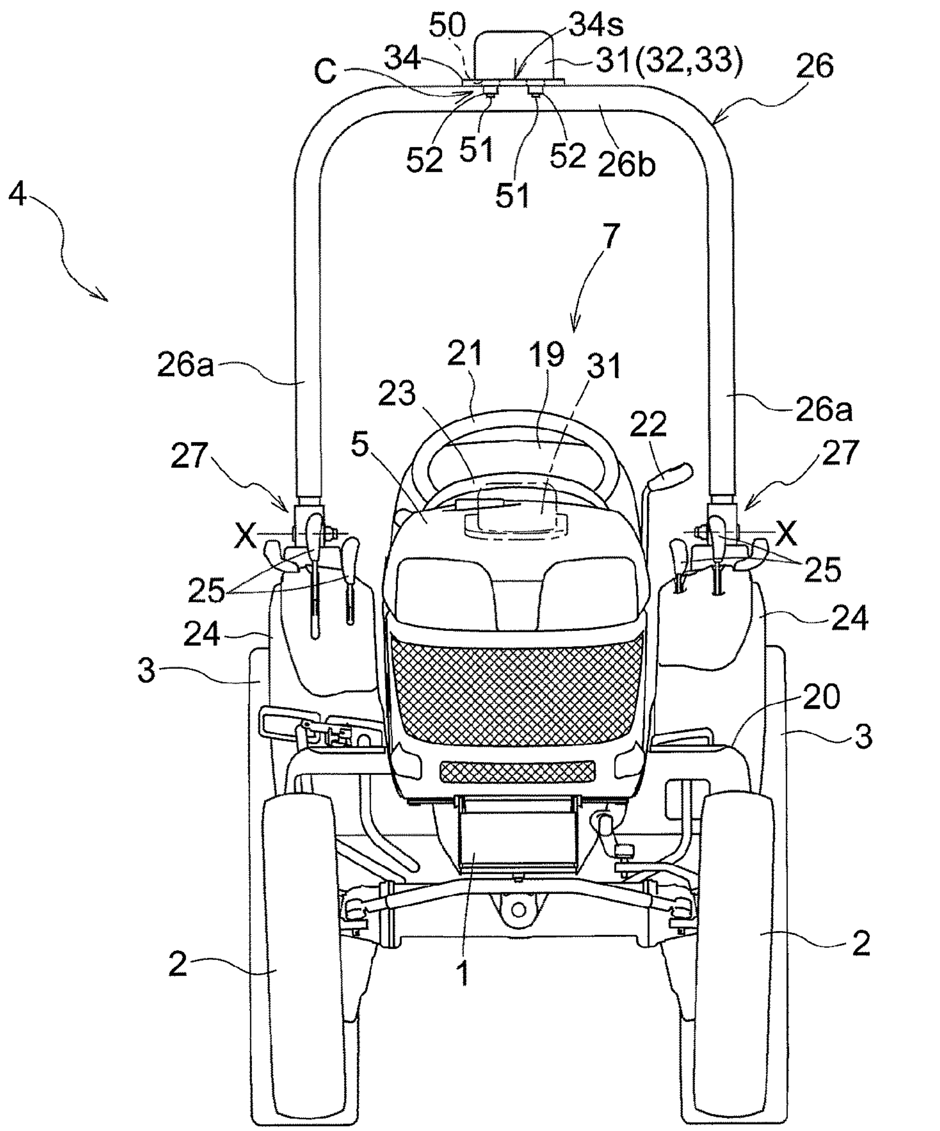
FIG. 30 is a front view of the tractor according to another embodiment f.

As shown in FIGS. 29 and 30, a ROPS 26 configured with a right-left pair of vertical frame portions 26*a* extending in the vertical direction and a lateral frame portion 26*b* extending in the lateral direction and joining the upper ends thereof to each other is provided located in the rear of the traveling vehicle body 4.

An attachment bracket 34 is fixed in a horizontal posture on the upper face of the lateral frame portion 26*b* at a center position in the right-left direction, and a positioning unit 31 having an antenna unit 32 is attached to a mounting face 34*s* of the attachment bracket 34 through a position adjusting mechanism C.

Figure 31:
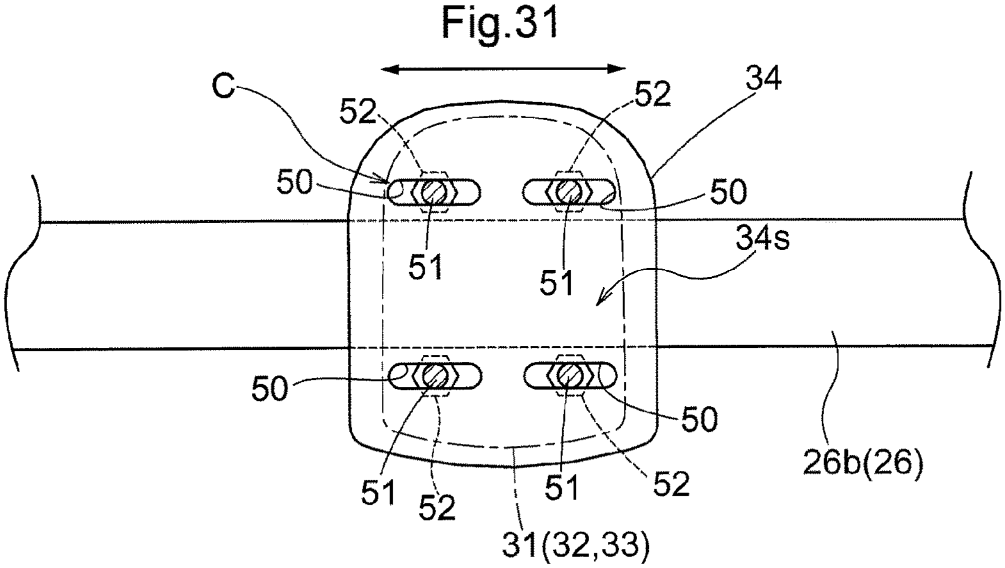
FIG. 31 is a plan view of a position adjusting mechanism according to another embodiment f.

As shown in FIG. 31, the position adjusting mechanism C is configured including a plurality of (four in this other embodiment (f-1)) elongated holes 50 drilled in the attachment bracket 34 and extending in the right-left direction, a plurality of (four in this other embodiment (f-1)) fastening bolts 51 protruding downward from the bottom face of the positioning unit 31 so that the fastening bolts 51 can be inserted into the elongated holes 50, and fastening nuts 52 screwed to the fastening bolts 51.

According to such a configuration, the fastening bolts 51 are inserted into the plurality of elongated holes 50, and by fastening the fastening nuts 52, the position of the positioning unit 31 is fixed to any position in the lateral direction of the traveling vehicle body 4. Thus, the position of the positioning unit 31 in the lateral direction can also be easily adjusted.

As a modified example of the other embodiment (f-1), a configuration may be adopted in which a flange (not shown) that abuts on the mounting face 34*s* of the attachment bracket 34 is formed so as to protrude in the right-left direction with respect to the positioning unit 31 having the antenna unit 32, the elongated holes 50 are formed extending in the lateral direction with respect to the flange, the attachment bracket 34 is provided with fastening bolts 51 that can be inserted into the elongated holes 50 in an upwardly directed posture, and fastening nuts 52 to be screwed to the fastening bolts 51 are provided. In this modified example, the position adjusting mechanism C is configured with the elongated holes 50, the fastening bolts 51, and the fastening nuts 52.

(f-2)

Figure 32:
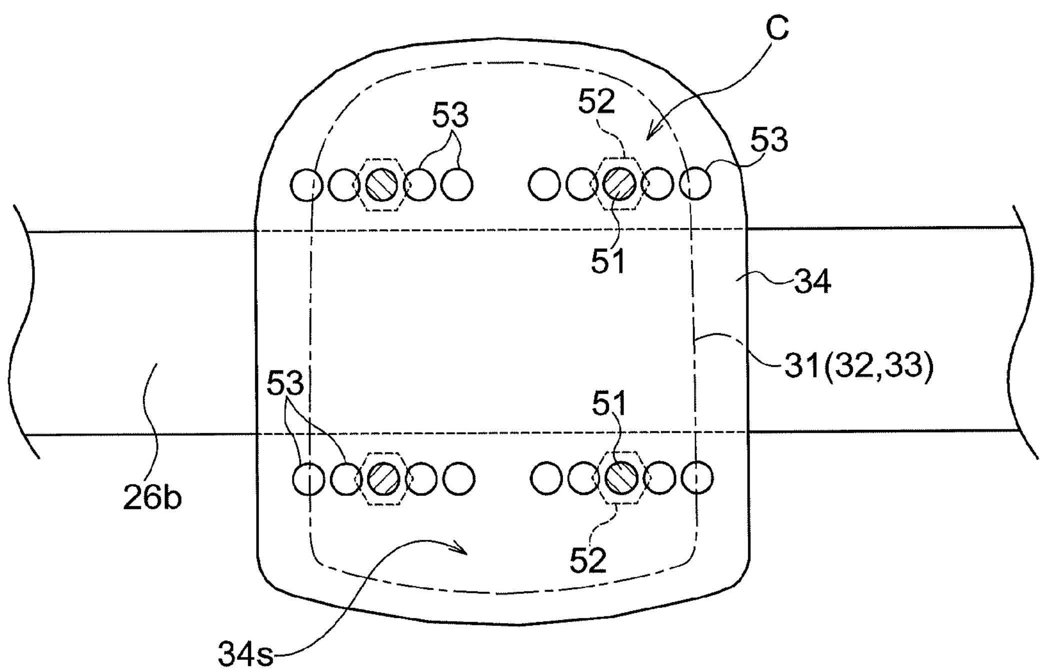
FIG. 32 is a plan view of the position adjusting mechanism according to another embodiment f.

As shown in FIG. 32, in this other embodiment (f-2), the position adjustment mechanism C is configured with a plurality (four sets in this other embodiment (f-1)) of insertion holes 53 that are arranged offset in the right-left direction in the attachment bracket 34, a downward directed plurality of fastening bolts 51 (four in this other embodiment (f-1)) on the bottom face of the positioning unit 31 having the antenna unit 32, and fastening nuts 52 that screw to the fastening bolts 51.

According to this sort of configuration, by selecting one of the plurality of insertion holes 53, inserting a fastening bolt 51, and fastening a fastening nut 52, the position of the positioning unit 31 is fixed to any position in the lateral direction of the traveling vehicle body 4. Thus, the position of the positioning unit 31 in the lateral direction can be easily adjusted.

As a modified example of the other embodiment (f-2), a configuration may be adopted in which a flange (not shown) that abuts on the mounting face 34*s* of the attachment bracket 34 is formed on the positioning unit 31, a plurality (four sets in this other embodiment (f-1)) of insertion holes 53 that are arranged offset in the right-left direction are formed in the flange, the attachment bracket 34 is provided with the fastening bolts 51 that can be inserted into insertion holes in an upwardly directed posture, and fastening nuts 52 to be screwed to the fastening bolts 51 are provided. In this modified example, the position adjusting mechanism C is configured with the plurality of insertion holes 53, the fastening bolts 51, and the fastening nuts 52.

Other Embodiment g

This other embodiment g is directed to a configuration provided with a rollover protection ROPS in front of the driver seat 19, but does not exclude a configuration provided with a rollover protection ROPS to the rear of the driver seat 19. Therefore, the ROPS in front of the driver seat 19 is referred to as a front ROPS 55, and the ROPS to the rear of the driver seat 19 is referred to as a rear ROPS 26.

(g-1)

Figure 33:
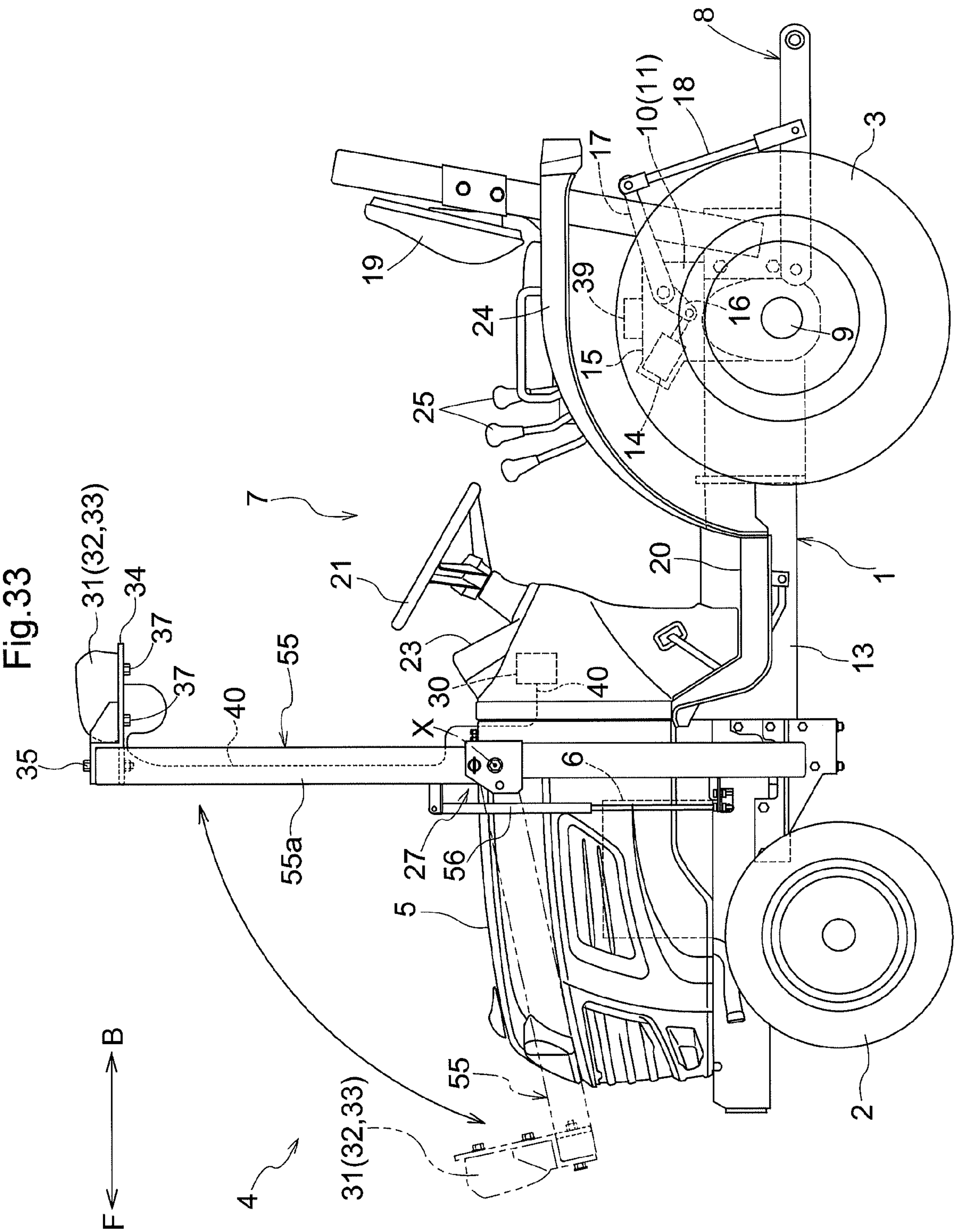
FIG. 33 is a side view of a tractor according to another embodiment g.
Figure 34:
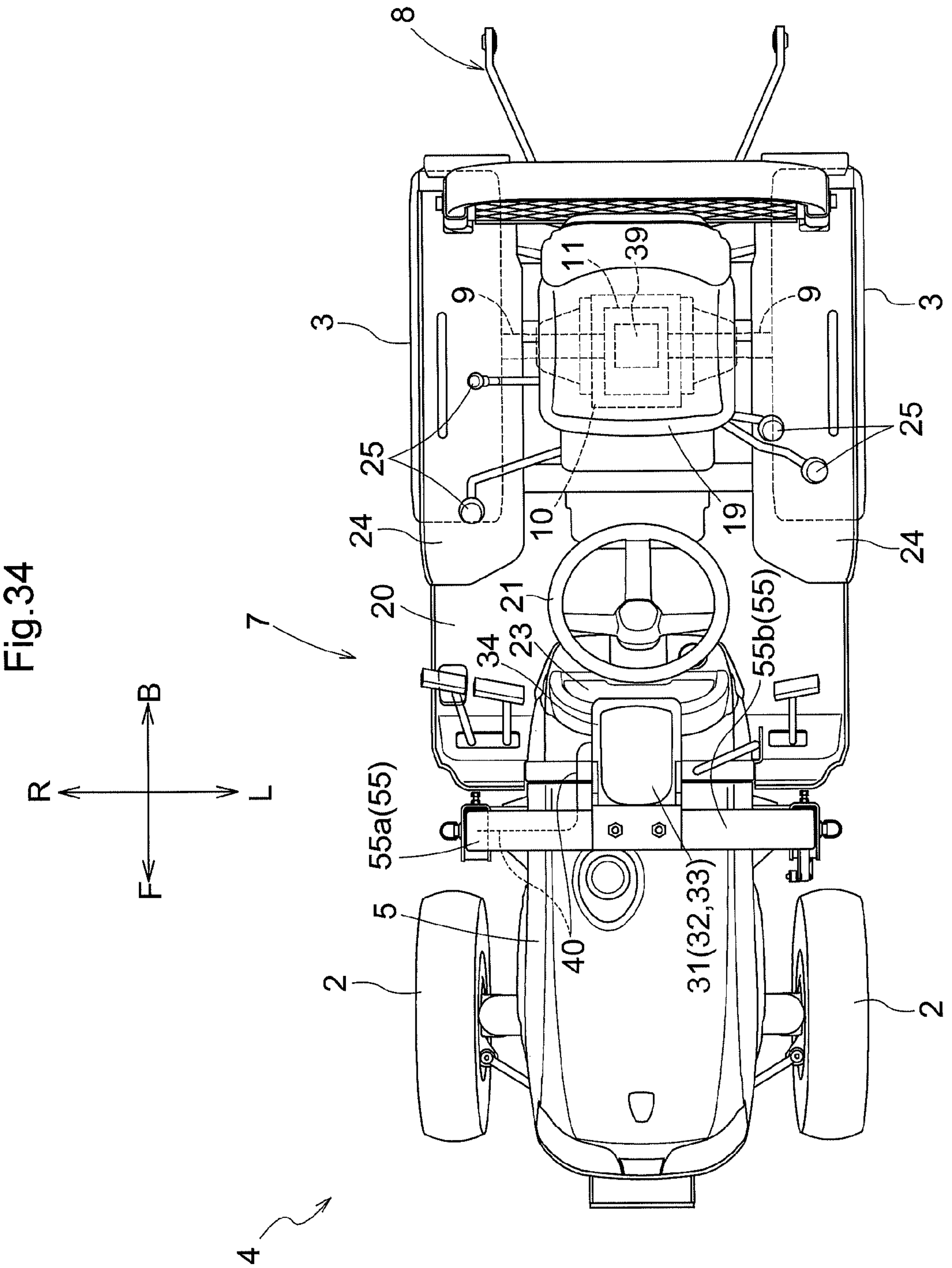
FIG. 34 is a plan view of the tractor according to another embodiment g.

As shown in FIGS. 33 and 34, a front ROPS 55 for rollover protection is provided in front of the driver seat 19, and the positioning unit 31 is provided in the front ROPS 55. The positioning unit 31 includes an antenna unit 32 for satellite navigation and a satellite navigation device 33 that measures the position and bearing of the traveling vehicle body 4.

The front ROPS 55, by bending a hollow square pipe material, has a right-left pair of front vertical frame portions 55*a* that extend in the vertical direction, and a front lateral frame portion 55*b* that joins upper ends of the right and left front vertical frame portions 55*a* to each other and extends in the lateral direction. The front ROPS 55 is formed substantially in a gate shape when viewed from the front of the vehicle body. In such a configuration, the positioning unit 31 is provided on the upper face of the front lateral frame portion 55*b* through the attachment bracket 34. Thus, the positioning unit 31 having the antenna unit 32 is disposed at a position higher than the upper end of the backrest of the driver seat 19.

In this other embodiment (g-1), the ROPS 55 is configured to be foldable around a laterally oriented swing pivot X in folding portions 27 provided below the right and left front vertical frame portions 55*a*. With this sort of configuration, by folding the upper frame portions (the upper portion of the right and left front vertical frame portions 55*a* above the swing pivot X and the front lateral frame portion 55*b*) of the ROPS 55 during transportation of the vehicle body or the like by swinging to the front side of the vehicle body around the swing pivot X, it is possible to reduce the amount of upward protrusion. At the time of folding, the vertical frame portions 26*a* above the swing pivot X swing by 180° and can be set to a non-use position. In this non-use position, the lateral frame portion 26*b* and the antenna unit 32 are located below the swing pivot X, thus facilitating maintenance of the antenna unit 32 and the like.

In this folding configuration, the side below the swing pivot X is referred to as a lower frame portion, and the lower frame portion is fixed to the traveling vehicle body 4. In addition, in the front ROPS 55, it is possible to switch between a standing posture in which the upper frame portion rises as shown by a solid line in FIG. 33 by a manual operation, and a storage posture in which the upper frame portion falls down to the front of the vehicle body as shown by a double-dotted chained line in FIG. 33. In particular, a gas spring 56 is provided as an assist mechanism to reduce the burden on the worker when operating from the storage posture to the standing posture.

Figure 35:
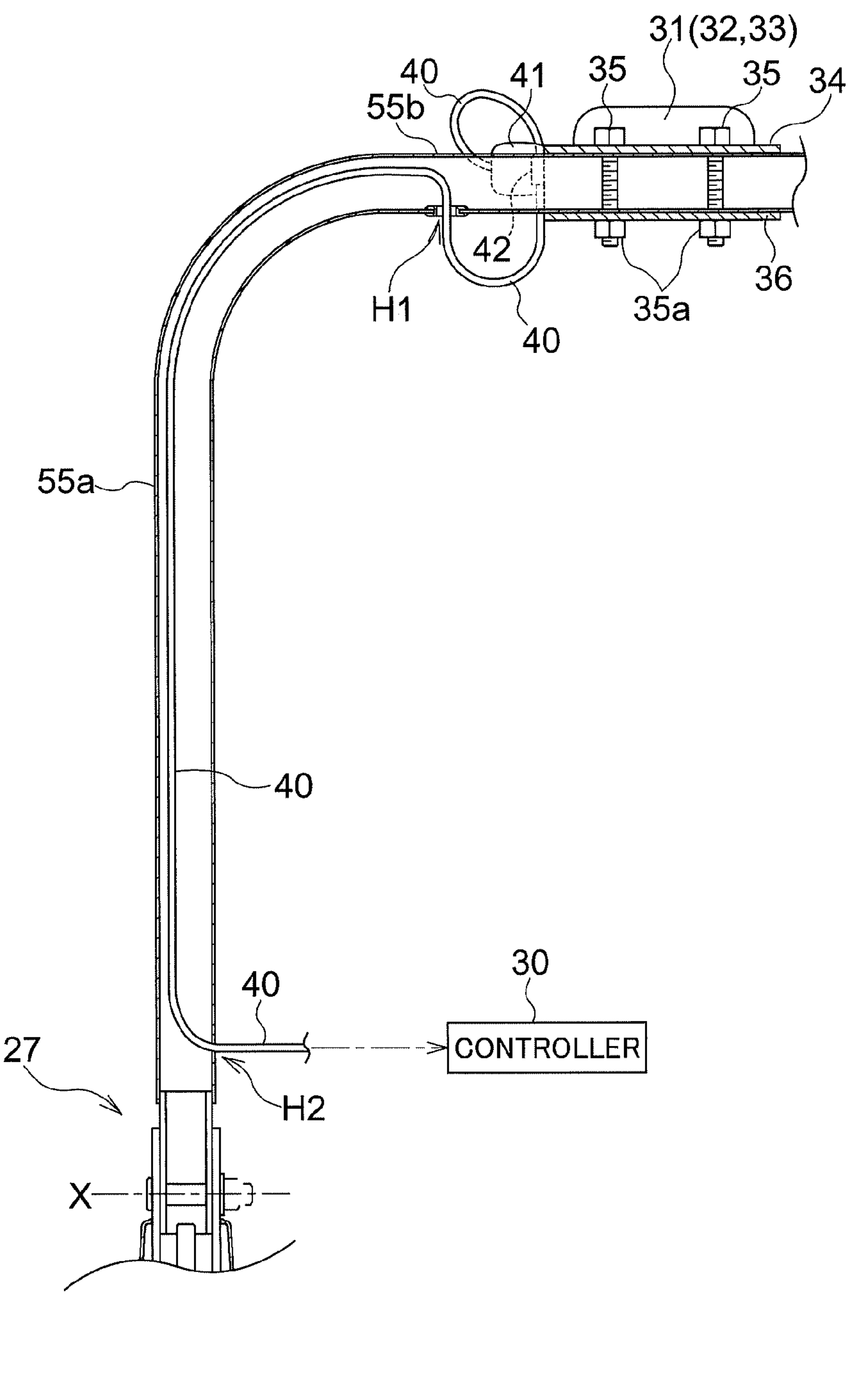
FIG. 35 is a view in cross section showing wiring within a front ROPS according to another embodiment g.

Further, in this configuration, as shown in FIG. 35, the wiring 40 that connects the positioning unit 31 including the antenna unit 32 with the controller 30 is routed from the front lateral frame portion 55*b* to the front vertical frame portion 55*a*. That is, the wiring 40 is inserted into the internal space of the front lateral frame portion 55*b* from a first through hole H1 on the lower face of the front lateral frame portion 55*b*, and below one front vertical frame portion 55*a* and above the folding portion 27 (above the swing pivot X), the wiring 40 is routed so as to be drawn out from a second through hole H2 on the inner face side (the side facing the right and left front vertical frame portions 55*a*) of the front vertical frame portion 55*a*. The wiring 40 thus drawn out is connected to the controller 30.

In the configuration of this other embodiment (g-1), even if the upper frame portion becomes heavy by providing the positioning unit 31 in the upper frame portion, the upper frame portion can be easily set to the standing posture by the biasing force of the gas spring 56. Further, by inserting the wiring 40 from the inside of the lateral frame portion 26*b* into the inside of the front vertical frame portion 55*a*, the wiring 40 is not damaged, and sagging of the wiring 40 can be suppressed.

In this other embodiment (g-1), the traveling vehicle body 4 may be configured to include the front ROPS 55 for rollover protection in front of the driver seat 19, and the ROPS 26 for rollover protection to the rear of the driver seat 19. Further, a torsion spring or a coil spring may be provided as an assist mechanism instead of the gas spring 56. The ROPS 26 may be configured to reach the storage posture by falling down rearward.

(g-2)

Figure 36:
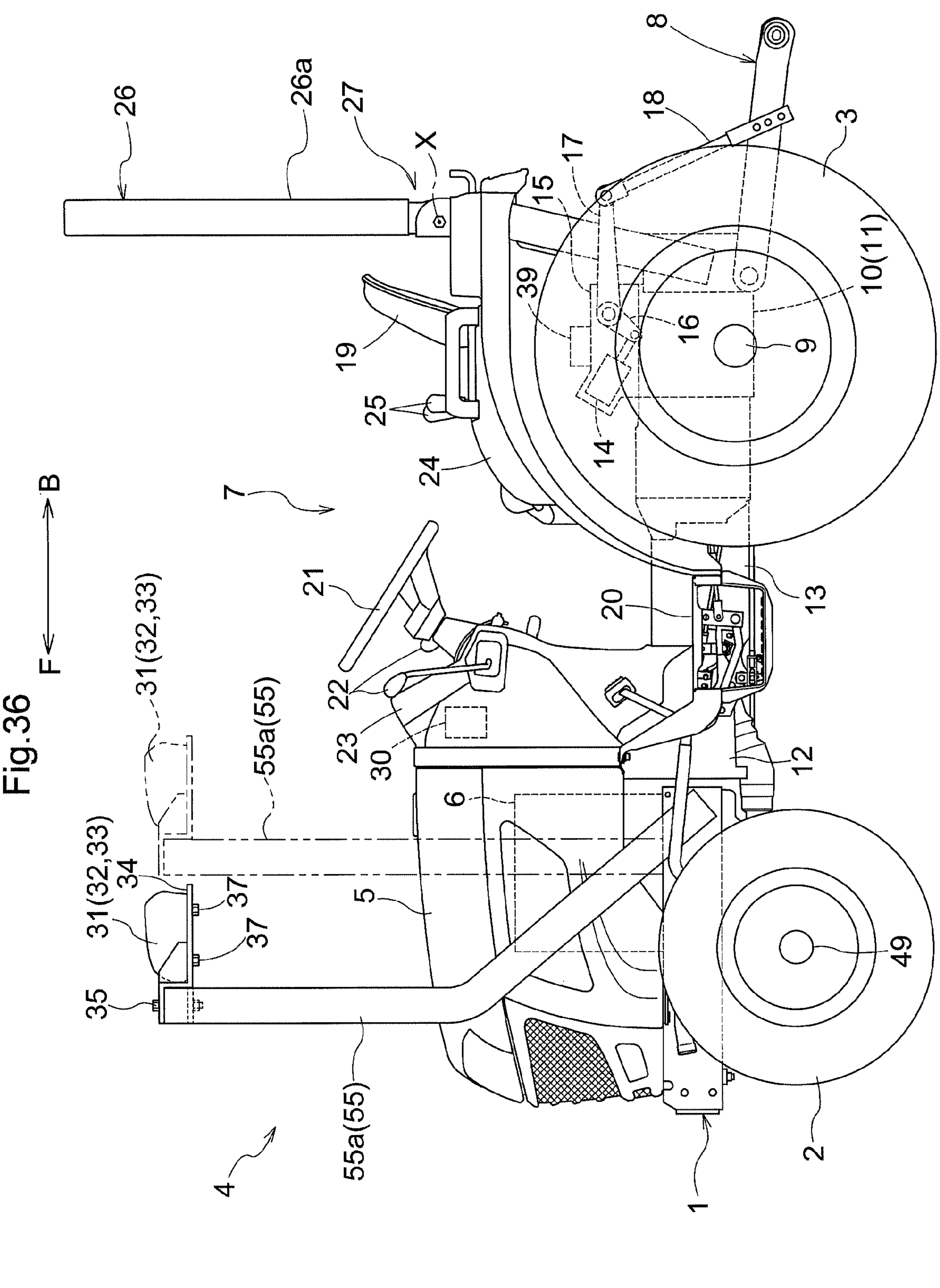
FIG. 36 is a side view of the tractor according to another embodiment g.
Figure 37:
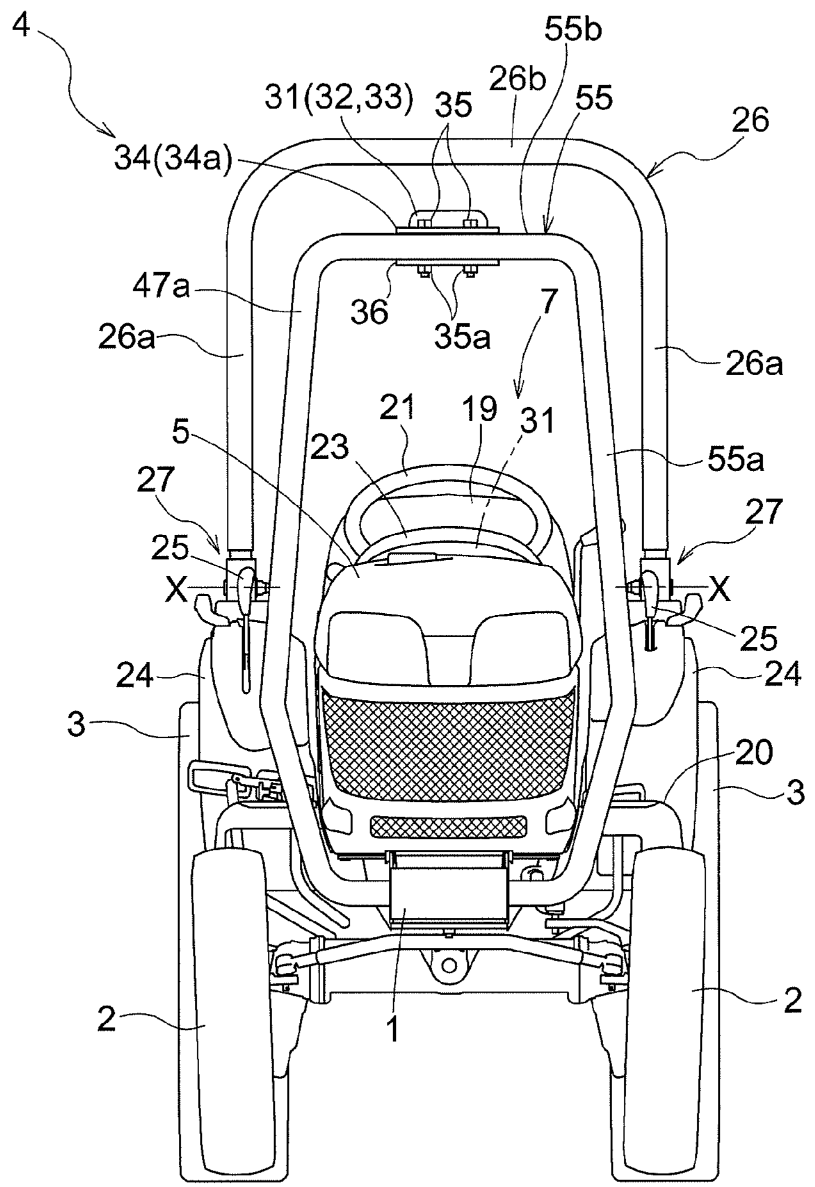
FIG. 37 is a front view of the tractor according to another embodiment g.

As shown in FIGS. 36 and 37, in the traveling vehicle body 4 provided with the rear ROPS 26 at a position to the rear of the driver seat 19, the front ROPS 55 is provided at a position to the front of the driver seat 19, and the positioning unit 31 is provided in the front ROPS 55. The positioning unit 31 includes an antenna unit 32 for satellite navigation and a satellite navigation device 33 that measures the position and bearing of the traveling vehicle body 4.

The front ROPS 55 includes the right-left pair of front vertical frame portions 55*a* that extend in the vertical direction, and the front lateral frame portion 55*b* that joins upper ends of the right and left front vertical frame portions 55*a* to each other and extends in the lateral direction. Thus, the front ROPS 55 is formed substantially in a gate shape when viewed from the front of the vehicle body. In such a configuration, the positioning unit 31 is provided on the upper face of the front lateral frame portion 55*b* through the attachment bracket 34. Thus, the positioning unit 31 having the antenna unit 32 is disposed at a position higher than the upper end of the backrest of the driver seat 19.

In this other embodiment (g-2), the front ROPS 55, by bending a hollow square pipe material, is formed substantially in a gate shape overall, and the base end side has an oblique posture toward the front as it goes upward. Therefore, the positioning unit 31 is separated from the rear ROPS 26 to improve the reception performance. In addition, as shown by a double-dotted chained line in FIG. 36, the front ROPS 55 may extend vertically upward from the traveling vehicle body 4.

Further, as a configuration for supporting the positioning unit 31 having the antenna unit 32 on the front ROPS 55, for example, a configuration may be adopted in which the positioning unit 31 is directly fixed to the upper face of the lateral frame portion 26*b* with a bolt or the like.

Other Embodiment h (h-1)

Figure 38:
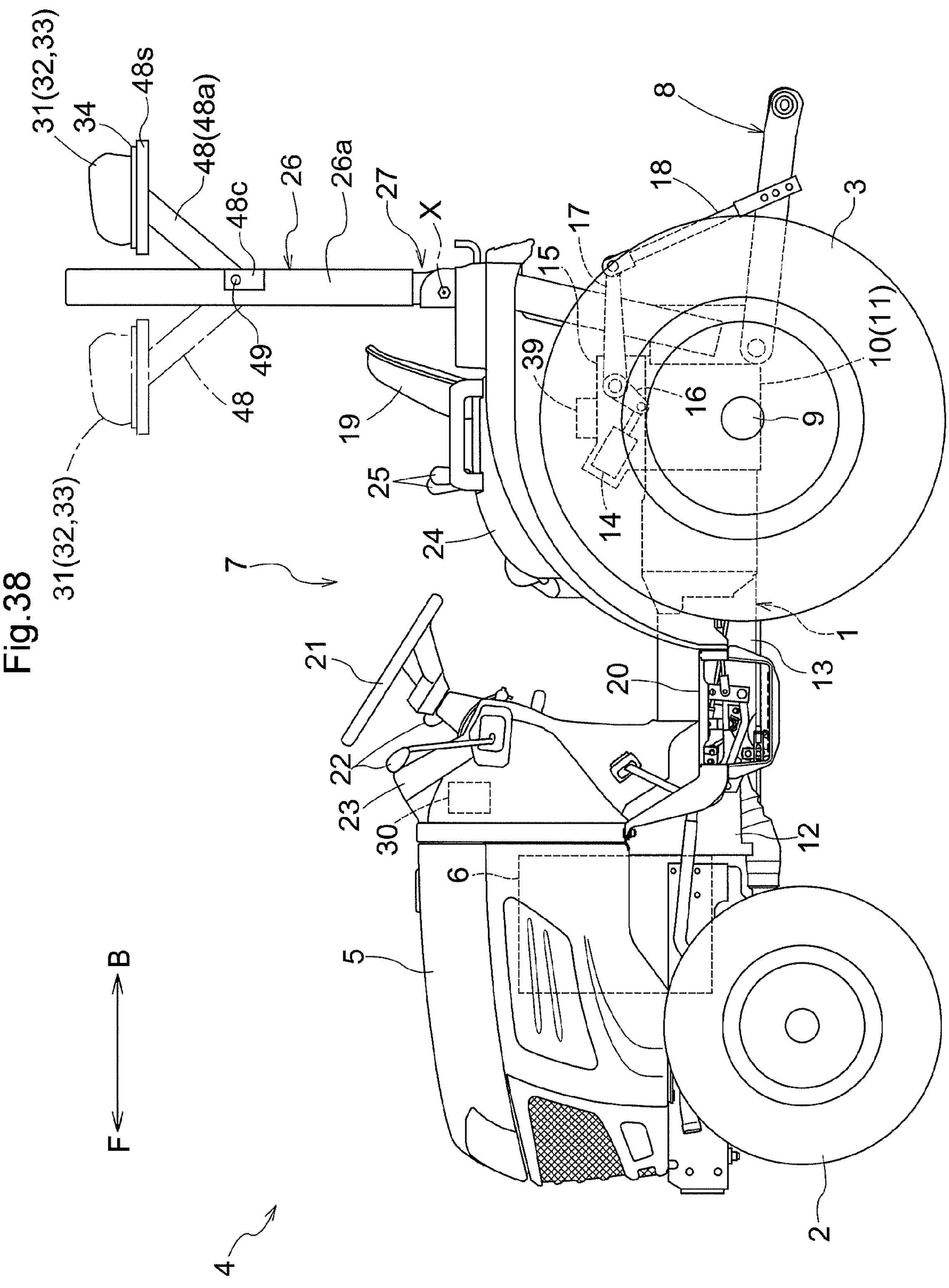
FIG. 38 is a side view of a tractor according to another embodiment h.
Figure 39:
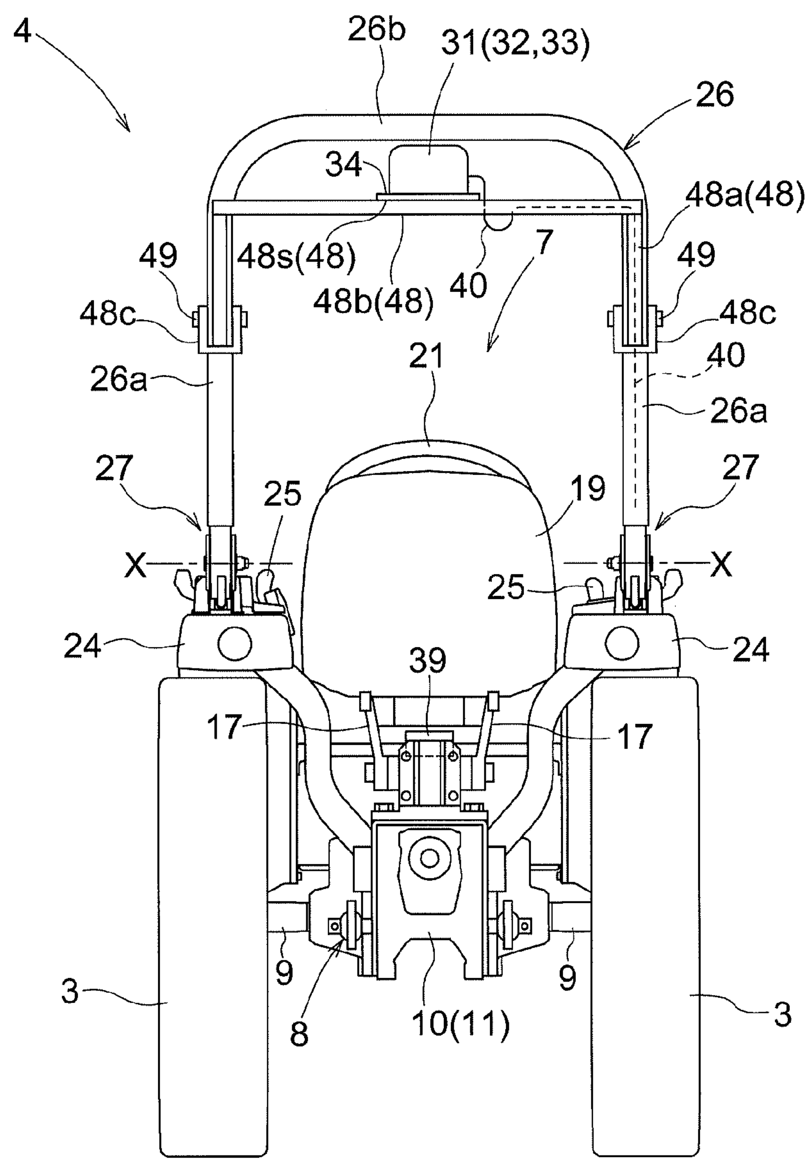
FIG. 39 is a rear view of the tractor according to another embodiment h.

As shown in FIGS. 38 and 39, a ROPS 26 for rollover protection that extends upward so as to surround the upper rear side of the driver seat 19 is provided. A positioning unit 31 is supported on an attachment table 48*s* of a jig 48 provided in the ROPS 26 through an attachment bracket 34. The ROPS 26, by bending a hollow square pipe material, has right and left vertical frame portions 26*a* that extend in the vertical direction, and a lateral frame portion 26*b* that joins upper ends of the right and left vertical frame portions 26*a* to each other and extends in the lateral direction. The positioning unit 31 includes an antenna unit 32 for satellite navigation and a satellite navigation device 33 that measures the position and bearing of the traveling vehicle body 4.

As shown in FIG. 39, the jig 48 includes right and left support members 48*a* made of a hollow square pipe material, a connecting member 48*b* made of a hollow square pipe material connecting the upper ends of the right and left support members 48*a*, and fixing brackets 48*c* formed at the lower ends of the right and left support members 48*a*. The attachment table 48*s* is provided on the upper face of the connecting member 48*b*.

The right and left fixing brackets 48*c* are shaped so as to be able to contact the rear face and the right and left side faces of the vertical frame portions 26*a* of the ROPS 26, and in the right and left fixing brackets 48*c*, attachment holes (not shown) passing through in the lateral direction are formed. Corresponding to these attachment holes, fixing holes (not shown) passing through in the lateral direction are formed in the right and left vertical frame portions 26*a* of the ROPS 26.

With such a configuration, in this other embodiment (h-1), the fixing brackets 48*c* are disposed at a location that embraces the right and left vertical frame portions 26*a* of the ROPS 26, holding bolts 49 are passed through the attachment holes and the fixing holes, and the jig 48 is fixed to the ROPS 26 by screwing the holding bolts 49 to holding nuts or the like.

Further, the wiring 40 connected to the positioning unit 31 passes through the internal space of the connecting member 48*b*, the internal space of the support member 48*a*, and the internal space of the vertical frame portion 26*a* of the ROPS 26. Thus, positioning information can be transmitted from the wiring 40 to the controller 30.

In this fixed state, the right and left support members 48*a* are in a posture extending obliquely rearward and upward in a side view, the connecting member 48*b* connected to the upper ends of the right and left support members 48*a* is in a horizontal posture, and the attachment table 48*s* is also in a horizontal posture. As a result, the positioning unit 31 is supported in a horizontal posture at a position separated rearward away from the ROPS 26, and at a position higher than both the rear wheel fenders 24 and the backrest of the driver seat 19.

Also, since the ROPS 26 has high rigidity, vibration of the positioning unit 31 is suppressed so it is possible to reduce measurement errors, and further, since the positioning unit 31 is disposed at a position separated from the ROPS 26, the positioning unit 31 is not blocked by the ROPS 26 and can receive information.

In this other embodiment (h-1), as shown by the double-dotted chained line in FIG. 38, the jig 48 may be disposed so as to extend forward and upward from the ROPS 26.

(h-2)

Figure 40:
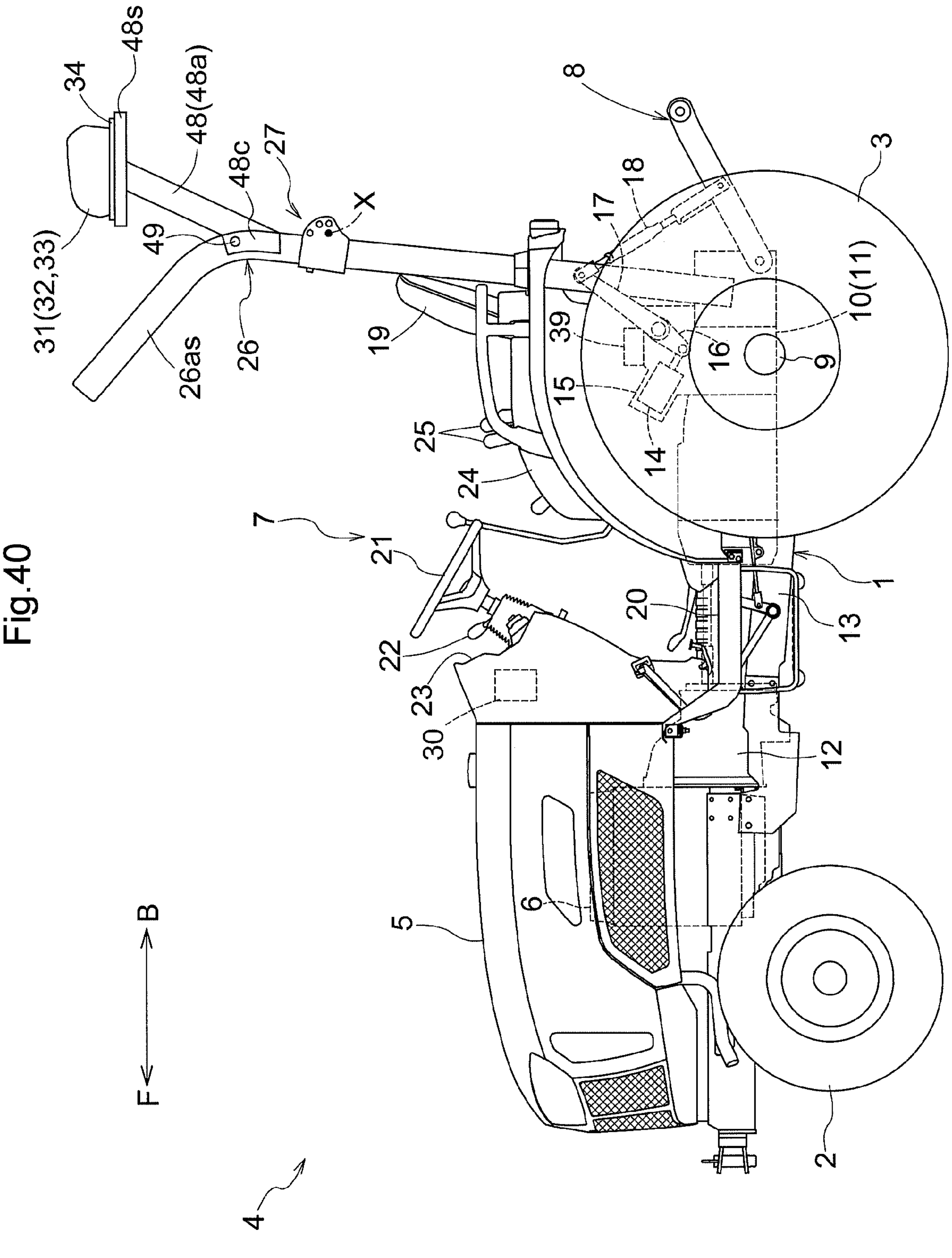
FIG. 40 is a side view of the tractor according to another embodiment h.

As shown in FIG. 40, a configuration may be adopted in which in a portion of each vertical frame portion 26*a* above the folding portion 27, an inclined portion 26*as* is formed that inclines to the front side toward the upper end side, and the jig 48 is provided above the folding portion 27 in the vertical frame portion 26*a*.

In this other embodiment (h-2), the same configuration as that of the other embodiment (h-1) described above is assumed. By adopting an inclined posture in which the support member 48*a* is displaced rearward toward the upper end, the positioning unit 31 placed on the attachment table 48*s* is separated from the upper end of the inclined portion 26*as*, and as a result, the inconvenience that the reception of the positioning information is prevented by the ROPS 26 can be suppressed.

In either of the other embodiments (h-1) and (h-2), it is possible to adopt a configuration in which, for example, the positioning unit 31 is supported at a predetermined position of the jig 48 through the attachment bracket 34 without using the attachment table 48*s*. Also, it is possible to adopt any configuration in which the jig 48 is fixed to the ROPS 26 with the holding bolts 49.

Other Embodiment i (i-1)

Figure 41:
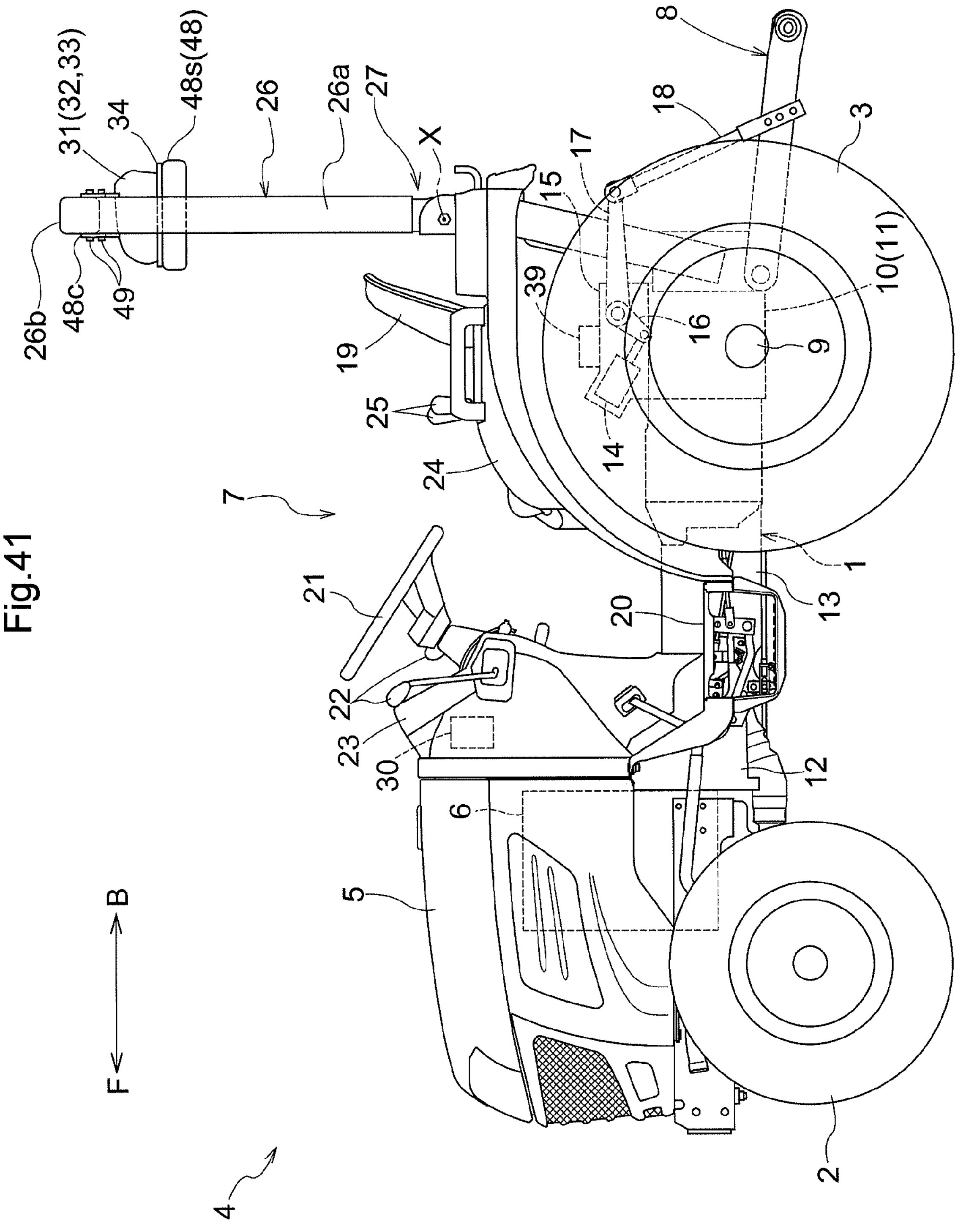
FIG. 41 is a side view of a tractor according to another embodiment i.
Figure 42:
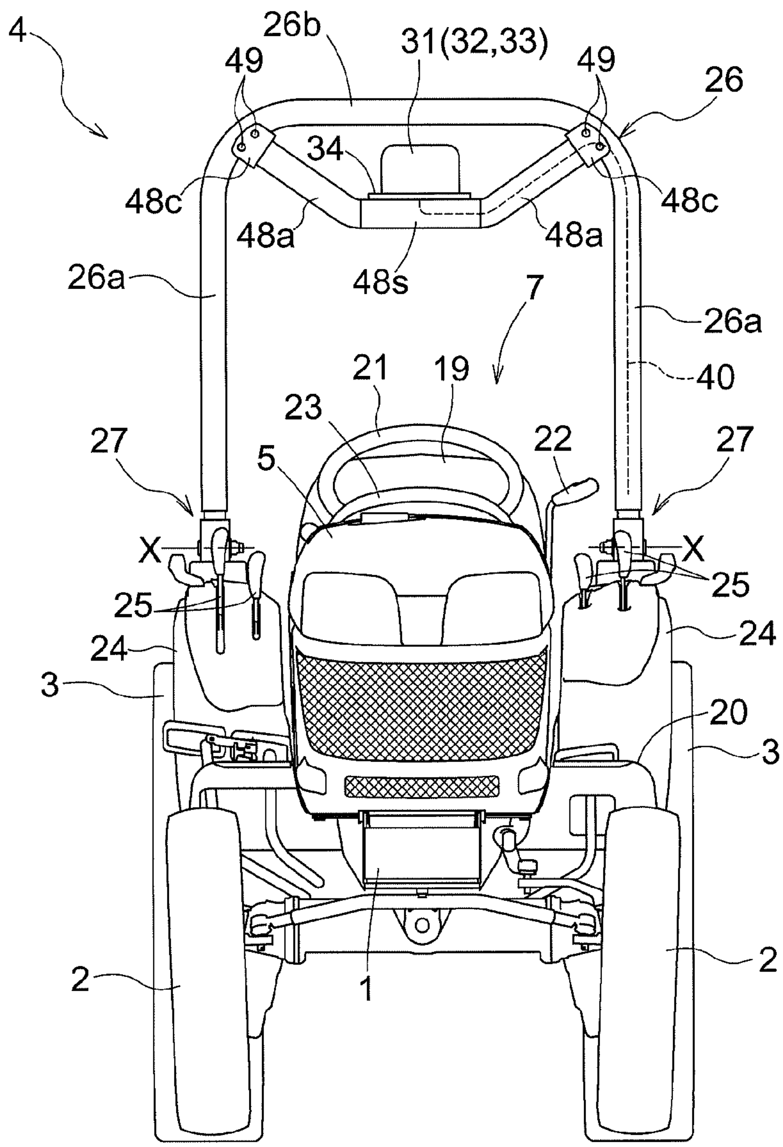
FIG. 42 is a front view of the tractor according to another embodiment i.

As shown in FIGS. 41 and 42, a ROPS 26 for rollover protection that extends obliquely upward so as to surround the upper rear side of the driver seat 19 is provided. A positioning unit 31 is supported on an attachment table 48*s* of a jig 48 provided in the ROPS 26 through an attachment bracket 34. The ROPS 26, by bending a hollow square pipe material, has right and left vertical frame portions 26*a* that extend in the vertical direction, and a lateral frame portion 26*b* that joins upper ends of the right and left vertical frame portions 26*a* to each other and extends in the lateral direction. The positioning unit 31 includes an antenna unit 32 for satellite navigation and a satellite navigation device 33 that measures the position and bearing of the traveling vehicle body 4.

The jig 48 is provided with right and left support members 48*a* that are inclined obliquely upward toward the outer end side, an attachment table 48*s* at a central position, and fixing brackets 48*c* formed at both ends of the right and left support members 48*a*. In this jig 48, outer ends of the right and left support members 48*a* are connected and fixed to the ROPS 26 by holding bolts 49 that pass through the fixing brackets 48*c*, thus holding the support members 48*a* in a horizontal posture, and the positioning unit 31 is supported on the support members 48*a* through the attachment bracket 34. Note that in this configuration, the position where the fixing brackets 48*c* are connected to the vertical frame portions 26*a* is set to a position higher than the folding portions 27.

In the configuration of this other embodiment (i-1), the jig 48 is provided with the support members 48*a* formed so as to extend toward the internal space of the ROPS 26. Therefore, the positioning unit 31 is disposed in a space surrounded by the right and left vertical frame portions 26*a* and the above lateral frame portion 26*b* in a front view, and partially overlaps with the vertical frame portions 26*a* in a side view. In particular, in this configuration, the positioning unit 31 is disposed at a location higher than the upper end of the backrest of the driver seat 19.

Further, as shown in FIG. 42, the support members 48*a* and the attachment table 48*s* are formed in a hollow shape, and the wiring 40 that connects to the positioning unit 31, in a state passing through the internal space of the attachment table 48*s*, the internal space of a support member 48*a*, and the internal space of a vertical frame portion 26*a* of the ROPS 26, transmits positioning information to the controller 30.

With such a configuration, for example, it is possible to prevent an inconvenience of tree branches or the like contacting the positioning unit 31 during traveling. Further, since the ROPS 26 has high rigidity, vibration of the antenna unit is suppressed so it is possible to reduce measurement errors. Also, the positioning unit 31 is disposed above the upper end of the backrest of the driver seat 19, so an inconvenience of the driver seat 19, or a driver sitting on the driver seat 19, hindering reception of positioning information is suppressed.

(i-2)

Figure 43:
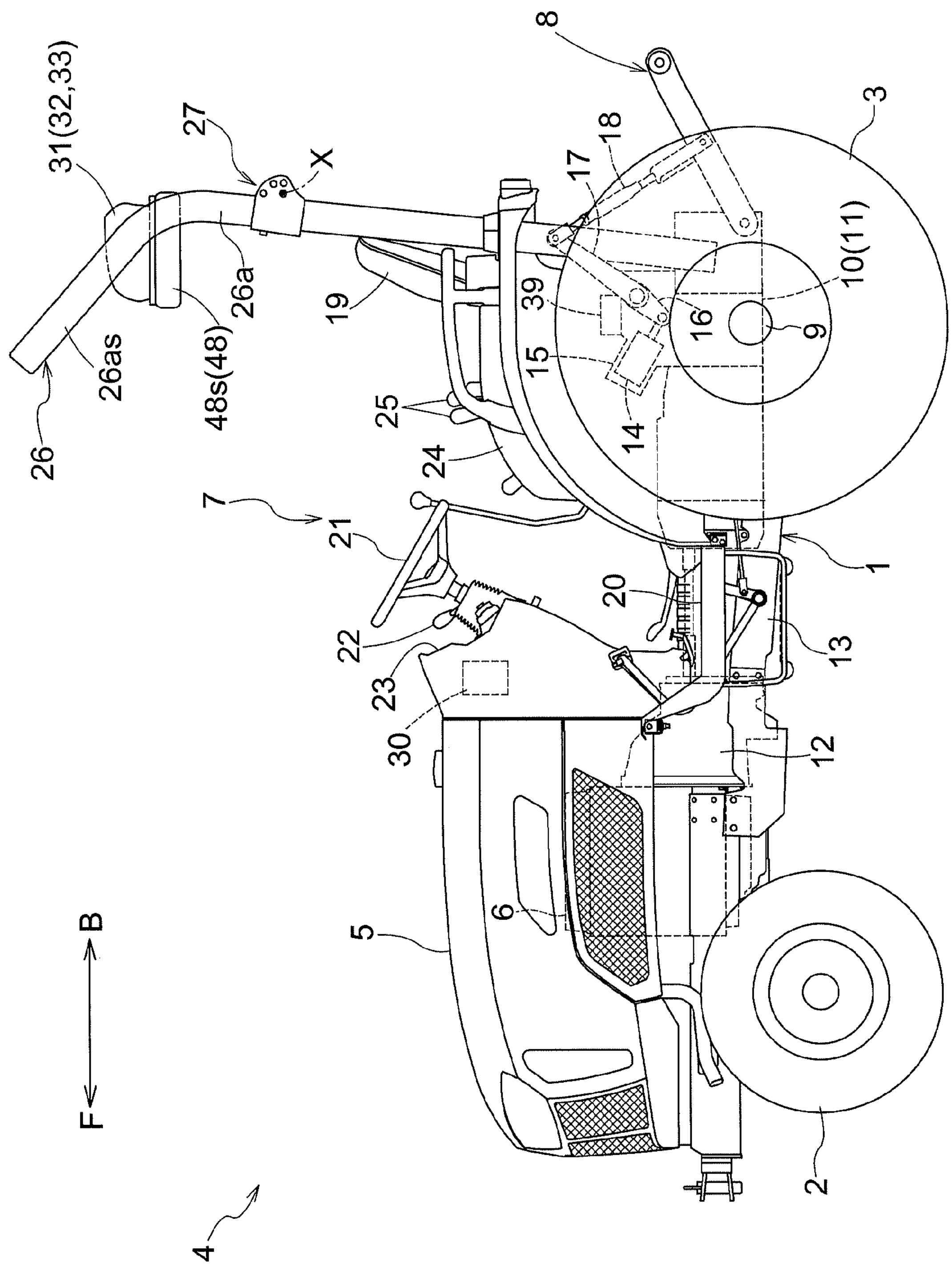
FIG. 43 is a side view of the tractor according to another embodiment i.

As shown in FIG. 43, in a portion of each vertical frame portion 26*a* above a folding portion 27, an inclined portion 26*as* is formed that inclines to the front side toward the upper end side, and a jig 48 is provided above the folding portion 27 in the vertical frame portion 26*a*.

In this other embodiment (i-2), it is assumed that the jig 48 is supported on the right and left vertical frame portions 26*a* as in the other embodiment (h-1) described above. By adopting a configuration in which the inclined portions 26*as* are inclined to the front side toward the upper end, the positioning unit 31 placed on the attachment table 48*s* is separated from the upper end of the inclined portions 26*as*, and as a result, the inconvenience that the reception of the positioning information is prevented by the ROPS 26 can be suppressed.

In either of the other embodiments (i-1) and (i-2), a configuration may be adopted in which, for example, the positioning unit 31 is directly supported by the attachment table 48*s*. Also, any configuration can be adopted as the configuration for fixing the jig 48 to the ROPS 26 with the holding bolts 49.

Other Embodiment j (j-1)

Figure 44:
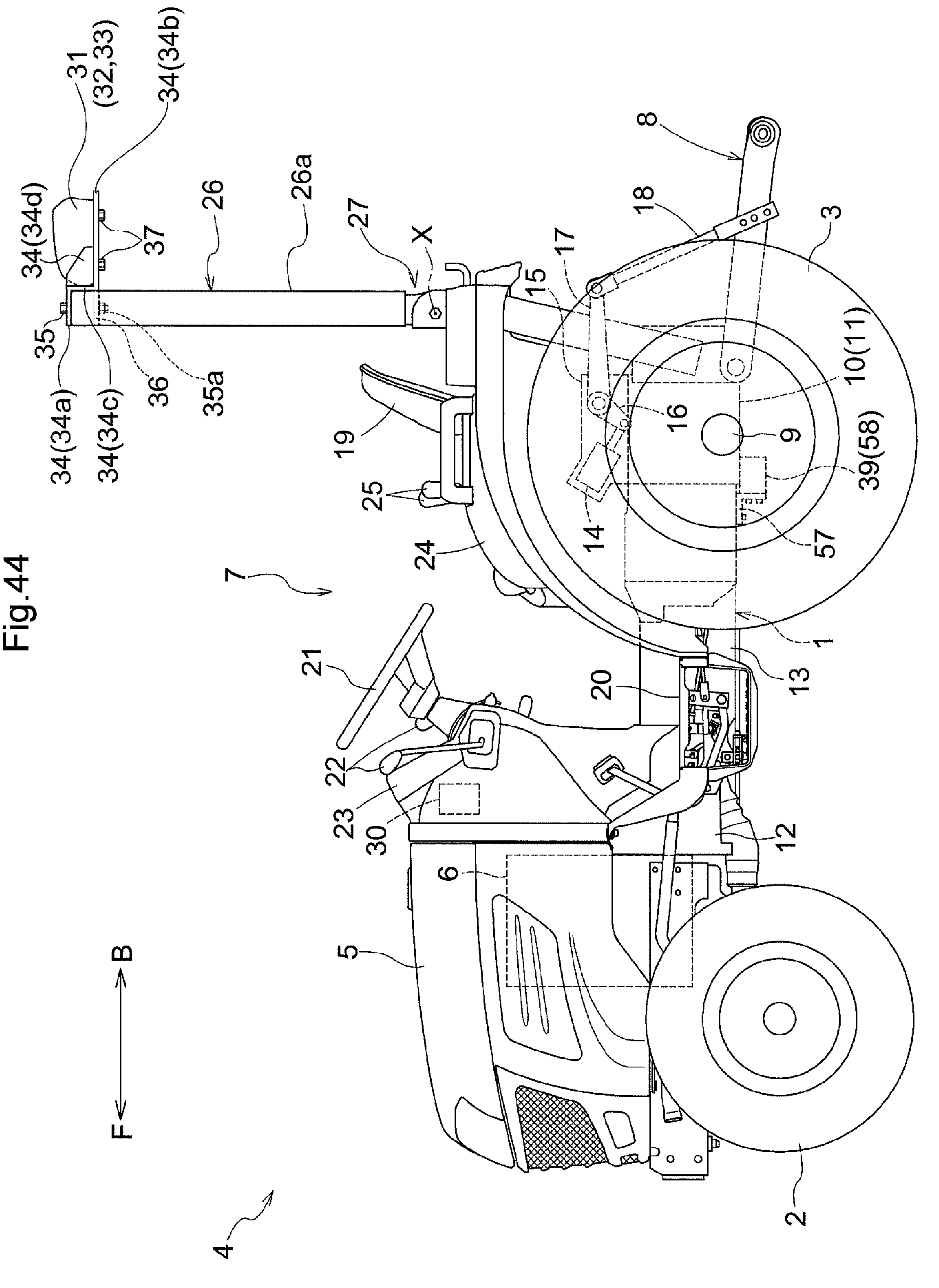
FIG. 44 is a side view of a tractor according to another embodiment j.

As shown in FIG. 44, an inertial measurement device 39 is fixed to the lower face of a vehicle body frame 1 configured as a rigid member through a fixing bracket 57. In this configuration, the inertial measurement device 39 is disposed at a location overlapping the lower side of the vehicle body frame 1 in a plan view. In addition, the inertial measurement device 39 is housed in a mud removing case 58, and by being housed in the mud removing case 58 in this way, not only is it possible to eliminate the inconvenience of mud and water adhering to the inertial measurement device 39, but also an inconvenience of damage caused by contacting a protrusion on the ground is eliminated.

In this other embodiment (j-1) as well, the inertial measurement device 39 is disposed at a location adjacent to the rigid member formed with the vehicle body frame 1, and the inertial measurement device 39 is disposed at an intermediate position between right and left rear wheel fenders 24 when viewed from the front, and at a position overlapping rear wheels 3 in a side view. In addition, since the inertial measurement device 39 is disposed in an area below the vehicle body frame 1, mounting is easy, and it is not necessary to change the design of the traveling vehicle body 4 in order to provide the inertial measurement device 39.

(j-2)

Figure 45:
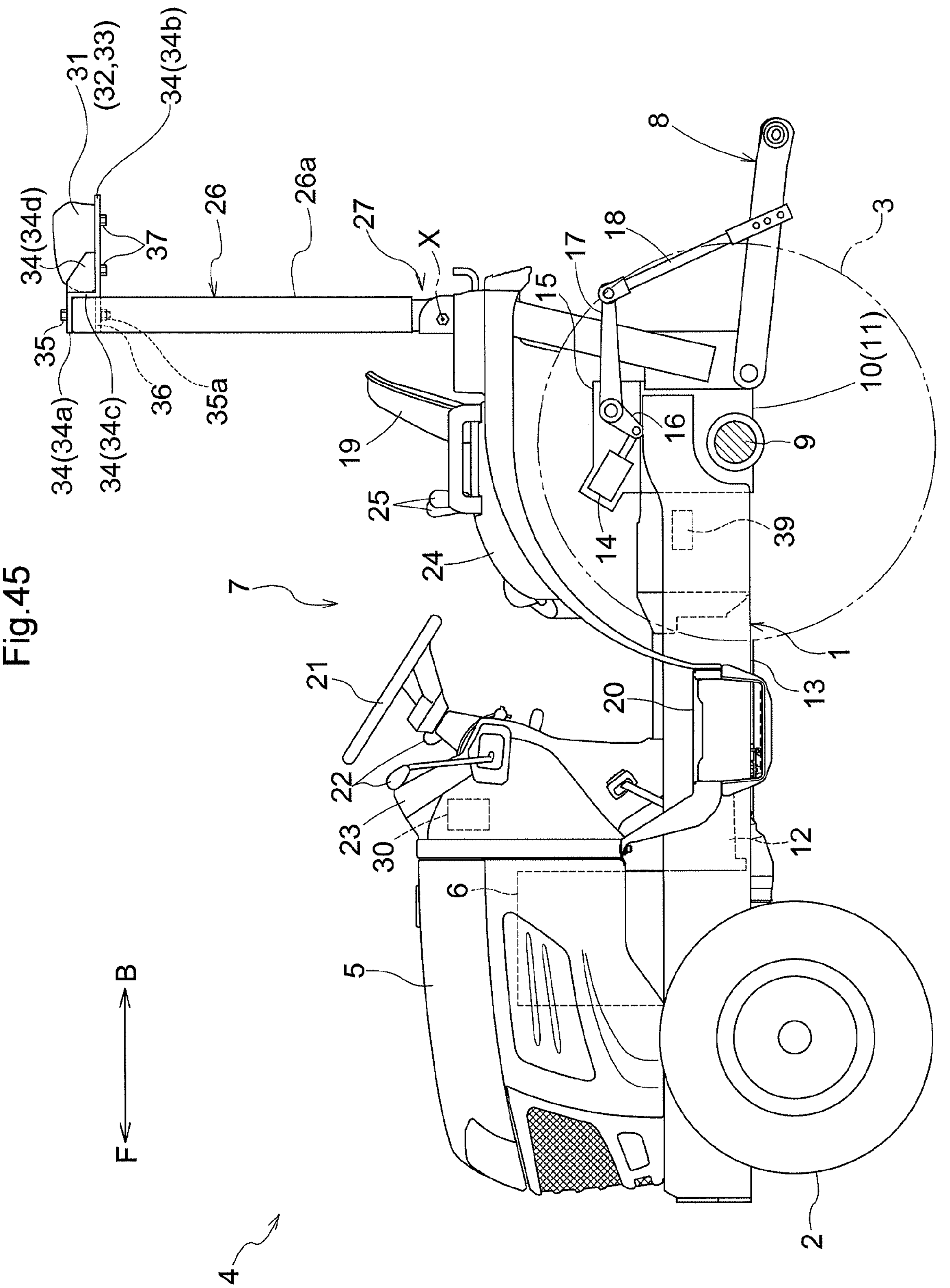
FIG. 45 is a side view of the tractor according to another embodiment j.
Figure 46:
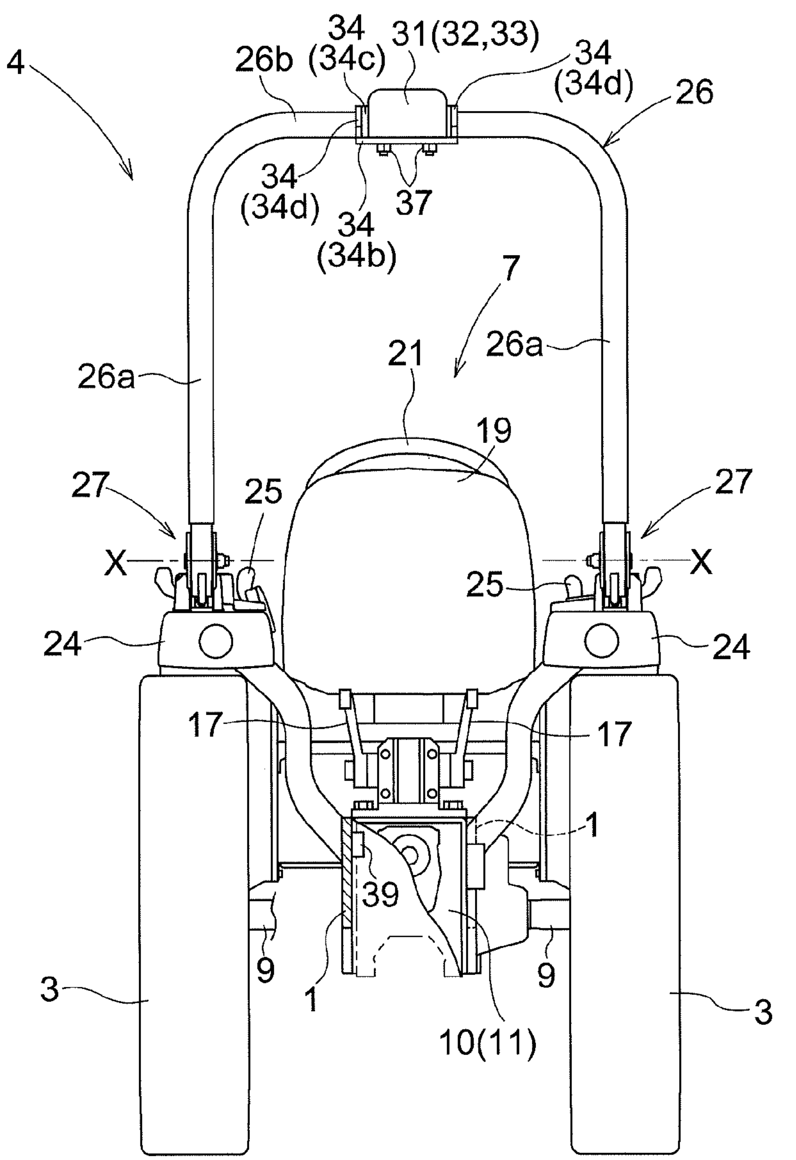
FIG. 46 is a rear view of the tractor according to another embodiment j.

As shown in FIGS. 45 and 46, by providing right and left vehicle body frames 1 in an area extending from the front position of the traveling body 4 to a transmission case 10 at the rear of the vehicle body, a rigid member is configured with the right and left vehicle body frames 1. In a tractor configured in this way, an engine 6, a clutch housing 12 and the like are supported by the right and left vehicle body frames 1, and the transmission case 10 is connected to the rear ends of the right and left vehicle body frames 1.

The right and left vehicle body frames 1 are assumed to be configured with a plate-like steel material, and the inertial measurement device 39 is disposed in an intermediate area between the right and left vehicle body frames 1. In this configuration, the inertial measurement device 39 is disposed at a location adjacent to the rigid member made of the vehicle body frames 1, and the inertial measurement device 39 is disposed at an intermediate position between right and left rear wheel fenders 24 when viewed from the front, and at a position overlapping rear wheels 3 in a side view.

(j-3)

The transmission case 10 disposed in an area from the rear end of the clutch housing 12 to the rear end of the traveling vehicle body 4 also includes a configuration in which the transmission case 10 is a rigid member, and in a tractor having such a configuration, the inertial measurement device 39 may be provided at a location adjacent to the transmission case 10. When the vehicle body frame 1 is configured with a right-left pair of members, the inertial measurement device 39 may be provided at an intermediate position on either the left or right vehicle body frame 1.

Other Embodiment k (k-1)

Figure 47:
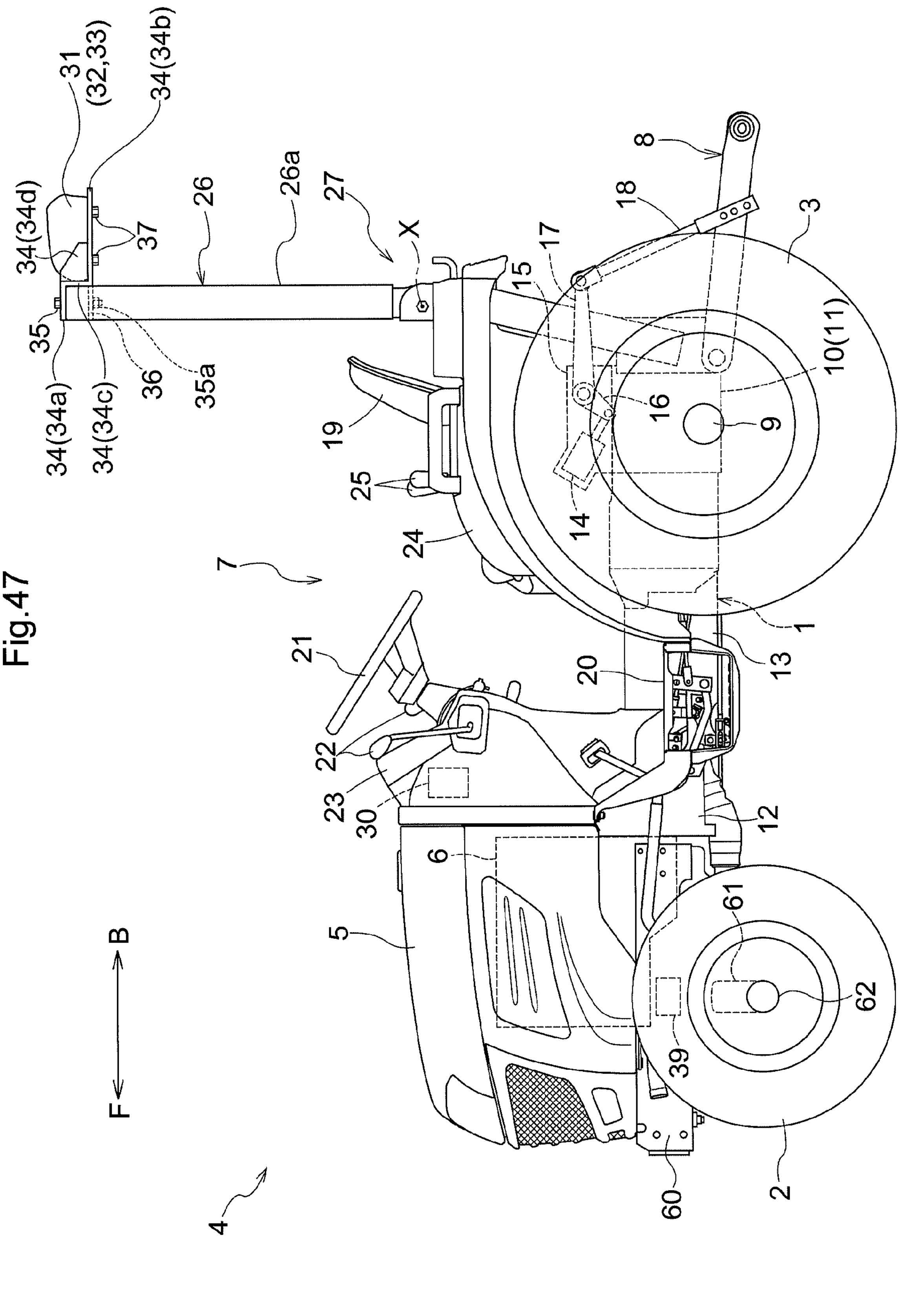
FIG. 47 is a side view of a tractor according to another embodiment k.
Figure 48:
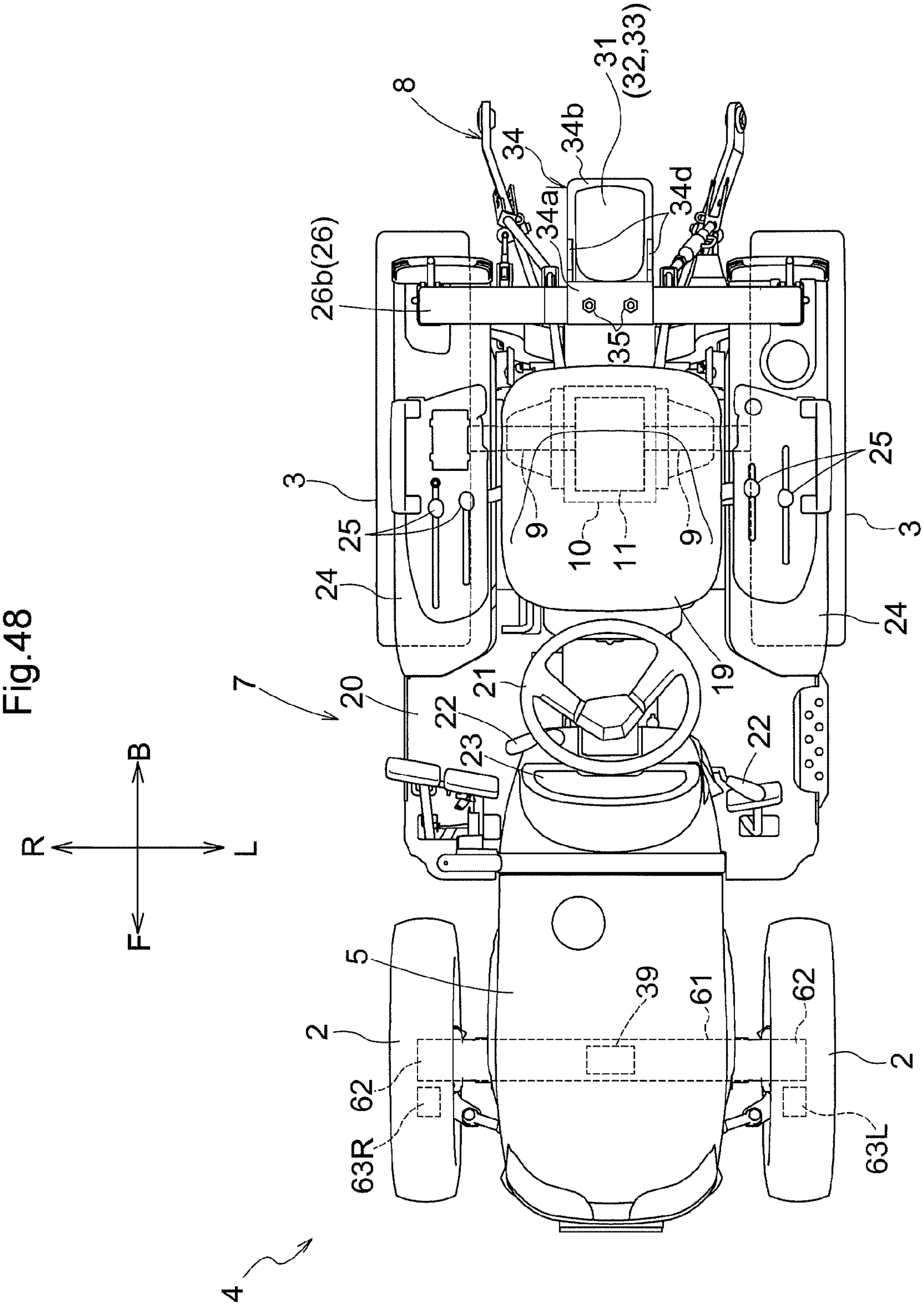
FIG. 48 is a plan view of the tractor according to another embodiment k.
Figure 49:
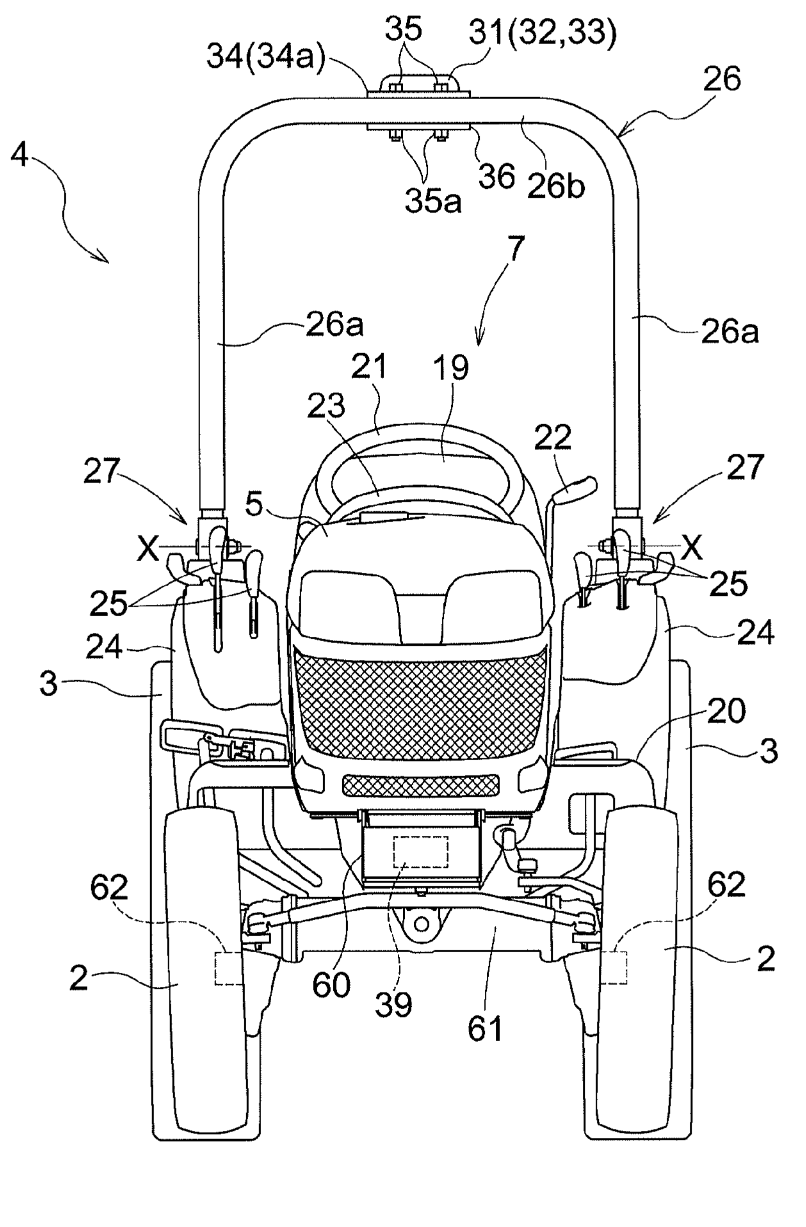
FIG. 49 is a front view of the tractor according to another embodiment k.

As shown in FIGS. 47 to 49, a right-left pair of front frames 60 extending forward from the vehicle body frame 1 is provided at a front position of the vehicle body frame 1. An engine 6 is supported by the front frames 60, and a hood 5 is disposed at a location covering the engine 6. Further, a front axle case 61 is supported by the front frames 60. Front axles 62 are provided at right and left ends of the front axle case 61, and front wheels 2 are driven by the front axles 62.

This tractor has a ROPS 26 at a location to the rear the driver seat 19. The ROPS 26 has a right-left pair of vertical frame portions 26*a* that extend in the vertical direction, and a lateral frame portion 26*b* that joins upper ends of the right and left vertical frame portions 26*a* to each other and extends in the lateral direction. A positioning unit 31 having an antenna unit 32 is provided in the lateral frame portion 26*b*.

In such a configuration, the inertial measurement device 39 that measures the inertia information of the traveling vehicle body 4 is disposed at a location overlapping the hood 5 in a plan view. More specifically, the inertial measurement device 39 overlaps with the engine 6 in a plan view and overlaps with the front axle case 61 in a plan view. The inertial measurement device 39 is disposed in an intermediate area between the right and left front frames 60.

The inertial measurement device 39 is disposed above the axle center of the front wheels 2 and is disposed at a location overlapping with the front wheels 2 in a side view.

By disposing the inertial measurement device 39 near the center of the front axle 62 in this manner, even when the traveling vehicle body 4 is pitched around the front axle 62 of the front wheels 2, the amount of displacement of the inertial measurement device 39 is small, so accurate measurement values can be obtained. Further, since the inertial measurement device 39 is disposed at a center delay angle of the traveling vehicle body 4 in the right-left direction, even when the traveling vehicle body 4 rolls, the displacement amount of the inertial measurement device 39 is reduced to obtain even more accurate measurement values.

(k-2)

As shown in FIG. 48, this tractor includes a right braking mechanism 63R for applying a braking force to the right front wheel 2, and a left braking mechanism 63L for applying a braking force to the left front wheel 2. An acceleration device is provided that, when the traveling vehicle body 4 turns, drives the peripheral speed of the front wheel 2 on the outer side of the turn at a speed approximately twice the peripheral speed of the right and left rear wheels 3.

With this configuration, when turning the traveling vehicle body 4 with a small radius, by applying a braking force to the front wheel 2 on the inner side of the turn with the right braking mechanism 63R or the left braking mechanism 63L, or by driving the front wheel 2 on the outer side of the turn to accelerate with the acceleration device, turning with a small radius is enabled.

Other Embodiment L (L-1)

Figure 50:
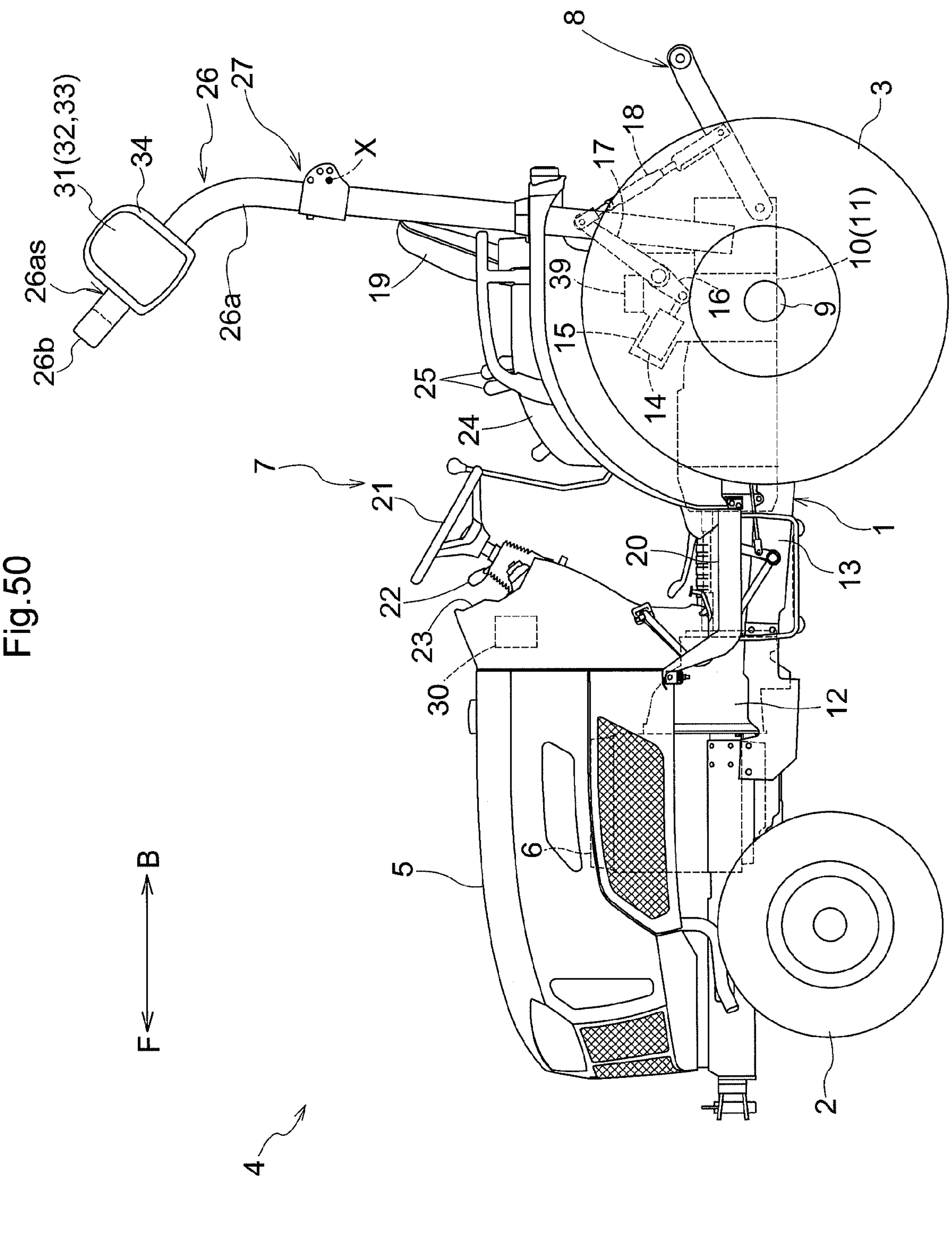
FIG. 50 is a side view of a tractor according to another embodiment L.
Figure 51:
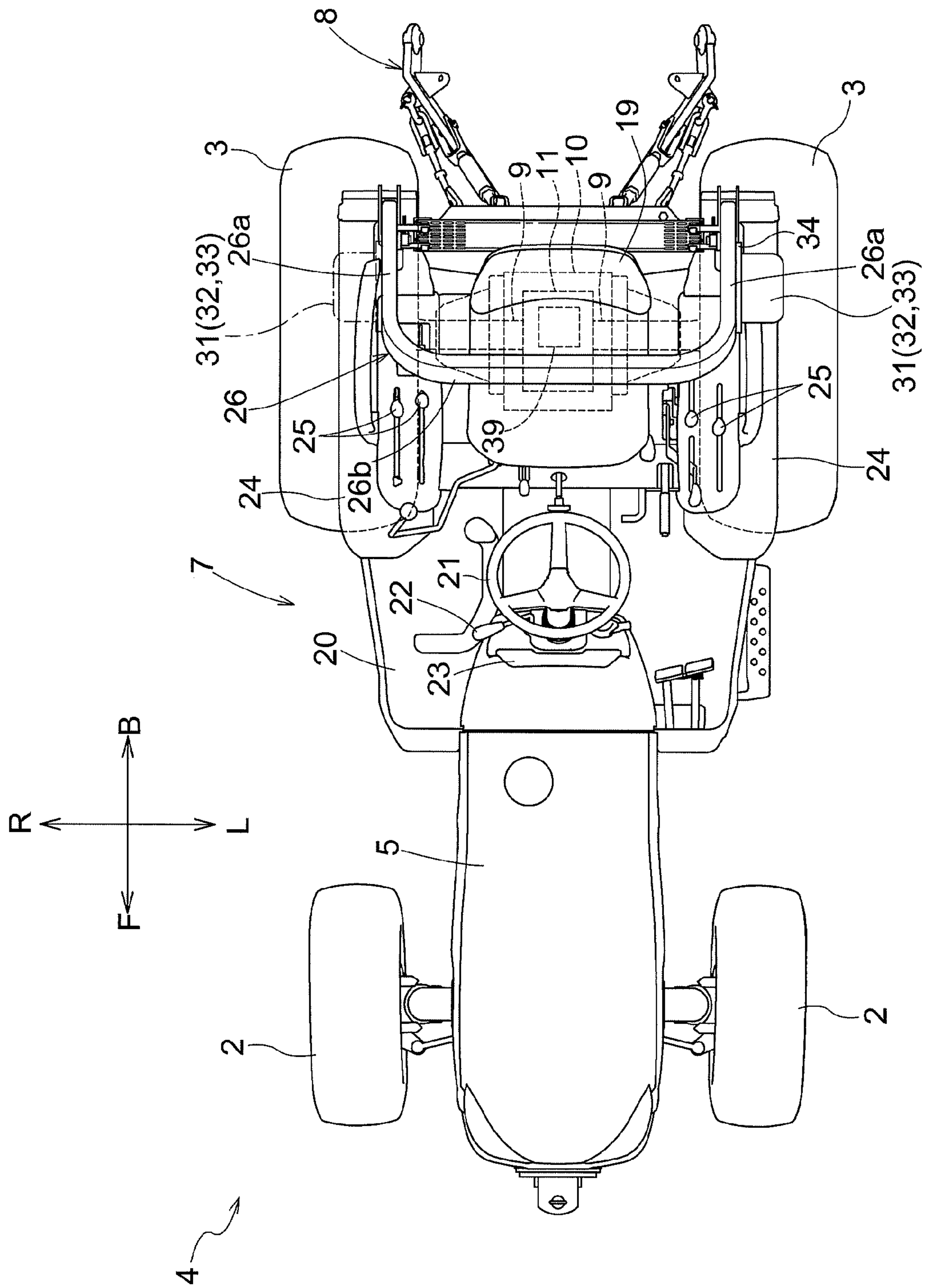
FIG. 51 is a plan view of the tractor according to another embodiment L.
Figure 52:
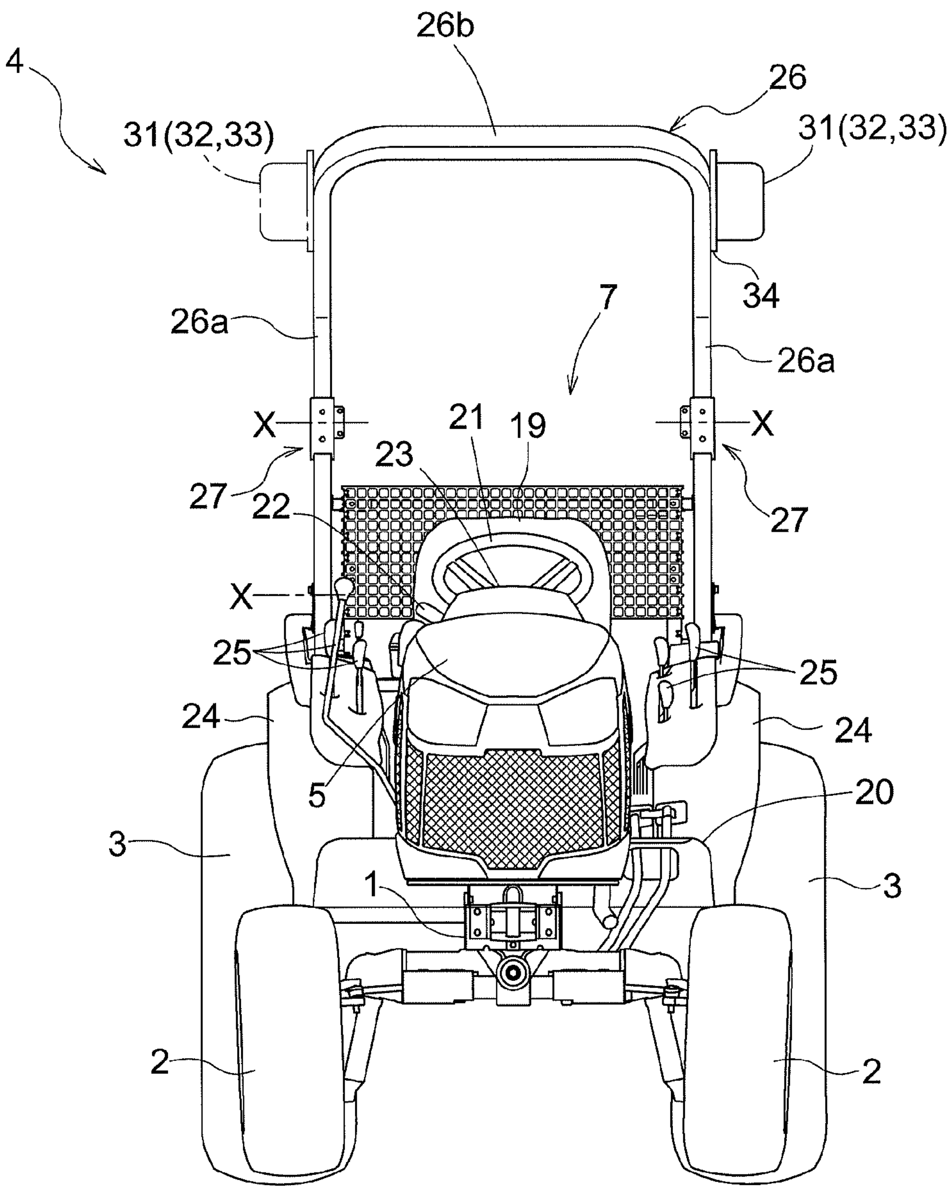
FIG. 52 is a front view of the tractor according to another embodiment L.

As shown in FIGS. 50 to 52, by providing a folding portion 27 at an intermediate portion in the vertical direction of the right and left vertical frame portions 26*a*, a ROPS 26 is configured to be foldable around a laterally oriented swing pivot X above the folding portions 27. Further, in a portion of each vertical frame portion 26*a* above the folding portion 27, an inclined portion 26*as* is formed that inclines to the front side toward the upper end side.

In this other embodiment (L-1), in either one of the right and left vertical frame portions 26*a* of the ROPS 26, at a position higher than the top of the seatback of the driver seat 19, the attachment bracket 34 serving as a support member is attached to the outer side face of the inclined portions 26*as* above the folding portion 27, and the positioning unit 31 is provided on the attachment bracket 34.

With this configuration, satellite positioning information transmitted from a GPS satellite or the like can be satisfactorily received without being hindered by the hood 5 or a part of the traveling vehicle body 4, and without being affected by obstacles. Further, since the ROPS 26 has high rigidity, the positioning unit 31 is not caused to vibrate significantly.

(L-2)

In FIGS. 50 to 52, a configuration is described in which the positioning unit 31 is provided on one of the right and left vertical frame portions 26*a*, but instead, a configuration may be adopted in which a positioning unit 31 is provided on both the right and left vertical frame portions 26*a* through attachment brackets 34, and positioning data is acquired with both of the two positioning units 31.

Other Embodiment m

Figure 53:
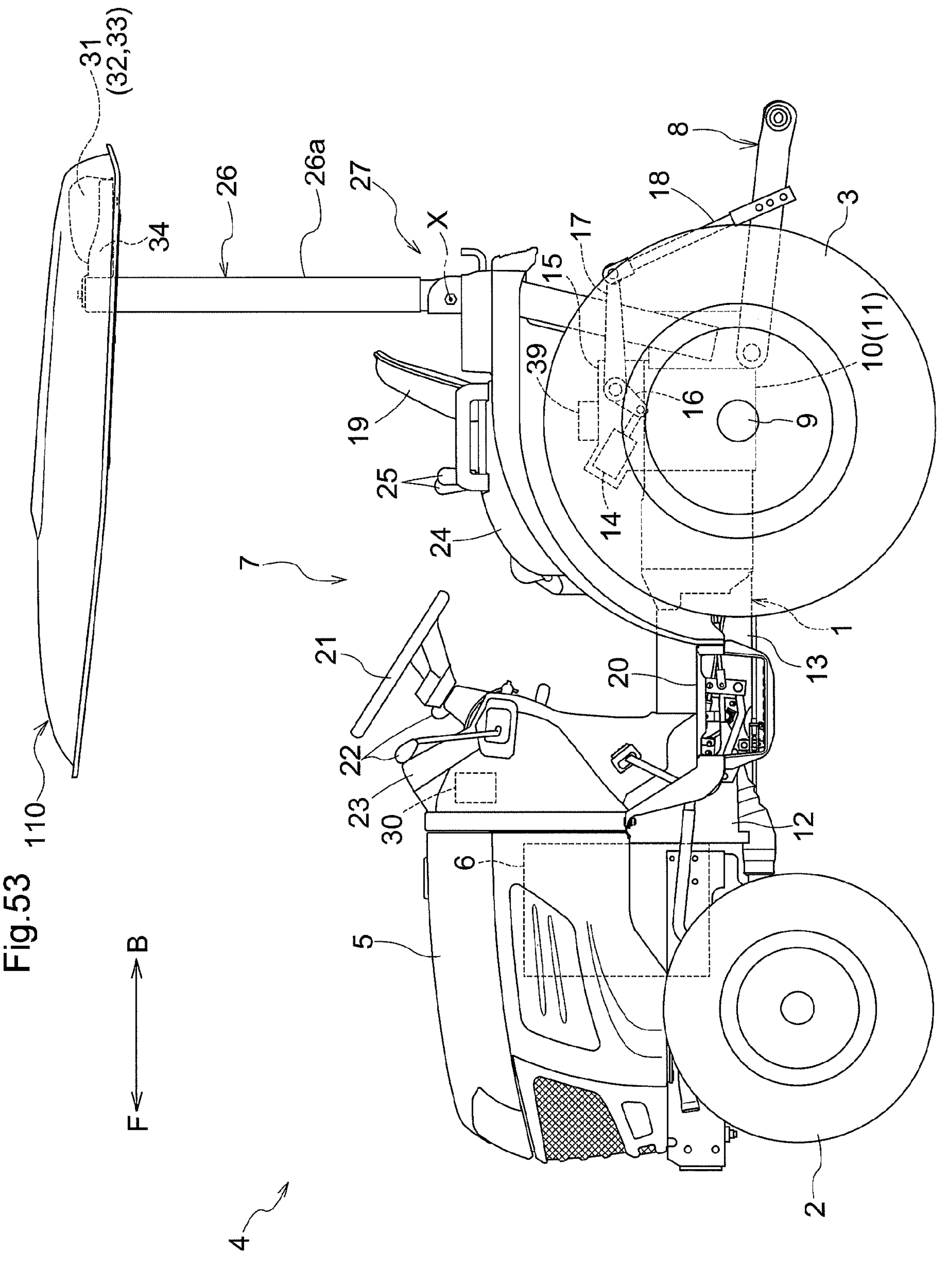
FIG. 53 is a side view of a tractor according to another embodiment m.
Figure 54:
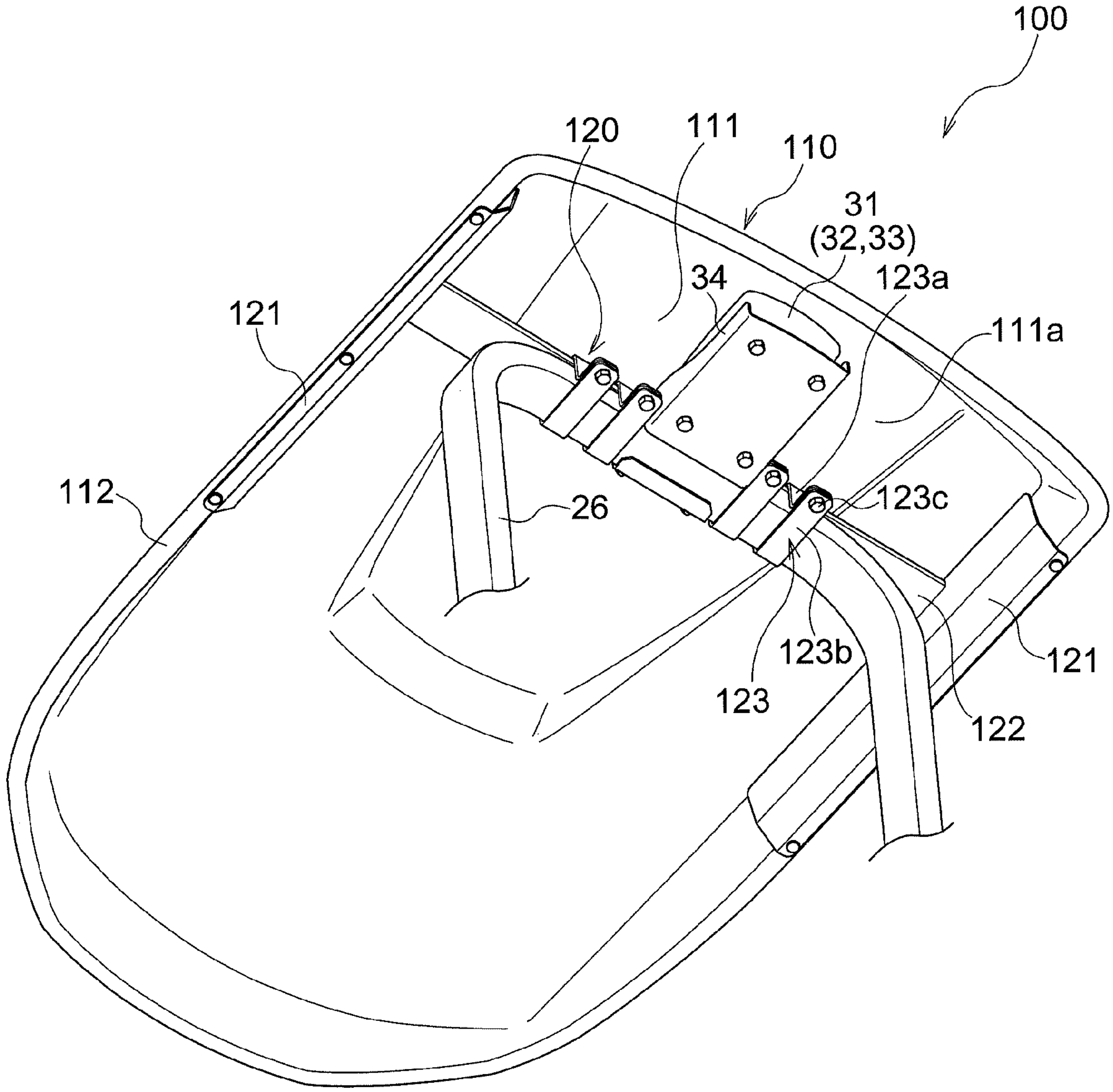
FIG. 54 is a perspective view showing a state in which a canopy is attached to a ROPS according to another embodiment m.
Figure 55:
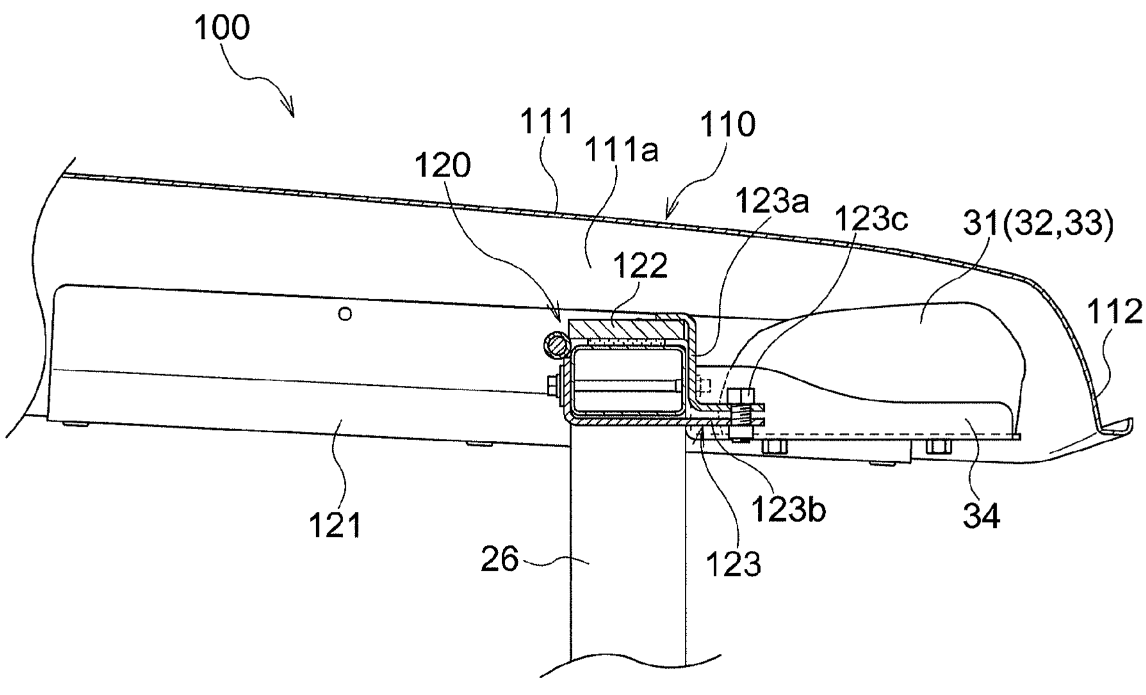
FIG. 55 is a view in cross section showing a state in which the canopy is attached to the ROPS according to another embodiment m.

In other embodiment m, as shown in FIGS. 53 to 55, in the tractor described in the above embodiment of the present invention (FIGS. 1 to 7), a roof (a canopy 100) that covers above the driving portion 7 (the driver seat 19) is fixed to the ROPS 26. The canopy 100 includes a roof portion 110 that covers above the driving portion 7 and an attachment portion 120 for attaching the roof portion 110 to the ROPS 26. For example, the roof portion 110 can be configured with a resin member, and the attachment portion 120 can be configured with a sheet metal member.

In this other embodiment m, the roof portion 110 has a center portion 111 and an edge portion 112 extending downward from an edge portion of the center portion 111. In the center portion 111, an upper concave portion 111*a* is formed in an area of a rear portion of the center portion 111, and is recessed upward relative to other portions in a state where the canopy 100 is attached to the ROPS 26. The attachment portion 120 has roof-side fixing portions 121 to be fixed to the roof portion 110. A right-left pair of the roof-side fixing portions 121 are provided, and these are respectively fixed to the edge portion 112 of the roof portion 110. Further, the attachment portion 120 has a connecting portion 122 that connects the right and left roof-side fixing portions 121. The connecting portion 122 is provided with a ROPS-side fixing portion 123 to be fixed to the ROPS. The ROPS-side fixing portion 123 has an upper member 123*a* and a lower member 123*b*. The lower member 123*b* is rotatable around a shaft center in the right-left direction. The lateral frame portion 26*b* of the ROPS 26 is sandwiched between the upper member 123*a* and the lower member 123*b*, and the ROPS-side fixing portion 123 is fixed to the ROPS 26 (the lateral frame portion 26*b*) by fastening a bolt 123*c* across the upper member 123*a* and the lower member 123*b*. Thus, the canopy 100 is fixed to the ROPS 26.

In this other embodiment m, the upper member 123*a* and the lower member 123*b* are provided respectively on both sides sandwiching the positioning unit 31. In the example shown in FIGS. 53 to 55, two pairs of the upper member 123*a* and the lower member 123*b* are provided respectively on both sides sandwiching the positioning unit 31. Note that the mode of attaching the canopy 100 to the ROPS 26 is not limited to the mode described above. For example, one of the upper member 123*a* and the lower member 123*b* may be provided respectively on both sides sandwiching the positioning unit 31, or three or more of the upper member 123*a* and the lower member 123*b* may be provided respectively on both sides sandwiching the positioning unit 31. Also, a fixing mode different from the above mode may be adopted.

In a state where the canopy 100 is attached to the ROPS 26, the positioning unit 31 is located below (inside) the roof portion 110. The positioning unit 31 is disposed at a location where the rear end protrudes rearward from the rear end of the lateral frame portion 26*b* in a plan view. In addition, when viewed from the front, the positioning unit 31 is disposed at the center in the right-left direction of the lateral frame portion 26*b* and at a location partially overlapping with the lateral frame portion 26*b*. By disposing the positioning unit 31 at a location that partially overlaps with the lateral frame 26*b*, the amount of protrusion of the positioning unit 31 from the upper face of the lateral frame portion 26*b* can be reduced. As a result, when attaching the canopy 100 to the ROPS 26, interference between the roof portion

110 of the canopy 100 and the positioning unit 31 is prevented. In the other embodiment m, the upper face of the positioning unit 31 slightly protrudes from the upper face of the lateral frame portion 26*b*, but because the positioning unit 31 is positioned in the upper concave portion 111*a* in the roof portion, interference between the roof portion 110 of the canopy 100 and the positioning unit 31 is reliably prevented. Also, since the roof portion 110 is configured with a resin member, it is possible to prevent the roof portion 110 from hindering reception by the positioning unit 31.

Note that in the example shown in FIGS. 53 to 55, the shape of the attachment bracket 34 is slightly different from that in FIGS. 1 to 7 described above. Specifically, in the example shown, the right and left reinforcement frames 34*d* are provided over the entire area of the mounting face 34*s* in the front-rear direction. Also, a cutout portion (not shown) for preventing interference with the waterproof cover 41 (see FIG. 5) is formed in one of the reinforcement frames 34*d*. Of course, the attachment bracket 34 may be the same as in FIGS. 1 to 7.

Also, when adopting a configuration in which the canopy 100 is attached to the ROPS, it is not necessary to adopt the above configuration, and for example, in the other embodiments a, b, c, d, f, g, h, i, j, k, and L described above, the canopy 100 may be attached to the ROPS, and in a configuration other than these, the canopy 100 may be attached to the ROPS.

Second Embodiment

A second embodiment will be described next.

Overview of Working Vehicle

Figure 83:
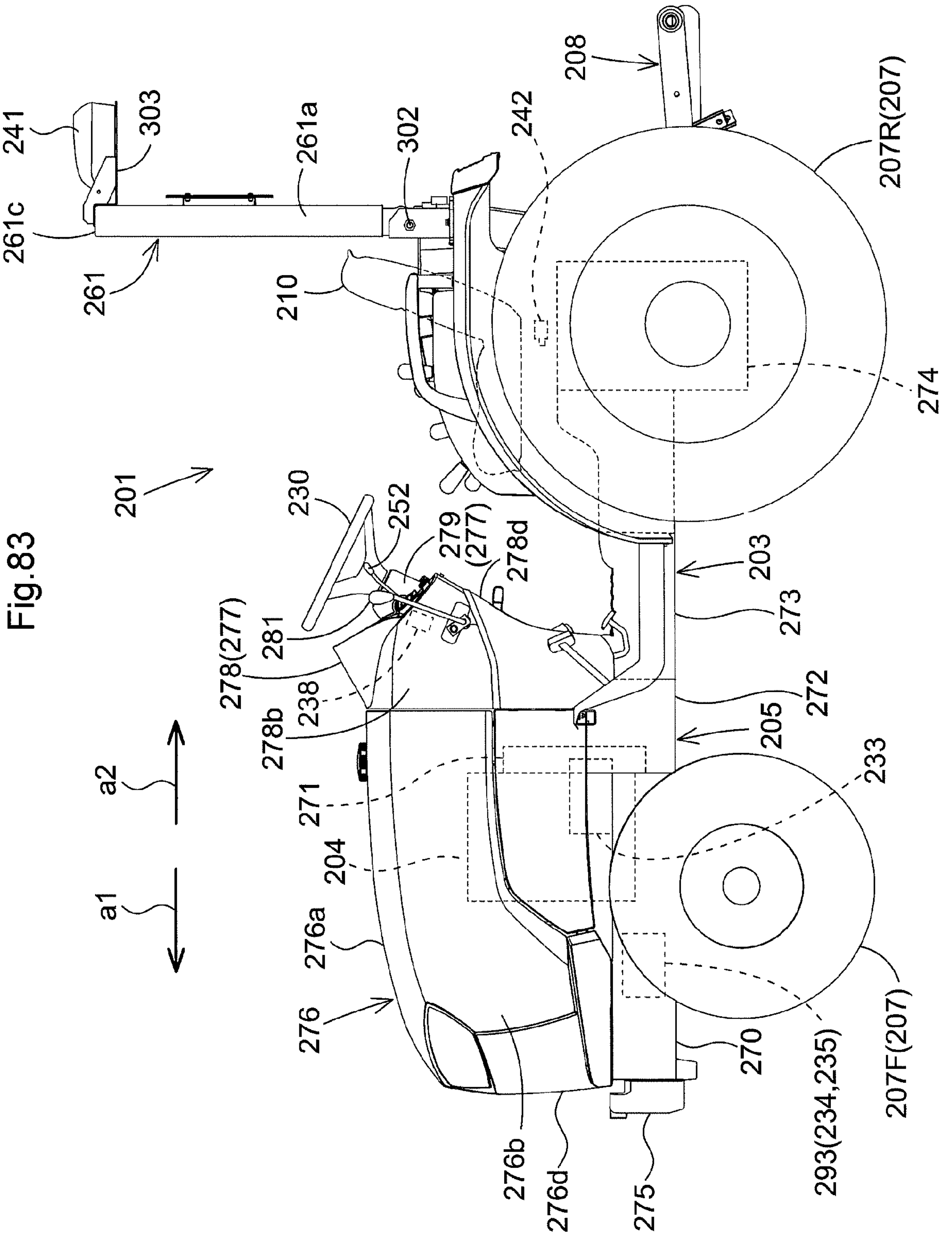
FIG. 83 is a left side view of a working vehicle (tractor).
Figure 84:
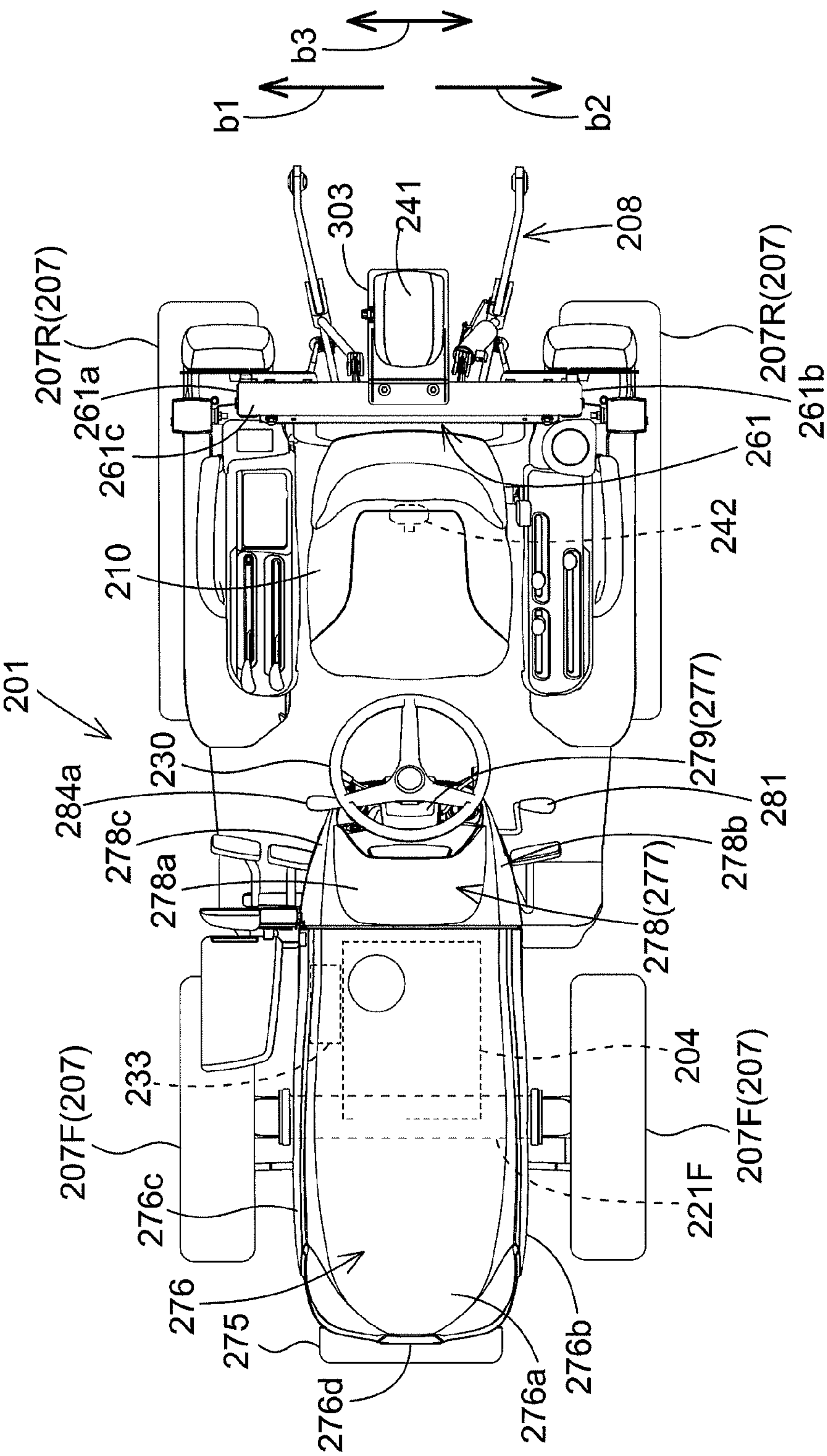
FIG. 84 is a plan view of a working vehicle (tractor).

FIG. 83 is a side view showing an embodiment of a working vehicle 201, and FIG. 84 is a plan view showing an embodiment of the working vehicle 201. In the case of the present embodiment, the working vehicle 201 is a tractor (hereinafter, also referred to as a "tractor 201"). However, the working vehicle 201 is not limited to a tractor, and may be an agricultural machine (agricultural vehicle) such as a combine or a transplant machine, or may be a construction machine (construction vehicle) or the like such as a loader work machine.

In the following description, the front side (in the direction of arrow a1 in FIG. 83) of a driver sitting on a driver seat 210 of the tractor (working vehicle) 201 is the forward direction, the rear side of the driver (in the direction of arrow a2 in FIG. 83) is the rearward direction, the left side of the driver (in the direction of arrow b1 in FIG. 84) is the left direction, and the right side of the driver (in the direction of arrow b2 in FIG. 84) is the right direction. Also, the lateral direction (the direction of arrow b3 in FIG. 84), which is a direction orthogonal to the front-rear direction of the tractor 201, is referred to as the vehicle body width direction.

As shown in FIG. 83, the tractor 201 includes a vehicle body 203, a motor 204 and a transmission 205. The vehicle body 203 has a traveling device 207 and can travel. The traveling device 207 is a device having front wheels 207F and rear wheels 207R. The front wheels 207F may be tire-type or crawler-type wheels. Also, the rear wheels 207R may be tire-type or crawler-type wheels.

The motor 204 is a diesel engine, an electric motor or the like, and in this embodiment, is configured with a diesel engine. The transmission 205 can switch the propulsion force of the traveling device 207 by changing speeds, and can switch the traveling device 207 between forward and reverse. A driver seat 210 is provided on the vehicle body 203.

Further, a connecting portion 208 including a three-point link mechanism or the like is provided at a rear portion of the vehicle body 203. A working device can be attached to/detached from the connecting portion 208. By connecting the working device to the connecting portion 208, the working device can be pulled by the vehicle body 203. The working device may be, for example, a tilling device for tilling, a fertilizer spraying device for spraying fertilizer, a pesticide spraying device for spraying pesticides, a harvesting device for harvesting, a mowing device for cutting grass and the like, a dispersion device for dispersing grass and the like, a grass collecting device for collecting pasture grass and the like, or a shaping device for shaping pasture grass and the like.

Figure 56:
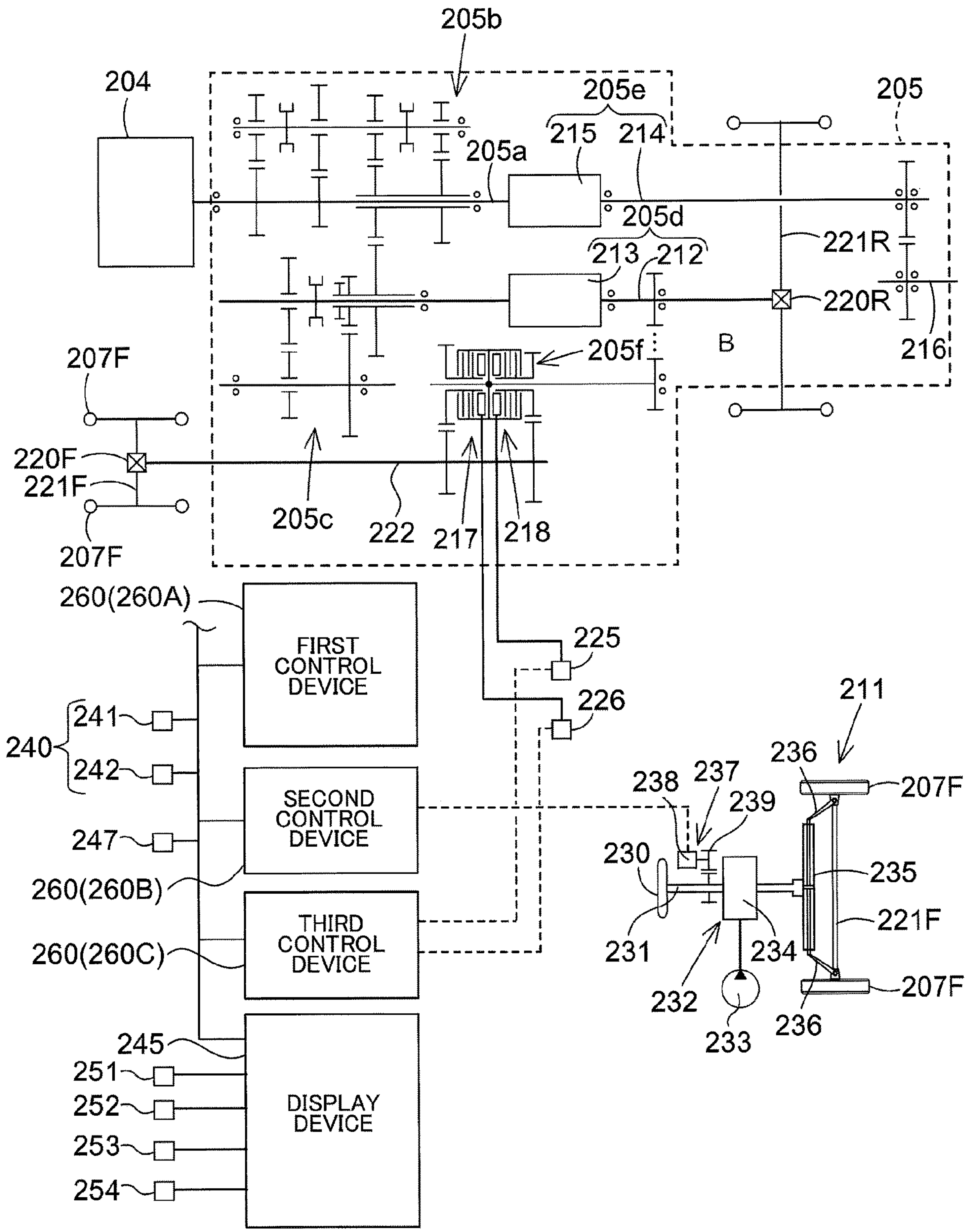
FIG. 56 shows a second embodiment (true up to FIG. 84), illustrating a configuration and a control block diagram of a working vehicle (tractor).

As shown in FIG. 56, the transmission 205 includes a main shaft (propulsion shaft) 205*a*, a main transmission unit 205*b*, an auxiliary transmission unit 205*c*, a shuttle unit 205*d*, a PTO power transmission unit 205*e*, and a front transmission unit 205*f*. The propulsion shaft 205*a* is rotatably supported by a housing case (transmission case) of the transmission 205, and power from a crankshaft of the motor 204 (engine) is transmitted to the propulsion shaft 205*a*. The main transmission unit 205*b* has a plurality of gears and a shifter that changes the connection of the gears. By appropriately changing the connection (engagement) of the plurality of gears with the shifter, the main transmission unit 205*b* changes the rotation input from the propulsion shaft 205*a* and outputs the changed rotation (changes speed).

The auxiliary transmission unit 205*c*, similar to the main transmission unit 205*b*, has a plurality of gears and a shifter that changes the connection of the gears. By appropriately changing the connection (engagement) of the plurality of gears with the shifter, the auxiliary transmission unit 205*c* changes the rotation input from the main transmission unit 205*b* and outputs the changed rotation (changes speed).

The shuttle unit 205*d* has a shuttle shaft 212 and a forward/reverse switching unit 213. The power output from the auxiliary transmission unit 205*c* is transmitted to the shuttle shaft 212 through gears and the like. The forward/reverse switching unit 213 is configured with, for example, a hydraulic clutch or the like, and switches the rotation direction of the shuttle shaft 212, that is, forward and reverse travel of the tractor 201, by switching on/off the hydraulic clutch. The shuttle shaft 212 is connected to a rear wheel differential device 220R. The rear wheel differential device 220R rotatably supports a rear axle 221R to which the rear wheels 207R are attached.

The PTO power transmission unit 205*e* includes a PTO propulsion shaft 214 and a PTO clutch 215. The PTO propulsion shaft 214 is rotatably supported, and can transmit power from the propulsion shaft 205*a*. The PTO propulsion shaft 214 is connected to a PTO shaft 216 through a gear or the like. The PTO clutch 215 is configured with, for example, a hydraulic clutch or the like, and by switching on/off the hydraulic clutch, switches between a state in which the power of the propulsion shaft 205*a* is transmitted to the PTO propulsion shaft 214, and a state in which the power of the propulsion shaft 205*a* is not transmitted to the PTO propulsion shaft 214.

The front transmission unit 205*f* has a first clutch 217 and a second clutch 218. The first clutch 217 and the second clutch 218 can transmit power from the propulsion shaft 205*a*, and for example, the power of the shuttle shaft 212 is transmitted through a gear and a transmission shaft. Power from the first clutch 217 and the second clutch 218 can be transmitted to a front axle 221F through the front transmission shaft 222. Specifically, the front transmission shaft 222 is connected to a front wheel differential device 220F, and the front wheel differential device 220F rotatably supports the front axle 221F to which the front wheels 207F are attached.

The first clutch 217 and the second clutch 218 are configured with a hydraulic clutch or the like. An oil path is connected to the first clutch 217, and the oil path is connected to a first operating valve 225 to which hydraulic oil discharged from a hydraulic pump is supplied. The first clutch 217 switches between a connected state and a disconnected state according to the opening degree of the first operating valve 225. An oil path is connected to the second clutch 218, and the oil path is connected to a second operating valve 226. The second clutch 218 switches between a connected state and a disconnected state according to the opening degree of the second operating valve 226. The first operating valve 225 and the second operating valve 226 are, for example, two-position switching valves with electromagnetic valves, and are switched to a connected state or a disconnected state by exciting or demagnetizing a solenoid of the electromagnetic valve.

When the first clutch 217 is in the disconnected state and the second clutch 218 is in the connected state, the power of the shuttle shaft 212 is transmitted to the front wheels 207F through the second clutch 218. As a result, the front wheels and the rear wheels are driven by power in four-wheel drive (4WD), and the rotation speeds of the front wheels and the rear wheels are substantially the same (4WD constant speed state). On the other hand, when the first clutch 217 is in the connected state and the second clutch 218 is in the disconnected state, four-wheel drive is performed, and the rotation speed of the front wheels is higher than the rotation speed of the rear wheels (4WD acceleration state). When the first clutch 217 and the second clutch 218 are in the connected state, the power of the shuttle shaft 212 is not transmitted to the front wheels 207F, so two-wheel drive (2WD) is performed in which the rear wheels are driven by the power.

Overview of Position Detection Device

The tractor 201 includes a position detection device 240. The position detection device 240 is a device that detects its own position (positioning information including latitude and longitude) by a satellite positioning system (positioning satellite) such as D-GPS, GPS, GLONASS, Hokuto, Galileo and Michibiki. That is, the position detection device 240 receives a reception signal (position of the positioning satellite, transmission time, correction information and the like) transmitted from a positioning satellite, and detects a position (for example, latitude and longitude) based on the reception signal. The position detection device 240 includes a receiving device 241 and an inertial measurement device (IMU: Inertial Measurement Unit) 242.

The receiving device 241 has an antenna or the like and receives a reception signal transmitted from a positioning satellite, and is attached to the vehicle body 203 separately from the inertial measurement device 242. In this embodiment, the receiving device 241 is attached to a ROPS (ROPS: Rollover Protection Structure) 261 provided on the vehicle body 203. Note that the attachment location of the receiving device 241 is not limited to the location disclosed in this embodiment.

The inertial measurement device 242 has an acceleration sensor that detects acceleration, a gyro sensor that detects angular velocity and the like. The inertial measurement device 242 is provided in the vehicle body 203, for example, below the driver seat 210, and is capable of detecting the roll angle, pitch angle, yaw angle and the like of the vehicle body 203.

Overview of Steering Device, Manual Steering, and Automatic Steering

As shown in FIG. 56, the tractor 201 includes a steering device 211. The steering device 211 is a device capable of performing manual steering in which steering of the vehicle body 203 is performed according to operation by a driver, and automatic steering in which for steering of the vehicle body 203 is performed automatically without a driver operation.

The steering device 211 includes a steering wheel 230 and a steering shaft (rotation shaft) 231 that rotatably supports the steering wheel 230. The steering device 211 has an auxiliary mechanism 232 (hereinafter also referred to as a "power steering device 232"). The auxiliary mechanism 232 assists manual steering of the steering wheel 230. More specifically, the auxiliary mechanism 232 assists rotation of the steering shaft 231 (the steering wheel 230) by hydraulic pressure or the like. The auxiliary mechanism 232 includes a hydraulic pump 233, a control valve 234 to which hydraulic oil discharged from the hydraulic pump 233 is supplied, and a steering cylinder 235 operated by the control valve 234. The control valve 234 is, for example, a three-position switching valve that can be switched by moving a spool or the like, and switches according to the steering direction (rotation direction) of the steering shaft 231. The steering cylinder 235 is connected to an arm (knuckle arm) 236 that changes the pointing direction of the front wheels 207F.

Therefore, if the driver grips the steering wheel 230 and operates it in one direction or the other, the switching position and the opening degree of the control valve 234 are switched according to the rotation direction of the steering wheel 230, and by the steering cylinder 235 expanding or contracting to the left or right according to the switching position and the opening degree of the control valve 234, the steering direction of the front wheels 207F can be changed. That is, the traveling direction of the vehicle body 203 can be changed to the left or right by manual steering of the steering wheel 230.

Next, automatic steering will be described.

Figure 57:
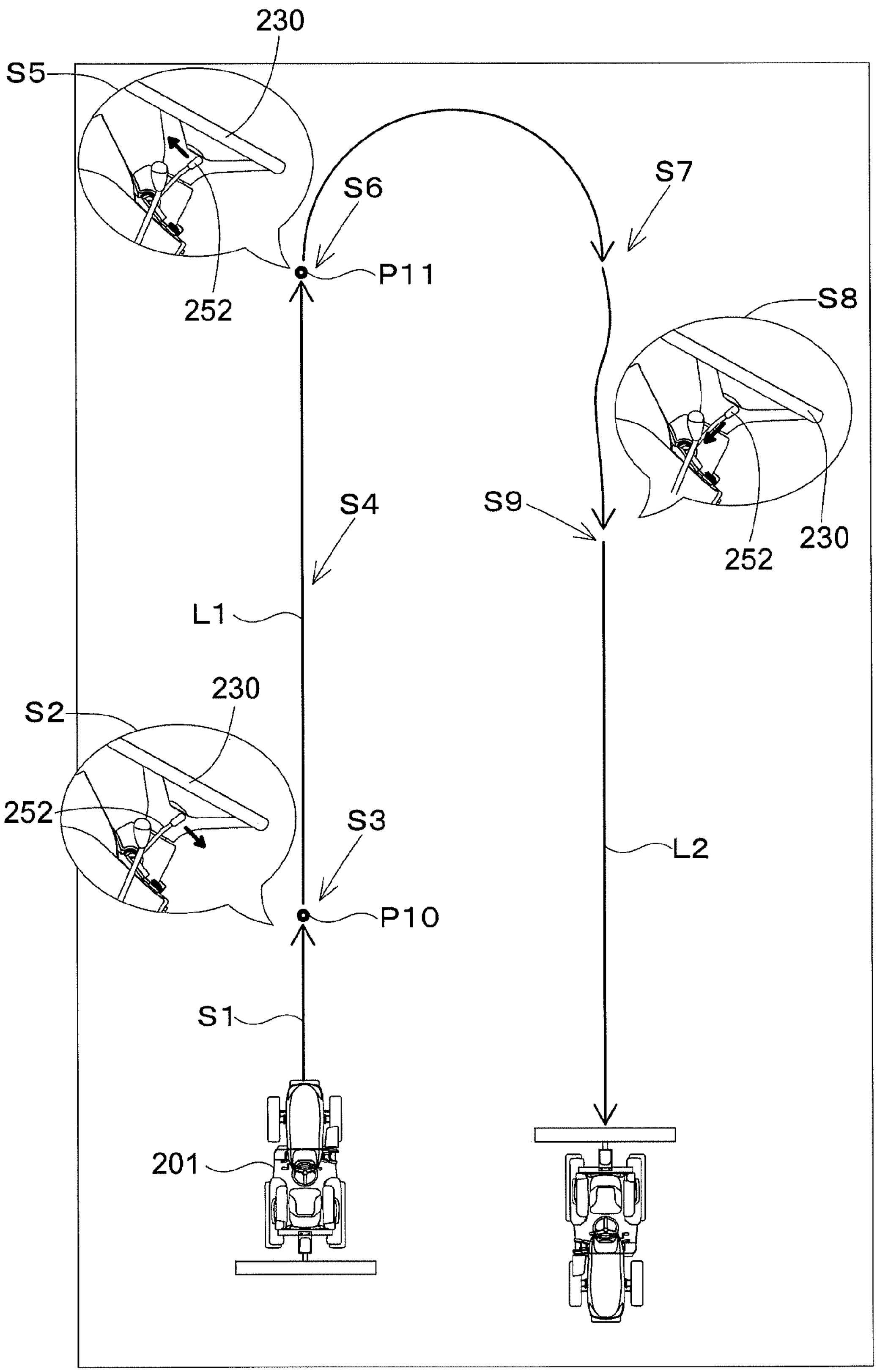
FIG. 57 is an explanatory diagram illustrating automatic steering.

As shown in FIG. 57, when performing automatic steering, first, a travel reference line L1 is set before performing automatic steering. After setting the travel reference line L1, automatic steering can be performed by setting a planned travel line L2 parallel to the travel reference line L1. In automatic steering, steering in the traveling direction of the tractor 201 (the vehicle body 203) is automatically performed so that the vehicle body position measured by the position detection device 240 matches the planned travel line L2.

Specifically, the tractor 201 (the vehicle body 203) is moved to a predetermined position in the field before performing automatic steering (S1), and when the driver operates a steering switching switch 252 provided in the tractor 201 to a predetermined position (S2), the vehicle body position measured by the position detection device 240 is set as a start point P10 of the travel reference line L1 (S3). Further, when the tractor 201 (the vehicle body 203) is moved from the start point P10 of the travel reference line L1 (S4), and the driver operates the steering switching switch 252 to a predetermined position (S5), the vehicle body position measured by the position detection device 240 is set as an end point P11 of the travel reference line L1 (S6). Therefore, a straight line connecting the start point P10 and the end point P11 is set as the travel reference line L1.

After the travel reference line L1 is set (after S6), for example, the tractor 201 (the vehicle body 203) is moved to a location different from the location where the travel reference line L1 was set (S7), and when the driver operates the steering switching switch 252 (S8), the planned travel line L2, which is a straight line parallel to the travel reference line L1, is set (S9). After setting the planned travel line L2, automatic steering is started, and the traveling direction of the tractor 201 (the vehicle body 203) is changed so as to follow the planned travel line L2. For example, when the current vehicle body position is on the left side of the planned travel line L2, the front wheels 207F are steered to the right, and when the current vehicle body position is on the right side of the planned travel line L2, the front wheels 207F are steered to the left. Note that during automatic steering, the traveling speed (vehicle speed) of the tractor 201 (the vehicle body 203) can be manually changed by the driver by changing the operation amount of an accelerator member (an accelerator pedal or an accelerator lever) provided in the tractor 201, or by changing the gear position of the transmission.

Further, after starting automatic steering, when the driver operates the steering switching switch 252 at any position, the automatic steering can be ended. That is, the end point of the planned travel line L2 can be set by ending the automatic steering by operating the steering switching switch 252. That is, the length from the start point to the end point of the planned travel line L2 can be set longer or shorter than the travel reference line L1. In other words, the planned travel line L2 is not associated with the length of the travel reference line L1, and the planned travel line L2 allows the vehicle to travel while performing automatic steering for a distance longer than the length of the travel reference line L1.

As shown in FIG. 56, the steering device 211 has an automatic steering mechanism 237. The automatic steering mechanism 237 is a mechanism for automatically steering the vehicle body 203, and automatically steers the vehicle body 203 based on the position (the vehicle body position) of the vehicle body 203 detected by the position detection device 240. More specifically, the automatic steering mechanism 237 automatically steers the steering wheel 230 based on a signal received by the receiving device 241 and the inertia measured by the inertial measurement device 242. The automatic steering mechanism 237 includes a steering motor 238 and a gear mechanism 239. The steering motor 238 is a motor whose rotation direction, rotation speed, rotation angle and the like can be controlled based on the vehicle body position. The gear mechanism 239 includes a gear provided on the steering shaft 231 and rotating with the steering shaft 231, and a gear provided on the rotation shaft of the steering motor 238 and rotating with the rotation shaft. When the rotation shaft of the steering motor 238 rotates, the steering shaft 231 automatically rotates (turns) through the gear mechanism 239, and thus the steering direction of the front wheels 207F can be changed so that the vehicle body position matches the planned travel line L2.

Overview of Display Device

Figure 67:
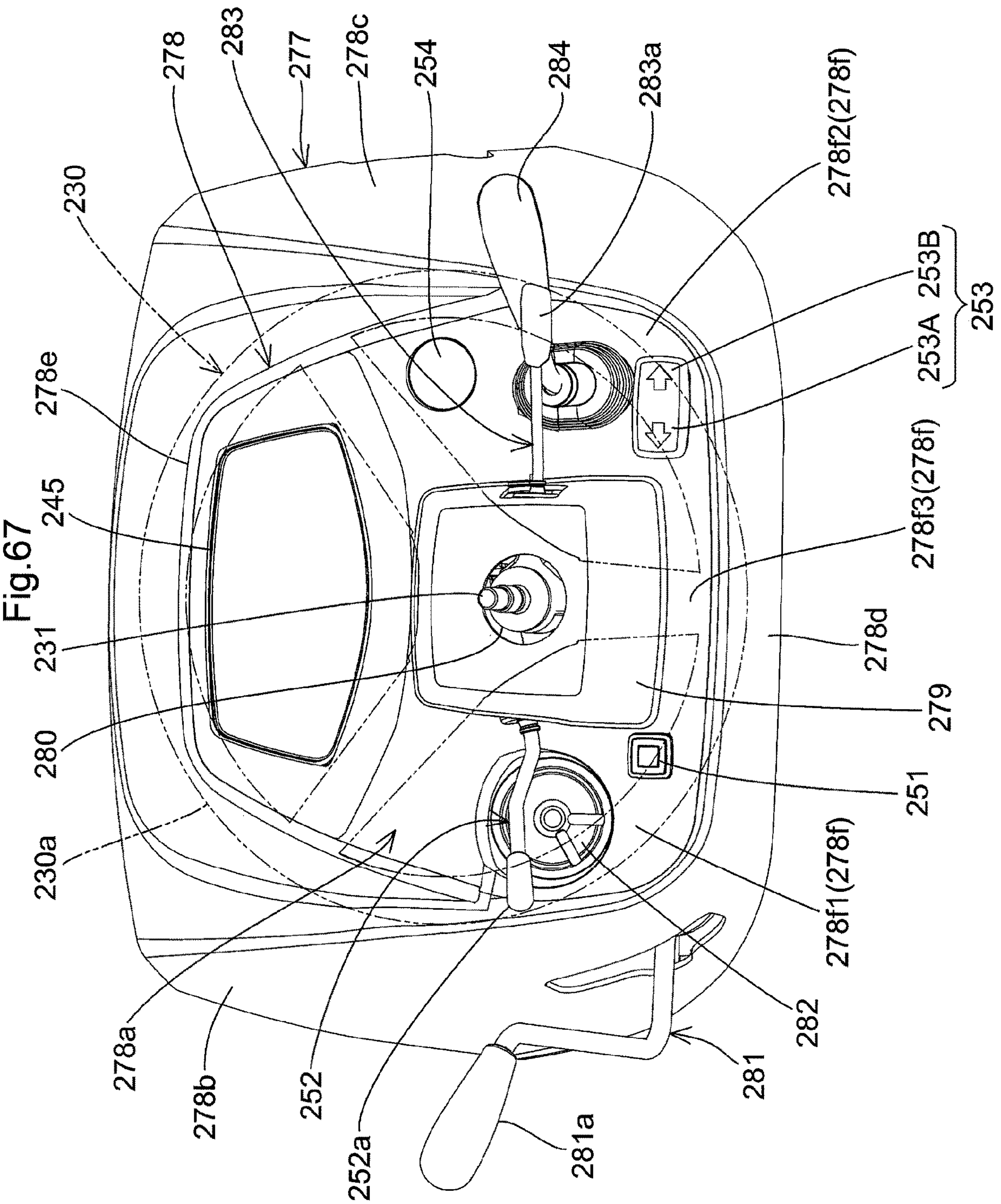
FIG. 67 shows a panel cover and the like when viewed from a direction perpendicular to a display face of a display device.

As shown in FIGS. 56 and 67, the tractor 201 includes a display device 245. The display device 245 is a device that can display various information related to the tractor 201, and can display at least driving information of the tractor 201. The display device 245 is provided in front of the driver seat 210.

Overview of Setting Switch and Steering Switching Switch

As shown in FIG. 56, the tractor 201 includes a setting switch 251. The setting switch 251 is a switch that switches to a setting mode in which settings are at least set before the start of automatic steering. The setting mode is a mode in which various settings relating to the automatic steering are performed before the automatic steering is started. For example, the setting mode is a mode in which the start point and the end point of the travel reference line L1 are set.

The setting switch 251 can be switched ON or OFF. When the setting switch 251 is ON, it outputs a signal that the setting mode is active, and when the setting switch 251 is OFF, it outputs a signal that the setting mode is inactive. Also, when the setting switch 251 is ON, it outputs a signal that the setting mode is active to the display device 245, and when the setting switch 251 is OFF, it outputs a signal that the setting mode is inactive to the display device 245.

The tractor 201 includes the steering switching switch 252. The steering switching switch 252 is a switch that switches between starting or ending of automatic steering in the setting mode. Specifically, the steering switching switch 252 can be switched up, down, forward, and rearward from a neutral position, and when switched downward from the neutral position in a state where the setting mode is active, outputs starting of automatic steering, and when switched upward from the neutral position in a state where the setting mode is active, outputs ending of automatic steering. Also, when the steering switching switch 252 is switched rearward from the neutral position in a state where the setting mode is active, setting of the current vehicle body position to the start point P10 of the travel reference line L1 is output, and when the steering switching switch 252 is switched forward from the neutral position in a state where the setting mode is active, setting of the current vehicle body position to the end point P11 of the travel reference line L1 is output.

Overview of Correction Switch

The tractor 201 includes a correction switch 253. The correction switch 253 is a switch for correcting the vehicle body position (latitude, longitude) measured by the position detection device 240. That is, the correction switch 253 is a switch for correcting the vehicle body position (calculated vehicle body position) calculated based on a reception signal (position of the positioning satellite, transmission time, correction information and the like) and measurement information (acceleration and angular velocity) measured by the inertial measurement device 242.

The correction switch 253 is configured with a push switch that can be pushed or a slide switch that can slide. Below, cases where the correction switch 253 is a push switch and a slide switch will be respectively described.

When the correction switch 253 is a push switch, the correction amount is set based on the number of times the push switch has been operated. The correction amount is determined by a formula 'correction amount=number of operations×correction amount per one operation'. For example, as shown in FIG. 58A, each time the push switch is operated, the correction amount increases by several centimeters or tens of centimeters. The number of times the push switch is operated is input to a first control device 260A, and the first control device 260A sets (calculates) a correction amount based on the number of times of operation.

When the correction switch 253 is a slide switch, the correction amount is set based on an operation amount (displacement amount) of the slide switch. For example, the correction amount is determined by a formula 'correction amount=displacement amount from a predetermined position'. For example, as shown in FIG. 58B, every time the displacement amount of the slide switch increases by 5 mm, the correction amount increases by several centimeters or tens of centimeters. The operation amount (displacement amount) of the slide switch is input to the first control device 260A, and the first control device 260A sets (calculates) a correction amount based on the displacement amount. Note that the above-described method of increasing the correction amount and the rate of increase are not limited to the above-described numerical values.

Figure 59A:
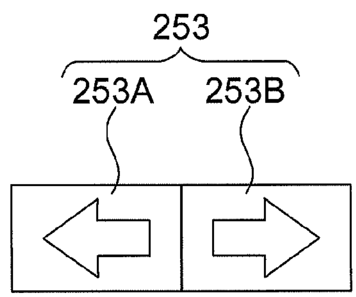
FIG. 59A shows a first correction unit and a second correction unit in the push switch.
Figure 59B:
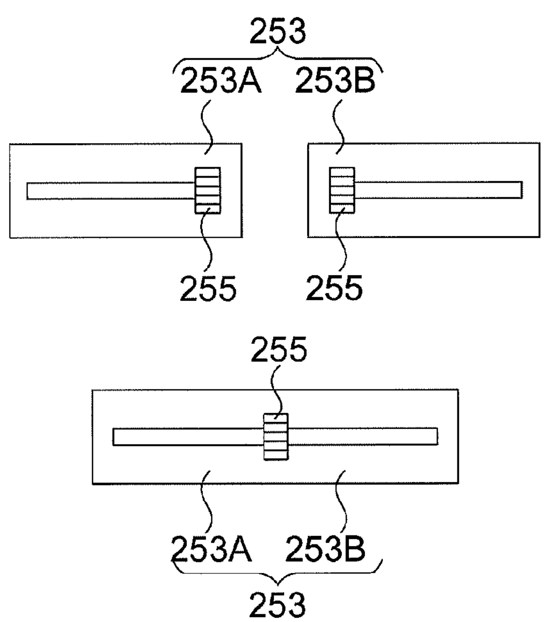
FIG. 59B shows a first correction unit and a second correction unit in the slide switch.

Specifically, as shown in FIGS. 59A and 59B, the correction switch 253 includes a first correction unit 253A and a second correction unit 253B. The first correction unit 253A is a portion that commands correction of the vehicle body position corresponding to one side in the width direction of the vehicle body 203 (the vehicle body width direction), that is, the left side. The second correction unit 253B is a portion that commands correction of the vehicle body position corresponding to the other side in the width direction of the vehicle body 203, that is, the right side.

As shown in FIG. 59A, when the correction switch 253 is a push switch, the first correction unit 253A and the second correction unit 253B are ON or OFF switches that automatically return each time an operation is performed. The switch configuring the first correction unit 253A and the switch configuring the second correction unit 253B are integrated. Note that the switch configuring the first correction unit 253A and the switch configuring the second correction unit 253B may also be disposed apart from each other. As shown in FIG. 58A, each time the first correction unit 253A is pushed, the correction amount (the left correction amount) corresponding to the left side of the vehicle body 203 increases. Also, each time the second correction unit 253B is pushed, the correction amount (the right correction amount) corresponding to the right side of the vehicle body 203 increases.

As shown in FIG. 59B, when the correction switch 253 is a slide switch, the first correction unit 253A and the second correction unit 253B include a knob 255 that moves left or right along the longitudinal direction of an elongated hole. When the correction switch 253 is a slide switch, the first correction unit 253A and the second correction unit 253B are disposed apart from each other in the width direction. As shown in FIG. 58B, when the knob 255 is gradually displaced leftward from a predetermined reference position, the left correction amount increases in accordance with the displacement amount. When the knob 255 is gradually displaced rightward from a predetermined reference position, the right correction amount increases in accordance with the displacement amount. Note that, as shown in FIG. 59B, a configuration may be adopted in which, in the case of a slide switch, the first correction unit 253A and the second correction unit 253B are formed integrated together, the reference position of the knob 255 is set at the center, and the left correction amount is set when the knob 255 is moved from the reference position to the left side, and the right correction amount is set when the knob 255 is moved from the center position to the right side.

Next, the relationship between the amount of correction by the correction switch 253 (the amount of left correction and the amount of right correction), the planned travel line L2 (the planned travel route), and the behavior (travel trajectory) of the tractor 201 (the vehicle body 203) will be described.

Figure 60A:
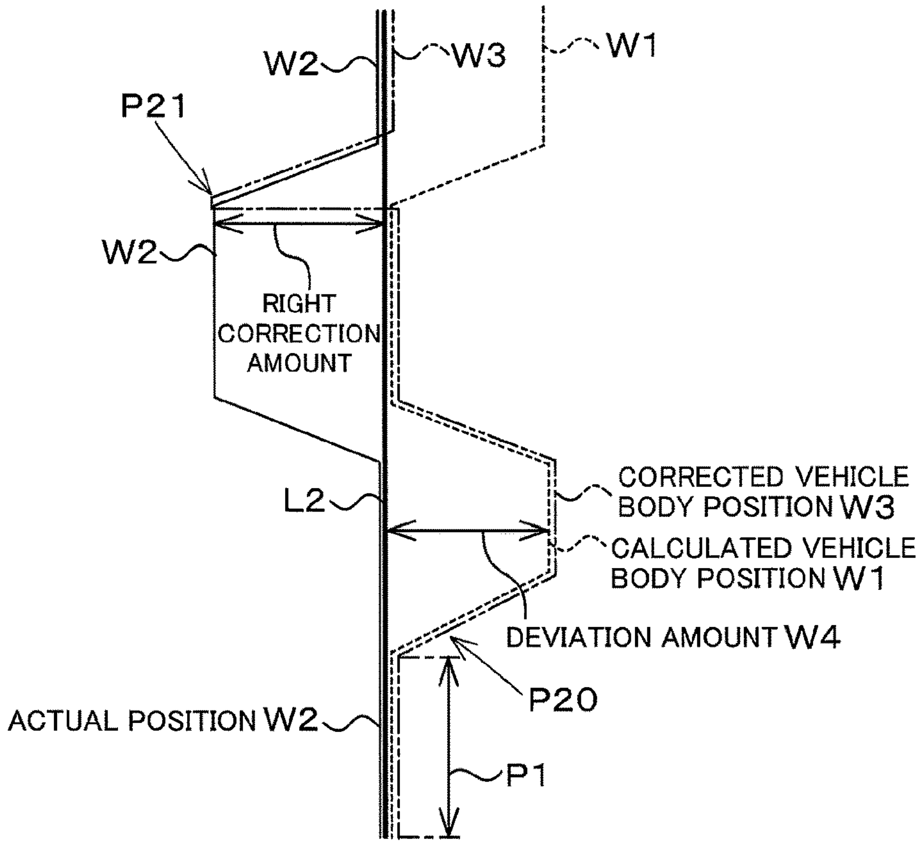
FIG. 60A shows a state in which a calculated vehicle body position is shifted to the right during automatic steering and in straight ahead travel.

FIG. 60A shows a state in which a calculated vehicle body position W1 is shifted to the right during automatic steering and straight ahead travel. As shown in FIG. 60A, in a state where the automatic steering has started, when the actual position (an actual position W2) of the tractor 201 (the vehicle body 203) matches the calculated vehicle body position W1, and the actual position W2 matches the planned travel line L2, the tractor 201 travels along the planned travel line L2. That is, in a section P1 where there is no error in the positioning of the position detection device 240 and the vehicle body position (the calculated vehicle body position W1) detected by the position detection device 240 is the same as the actual position W2, the tractor 201 travels along the planned travel line L2. Note that, when there is no error in the positioning of the position detection device 240 and no correction is performed, the calculated vehicle body position W1 and a vehicle body position (corrected vehicle body position) W3 after correction by the correction amount have the same value. The corrected vehicle body position W3 is calculated from a formula 'corrected vehicle body position W3=calculated vehicle body position W1−correction amount'.

Here, in the vicinity of a position P20, although the actual position W2 does not deviate from the planned travel line L2, due to various influences, an error occurs in the positioning of the position detection device 240. Assuming that the vehicle body position W1 detected by the position detection device 240 is shifted to the right side with respect to the planned travel line L2 (the actual position W2), and a deviation amount W4 is maintained, the tractor 201 judges that there is deviation between the calculated vehicle body position W1 and the planned travel line L2, and the tractor 201 is steered to the left so as to eliminate the deviation amount W4 between the calculated vehicle body position W1 and the planned travel line L2. Thus, the actual position W2 of the tractor 201 is shifted to the planned travel line L2 by left steering. Thereafter, it is assumed that the driver notices that the tractor 201 has deviated from the planned travel line L2, and steers the second correction unit 253B at the position P21 to increase the right correction amount from zero. In this way the right correction amount is added to the calculated vehicle body position W1, and thus the vehicle body position (corrected vehicle body position) W3 after correction can be made substantially the same as the actual position W2. That is, by setting the right correction amount with the second correction unit 253B, the vehicle body position of the position detection device 240 can be corrected in the direction in which the deviation amount W4 generated near the position P20 is eliminated. Note that, as indicated at the position P21 in FIG. 60A, after correction of the vehicle body position, when the actual position W2 of the tractor 201 is separated to the left side from the planned travel line L2, the tractor 201 is steered to the right, and thus the actual position W2 of the tractor 201 can be made to match the planned travel line L2.

Figure 60B:
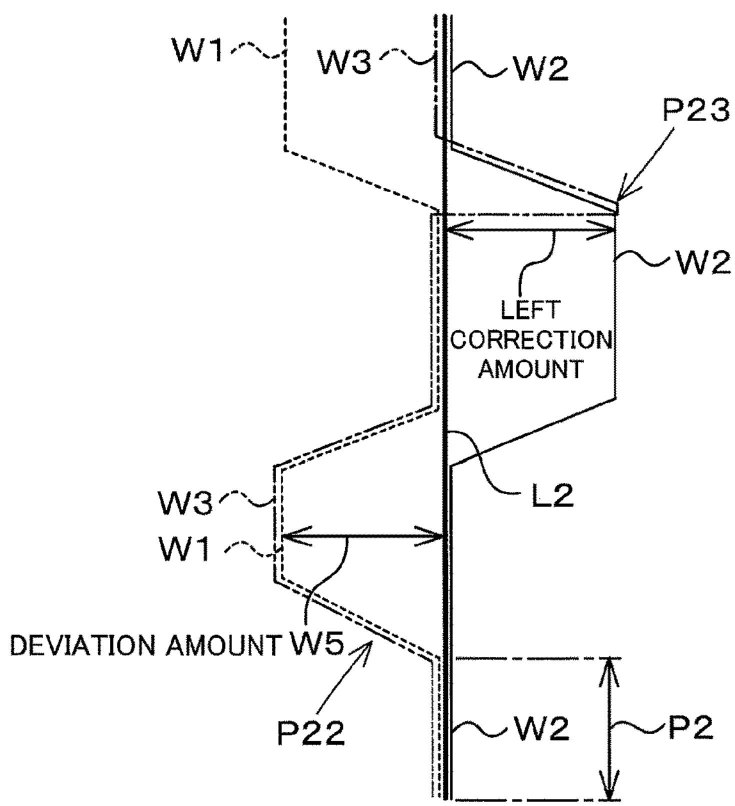
FIG. 60B shows a state in which a calculated vehicle body position is shifted to the left during automatic steering and in straight ahead travel.

FIG. 60B shows a state in which the calculated vehicle body position W1 is shifted to the left during automatic steering and straight ahead travel. As shown in FIG. 60B, in a state where the automatic steering has started, when the actual position W2 matches the calculated vehicle body position W1, and the actual position W2 matches the planned travel line L2, same as in FIG. 60A, the tractor 201 travels along the planned travel line L2. That is, as in FIG. 60A, in the section P2 where there is no error in the positioning of the position detection device 240, the tractor 201 travels along the planned travel line L2. Also, as in FIG. 60A, the calculated vehicle body position W1 and the corrected vehicle body position W3 have the same value.

Here, in the vicinity of a position P22, due to various influences, an error occurs in the positioning of the position detection device 240, and assuming that the vehicle body position W1 detected by the position detection device 240 is shifted to the left side with respect to the actual position W2, and a deviation amount W5 is maintained, the tractor 201 is steered to the right so as to eliminate the deviation amount W5 between the calculated vehicle body position W1 and the planned travel line L2. Thereafter, it is assumed that the driver notices that the tractor 201 has deviated from the planned travel line L2, and steers the first correction unit 253A at the position P23 to increase the left correction amount from zero. In this way the left correction amount is added to the calculated vehicle body position W1, and thus the vehicle body position (corrected vehicle body position) W3 after correction can be made substantially the same as the actual position W2. That is, by setting the left correction amount with the first correction unit 253A, the vehicle body position of the position detection device 240 can be corrected in the direction in which the deviation amount W5 generated near the position P22 is eliminated. Note that, as indicated at the position P23 in FIG. 60B, after correction of the vehicle body position, when the actual position W2 of the tractor 201 is separated to the right side from the planned travel line L2, the tractor 201 is steered to the left, and thus the actual position W2 of the tractor 201 can be made to match the planned travel line L2.

Overview of Control Devices

As shown in FIG. 56, the tractor 201 includes a plurality of control devices 260. The plurality of control devices 260 are devices that perform control of the traveling system, control of the work system, calculation of the vehicle body position and the like in the tractor 201. The plurality of control devices 260 are a first control device 260A, a second control device 260B and a third control device 260C.

The first control device 260A receives a reception signal (reception information) received by the receiving device 241 and measurement information (acceleration, angular velocity and the like) measured by the inertial measurement device 242, and based on the reception information and the measurement information, calculates the vehicle body position. For example, when the correction amount by the correction switch 253 is zero, that is, when correction of the vehicle body position by the correction switch 253 is not commanded, the first control device 260A does not correct the calculated vehicle body position W1 calculated based on the reception information and the measurement information, and determines the calculated vehicle body position W1 as the vehicle body position to be used when performing automatic steering. On the other hand, when correction of the vehicle body position by the correction switch 253 is commanded, the first control device 260A sets a correction amount of the vehicle body position based on either the number of operations of the correction switch 253 or the operation amount (displacement amount) of the correction switch 253, and determines the corrected vehicle body position W3 obtained by correcting the calculated vehicle body position W1 by the correction amount as the vehicle body position to be used when performing automatic steering.

The first control device 260A sets a control signal based on the vehicle body position (the calculated vehicle body position W1 and the corrected vehicle body position W3) and the planned travel line L2, and outputs the control signal to the second control device 260B. The second control device 260B controls the steering motor 238 of the automatic steering mechanism 237 based on the control signal output from the first control device 260A so that the vehicle body 203 travels along the planned travel line L2.

Figure 61:
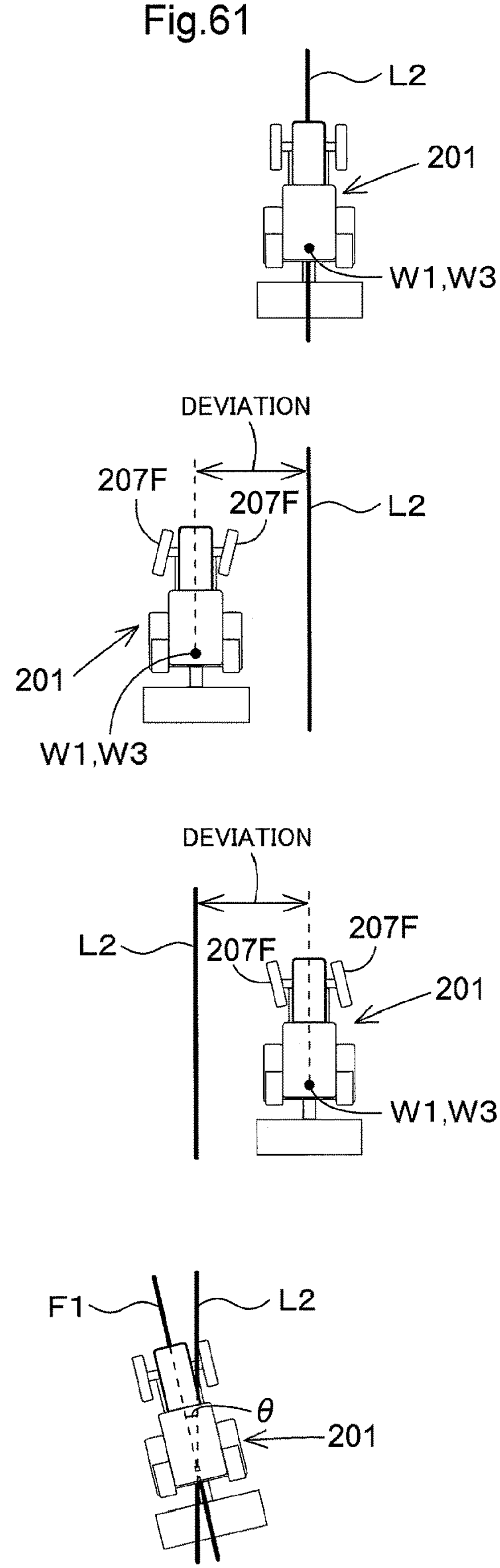
FIG. 61 is an explanatory diagram illustrating an automatic operation.

As shown in FIG. 61, when the deviation between the vehicle body position and the planned travel line L2 is less than a threshold value, the second control device 260B maintains the rotation angle of the rotation shaft of the steering motor 238. When the deviation between the vehicle body position and the planned travel line L2 is at least the threshold value and the tractor 201 is located on the left side of the planned travel line L2, the second control device 260B rotates the rotation shaft of the steering motor 238 such that the steering direction of the tractor 201 is in the right direction. When the deviation between the vehicle body position and the planned travel line L2 is at least the threshold value and the tractor 201 is located on the right side of the planned travel line L2, the second control device 260B rotates the rotation shaft of the steering motor 238 such that the steering direction of the tractor 201 is in the left direction. Note that in the above-described embodiment, the steering angle of the steering device 211 is changed based on the deviation between the vehicle body position and the planned travel line L2, but a configuration may also be adopted in which, when the bearing of the planned travel line L2 and a bearing (vehicle body bearing) F1 of the advancing direction (travel direction) of the tractor 201 (the vehicle body 203) are different, that is, when the angle θ of the vehicle body bearing F1 with respect to the planned travel line L2 at least a threshold value, the second control device 260B sets the steering angle such that the angle θ becomes zero (the vehicle body bearing F1 matches the bearing of the planned travel line L2). Also, a configuration may also be adopted in which the second control device 260B sets a final steering angle in automatic steering based on a steering angle obtained based on deviation (position deviation) and a steering angle obtained based on bearing (bearing deviation). The setting of the steering angle in automatic steering in the above-described embodiment is only one example, and is not limited.

The third control device 260C raises/lowers the connecting portion 208 according to operation of an operation member provided in the vicinity of the driver seat 210.

Note that the above-described control of the traveling system, control of the work system, and calculation of the vehicle body position are not limited.

Specific Configuration of Vehicle Body and the Like

As shown in FIG. 83, the vehicle body 203 has a front axle frame 270, a flywheel housing 271, a clutch housing 272, an intermediate frame 273, and a transmission case 274.

The front axle frame 270 is disposed at the front of the vehicle body 203, and rotatably supports the axle (the front axle 221F) of the front wheels 207F. Further, the front axle frame 270 supports the motor 204 and extends forward from the motor 204. The front axle frame 270, the flywheel housing 271, the clutch housing 272, the intermediate frame 273, and the transmission case 274 are integrally connected to configure a highly rigid vehicle body frame.

The flywheel housing 271 is connected to a rear portion of the motor 204 and houses a flywheel connected to an output shaft of the motor 204. The clutch housing 272 is connected to the flywheel housing 271 and houses a clutch that transmits the power of the motor 204 transmitted through the flywheel in an intermittent manner. The intermediate frame 273 is connected to a rear portion of the clutch housing 272 and extends rearward from the clutch housing 272. The transmission case 274 is connected to a rear portion of the intermediate frame 273 and houses the transmission 205 and the rear wheel differential device 220R.

Figure 62:
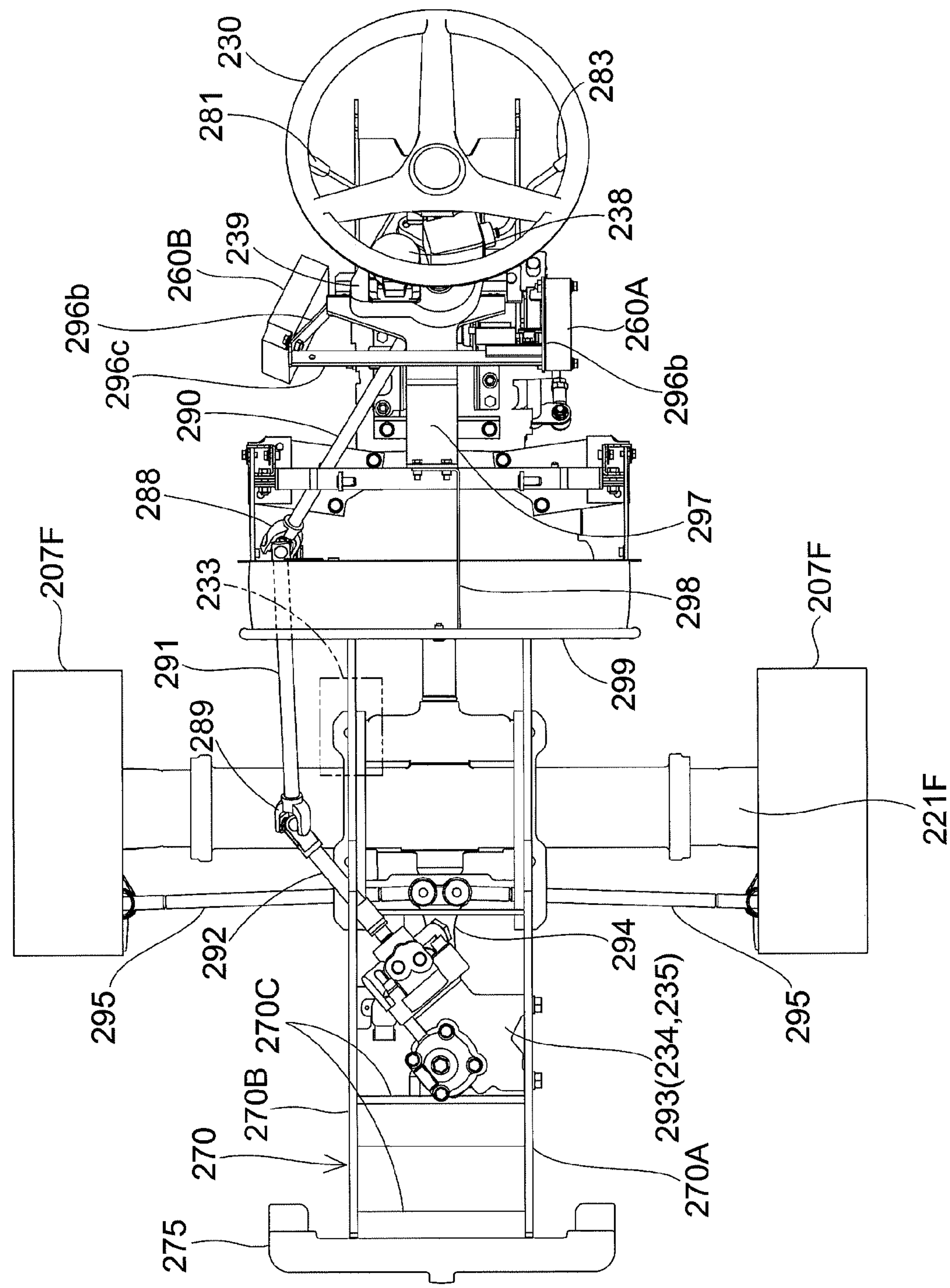
FIG. 62 is a plan view showing a main part of the internal structure of a front part of the vehicle body.

As shown in FIG. 62, the front axle frame 270 includes a first frame 270A disposed on one side (the left side) in the vehicle body width direction, a second frame 270B disposed on the other side (the right side) in the vehicle body width direction, and a third frame 270C that connects the first frame 270A and the second frame 270B. As shown in FIGS. 62, 83 and 84, a weight 275 is mounted on the front end of the front axle frame 270. Further, a hood 276 is attached to an upper portion of the front axle frame 270.

The hood 276 covers the motor 204. More specifically, the hood 276 includes an upper plate 276*a* that covers the upper part of the motor 204, a left plate 276*b* that covers the left of the motor 204, a right plate 276*c* that covers the right of the motor 204, and a front plate 276*d* that covers the front of the motor 204. A cover 277 that houses the steering shaft 231 and the like is provided at a rear portion of the hood 276. The steering wheel 230 is provided above the cover 277 and in front of the driver seat 210.

Panel Cover and Column Cover

Figure 63:
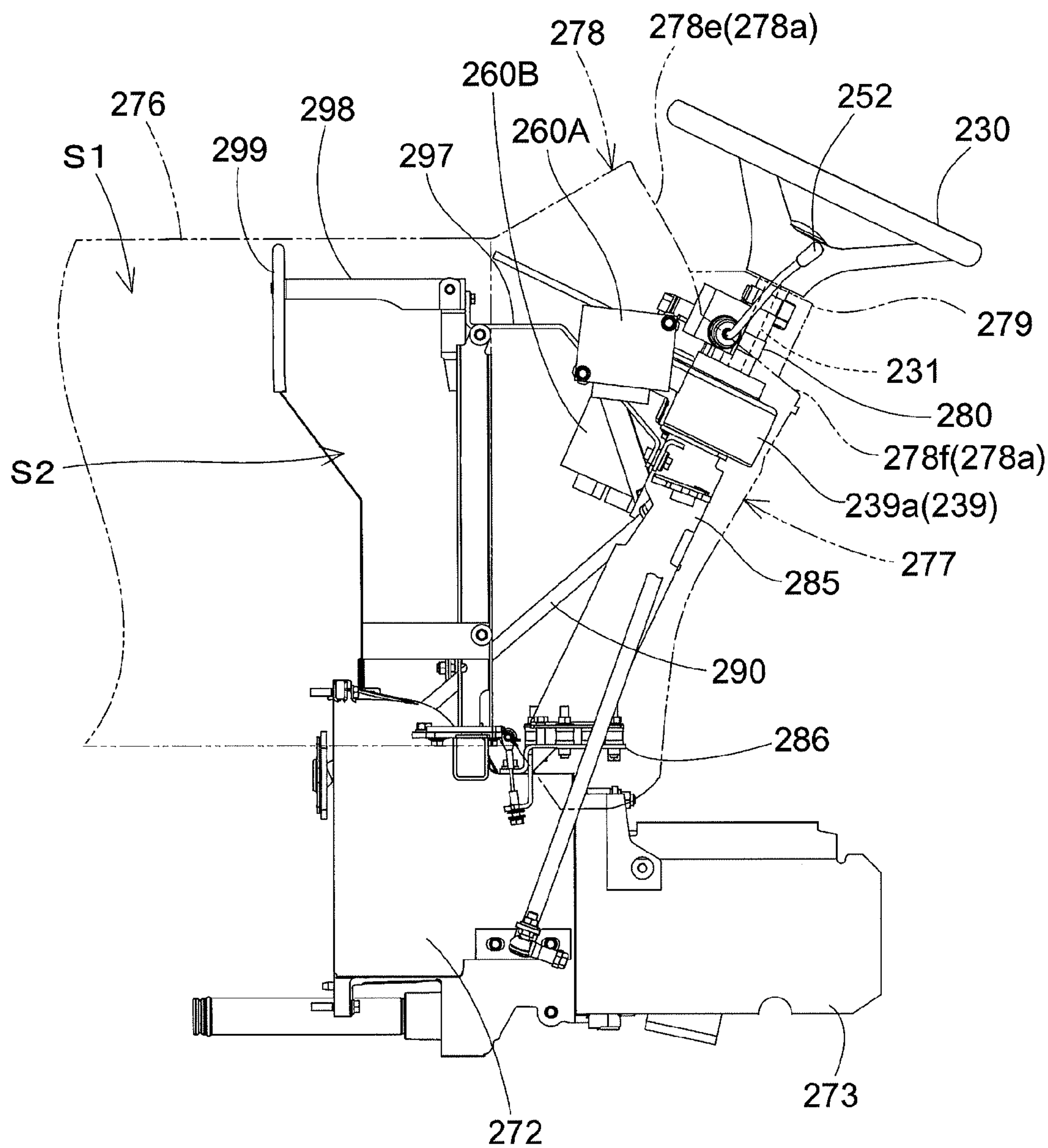
FIG. 63 is a left side view showing the main part of the internal structure of the front part of the vehicle body.
Figure 64:
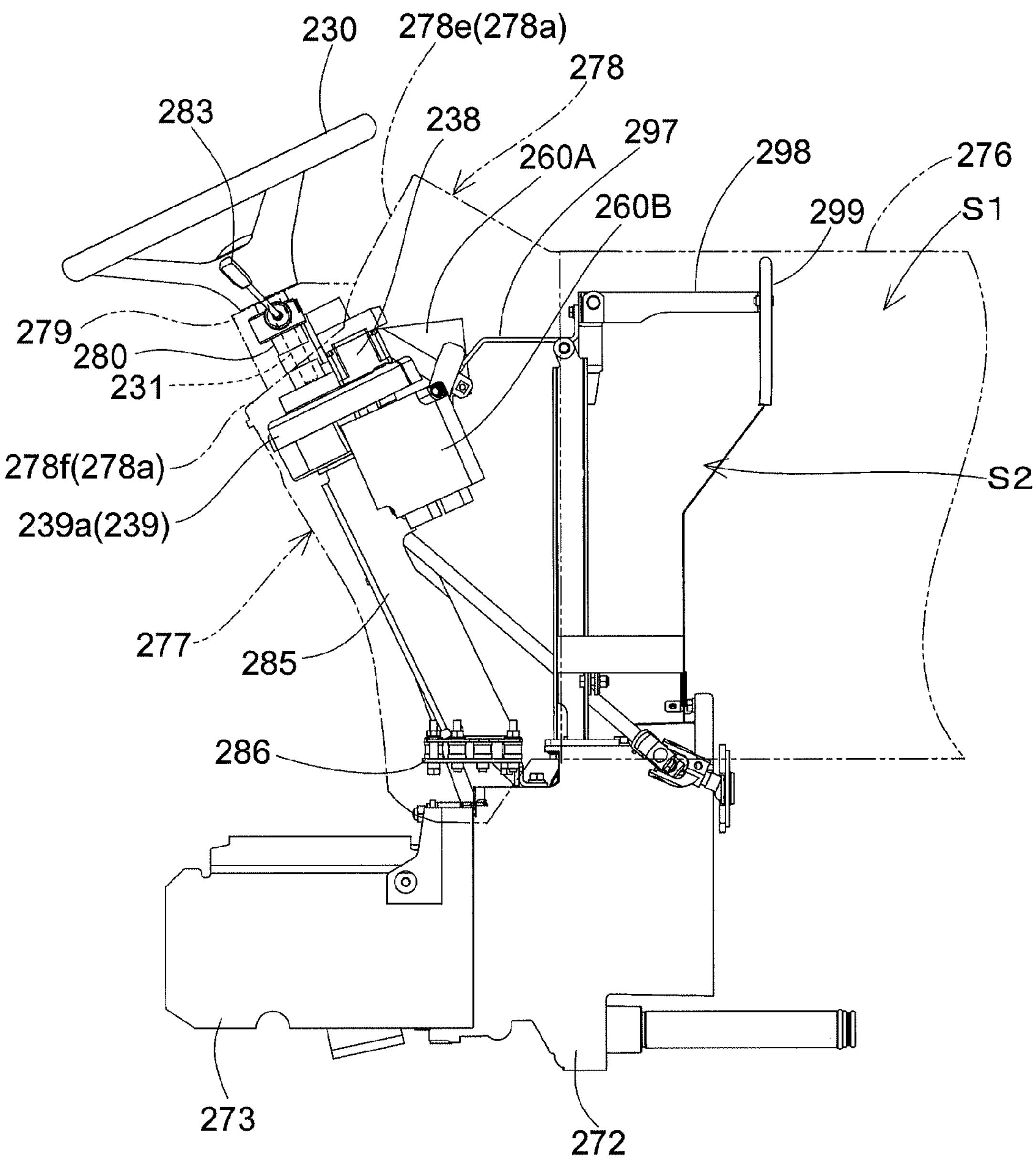
FIG. 64 is a right side view showing the main part of the internal structure of the front part of the vehicle body.
Figure 65:
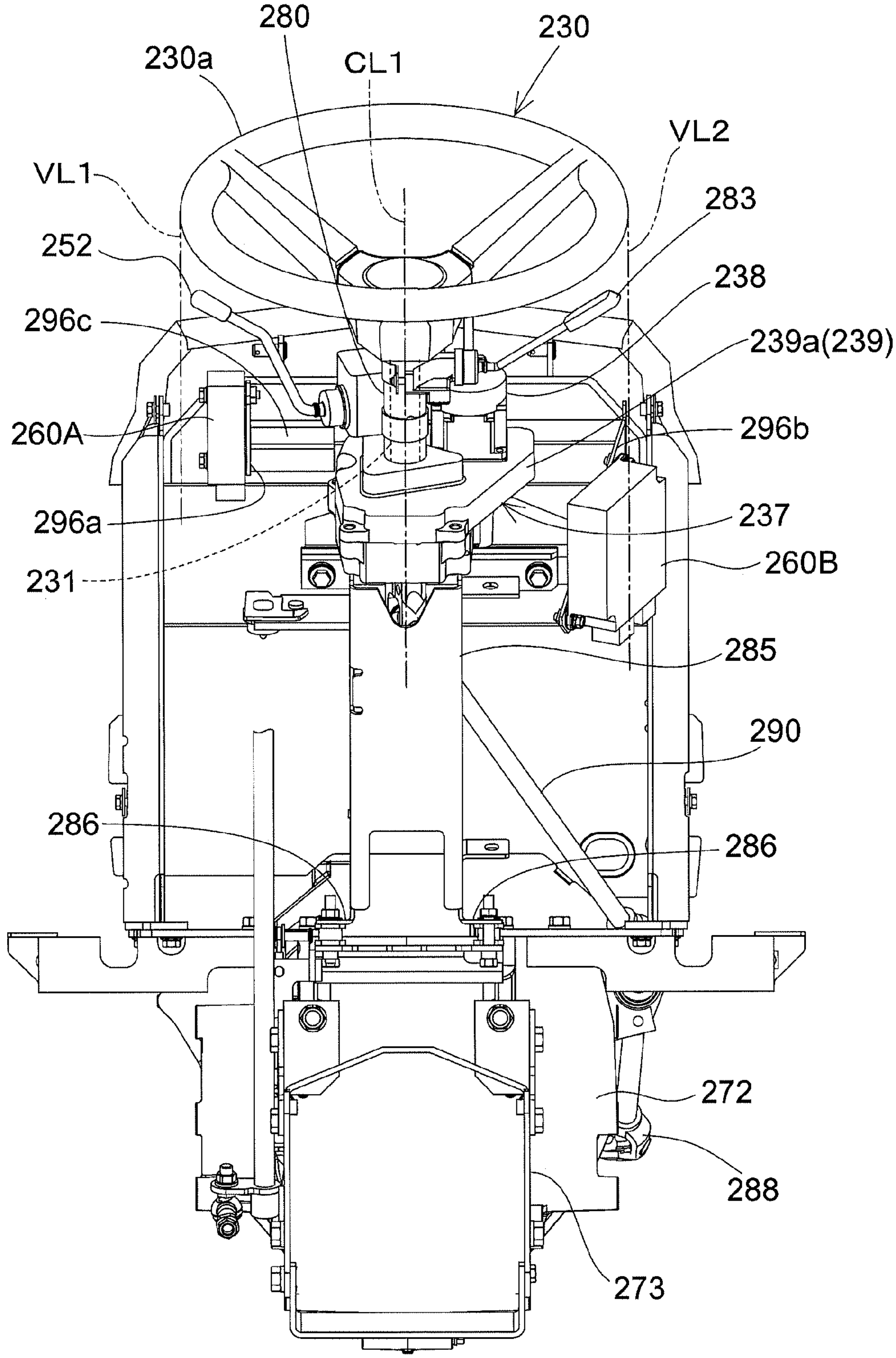
FIG. 65 is a rear view showing the main part of the internal structure of the front part of the vehicle body.
Figure 69:
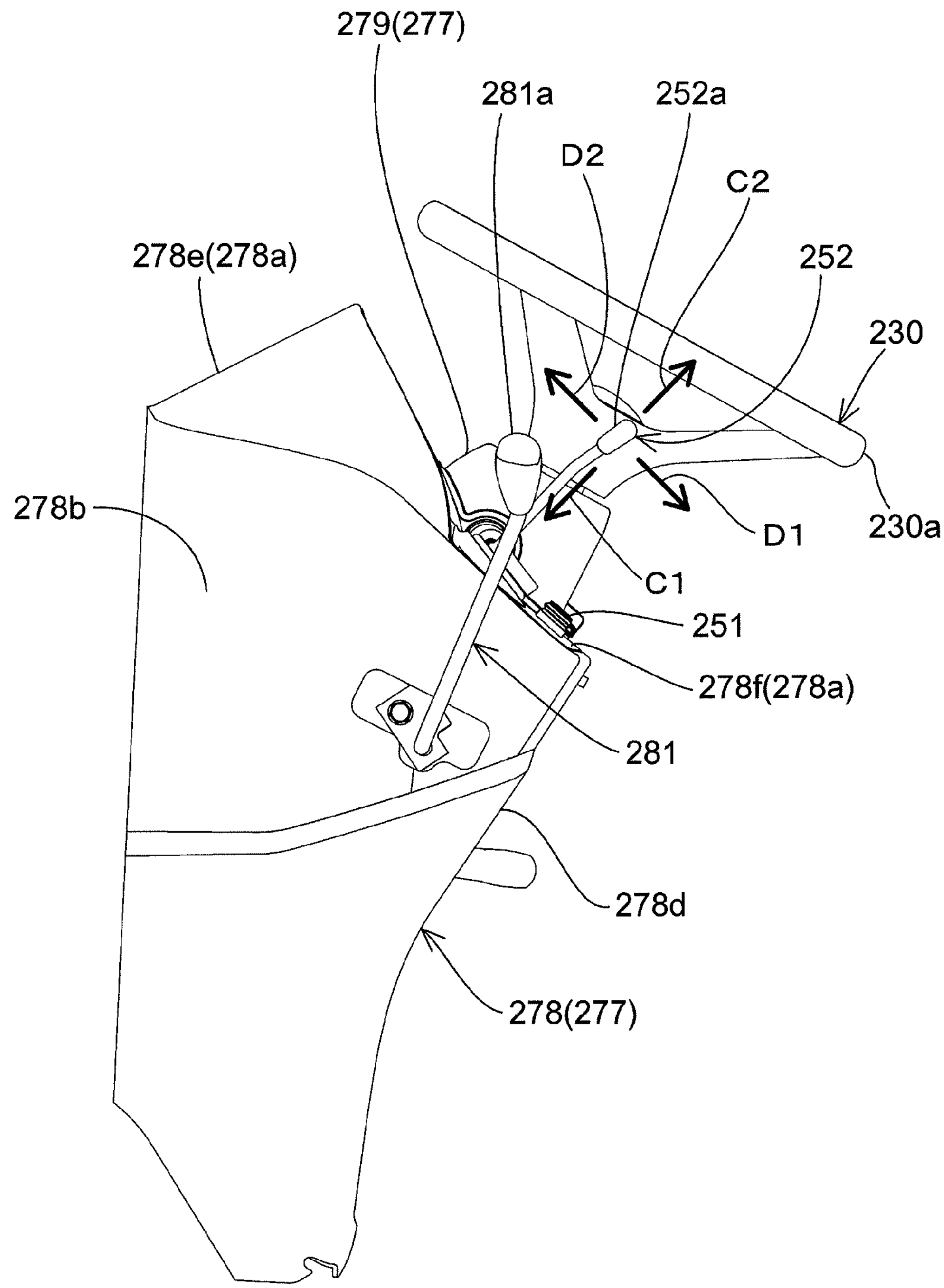
FIG. 69 is a left side view illustrating movement of a steering switching switch.

As shown in FIGS. 63 to 65, the outer periphery of the steering shaft 231 is covered with a steering post 280. The steering post 280 is cylindrical and extends in the axial direction of the steering shaft 231. As shown in FIGS. 63 and 64, the outer periphery of the steering post 280 is covered with the cover 277. The cover 277 is provided in front of the driver seat 210. As shown in FIGS. 69, 83, and 84, the cover 277 includes a panel cover 278 and a column cover 279.

As shown in FIGS. 66 to 69, 83 and 84, the panel cover 278 has an upper plate 278*a*, a left plate 278*b*, a right plate 278*c*, and a rear plate 278*d*. The front end of the left plate 278*b* of the panel cover 278 is connected to the left plate 276*b* of the hood 276. The front end of the right plate 278*c* of the panel cover 278 is connected to the right plate 276*c* of the hood 276. The rear plate 278*d* of the panel cover 278 connects the rear end of the left plate 278*b* and the rear end of the right plate 278*c*. The upper plate 278*a* of the panel cover 278 connects the upper end of the left plate 278*b*, the upper end of the right plate 278*c*, and the upper end of the rear plate 278*d*, and is connected to the upper plate 276*a* of the hood 276.

As shown in FIGS. 66 to 69, a support portion 278*e* that supports the display device 245 is provided on the upper plate 278*a* of the panel cover 278. The support portion 278*e* supports the display device 245 in front of the steering shaft 231 and below the steering wheel 230.

Figure 68:
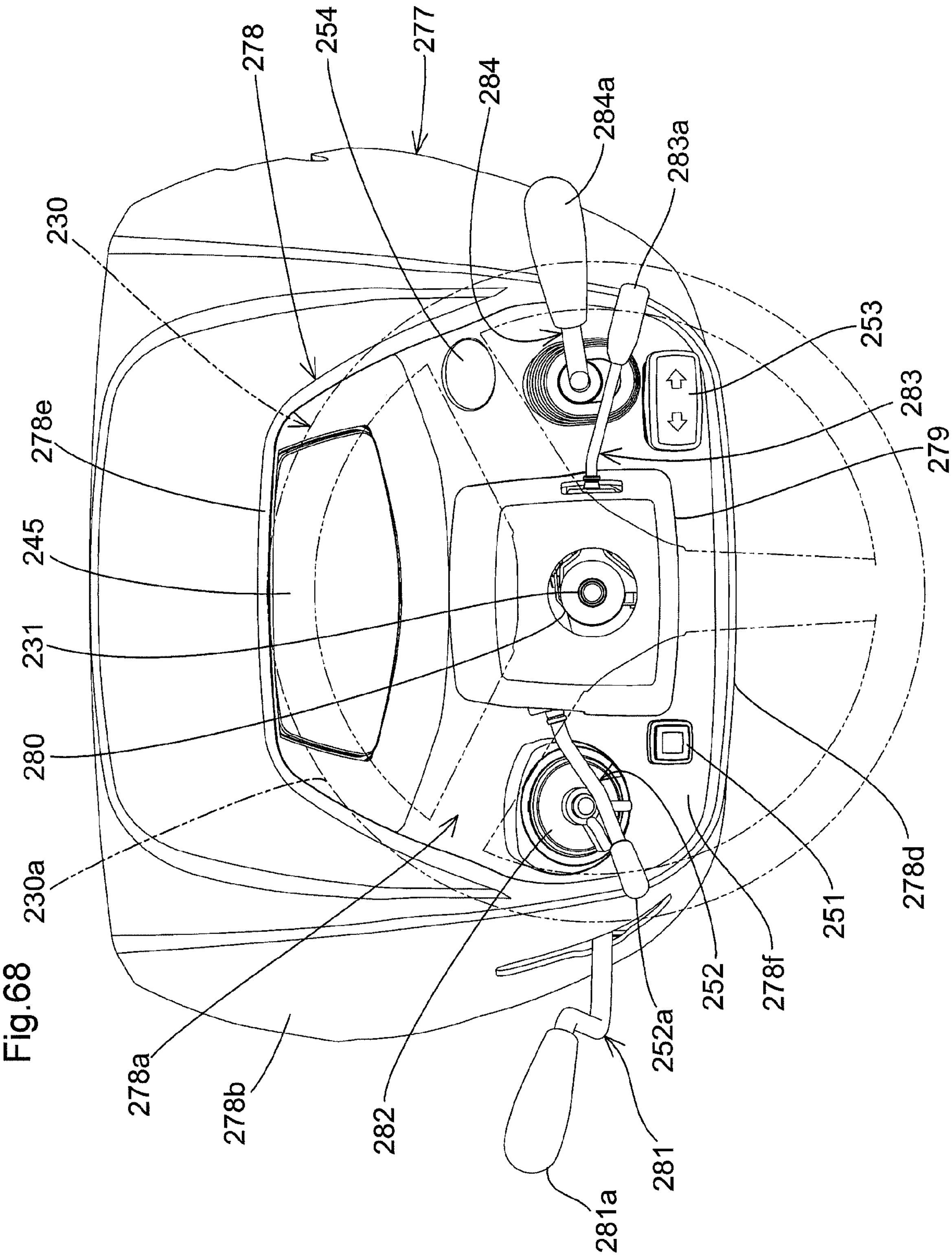
FIG. 68 shows the panel cover and the like when viewed from above in an axial direction of a steering shaft.

In the case of the present embodiment, the display device 245 is configured with a liquid crystal panel. As shown in FIG. 68, the display device 245 is disposed in the vicinity of the steering shaft 231. Specifically, the display device 245 is disposed in front of the steering shaft 231. As shown in FIG. 67, when viewed from a direction perpendicular to the display face of the display device 245 (hereinafter, referred to as "display face perpendicular direction"), the display device 245 is disposed at a position that does not overlap with a grip 230*a* of the steering wheel 230 (a position inside the grip 230*a*). Since the display face perpendicular direction substantially matches the line of sight direction of the driver sitting on the driver seat 210, there is good visibility of the display device 245.

As shown in FIGS. 66 to 69, the upper plate 278*a* of the panel cover 278 has an attachment face 278*f* to which a setting switch 251, a correction switch 253, and a screen switching switch 254 are attached. That is, the setting switch 251, the correction switch 253 and the screen switching switch 254 are provided on the panel cover 278. The attachment face 278*f* is provided to the rear of the support portion 278*e* and below the steering wheel 230. The support portion 278*e* and the attachment face 278*f* are continuously and integrally configured, and the support portion 278*e* is located in a front portion of the upper plate 278*a*, and the attachment face 278*f* is located in a rear portion of the upper plate 278*a*.

As shown in FIGS. 63, 64, 66 and 69, the attachment face 278*f* is inclined so as to move downward toward the rear. As shown in FIG. 67, the attachment face 278*f* has a first area 278*f*1, a second area 278*f*2, and a third area 278*f*3 provided in the vicinity of the steering shaft 231. The first area 278*f*1 is an area located on one side (the left side) of the steering shaft 231. The second area 278*f*2 is an area located on the other side (the right side) of the steering shaft 231. The third area 278*f*3 is an area located to the rear of the steering shaft 231. The setting switch 251, the correction switch 253 and the screen switching switch 254 are attached at any of the three areas (the first area 278*f*1, the second area 278*f*2 and the third area 278*f*3) of the attachment face 278*f*, and thus disposed in the vicinity of the steering shaft 231. The specific arrangement of the setting switch 251, the correction switch 253 and the screen switching switch 254 will be described later.

As shown in FIGS. 66 to 69, 83 and 84, a shuttle lever 281 protrudes from the left portion (the left plate 278*b*) of the panel cover 278. The shuttle lever 281 protrudes leftward from the left portion of the panel cover 278, and then extends upward. The shuttle lever 281 is a member for performing an operation of switching the traveling direction of the vehicle body 203. More specifically, when the shuttle lever 281 is operated (swung) forward, the forward/reverse switching unit 213 is switched to a state that outputs forward power to the traveling device 207, and the traveling direction of the vehicle body 203 is switched to the forward direction. When the shuttle lever 281 is operated (swung) rearward, the forward/reverse switching unit 213 is switched to a state that outputs reverse power to the traveling device 207, and the traveling direction of the vehicle body 203 is switched to the reverse direction. When the shuttle lever 281 is at the neutral position, power is not output to the traveling device 207.

Figure 66:
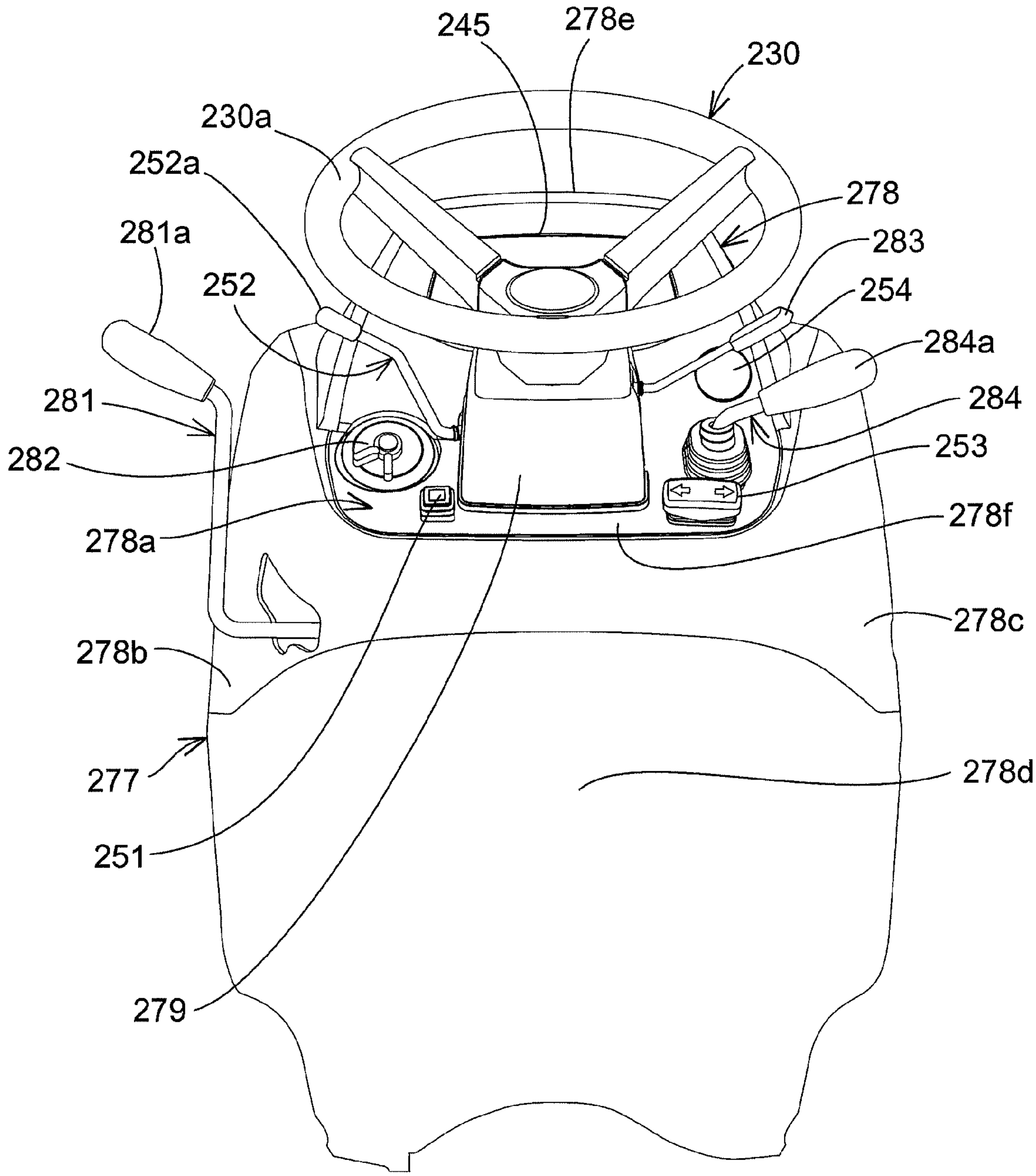

A grip portion 281*a* that is gripped by the operator is provided at the tip (upper end) of the shuttle lever 281. As shown in FIG. 66, the grip portion 281*a* is disposed to the left of the grip 230*a* of the steering wheel 230. Further, the grip portion 281*a* is disposed above the attachment face 278*f* of the panel cover 278 and at a location separated leftward from the attachment face 278*f*. Thus, unintentional touching of various switches (such as the setting switch 251) provided on the attachment face 278*f* when operating the shuttle lever 281, and unintentional touching of the shuttle lever 281 when operating various switches provided on the attachment face 278*f*, are prevented.

As shown in FIGS. 66 to 69, 83 and 84, the column cover 279 is disposed below the steering wheel 230. As shown in FIGS. 63 and 64, the column cover 279 covers the vicinity above the steering shaft 231 and the steering post 280. The column cover 279 is formed in a substantially square cylindrical shape, and protrudes upward from the attachment face 278*f* of the panel cover 278. As shown in FIG. 67, the first area 278*f*1, the second area 278*f*2, and the third area 278*f*3 of the attachment face 278*f* are respectively located on one side (the left side), the other side (the right side), and to the rear of the column cover 279. That is, the attachment face 278*f* is provided in the vicinity of the column cover 279. The setting switch 251, the correction switch 253 and the screen switching switch 254 attached to the attachment face 278*f* are disposed in the vicinity of the column cover 279.

As shown in FIGS. 63, 64 and 66 to 69, the attachment face 278*f* is connected to the lower end of the column cover 279 and is located at the same height as the lower end. Therefore, the attachment face 278*f* is separated from the grip 230*a* of the steering wheel 230 by the height of the column cover 279. Thus, the setting switch 251, the correction switch 253 and the screen switching switch 254 attached to the attachment face 278*f* are disposed at locations separated from the steering wheel 230.

Since the setting switch 251, the correction switch 253 and the screen switching switch 254 are located away from the steering wheel 230, unintentional touching of the setting switch 251, the correction switch 253 and the screen switching switch 254 when operating the steering wheel 230 is prevented. Also, unintentional touching of the steering wheel 230 when operating the setting switch 251, the correction switch 253 and the screen switching switch 254 is prevented. Therefore, it is possible to prevent unintended switching to automatic steering or the like due to a mistaken operation.

Arrangement of Switches

Next, the arrangement of the setting switch 251, the steering switching switch 252, the correction switch 253 and the screen switching switch 254 will be described.

As shown in FIGS. 66 to 68, the setting switch 251, the steering switching switch 252, the correction switch 253 and the screen switching switch 254 are disposed in the vicinity of the steering shaft 231. Below, a specific arrangement of the setting switch 251, the steering switching switch 252, the correction switch 253 and the screen switching switch 254 will be described.

As shown in FIGS. 66 to 68, the setting switch 251 is disposed on one side (the left side) of the steering shaft 231 in the vehicle body width direction. Also, the setting switch 251 is disposed to the rear of the steering shaft 231 in the front-rear direction. That is, the setting switch 251 is disposed leftward and rearward (the oblique left rear) of the steering shaft 231. In the case of the present embodiment, the setting switch 251 is configured with a push switch.

The setting switch 251, in relation to the position of the column cover 279, is disposed leftward and rearward (the oblique left rear) of the column cover 279. The setting switch 251, in relation to the position of the attachment face 278*f* of the panel cover 278, is disposed to the rear of the first area 278*f*1 of the attachment face 278*f*.

Also, the setting switch 251, in relation to the position of the display device 245, is disposed to the rear of the display device 245 (on the driver seat 210 side). Accordingly, the driver can easily and accurately operate the setting switch 251 while checking the display device 245, without changing the posture in which the driver sits on the driver seat 210.

As shown in FIG. 68, the setting switch 251 does not overlap with the grip 230*a* of the steering wheel 230 when viewed from the axial direction of the steering shaft 231. Specifically, the setting switch 251 is disposed inside the grip 230*a* of the steering wheel 230 (on the side closer to the axis of the steering shaft 231) when viewed from the axial direction of the steering shaft 231.

As shown in FIGS. 66 to 68, the steering switching switch 252 is disposed on one side (the left side) of the steering shaft 231. In the case of the present embodiment, the steering switching switch 252 is configured with a swingable lever. The steering switching switch 252 can swing around a base end portion provided on the steering shaft 231 side as a pivot. The base end portion of the steering switching switch 252 is provided inside the column cover 279. The steering switching switch 252 protrudes to one side (the left side) of the column cover 279.

A grip portion 252*a* that is gripped by the operator is provided at the tip (the left end) of the steering switching switch 252. As shown in FIGS. 66, 69 and the like, the grip portion 252*a* is disposed below the grip 230*a* of the steering wheel 230 and near the grip 230*a*. Further, as shown in FIG. 68, the grip portion 252*a* overlaps with the grip 230*a* of the steering wheel 230 when viewed from the axial direction of the steering shaft 231. Thus, in a state where the grip 230*a* of the steering wheel 230 is gripped, a finger can be extended to the grip 252*a* to operate the steering switching switch 252.

Here, the grip portion 281*a* of the shuttle lever 281 is separated downward and leftward from the grip 230*a* of the steering wheel 230, and is disposed at a position where fingers cannot reach in a state where the grip 230*a* is gripped. Therefore, it is possible to prevent the shuttle lever 281 from being operated unintentionally when operating the steering switching switch 252 in a state where the grip 230*a* is gripped. Further, it is possible to prevent the steering switching switch 252 from being operated unintentionally when operating the shuttle lever 281.

As shown in FIG. 69, the steering switching switch 252 is swingable between a first direction (a direction indicated by arrow C1 and arrow C2) that switches between starting or ending automatic operation, and a second direction (a direction indicated by arrow D1 and arrow D2) that sets a start point and an end point of a travel reference line serving as a reference of a planned travel line.

Swinging in the first direction is swinging upward or downward from the neutral position. Swinging in the second direction is swinging forward or rearward from the neutral position. When the setting mode is active, the steering switching switch 252 commands (outputs) starting of automatic steering by swinging downward (in the direction of arrow C1) from the neutral position, and commands (outputs) ending of automatic steering by swinging upward (in the direction of arrow C2) from the neutral position. Also, when the setting mode is active, the steering switching switch 252 sets the start point of the travel reference line by swinging rearward (in the direction of arrow D1) from the neutral position, and sets the end point of the travel reference line by swinging forward (in the direction of arrow D2) from the neutral position.

As shown in FIGS. 66 to 68, the correction switch 253 is disposed on the other side (the right side) of the steering shaft 231 in the vehicle body width direction. Further, the correction switch 253 is disposed to the rear of the steering shaft 231 in the front-rear direction. That is, the correction switch 253 is disposed rightward and rearward (the oblique right rear) of the steering shaft 231. In the case of the present embodiment, the correction switch 253 is configured with a push switch. The correction switch 253, in relation to the position of the column cover 279, is disposed rightward and rearward (the oblique right rear) of the column cover 279. The correction switch 253, in relation to the position of the attachment face 278*f* of the panel cover 278, is disposed to the rear of the second area 278*f*2 of the attachment face 278*f*.

Also, the correction switch 253, in relation to the position of the display device 245, is disposed to the rear of the display device 245 (on the driver seat 210 side). Accordingly, the driver can easily and accurately operate the correction switch 253 while checking the display device 245, without changing the posture in which the driver sits on the driver seat 210.

As shown in FIG. 68, the correction switch 253 does not overlap with the grip 230*a* of the steering wheel 230 when viewed from the axial direction of the steering shaft 231. Specifically, the correction switch 253 is disposed inside the grip 230*a* of the steering wheel 230 (on the side closer to the axis of the steering shaft 231) when viewed from the axial direction of the steering shaft 231.

Figure 82:
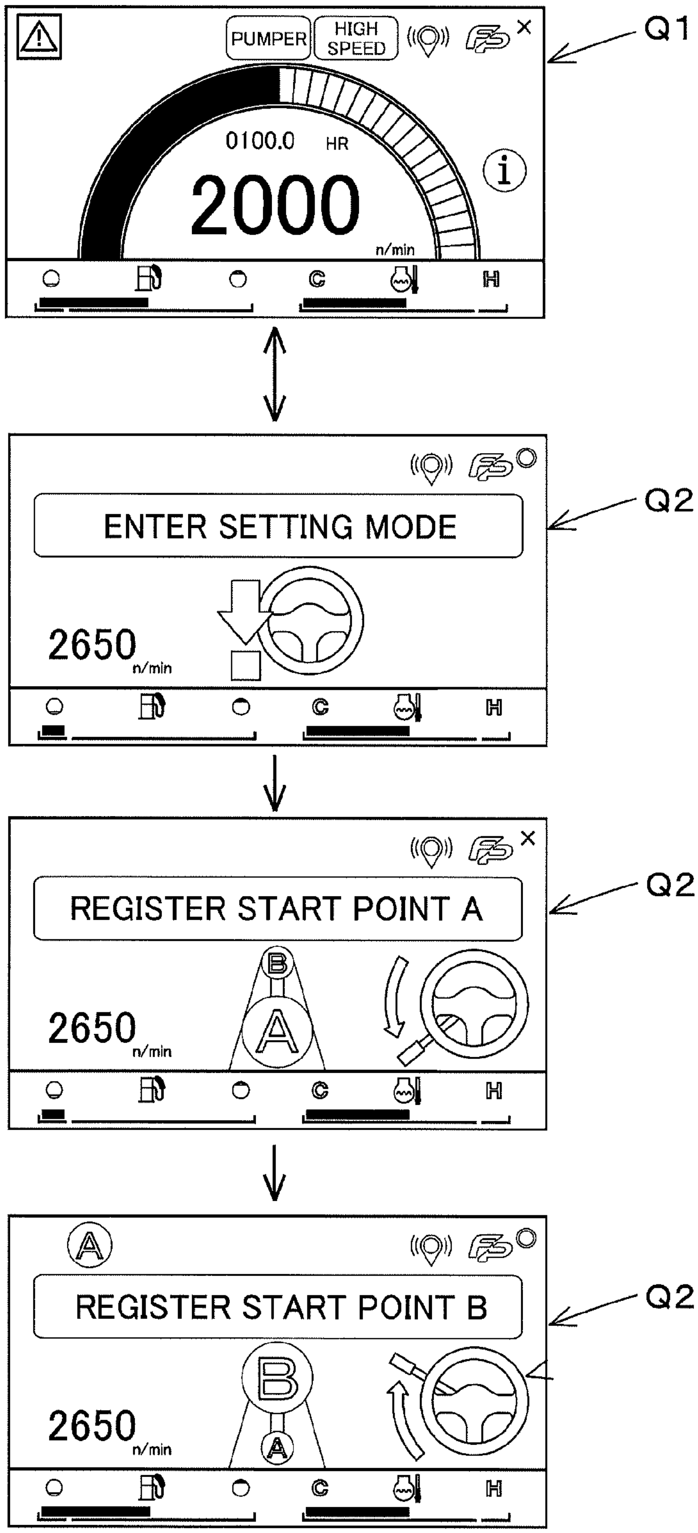
FIG. 82 shows an example of a first screen and a second screen configured to be switched by a screen switching switch.

The screen switching switch 254 is a switch for switching the display of the display device 245 between a first screen Q1 that displays a driving situation (driving information) in the setting mode, and a second screen Q2 that explains setting operation in the setting mode. FIG. 82 shows an example of the first screen Q1 and the second screen Q2 displayed on the display device 245.

As shown in FIGS. 67 and 68, the screen switching switch 254 is disposed on the other side (the right side) of the steering shaft 231 in the vehicle body width direction. The screen switching switch 254 is disposed in front of the steering shaft 231 in the front-rear direction. That is, the screen switching switch 254 is disposed rightward and forward (the oblique right front) of the steering shaft 231. In the case of the present embodiment, the screen switching switch 254 is configured with a push switch. The screen switching switch 254, in relation to the position of the column cover 279, is disposed rightward and forward (the oblique right front) of the column cover 279. The screen switching switch 254, in relation to the position of the attachment face 278*f* of the panel cover 278, is disposed to the front of the second area 278*f*2 of the attachment face 278*f*. Also, the screen switching switch 254 is located in front of the correction switch 253.

As shown in FIG. 68, the screen switching switch 254 does not overlap with the grip 230*a* of the steering wheel 230 when viewed from the axial direction of the steering shaft 231. Specifically, the screen switching switch 254 is disposed inside the grip 230*a* of the steering wheel 230 (on the side closer to the axis of the steering shaft 231) when viewed from the axial direction of the steering shaft 231.

As described above, the setting switch 251, the steering switching switch 252, the correction switch 253 and the screen switching switch 254 are collectively disposed in the vicinity of the steering shaft 231. Therefore, the driver can understand the position of each switch at a glance. In addition, the driver can operate each switch without changing their posture while sitting on the driver seat 210. Therefore, there is good operability, and mistaken operation can be prevented. Further, the harness (wiring) routed from each switch can be shortened.

As shown in FIGS. 67 and 68, a combination switch 282 is provided on the attachment face 278*f* of the panel cover 278. The combination switch 282 is a switch that operates a turn signal, a headlight and the like provided at the front of the vehicle body 203. The combination switch 282 is disposed in the vicinity of the steering shaft 231. Specifically, the combination switch 282 is disposed on one side (the left side) of the steering shaft 231. In relation to the column cover 279, the combination switch 282 is disposed on one side (the left side) of the column cover 279. Further, the combination switch 282 is disposed below the steering switching switch 252 and in front of the setting switch 251.

As shown in FIG. 68, the combination switch 282 does not overlap with the grip 230*a* of the steering wheel 230 when viewed from the axial direction of the steering shaft 231. Specifically, when viewed from the axial direction of the steering shaft 231, the combination switch 282 is disposed inside the grip 230*a* of the steering wheel 230 (on the side closer to the axis of the steering shaft 231).

Note that, regarding the arrangement of the various switches described above, the right and left positional relationships may be interchanged. That is, one side may be disposed on the left and the other side may be disposed on the right, or one side may be disposed on the right and the other side may be disposed on the left. Specifically, for example, the setting switch 251 and the steering switching switch 252 may be disposed rightward of the steering shaft 231, and the correction switch 253 may be disposed leftward of the steering shaft 231.

Raising/Lowering Lever (Pumper Lever) and Accelerator Lever

As shown in FIGS. 66 to 68, the tractor 201 includes a raising/lowering lever 283 and an accelerator lever 284.

The raising/lowering lever 283 is a lever (pumper lever) that raises/lowers the connecting portion 208. The raising/lowering lever 283 is disposed on the other side (the right side) of the steering shaft 231. The raising/lowering lever 283 can swing around a base end portion provided on the steering shaft 231 side as a pivot. The base end portion of the raising/lowering lever 283 is provided inside the panel cover 278. The raising/lowering lever 283 protrudes to the other side (the right side) of the panel cover 278 and extends upward, and its tip is located on the other side (the right side) of the column cover 279.

As shown in FIG. 68, when the raising/lowering lever 283 is in the neutral position, it is located between the correction switch 253 and the screen switching switch 254 when viewed from the axial direction of the steering shaft 231, and does not overlap with the correction switch 253 and the screen switching switch 254. As a result, unintentional operation of the correction switch 253 and the screen switching switch 254 when operating the raising/lowering lever 283 is prevented, and unintentional operation of the raising/lowering lever 283 when operating the correction switch 253 and the screen switching switch 254 is prevented.

As shown in FIGS. 67 and 68, a grip portion 283*a* that is gripped by the operator is provided at the tip (the right end) of the raising/lowering lever 283. The grip 283*a* is disposed below the grip 230*a* of the steering wheel 230 and near the grip 230*a*. As shown in FIG. 68, the grip portion 283*a* overlaps with the grip 230*a* when viewed from the axial direction of the steering shaft 231. Accordingly, in a state where the grip 230*a* of the steering wheel 230 is gripped, a finger can be extended to the grip 283*a* to operate the raising/lowering lever 283.

The raising/lowering lever 283 is disposed on the opposite side as the steering switching switch 252 sandwiching the steering shaft 231 in the vehicle body width direction. Thus, mistaken operation due to the hand of the operator touching the raising/lowering lever 283 when operating the steering switching switch 252, or due to the hand of the operator touching the steering switching switch 252 when operating the raising/lowering lever 283, can be prevented.

As shown in FIGS. 66 to 68, the accelerator lever 284 is disposed on the other side (the right side) of the steering shaft 231. The accelerator lever 284 can swing around a base end portion provided on the steering shaft 231 side as a pivot. The base end portion of the accelerator lever 284 is provided inside the panel cover 278. The accelerator lever 284 protrudes upward from the attachment face 278*f* of the panel cover 278 on the other side of the column cover 279. More specifically, the accelerator lever 284 protrudes from the attachment face 278*f* of the panel cover 278 in front of the correction switch 253 and to the rear of the screen switching switch 254. The accelerator lever 284 protrudes upward from the attachment face 278*f* and then extends rightward (in the direction away from the column cover 279).

A grip portion 284*a* that is gripped by the operator is provided at the tip (the right end) of the accelerator lever 284. The grip portion 284*a* is located below the grip 230*a* of the steering wheel 230. As shown in FIG. 68, the grip portion 284*a* overlaps with the grip 230*a* in the axial direction of the steering shaft 231. The grip portion 284*a* of the accelerator lever 284 is located in front of and below the grip portion 283*a* of the raising/lowering lever 283.

Arrangement and the Like of Automatic Steering Mechanism

Next is a description of the arrangement and the like of the automatic steering mechanism 237.

As shown in FIGS. 65 and 70 to 72, the steering motor 238 of the automatic steering mechanism 237 is disposed in the vicinity of the steering shaft 231. Specifically, the steering motor 238 is disposed below the steering wheel 230, and frontward and rightward (the oblique right front) of the steering shaft 231. The output shaft (rotation shaft) of the steering motor 238 is disposed parallel to the axial direction of the steering shaft 231 and extends downward.

Figure 70:
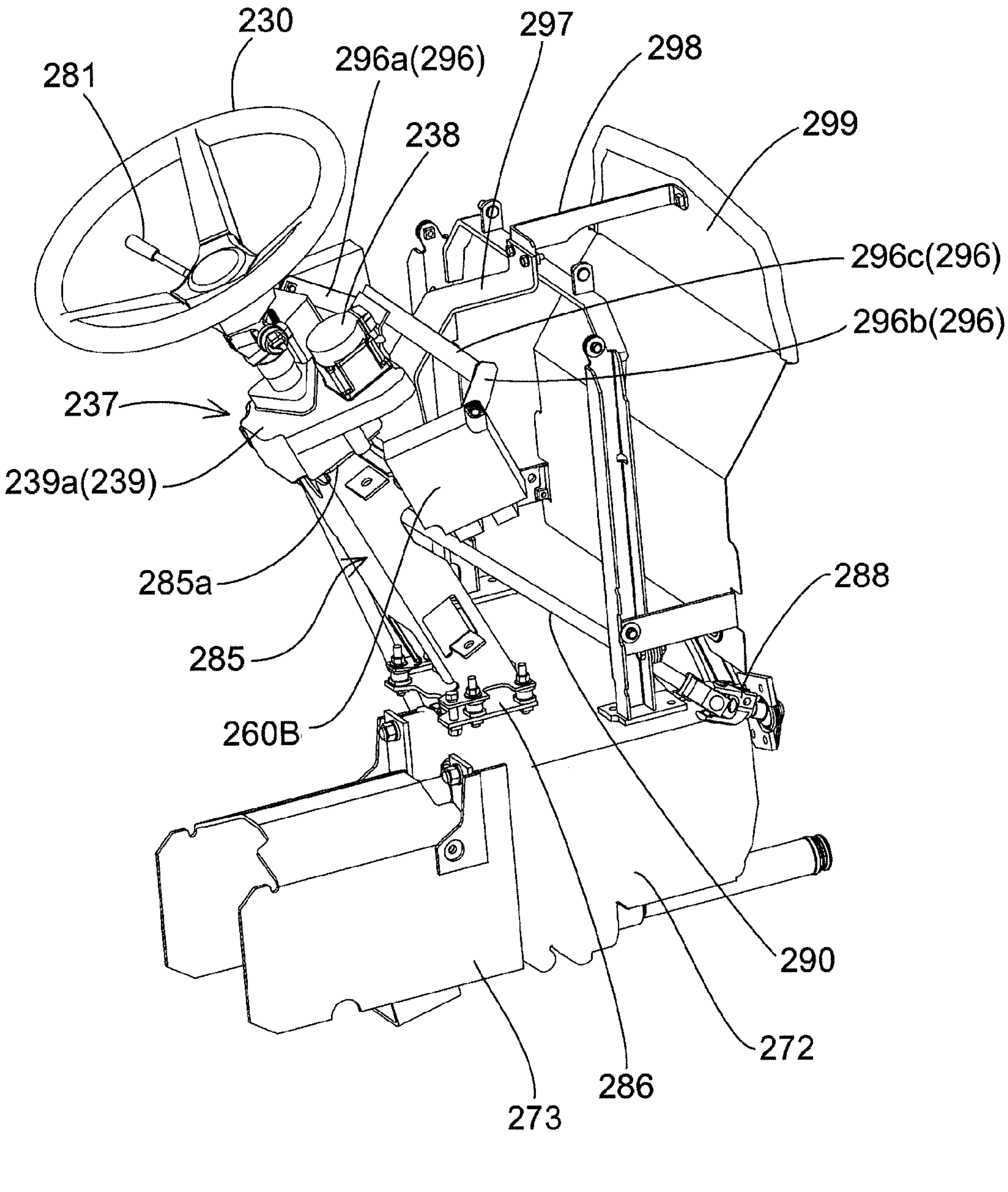
FIG. 70 is a rear perspective view showing the main part of the internal structure of the front part of the vehicle body.
Figure 72:
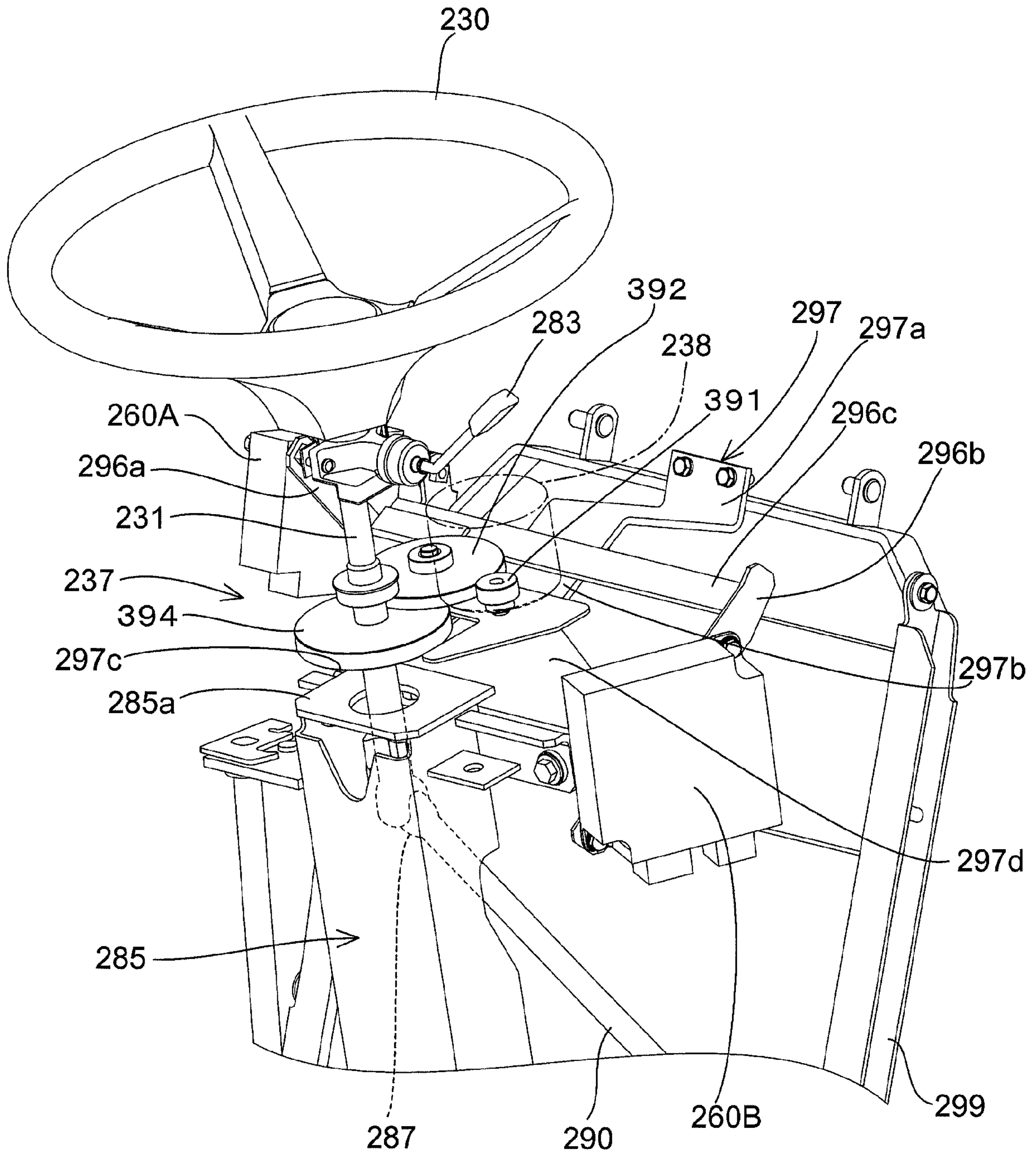

The gear mechanism 239 of the automatic steering mechanism 237 has a gear case 239*a* and a plurality of gears housed inside the gear case 239*a*. As shown in FIGS. 65 and 70, the gear case 239*a* is fixed to the upper end of a support post 285. The support post 285 is formed in a quadrangular cylindrical shape, and extends in the axial direction of the steering shaft 231. As shown in FIGS. 70 and 72, an upper plate 285*a* that supports the gear case 239*a* from below is provided at the upper end of the support post 285. Note that in FIG. 72, the gear case 239*a* is omitted to show the internal gears. As shown in FIG. 72, the lower portion of the steering shaft 231 penetrating through the upper plate 285*a* and the gear case 239*a* is inserted into the upper portion of the support post 285. As shown in FIGS. 63 to 65 and 70, the lower end of the support post 285 is fixed to the upper portion of the clutch housing 272 through an attachment stay 286 or the like.

The steering motor 238 and the gear mechanism 239 are provided integrally. Specifically, the housing of the steering motor 238 is fixed to the upper portion of the gear case 239*a* by bolts or the like.

As shown in FIG. 65, the steering motor 238 and the gear mechanism 239 are disposed near an axis CL1 of the steering shaft 231. Specifically, the steering motor 238 and the gear mechanism 239 are disposed at a location closer to the axis CL1 of the steering shaft 231 than the outer edge of the grip 230*a* of the steering wheel 230 in the vehicle body width direction. In other words, the steering motor 238 and the gear mechanism 239 are disposed, in the vehicle body width direction, between an imaginary line VL1 extending downward from one outer side end of the grip 230*a* in the vehicle body width direction, and an imaginary line V2 extending downward from the other outer side end of the grip 230*a* in the vehicle body width direction.

Figure 73:
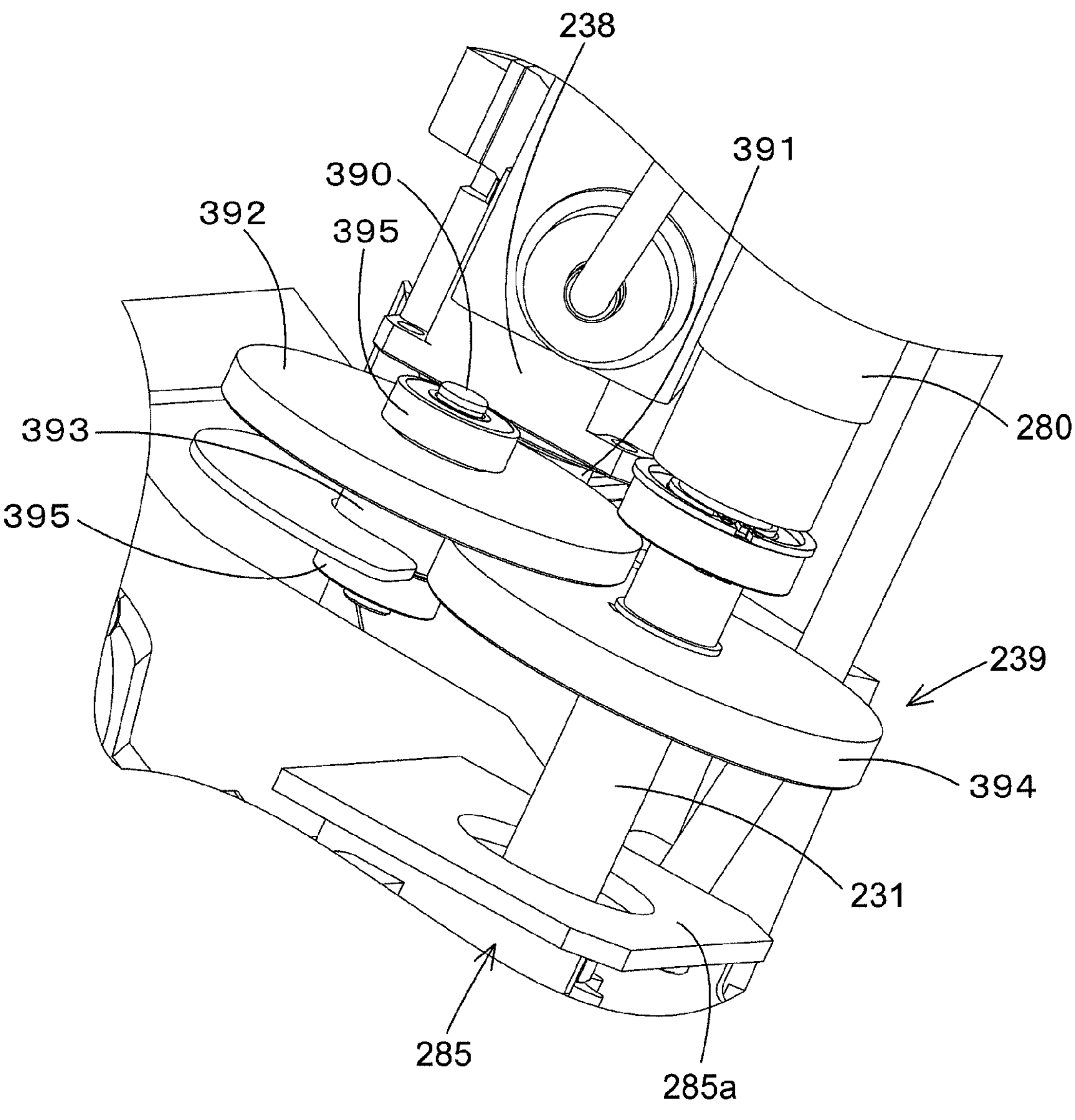
FIG. 73 shows the gear mechanism when viewed from the left.

As shown in FIGS. 72 and 73, the gear mechanism 239 includes a first gear 391, a second gear 392, a third gear 393, and a fourth gear 394. The first gear 391 is mounted on an output shaft (rotation shaft) of the steering motor 238. The second gear 392 is disposed in front of the steering shaft 231 and meshes with the first gear 391. The third gear 393 is disposed below the second gear 392, and is connected to the second gear 392 by a connection shaft 390. The connection shaft 390 is rotatably supported by a bearing 395 held within the gear case 239*a*. The second gear 392 and the third gear 393 rotate integrally together with the connection shaft 390. The fourth gear 394 is meshed with the third gear 393. The fourth gear 394 is attached to the steering shaft 231 and rotates together with the steering shaft 231.

When the output shaft rotates by driving of the steering motor 238, the power of the rotation is transmitted from the first gear 391 to the second gear 392, and the connection shaft 390 rotates. When the connection shaft 390 rotates, the third gear 393 rotates, and the power of the rotation is transmitted to the steering shaft 231 through the fourth gear 394, and the steering shaft 231 rotates. Thus, the steering shaft 231 is rotated by the driving of the steering motor 238.

Arrangement and the Like of Power Steering Device

Next is a description of the arrangement and the like of the power steering device 232.

As shown in FIGS. 62 and 72, the steering shaft 231 is connected to the control valve 234 of the power steering device 232 through a linkage mechanism (first to third universal joints 287, 288 and 289, and first to third arms 290, 291 and 292). Specifically, a lower portion of the steering shaft 231 is connected to one end of the first arm 290 through the first universal joint 287. The other end of the first arm 290 is connected to one end of the second arm 291 through the second universal joint 288. The other end of the second arm 291 is connected to one end of the third arm 292 through the third universal joint 289. The other end of the third arm 292 is connected to a power steering unit 293 including the control valve 234. Note that although the configuration of the power steering device 232 shown in FIG. 62 is partially different from the configuration shown in FIG. 56, either configuration may be adopted, or another configuration may be adopted.

The power steering unit 293 shown in FIG. 62 includes the control valve 234 and a steering cylinder (a power cylinder) 235. The power steering unit 293 (the control valve 234 and the steering cylinder 235) is supported by the front axle frame 270. The power steering unit 293 is located between the first frame 270A and the second frame 270B of the front axle frame 270. The power steering unit 293 is connected to the hydraulic pump 233 through a hydraulic hose (not shown). The hydraulic pump 233 is disposed to the rear of the power steering unit 293 and above the second frame 270B of the front axle frame 270. The hydraulic pump 233 is driven by the power of the motor 204.

The steering cylinder 235 is connected to one end (the inner end) of left side and right side tie rods 295 through a pitman arm 294. The other end (the outer end) of the tie rods 295 is connected to the right and left front wheels 207F. When the steering wheel 230 is manually rotated (steered), the rotation is transmitted from the steering shaft 231 through the linkage mechanism (the first to third universal joints 287, 288 and 289, and the first to third arms 290, 291 and 292) to the power steering unit 293, and the control valve 234 operates (the spool moves). Thus, the hydraulic oil discharged from the hydraulic pump 233 is sent to the steering cylinder 235, and the steering cylinder 235 is driven. The driving force of the steering cylinder 235 is transmitted to the tie rods 295 through the pitman arm 294, and the pointing direction of the left side and right side front wheels 207F is changed by the movement of the tie rods 295.

As shown in FIG. 83, the power steering unit 293 (the control valve 234 and the steering cylinder 235) and the hydraulic pump 233 that form the power steering device 232 are disposed outside the panel cover 278 (in front of the panel cover 278). On the other hand, as shown in FIGS. 63 and 64 and the like, the automatic steering mechanism 237 (the steering motor 238 and the gear mechanism 239) is disposed inside the panel cover 278. Thus, the automatic steering mechanism 237 (the steering motor 238 and the gear mechanism 239) and the power steering device 232 are disposed at positions separated from each other.

When the automatic steering mechanism 237 and the power steering device 232 (for example, the control valve 234) are disposed at near positions, a large space is required for disposing them, but by disposing the automatic steering mechanism 237 and the power steering device 232 at positions separated from each other, the respective spaces for disposing them can be small, so a large space for disposing them is not required.

Arrangement and the Like of First and Second Control Devices

Figure 71:
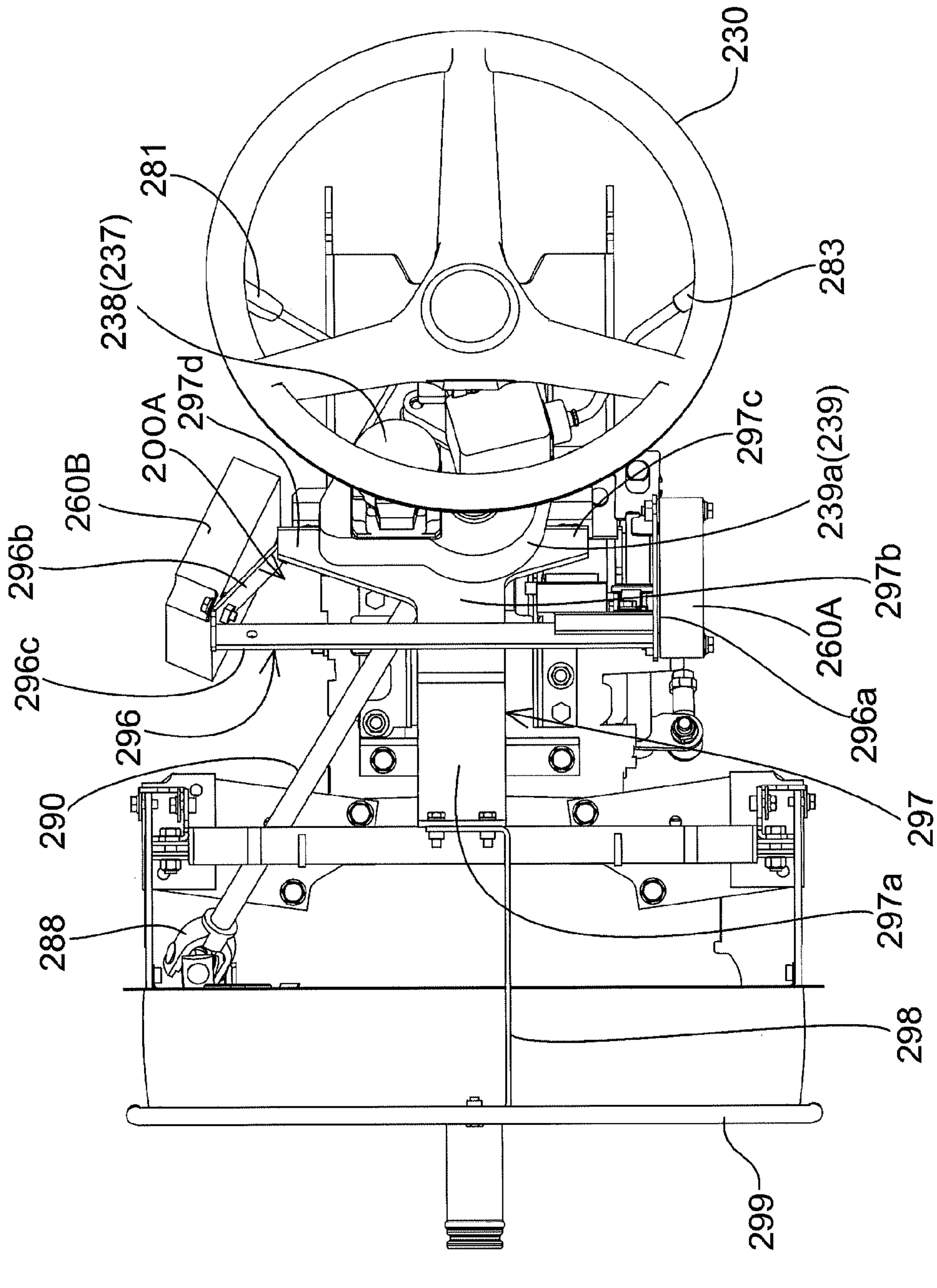
FIG. 71 is a plan view showing an enlarged view of part (the front) of FIG. 62.

As shown in FIGS. 63 and 64, the first control device 260A and the second control device 260B are disposed inside the panel cover 278. As shown in FIGS. 65 and 71, the first control device 260A is disposed on one side (the left side) of the steering shaft 231. The second control device 260B is disposed on the other side (the right side) of the steering shaft 231. The first control device 260A and the second control device 260B are connected by a harness (not shown) capable of transmitting an electric signal.

As described above, the first control device 260A and the second control device 260B are configured separately, and are disposed separately on one side (the left side) and the other side (the right side) of the steering shaft 231. Accordingly, the first control device 260A and the second control device 260B can be reduced in size compared to a case where they are configured as an integrated control device, and so they can be disposed at positions near the steering shaft 231. Therefore, the first control device 260A and the second control device 260B can be securely housed within the panel cover 278. Further, since the first control device 260A and the second control device 260B are disposed away from each other, it is possible to prevent the heat generated from one control device from adversely affecting the other control device.

The first control device 260A and the second control device 260B have a housing and a circuit board disposed in the housing. The circuit board is configured with various electric and electronic components such as semiconductors, and can perform the above-described control and the like. The housing has a rectangular parallelepiped shape and is disposed vertically. Specifically, the housing of the first control device 260A has three-direction sides (longitudinal side, lateral side and altitudinal side); and of these sides, the shortest side of the faces the vehicle body width direction, and the longest side faces the vertical direction. In the housing of the second control device 260B, the shortest side of the three sides is substantially in the vehicle body width direction, and the longest side is substantially in the front-rear direction. Thus, in the first control device 260A and the second control device 260B, the shortest side is oriented in the vehicle body width direction or substantially in the vehicle body width direction. Accordingly, the area occupied by the first control device 260A and the second control device 260B in the vehicle body width direction is reduced, so the first control device 260A and the second control device 260B can be reliably housed within the panel cover 278. Further, since the size of the panel cover 278 can be reduced, it is possible to sufficiently secure the foot space and the front field of view of the driver sitting on the driver seat 210. Further, since the first control device 260A and the second control device 260B can be disposed close to each other, the harness that connects the first control device 260A and the second control device 260B can be shortened, and the influence of noise is reduced.

As shown in FIG. 65, the first control device 260A is disposed at a location closer to the axis CL1 of the steering shaft 231 than the outer edge of the grip 230*a* of the steering wheel 230 in the vehicle body width direction. In other words, the first control device 260A is disposed at a location closer to the axis CL1 than the imaginary line VL1 extending downward from one outer side end in the vehicle body width direction of the grip 230*a* of the steering wheel 230. The second control device 260B overlaps with the imaginary line VL2 extending downward from the other outer side end in the vehicle body width direction of the grip 230*a* of the steering wheel 230.

The second control device 260B is disposed below the first control device 260A. Further, the second control device 260B is disposed below the steering motor 238. That is, the second control device 260B is disposed at a location shifted downward with respect to the first control device 260A and the steering motor 238. Thus, it is possible to prevent the second control device 260B from being adversely affected by heat generated from the first control device 260A and the steering motor 238.

As shown in FIG. 65, the second control device 260B and the steering motor 238 are disposed on the right side with respect to the axis CL1 of the steering shaft 231. As described above, since the second control device 260B and the steering motor 238 are disposed in the same direction (rightward) in the vehicle body width direction, the second control device 260B is located near the steering motor 238. Therefore, the harness that electrically connects the second control device 260B and the steering motor 238 can be shortened, and the influence of noise is reduced.

As shown in FIGS. 62 and 65, and 70 to 72, the first control device 260A and the second control device 260B are held by a holding member 296. The holding member 296 has a first holding portion 296*a*, a second holding portion 296*b*, and a connecting portion 296*c*. The first holding portion 296*a* is disposed on one side (the left side) of the steering shaft 231. The first control device 260A is fixed and held by the first holding portion 296*a* with a fixture such as a bolt. The second holding portion 296*b* is disposed on the other side (the right side) of the steering shaft 231. The second control device 260B is fixed and held by the second holding portion 296*b* with a fixing tool such as a bolt. The connecting portion 296*c* extends in the vehicle body width direction from one side (the left side) to the other side (the right side) of the steering shaft 231. The connecting portion 296*c* connects the first holding portion 296*a* and the second holding portion 296*b*.

That is, as shown in FIG. 71, the holding member 296 (the first holding portion 296*a*) supports the first control device 260A on one side (the left side) of the steering shaft 231 and the gear case 239*a* in a plan view. The holding member 296 (the second holding portion 296*b*) supports the second control device 260B on one side (the left side) of the steering shaft 231 and the gear case 239*a* in a plan view. The holding member 296 (the second holding portion 296*b*) supports the second control device 260B so that the second control device 260B shifts to one side (the left side) when moving from the front end to the rear end. Accordingly, the space 200A between the connector side (the front side) of the gear case 239*a* and the second control device 260B can be widened, so that wiring and the like can be easily performed.

As shown in FIG. 65, when the first control device 260A and the second control device 260B are viewed with reference to the gear case 239*a*, the holding member 296 supports the first control device 260A above the gear case 239*a*, and supports the second control device 260B below the gear case 239*a*.

A middle portion in the vehicle body width direction of the connecting portion 296*c* of the holding member 296 is fixed to the connecting member 297 by welding or the like. The connecting member 297 extends in the front-rear direction. As shown in FIG. 70, the connecting member 297 extends forward and rearward respectively from the connecting portion 296*c*. The rear end portion of the connecting member 297 is fixed to the upper portion of the support post 285. The front end of the connecting member 297 is connected to the rear end portion of a stay 298 extending in the front-rear direction.

More specifically, as shown in FIGS. 71 and 72, the connecting member 297 is configured with a plate member, and includes a front plate 297*a* to which a connecting portion 296*c* is attached, and extending forward from the connecting portion 296*c*, a rear plate 297*b* to which the connecting portion 296*c* is attached, and extending rearward (to the steering shaft 231 side) from the connecting portion 296*c*, one plate 297*c* extending from the rear plate 297*b* to the first control device 260A side, and another plate 297*d* extending from the rear plate 297*b* to the second control device 260B side. The one plate 297*c* and the other plate 297*d* are integrally formed, and are inclined downward toward the steering shaft 231. The rear ends of the one plate 297*c* and the other plate 297*d* are attached to the support post 285.

The front end of the stay 298 is fixed to the upper portion of a partition plate 299. As shown in FIGS. 63 and 64, the partition plate 299 is disposed inside the hood 276, and partitions the space inside the hood 276 into a first space 51 toward the front and a second space S2 toward the rear. The motor 204 is disposed in the first space S1. A fuel tank (not shown) is disposed in the second space S2. The lower portion of the partition plate 299 is fixed to the upper portion of the clutch housing 272.

Arrangement and the Like of Receiving Device

Next, the arrangement and the like of the receiving device 241 included in the position detection device 240 will be described.

The receiving device 241 receives a signal of a positioning satellite, and detects the position of the vehicle body 203 based on the received signal. That is, the receiving device 241 is a device that detects the position information of the vehicle body 203 by a satellite positioning system (GNSS: Global Navigation Satellite System). As the satellite positioning system, for example, a GPS (Global Positioning System) is used. For example, the receiving device 241 receives a signal transmitted from a positioning satellite and a signal transmitted from a base station installed on the ground, and calculates the position and the like of the vehicle body 203 based on the received signal. Specifically, the base station transmits correction information including position information (a reference position) of the base station, information (a distance between satellite receivers or the like) obtained by a signal from a positioning satellite and the like to the receiving device 241 by wireless communication or the like. The receiving device 241 corrects the information received from the positioning satellite based on the correction information acquired from the base station, and thus acquires more accurate position information. However, another method such as an RTK method may be used as the method of detecting the vehicle body position with the receiving device 241.

As shown in FIGS. 83 and 84, the receiving device 241 is attached to the ROPS 261.

Before describing the attachment position of the receiving device 241, a specific configuration of the ROPS 261 will be described.

The ROPS 261 is provided to the rear of the driver seat 210. The ROPS 261 has a first vertical column 261*a*, a second vertical column 261*b* and a lateral bridge 261*c*. The first vertical column 261*a*, the second vertical column 261*b* and the lateral bridge 261*c* are integrally formed by bending a square pipe. The first vertical column 261*a* extends vertically to the left and rear of the driver seat 210. The second vertical column 261*b* extends vertically to the right and rear of the driver seat 210. The lateral bridge 261*c* extends in the vehicle body width direction, and connects the upper end of the first vertical column 261*a* and the upper end of the second vertical column 261*b* above and to the rear of the driver seat 210. As a result, the ROPS 261 as a whole is formed in a substantially gate-like shape when viewed from the front. The ROPS 261 can swing rearward using pivot shafts 302 provided at the lower end of the first vertical column 261*a* and the lower end of the second vertical column 261*b* as a pivot.

The receiving device 241 is attached to the lateral bridge 261*c* of the ROPS 261. The receiving device 241 is fixed to a bracket 303, and the bracket 303 is attached to the lateral bridge 261*c*. The bracket 303 is attached to a center portion in the vehicle body width direction of the lateral bridge 261*c*, and extends rearward from the center portion. Thus, the receiving device 241 is located to the rear of the center portion in the vehicle body width direction of the lateral bridge 261*c*. Thus, the receiving device 241 is disposed at a location offset (shifted) rearward from the ROPS 261. Also, the receiving device 241 is located above and to the rear of the driver seat 210.

However, the attachment location of the receiving device 241 is not limited to the location shown in FIGS. 83 and 84. For example, the receiving device 241 may be disposed at a location offset forward or sideways from the ROPS 261. Also, the receiving device 241 may be attached to the first vertical column 261*a* or the second vertical column 261*b* of the ROPS 261, or may be attached at a location in the tractor 201 other than the ROPS 261. Further, a configuration may be adopted in which a canopy is used instead of the ROPS 261, and the receiving device 241 is attached to the canopy.

Arrangement and the Like of Inertial Measurement Device

Next, the arrangement and the like of the inertial measurement device 242 included in the position detection device 240 will be described.

The inertial measurement device 242 is a device that measures the inertia of the vehicle body 203. Specifically, the inertial measurement device 242 can measure inertia (inertia information) of the vehicle body 203 such as a yaw angle, a pitch angle, and a roll angle.

As shown in FIGS. 74, 75, 83 and 84, the inertial measurement device 242 is disposed below the driver seat 210 and on a center line CL2 in the vehicle body width direction. In addition, the inertial measurement device 242 is disposed at a location overlapping with the rear wheels 207R in a side view.

Also, the inertial measurement device 242 is disposed above the transmission case 274. In other words, the inertial measurement device 242 is disposed at a location overlapping with the transmission case 274 in a plan view. Since the inertial measurement device 242 is located at a location overlapping with the transmission case 274, the position of the inertial measurement device 242 is close to the position of the center of gravity of the vehicle body 203. Therefore, the inertial measurement device 242 can easily measure a representative value of a change in the posture of the vehicle body 203 (a value that can represent the change in the posture of the vehicle body 203), and can track the change in the posture of the vehicle body 203, thus quickly and accurately obtaining the position of the vehicle body 203. In other words, since the inertial measurement device 242 is disposed at a location where the front-rear, right-left, and vertical weight balance is good in the vehicle body 203, the measurement accuracy of the position of the vehicle body 203 can be improved.

Figure 75:
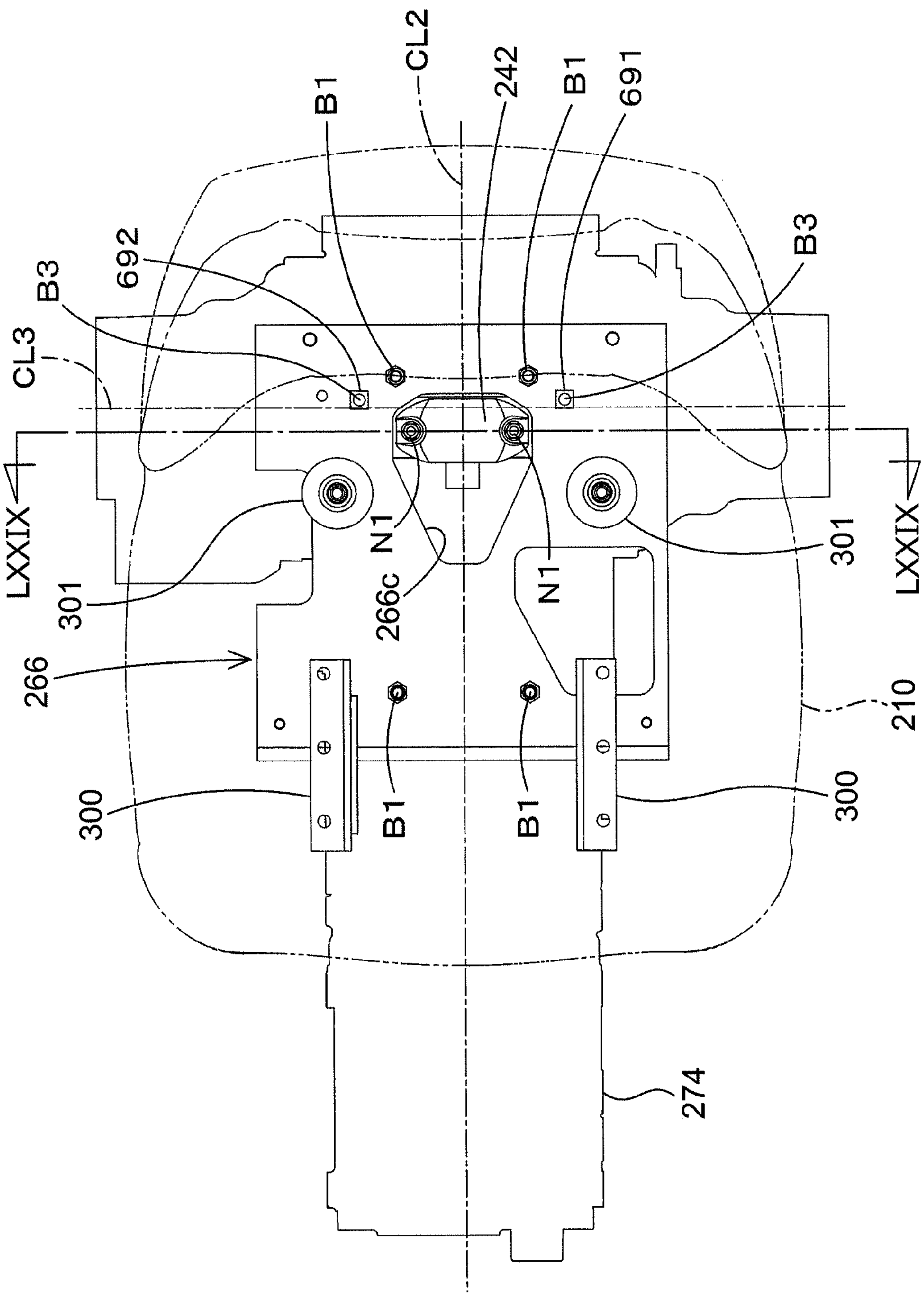
FIG. 75 is a plan view showing an attachment structure of an inertial measurement device.

Further, as shown in FIG. 75, the inertial measurement device 242 is disposed on an axis CL3 of the rear axle in a plan view. When a working device (an implement) is mounted on the connecting portion 208, the position of the center of gravity of the vehicle body 203 and the working device is closer to the axis CL3 of the rear axle than the center in the front-rear direction of the vehicle body 203. Therefore, since the inertial measurement device 242 is disposed on the axis CL3 of the rear axle, even when a working device (an implement) is mounted on the connecting portion 208, the inertial measurement device 242 is close to the center of gravity of the vehicle body 203, and as a result the position of the vehicle body 203 can be quickly and accurately obtained.

Below, the support structure (attachment structure) of the inertial measurement device 242 will be described mainly with reference to FIGS. 74 to 80.

The inertial measurement device 242 is supported by the vehicle body 203 (the transmission case 274) by the support member 265 through an anti-vibration member 264. The anti-vibration member 264 is a member that suppresses vibration of the inertial measurement device 242, and is an elastically deformable member such as rubber or a spring, for example.

The support member 265 supports the inertial measurement device 242 on the vehicle body 203 through the anti-vibration member 264. More specifically, the support member 265 supports the inertial measurement device 242 in a housing that covers a drive unit that drives the vehicle body 203 through the anti-vibration member 264. The drive unit is the motor 204 or a device that transmits the power of the motor 204. In the case of the present embodiment, the driving unit is the transmission 205 and the housing is the transmission case 274. However, the housing where the support member 265 is supported is not limited to the transmission case 274, and the drive unit covered by the housing is not limited to the transmission 205. For example, the housing may be the clutch housing 272 and the driving unit may be a clutch. Below, a description will be given assuming that the drive unit is the transmission 205 and the housing is the transmission case 274.

The support member 265 is attached to the support plate 266. The support plate 266 is attached to the transmission case (the housing) 274. That is, the support member 265 is indirectly attached to the transmission case 274 through the support plate 266. However, the support member 265 may be directly attached to the transmission case (the housing) 274 (not through the support plate 266).

The support plate 266 is disposed below the driver seat 210 and supports the driver seat 210 from below. On the upper face of the support plate 266, a support bracket 300 and a cushion material 301 are attached. The support bracket 300 is fixed to the front left portion and the front right portion of the support plate 266 by welding or the like, respectively, and extends forward from the support plate 266. In the case of the present embodiment, the support bracket 300 is configured with an angle member having an L-shaped cross section. The cushion material 301 is made of an elastic material such as rubber. In the case of the present embodiment, the cushion material 301 is cylindrical. The cushion material 301 is fixed to the left rear portion and the right rear portion of the support plate 266 by bolts or the like, respectively. The driver seat 210 is supported above the support plate 266 by being mounted above the support bracket 300 and the cushion material 301.

Figure 74:
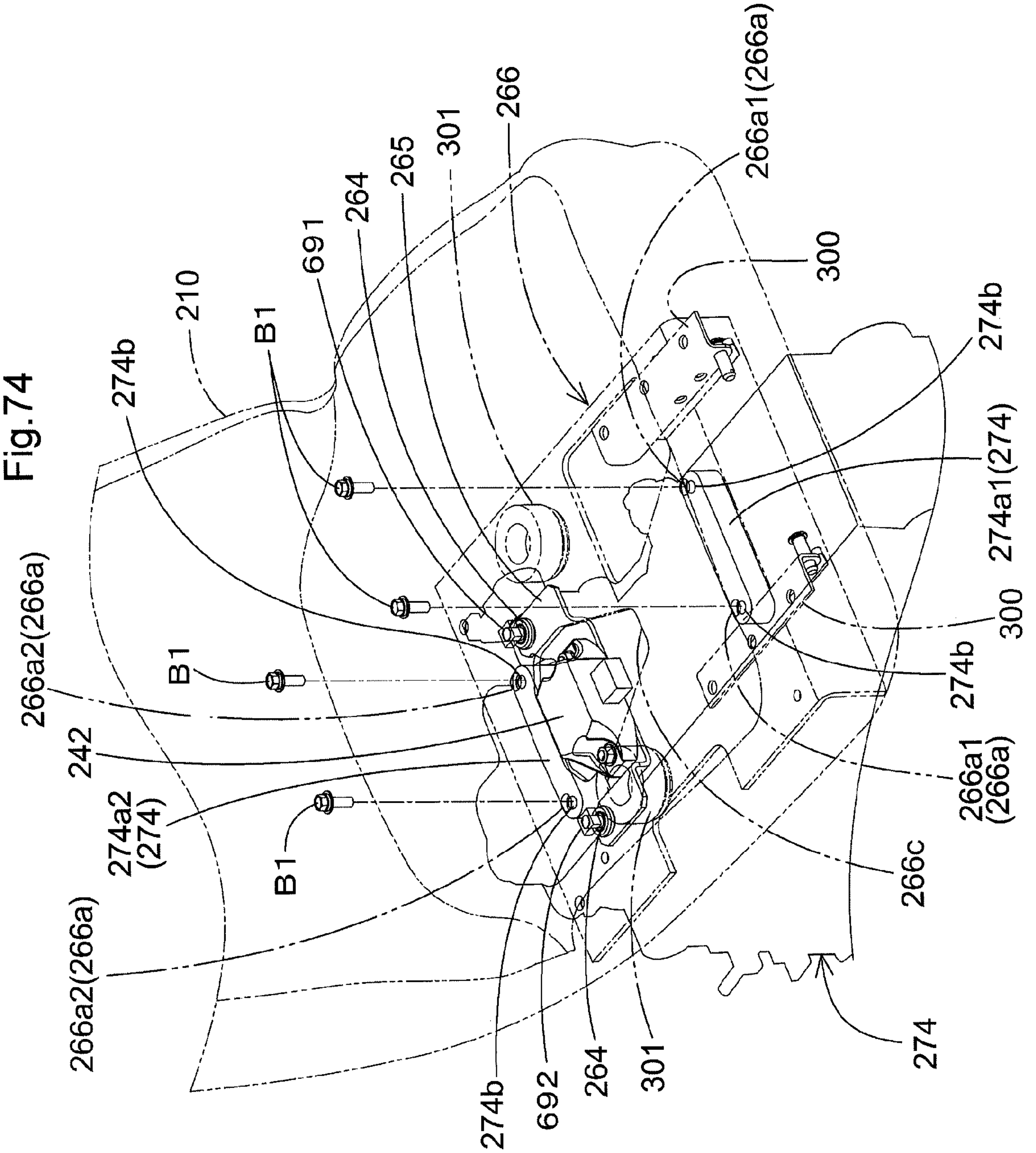
FIG. 74 is a perspective view showing an attachment structure of an inertial measurement device.
Figure 77:
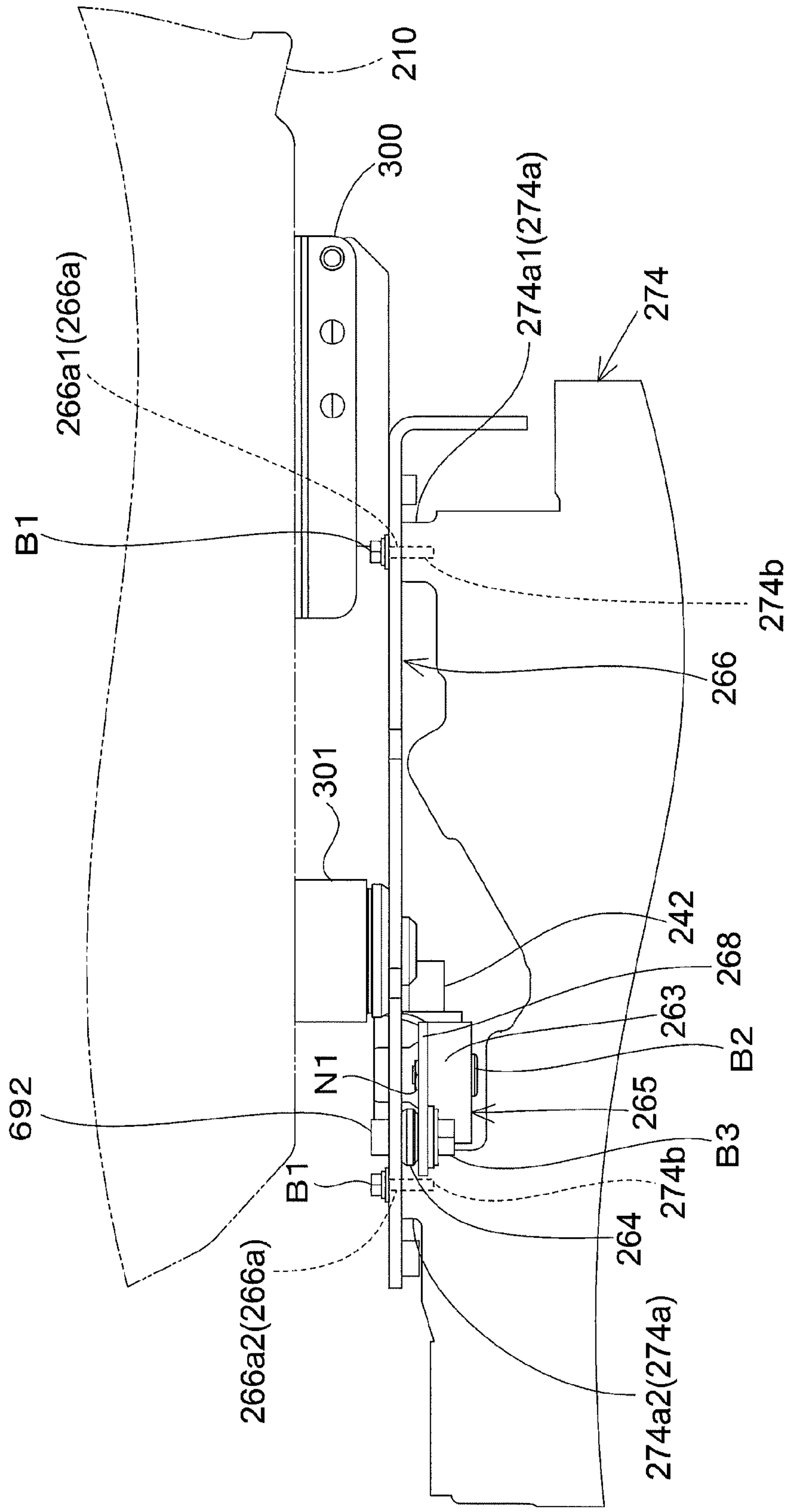
FIG. 77 is a right side view showing an attachment structure of the inertial measurement device.
Figure 78:
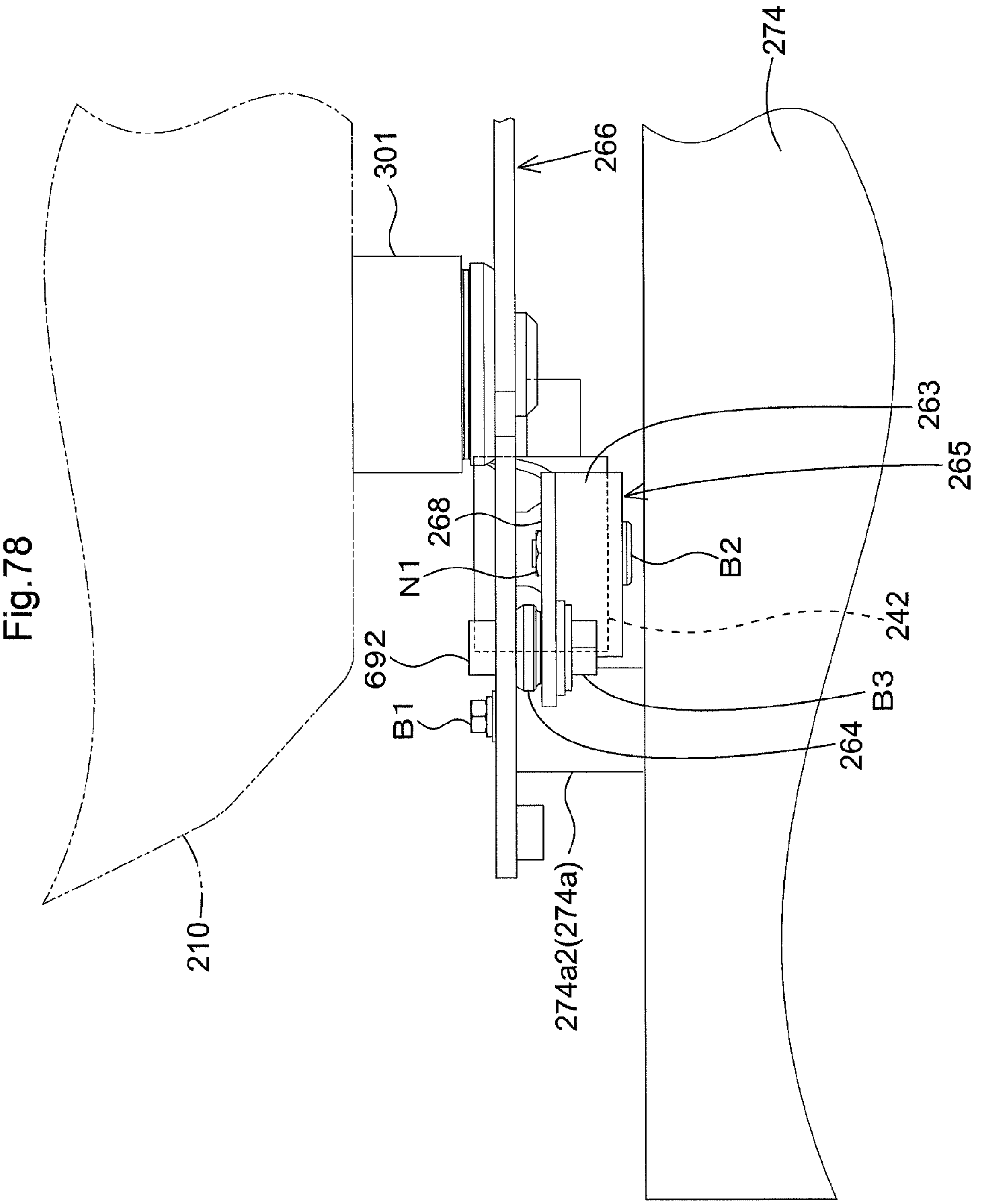
FIG. 78 is a right side view showing an enlarged view of a rear part of the attachment structure of the inertial measurement device.

The support plate 266 is attached to the upper portion of the transmission case 274. As shown in FIGS. 74, 77 and the like, the transmission case 274 has a protruding portion **274*a* that protrudes upward from the upper face of the transmission case 274. The protruding portion 274*a* includes a front protruding portion 274*a*1 protruding upward from the front portion of the transmission case 274, and a rear protruding portion 274*a*2 protruding upward from the rear portion of the transmission case 274. The front protruding portion 274*a*1 and the rear protruding portion 274*a*2 are disposed at an interval in the front-rear direction, and each extend in the vehicle body width direction. Screw holes 274*b* extending vertically are formed respectively in the front protruding portion 274*a*1 and the rear protruding portion 274*a*2. A plurality of the screw holes 274*b* are formed at intervals in the vehicle body width direction for each of the front protruding portion 274*a*1 and the rear protruding portion 274*a*2. In the case of the present embodiment, two screw holes 274*b* are formed in each of the front protruding portion 274*a*1 and the rear protruding portion 274*a*2** (a total of four screw holes).

The support plate 266 has first through holes **266*a* and second through holes 266*b***.

Figure 76:
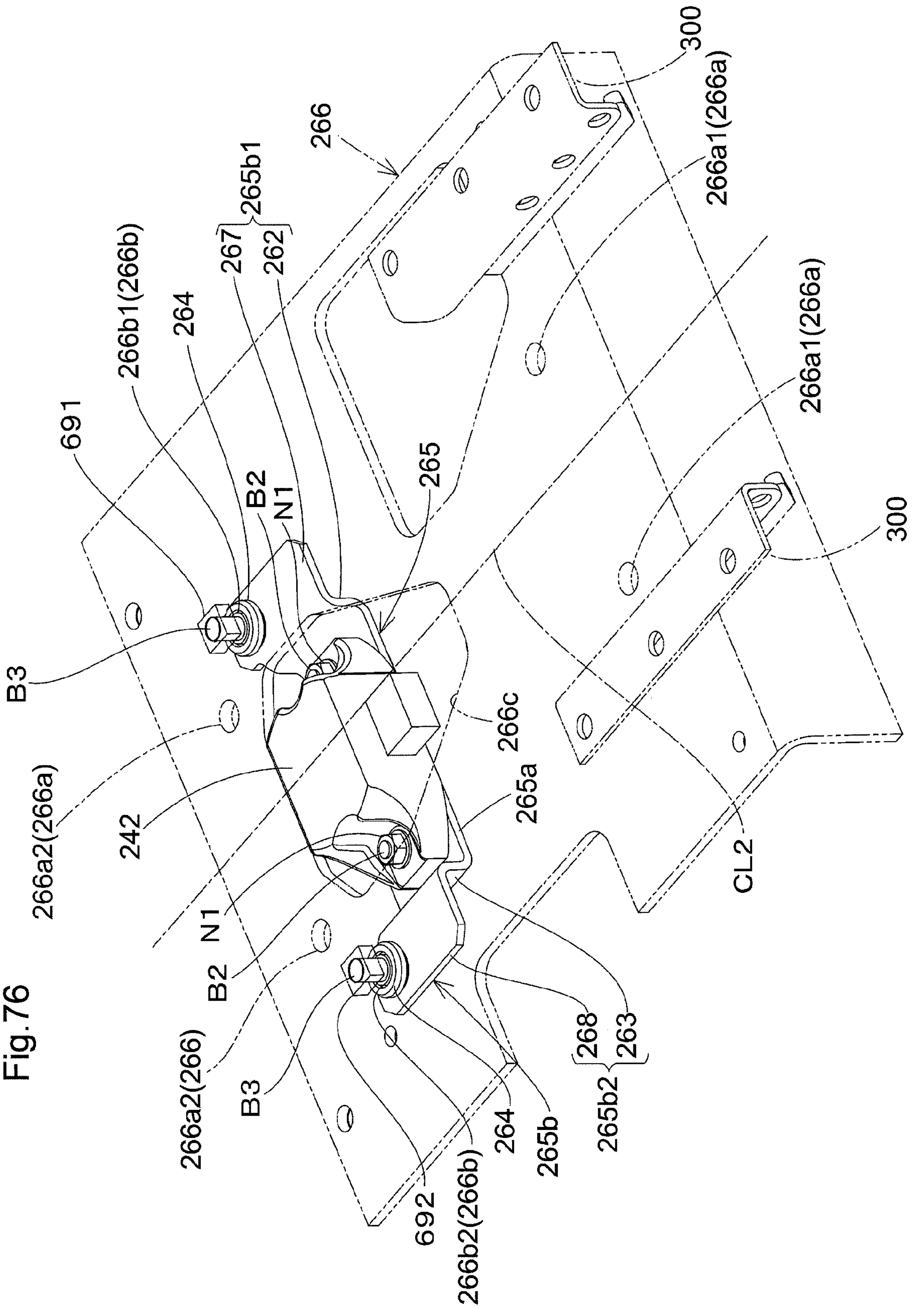
FIG. 76 is a perspective view showing the inertial measurement device, a support member, an anti-vibration member, and a support plate.

The first through holes **266*a* are holes for attaching the support plate 266 to the transmission case 274. As shown in FIGS. 74, 76 and 77, the first through holes 266*a* are formed at positions corresponding to the plurality of screw holes 274*b* formed in the transmission case 274, respectively. Specifically, the first through holes 266*a* include front through holes 266*a*1 and rear through holes 266*a*2. The front through holes 266*a*1 are formed in the left front portion and the right front portion of the support plate 266, respectively. The rear through holes 266*a*2 are formed in the left rear portion and the right rear portion of the support plate 266, respectively. Bolts B1 are inserted into the first through holes 266*a*, and the support plate 266 is fixed to an upper portion of the transmission case 274 by screwing the bolts B1 into the screw holes 274*b***.

As described above, the transmission case 274 forms a highly rigid vehicle body frame by being integrally connected with the front axle frame 270, the flywheel housing 271, the clutch housing 272, and the intermediate frame 273. Therefore, by fixing the support plate 266 to the transmission case 274, the support plate 266 is fixed to the highly rigid vehicle body frame.

Figure 79:
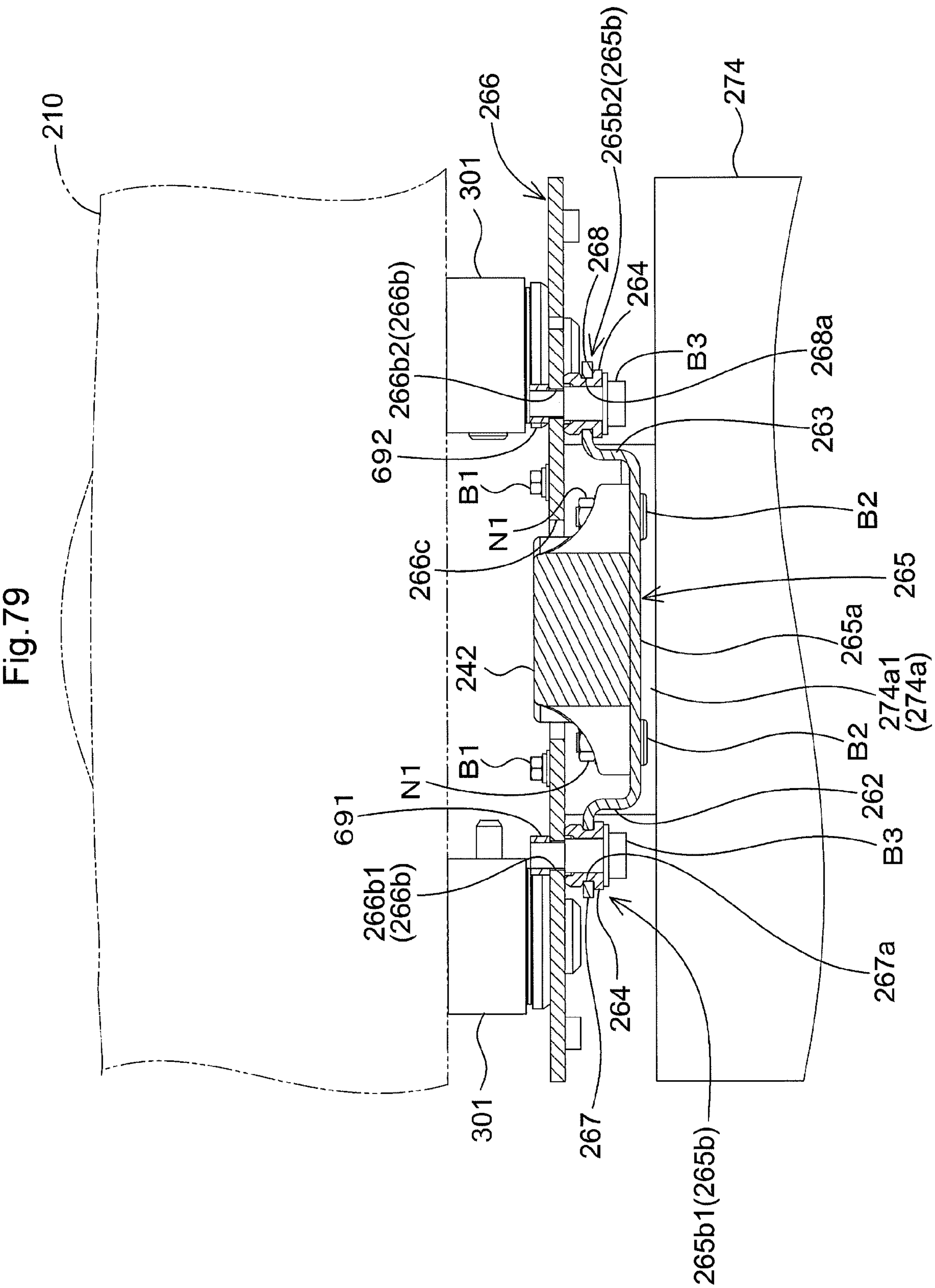
FIG. 79 is a view in cross section taken along a line LXXIX-LXXIX in FIG. 75.

The second through holes **266*b* are holes for attaching the support member 265 to the support plate 266. As shown in FIGS. 76 and 79, the second through holes 266*b* are provided at locations near the rear of the support plate 266. More specifically, the second through holes 266*b* are provided to the rear of the front through holes 266*a*1 and in front of the rear through holes 266*a*2. The second through holes 266*b* include one through hole 266*b*1 provided on one side (the left side) in the vehicle body width direction, and another through hole 266*b*2 provided on the other side (the right side) in the vehicle body width direction. The one through hole 266*b*1 and the other through hole 266*b*2 are provided symmetrically sandwiching the center line CL2** in the vehicle body width direction.

A first female screw member 691 and a second female screw member 692 are fixed to the upper face of the support plate 266. The first female screw member 691 is provided above the one through hole **266*b*1. The second female screw member 692 is provided above the other through hole 266*b*2. The screw hole of the first female screw member 691 communicates with the one through hole 266*b*1. The screw hole of the second female screw member 692 communicates with the other through hole 266*b*2. Note that the first female screw member 691 and the second female screw member 692 can be omitted by directly forming screw holes in the support plate 266**.

As shown in FIGS. 76, 79, etc., the support member 265 has an attachment portion 265*a* and a fixing portion 265*b*. The attachment portion 265*a* and the fixing portion 265*b* are integrally formed by bending a single plate (a metal plate or the like).

The attachment portion 265*a* is disposed below the support plate 266. The attachment portion 265*a* has a flat plate shape and is disposed in parallel with the support plate 266. The inertial measurement device 242 is attached to the attachment portion 265*a*. More specifically, the inertial measurement device 242 is mounted on the upper face of the attachment portion 265*a*, and is fixed to the upper face by fixtures (bolts B2 and nuts N1).

The fixing portion 265*b* stands up from the attachment portion 265*a*. Specifically, the fixing portion 265*b* includes a first fixing portion 265*b*1 provided on the left side of the support member 265 and a second fixing portion 265*b*2 provided on the right side of the support member 265. The first fixing portion 265*b*1 has a first rising portion 262 rising from the left end of the attachment portion 265*a*, and a first upper plate 267 extending leftward from the upper end of the first rising portion 262. The second fixing part 265*b*2 has a second rising portion 263 rising from the right end of the attachment portion 265*a*, and a second upper plate 268 extending rightward from the upper end of the second rising portion 263. The upper face of the first upper plate 267 and the upper face of the second upper plate 268 are disposed at the same height and are disposed in parallel with the upper face of the attachment portion 265*a*.

Figure 80:
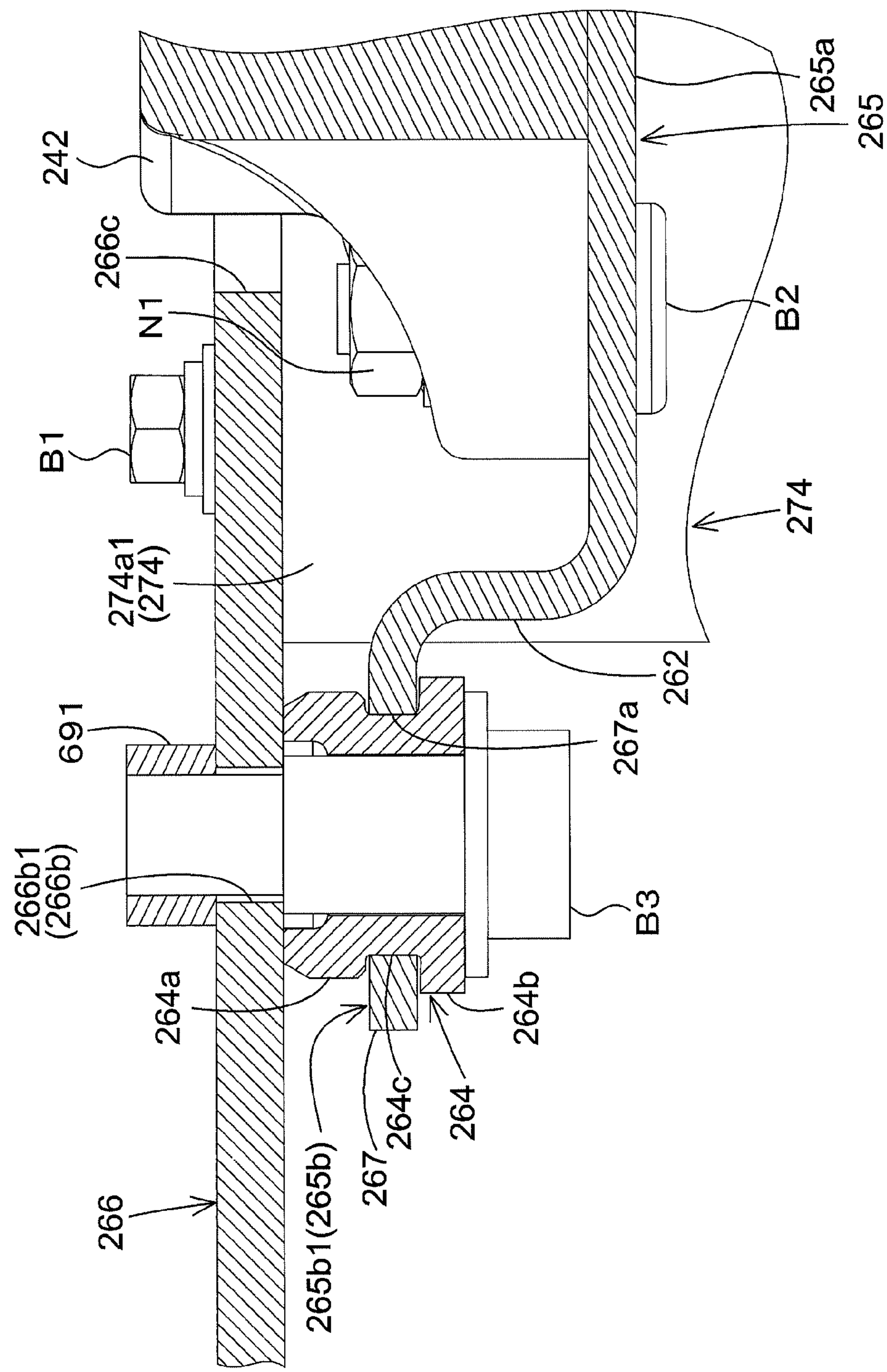
FIG. 80 is a view in cross section showing an enlarged view of part (the left) of FIG. 79.

As shown in FIGS. 79 and 80, a first attachment hole 267*a* is formed in the first upper plate 267. A second attachment hole 268*a* is formed in the second upper plate 268. The first attachment hole 267*a* and the second attachment hole 268*a* are through holes extending vertically. The first attachment hole 267*a* is disposed at a location overlapping with the one through hole 266*b*1. The second attachment hole 268*a* is disposed at a location overlapping with the other through hole 266*b*2. Bolts B3 are inserted into the first attachment hole 267*a* and the second attachment hole 268*a*, respectively. The bolt B3 inserted into the first attachment hole 267*a* passes through the one through hole 266*b*1 and is screwed into the screw hole of the first female screw member 691. The bolt B3 inserted into the second attachment hole 268*a* passes through the other through hole 266*b*2 and is screwed into the screw hole of the second female screw member 692. Thus, the fixing portion 265*b* is fixed to the support plate 266 by the bolts B3.

As shown in FIGS. 79, 80, etc., the fixing portion 265*b* (the first fixing portion 265*b*1 and the second fixing portion 265*b*2) is fixed to the support plate 266 through the anti-vibration member 264. The anti-vibration member 264 is configured with a substantially cylindrical elastic body (rubber or the like). As shown in FIG. 80, the anti-vibration member 264 has a first large diameter portion 264*a*, a second large diameter portion 264*b*, and a small diameter portion 264*c*. The first large diameter portion 264 a is provided above the anti-vibration member 264. The second large diameter portion 264*b* is provided below the anti-vibration member 264. The small diameter portion 264*c* is provided between the first large diameter portion 264*a* and the second large diameter portion 264*b*. Note that although FIG. 80 shows the attachment structure of the anti-vibration member 264 in the first fixing portion 265*b*1, the same applies to the attachment structure of the anti-vibration member 264 in the second fixing portion 265*b*2.

The first large diameter portion 264*a* is interposed between the upper face of the fixing portion 265*b* (the first fixing portion 265*b*1 and the second fixing portion 265*b*2) and the lower face of the support plate 266. The second large diameter portion 264*b* is interposed between the lower face of the fixing portion 265*b* (the first fixing portion 265*b*1 and the second fixing portion 265*b*2) and the heads of the bolts B3. The small diameter portion 264*c* is interposed between the outer peripheral face of the bolts B3 and the inner peripheral faces of the attachment holes (the first attachment hole 267*a* and the second attachment hole 268*a*) of the support member 265. Thus, the anti-vibration member 264 is interposed between the bolts B3 and the fixing portion 265*b* (the first fixing portion 265*b*1 and the second fixing portion 265*b*2), and between the fixing portion 265*b* (the first fixing portion 265*b*1 and the second fixing portion 265*b*2) and the support plate 266.

One or both of the first large diameter portion 264*a* and the second large diameter portion 264*b* may be formed by elastic deformation of the anti-vibration member 264 caused by tightening of the bolt B3, or may be formed in a state without elastic deformation of the anti-vibration member 264.

As described above, the support member 265 supports the inertial measurement device 242 below the support plate 266 through the anti-vibration member 264.

As shown in FIGS. 75, 76, etc., the support plate 266 has an opening portion 266*c* provided above the inertial measurement device 242. The inertial measurement device 242 is exposed from the opening portion 266*c*. That is, the inertial measurement device 242 has a portion located below the support plate 266 and a portion protruding above the support plate 266 through the opening portion 266*c*. The uppermost face of the inertial measurement device 242 is located above the support plate 266, but is separated from at least the lower face of the driver seat 210 by a distance such that it is possible to reliably avoid contact with the lower face. In addition, the opening portion 266*c* exposes the fixtures (the nuts N1). Thus, the fixtures can be easily removed by inserting a hand, a tool or the like from the opening portion 266*c*. In addition, by causing the upper portion of the inertial measurement device 242 to protrude from the opening portion 266*c*, the space occupied by the inertial measurement device 242 in the thickness direction (the vertical direction) can be reduced.

The attachment position of the inertial measurement device 242 is not limited to the above embodiment. From the viewpoint of accurately detecting the behavior of the tractor (the working vehicle) 201 with the inertial measurement device 242, four positions are conceivable as positions where the inertial measurement device 242 is attached.

Figure 81:
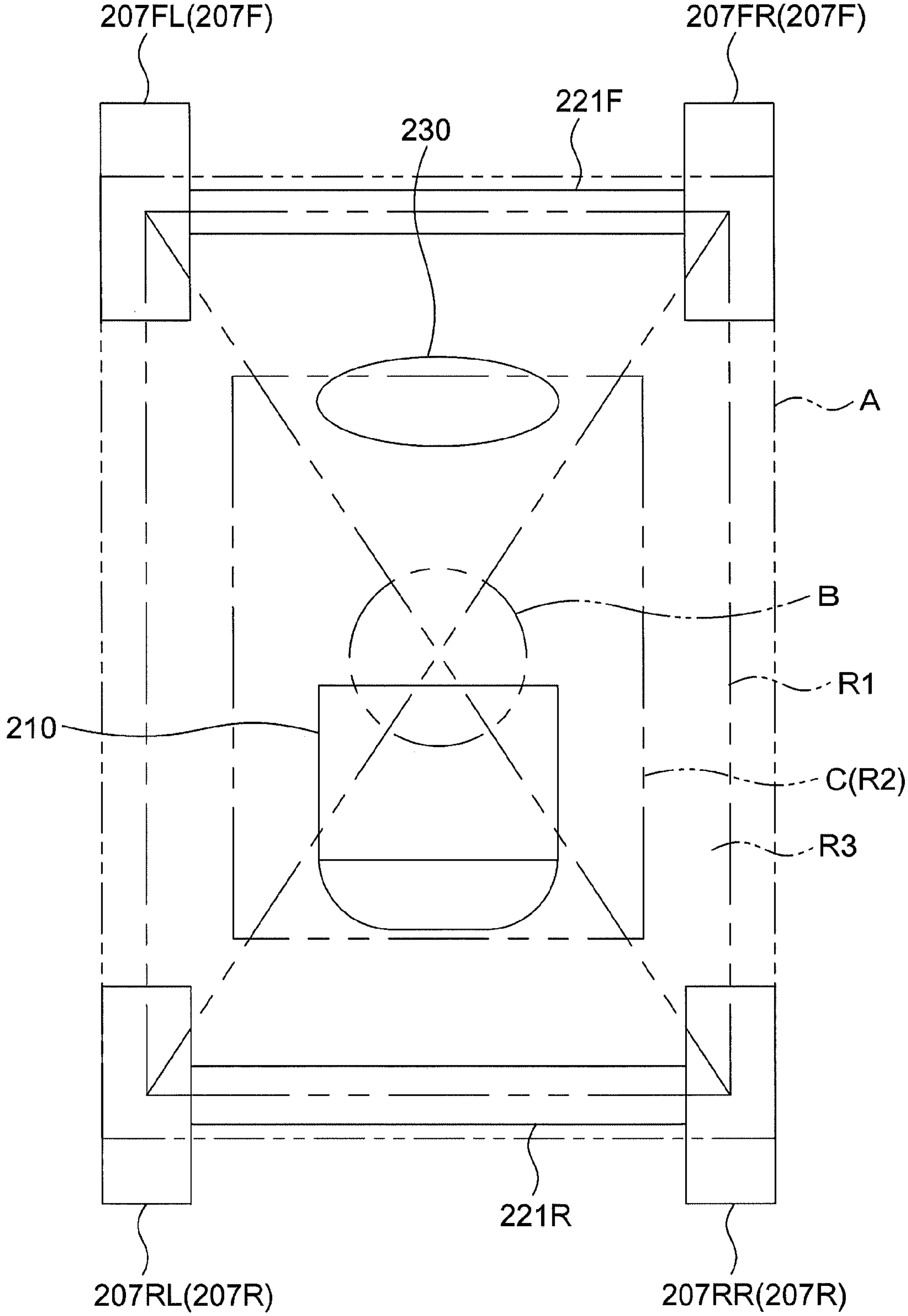
FIG. 81 is a schematic plan view illustrating the attachment position of the inertial measurement device.

The first position is within an area connecting a left front wheel 207FL, a right front wheel 207FR, a left rear wheel 207RL, and a right rear wheel 207RR, and is indicated by reference sign A in FIG. 81. The second position is within an area in the vicinity of the intersection of a diagonal line connecting the left front wheel 207FL and the right rear wheel 207RR and a diagonal line connecting the right front wheel 207FR and the left rear wheel 207RL, and is indicated by reference sign B in FIG. 81. The third position is near the position of the center of gravity of the tractor 201. The fourth position is in a range in which the zero moment point (ZMP) moves during traveling of the tractor 201 (a range in which the center of gravity moves during traveling (the dynamic center of gravity position)). The range in which the ZMP moves, indicated by reference sign C in FIG. 81, is a stable area where the posture of the tractor 201 is stable during traveling (for example, an area where the tractor 201 travels stably).

The calculation of the ZMP can be performed by providing the vehicle body 203 with a plurality of vehicle body state detection units. The vehicle body state detection unit is a device that detects at least a first load (a floor reaction force) and a moment applied to the vehicle body 203. For example, a 6-component force-type load cell capable of detecting the first load and the moment in three axis directions (X-axis direction, Y-axis direction and Z-axis direction) is used. The X-axis direction can be set as the traveling direction of the vehicle body 203, the Y-axis direction can be set as the vehicle body width direction, and the Z-axis direction can be set as the vertical direction.

The plurality of vehicle body state detection units can include a first state detection unit corresponding to a left front support point (the left front wheel) of the vehicle body 203, a second state detection unit corresponding to a right front support point (the right front wheel) of the vehicle body 203, a third state detection unit corresponding to a left rear support point (the left rear wheel) of the vehicle body 203 and a fourth state detection unit corresponding to a right rear support point (the right rear wheel) of the vehicle body 203. The calculation of the ZMP can be performed by a control device (the control device 260 or another control device) (a computer). This control device calculates the ZMP expressed in two dimensions based on the first load (the floor reaction force) at the support points of the vehicle body 203—for example, based on the floor reaction force and the moment of the first state detection unit, the second state detection unit, the third state detection unit and the fourth state detection unit.

In FIG. 81, an area R1 connecting the support points of the vehicle body 203 (the positions where the plurality of vehicle body state detection units are installed) is a critical area, and is expressed in the two dimensions of the X axis and the Y axis. A stable area R2 (C) is a stable area in which the posture of the tractor 201 is stable when traveling, and is an area shifted inward from the critical area R1 by a predetermined distance. An area excluding the critical area R1 and the stable area R2, that is, an area between the contour line forming the critical area R1 and the contour line forming the stable area R2, is an unstable area R3 in which the posture of the tractor 201 is likely to be unstable.

By setting the attachment position of the inertial measurement device 242 to the stable region R2 (C), the measurement accuracy of the inertial measurement device 242 can be improved.

Effects

According to the working vehicle (the tractor) 1 of the above embodiment, the following effects can be exhibited.

The working vehicle 201 includes the steering wheel 230, the steering shaft 231 that rotatably supports the steering wheel, the vehicle body 203 that can travel with either of manual steering by the steering wheel and automatic steering of the steering wheel based on a planned travel line, the setting switch 251 that is disposed in the vicinity of the steering shaft and switches to a setting mode for performing settings at least prior to starting automatic steering, and the steering switching switch 252 that is disposed in the vicinity of the steering shaft and switches starting or ending of automatic steering in the setting mode.

According to this configuration, since the setting switch 251 and the steering switching switch 252 are disposed in the vicinity of the steering shaft 231, the driver can reliably recognize the setting switch 251 and the steering switching switch 252 at a glance, and the driver can easily operate them without changing the posture of the driver. Therefore, unintended automatic steering or the like due to mistaken operation of a switch can be prevented.

Also, the working vehicle 201 includes the position detection device 240 that is provided in the vehicle body 203 and detects the position of the vehicle body based on a signal from a positioning satellite, and the correction switch 253 that is disposed in the vicinity of the steering shaft 231 and corrects the position of the vehicle body detected by the position detection device.

According to this configuration, in addition to the setting switch 251 and the steering switching switch 252, the correction switch 253 is also disposed in the vicinity of the steering shaft 231, so the driver can reliably recognize the setting switch 251, the steering switching switch 252, and the correction switch 253 at a glance, and the driver can easily operate them without changing the posture of the driver. Therefore, unintended automatic steering or the like due to mistaken operation of a switch can be prevented.

Also, the working vehicle 201 includes the display device 245 that is disposed in the vicinity of the steering shaft 231 and displays driving information and the screen switching switch 254 that is disposed in the vicinity of the steering shaft and selectively switches the display of the display device between the first screen G1 that displays the driving situation in the setting mode and the second screen Q2 that explains the setting operation in the setting mode.

According to this configuration, in addition to the setting switch 251, the steering switching switch 252 and the correction switch 253, the screen switching switch 254 is also disposed in the vicinity of the steering shaft 231, so the driver can reliably recognize the setting switch 251, the steering switching switch 252, the correction switch 253 and the screen switching switch 254 at a glance, and the driver can easily operate them without changing the posture of the driver. Therefore, unintended automatic steering or the like due to mistaken operation of a switch can be prevented.

The setting switch 251 is disposed on one side of the steering shaft 231, and the correction switch 253 is disposed on the other side of the steering shaft 231.

According to this configuration, since the setting switch 251 and the correction switch 253 are disposed in opposite directions from each other with the steering shaft 231 interposed therebetween, the space in the vicinity of the steering shaft 231 can be effectively used, and mistaken operation of the setting switch 251 and the correction switch 253 is prevented.

Also, the steering switching switch 252 is disposed on one side of the steering shaft 231.

According to this configuration, since the steering switching switch 252 and the setting switch 251 are disposed on the same side with respect to the steering shaft 231, there is good operability of switch operation for automatic steering of the working vehicle 201.

Also, the setting switch 251 is disposed on one side of the steering shaft 231, and the screen switching switch 254 is disposed on the other side of the steering shaft 231.

According to this configuration, since the setting switch 251 and the screen switching switch 254 are disposed in opposite directions from each other with the steering shaft 231 interposed therebetween, the space in the vicinity of the steering shaft 231 can be effectively used, and mistaken operation of the setting switch 251 and the screen switching switch 254 is prevented.

Also, the panel cover 278 that supports the display device 245 from below the steering wheel 230 is provided, and the setting switch 251, the correction switch 253 and the screen switching switch 254 are provided in the panel cover.

According to this configuration, the setting switch 251, the correction switch 253 and the screen switching switch 254 are collectively disposed in the panel cover 278 supporting the display device 245. Therefore, the driver can visually recognize the setting switch 251, the correction switch 253 and the screen switching switch 254 together with the display device 245, so there is good operability. Further, since the setting switch 251, the correction switch 253 and the screen switching switch 254 are disposed at locations away from the steering wheel 230, unintentional touching of the setting switch 251, the correction switch 253 and the screen switching switch 254 when operating the steering wheel 230 is prevented, and unintentional touching of the steering wheel 230 when operating the setting switch 251, the correction switch 253 and the screen switching switch 254 is prevented. Therefore, it is possible to prevent unintended switching to automatic steering or the like due to a mistaken operation.

Further, the working vehicle 201 includes the connecting portion 208 that is provided at a rear portion of the vehicle body 203 and connects a working device, and the raising/lowering lever 283 that raises/lowers the connecting portion 208, the raising/lowering lever being disposed on the other side of the steering shaft 231.

According to this configuration, the raising/lowering lever 283 and the steering switching switch 252 are disposed in opposite directions from each other with the steering shaft 231 interposed therebetween, the space in the vicinity of the steering shaft 231 can be effectively used. In addition, unintended operation by the driver due to touching the steering switching switch 252 when operating the raising/lowering lever 283, or due to touching the raising/lowering lever 283 when operating the steering switching switch 252, is prevented.

Also, the setting switch 251 and the correction switch 253 are disposed to the rear of the steering shaft 231.

According to this configuration, since the setting switch 251 and the correction switch 253 are disposed on the side of the driver operating the steering wheel 230, there is good operability of the setting switch 251 and the correction switch 253, and mistaken operation is less likely to occur.

Further, the working vehicle 201 includes the steering wheel 230, the steering shaft 231 that rotatably supports the steering wheel 230, the vehicle body 203 that can travel with either of manual steering by the steering wheel and automatic steering of the steering wheel based on a planned travel line, the position detection device 240 that is provided in the vehicle body and detects the position of the vehicle body based on a signal of a positioning satellite, the automatic steering mechanism 237 that automatically steers the steering wheel based on the position of the vehicle body detected by the position detection device, the first control device 260A that is disposed on one side of the steering shaft and outputs a control signal calculated based on the position of the vehicle body detected by the position detection device, and the second control device 260B that is disposed on the other side of the steering shaft and controls the automatic steering mechanism such that the vehicle body travels along the planned travel line based on the control signal output by the first control device.

According to this configuration, the size of the control device is reduced in comparison to a configuration in which the first control device 260A and the second control device 260B are integrated. Therefore, the control devices (the first control device 260A and the second control device 260B) can be disposed in a small space near the steering shaft 231. Further, since the first control device 260A and the second control device 260B are disposed in opposite directions from each other with the steering shaft 231 interposed therebetween, it is possible to prevent heat generated by one control device from adversely affecting the other control device.

Further, the working vehicle 201 includes the display device 245 that is disposed in the vicinity of the steering shaft 231 and displays driving information, and the panel cover 278 that supports the display device below the steering wheel 230, the first control device 260A and the second control device 260B being disposed within the panel cover 278.

According to this configuration, since the first control device 260A and the second control device 260B are disposed within the panel cover 278 in a state disposed near the steering shaft 231, the size of the panel cover 278 can be reduced. Therefore, it is possible to sufficiently secure the foot space and the front field of view of the driver.

Also, the working vehicle 201 includes the steering wheel 230, the steering shaft 231 that rotatably supports the steering wheel 230, the vehicle body 203 that can travel with either of manual steering by the steering wheel and automatic steering of the steering wheel based on a planned travel line, the position detection device 240 that is provided in the vehicle body and detects the position of the vehicle body based on a signal of a positioning satellite, the power steering device 232 that assists manual operation of the steering wheel, and the automatic steering mechanism 237 that is disposed at a position separated away from the power steering device and automatically steers the steering wheel based on the position of the vehicle body detected by the position detection device.

According to this configuration, since the power steering device 232 and the automatic steering mechanism 237 are disposed at positions away from each other, the operation of the power steering device 232 and the operation of the automatic steering mechanism 237 are made independent from each other, and the power steering device 232 can be allowed to operate regardless of whether or not the automatic steering mechanism 237 is operated.

In addition, the working vehicle 201 includes the display device 245 that is disposed in the vicinity of the steering shaft 231 and displays driving information, the panel cover 278 that supports the display device below the steering wheel, and the front wheels 207F and the rear wheels 207R that support the vehicle body 203 such that travel is possible. The vehicle body has the front axle frame 270 that supports the front wheels. The automatic steering mechanism is disposed inside the panel cover. The power steering device includes the hydraulic pump 233, the control valve 234 to which hydraulic oil discharged from the hydraulic pump is supplied, and the steering cylinder 235 operated by the control valve. The control valve is supported by the front axle frame 270.

According to this configuration, the automatic steering mechanism 237 can be disposed within the panel cover 278 near the steering shaft 231 without increasing the size of the panel cover 278. Therefore, it is possible to sufficiently secure the foot space and the front field of view of the driver.

In addition, the working vehicle 201 includes the steering wheel 230, the steering shaft 231 that rotatably supports the steering wheel 230, the vehicle body 203 that can travel with either of manual steering by the steering wheel and automatic steering of the steering wheel based on a planned travel line, and the steering switching switch 252 that is disposed in the vicinity of the steering shaft, and using a base end portion provided on the steering shaft side as a pivot, is capable of swinging between a first direction for switching between starting and ending the automatic steering, and a second direction for setting a start point and an end point of a travel reference line that serves as a reference for the planned travel line.

According to this configuration, switching between starting and ending the automatic steering, and setting a start point and an end point of a travel reference line that serves as a reference for the planned travel line, are performed by merely changing the swing direction of the steering switching switch 252, so there is excellent operability. Further, in comparison to a configuration in which a plurality of switches are provided as the steering switching switch 252, the installation space for the steering switching switch 252 can be reduced.

Also, with respect to the steering switching switch 252, swinging in the first direction is swinging upward or downward, and swinging in the second direction is swinging forward or rearward.

According to this configuration, switching between starting and ending the automatic steering, and setting a start point and an end point of a travel reference line that serves as a reference for the planned travel line, are performed by swinging of the steering switching switch 252 upward, downward, forward, and rearward, so there is excellent operability.

Also, with respect to the steering switching switch 252, starting of automatic steering is commanded by swinging downward and ending of automatic steering is commanded by swinging upward, and the start point of the travel reference line is set by swinging rearward and the end point of the travel reference line is set by swinging forward.

According to this configuration, the respective operations of starting the automatic steering, ending the automatic steering, setting the start point of the travel reference line, and setting the end point of the travel reference line can be performed easily and reliably.

Also, there is provided the setting switch 251 that is disposed in the vicinity of the steering shaft 231, and at least switches to a setting mode for performing settings prior to starting the automatic steering.

According to this configuration, by disposing the setting switch 251 in the vicinity of the steering shaft 231 in addition to the steering switching switch 252, it is possible to reduce the space for disposing switches while providing a variety of switches.

Also, there are provided the position detection device 240 that detects a position of the vehicle body based on a signal from a positioning satellite, and the correction switch 253 that is disposed in the vicinity of the steering shaft 231, and corrects the position detected by the position detection device 240.

According to this configuration, the steering switching switch 252, the setting switch 251 and the correction switch 253 are collectively disposed in the vicinity of the steering shaft 231, so it is possible to reduce the space for disposing switches while providing a variety of switches.

Also, the screen switching switch 254 is disposed in the vicinity of the steering shaft 231, and selectively switches a display of the display device 245 between the first screen Q1 that displays a driving situation in the setting mode and the second screen Q2 that explains a setting operation in the setting mode.

According to this configuration, in addition to the steering switching switch 252, the setting switch 251, and the correction switch 253, the screen switching switch 254 is also disposed in the vicinity of the steering shaft 231. Therefore, it is possible to reduce the space for disposing switches while providing a variety of switches.

Also, the working vehicle 201 includes the vehicle body 203 that can travel with either of manual steering by the steering wheel 230 and automatic steering of the steering wheel based on a planned travel line, the receiving device 241 that is provided in the vehicle body and receives a signal from a positioning satellite, the inertial measurement device 242 that measures inertia of the vehicle body, the automatic steering mechanism 237 that automatically steers the steering wheel based on the signal received by the receiving device and the inertia measured by the inertial measurement device, the anti-vibration member 264 that suppresses vibration of the inertial measurement device, and the support member 265 that supports the inertial measurement device on the vehicle body through the anti-vibration member.

According to this configuration, vibration of the vehicle body 203 or the like is suppressed from being transmitted to the inertial measurement device 242 by the anti-vibration member 264. Therefore, measurement errors of the inertial measurement device 242 can be reduced, and the automatic steering can be accurately performed.

Further, a drive unit (for example, the transmission 205) that drives the vehicle body and a housing (for example, the transmission case 274) that covers the drive unit are provided, and the support member 265 supports the inertial measurement device 242 in the housing through the anti-vibration member 264.

According to this configuration, vibration caused by driving of the driving unit is suppressed from being transmitted to the inertial measurement device 242 by the anti-vibration member 264. Therefore, measurement errors of the inertial measurement device 242 can be reduced.

In addition, the support plate 266 attached to the housing (for example, the transmission case 274) is provided. The support member 265 includes the attachment portion 265*a* that is disposed below the support plate 266 and to which the inertial measurement device 242 is configured to be attached, and the fixing portion 265*b* that stands up from the attachment portion 265*a* and is configured to be fixed to the support plate 266 through the anti-vibration member 264.

According to this configuration, the inertial measurement device 242 can be attached to the support plate 266 with the anti-vibration member 264 therebetween, in a state suspended below the support plate 266, which has been attached to the housing (for example, the transmission case 274). Therefore, it is possible to effectively prevent the vibration from being transmitted to the inertial measurement device 242 with the anti-vibration member 264. Further, an installation space for a driver seat or the like can be secured above the support plate 266.

Also, there is provided the driver seat 210 provided in the vehicle body 203, and the support plate 266 supports the driver seat from below.

According to this configuration, the inertial measurement device 242 can be disposed below the driver seat 210 through the support plate 266. Therefore, the inertial measurement device 242 can be disposed near the center of gravity of the vehicle body 203, and the measurement accuracy of the inertial measurement device 242 can be improved.

Also, the fixing portion 265*b* is fixed to the support plate 266 by the bolts B3, and the anti-vibration member 264 is interposed between the bolts and the fixing portion, and between the fixing portion and the support plate.

According to this configuration, transmission of vibration of the support plate 266 to the inertial measurement device 242 through the support member 265 can be reliably prevented by the anti-vibration member 264.

Also, the housing is the transmission case 274, and the support plate 266 is attached to the upper portion of the transmission case.

According to this configuration, since the support plate 266 is attached to the highly rigid transmission case, vibration of the support plate 266, to which the support member 265 is configured to be fixed, is suppressed, so the measurement accuracy of the inertial measurement device 242 can be improved.

Also, the support plate 266 has the opening portion 266*c* provided above the inertial measurement device 242, and the inertial measurement device is exposed from the opening portion.

According to this configuration, the inertial measurement device 242 can be easily attached/detached using the opening portion 266*c*. In addition, by causing the upper portion of the inertial measurement device 242 to protrude from the opening portion 266*c*, the space occupied by the inertial measurement device 242 in the thickness direction (the vertical direction) can be reduced.

Although one embodiment of the present invention has been described above, the embodiment disclosed here should be considered in all points as illustrative and not restrictive. The scope of the present invention is defined by the scope of the claims, rather than the description above, and is intended to include any modifications within the meaning and scope equivalent to the scope of the claims.

DESCRIPTION OF REFERENCE SIGNS

First Embodiment

8: raising/lowering link mechanism
19: driver seat
26: ROPS
26*a*: vertical frame portion
26*b*: lateral frame portion
30: controller
32: antenna unit
34: attachment bracket (support member)
34*s*: mounting face
34*d*: reinforcement frame
100: canopy (roof)
40: wiring
X: swing pivot
H2: second through hole (through hole)

Second Embodiment

201: working vehicle
203: vehicle body
230: steering wheel
231: steering shaft
240: position detection device
245: display device
251: setting switch
252: steering switching switch
253: correction switch
254: screen switching switch
Q1: first screen
Q2: second screen

What is claimed is:

1. A tractor comprising:

a driver seat on which a driver can sit; and an antenna unit that receives satellite positioning information, wherein when viewed from the front, an upper end portion of a rollover protection structure (ROPS) and at least part of the antenna unit overlap with each other, wherein the ROPS has right and left vertical frame portions and a lateral frame portion that joins upper ends of the right and left vertical frame portions to each other, when viewed from the front, at least part of the antenna unit and at least part of the lateral frame portion overlap with each other, and wherein the antenna unit is disposed rearward of the lateral frame portion and a lower end of the antenna unit is below an upper end edge of the lateral frame portion.

2. The tractor according to claim 1, wherein the ROPS is provided to the rear of the driver seat.

3. The tractor according to claim 1, further comprising:

right and left raising/lowering link mechanisms that are provided in a rear part of the vehicle body and raise/lower a working device, wherein the antenna unit is provided between a rear end portion of the driver seat and a rear end portion of the right and left raising/lowering link mechanisms in a side view.

4. The tractor according to claim 3, wherein the antenna unit is provided between the right and left raising/lowering link mechanisms in a plan view.

5. The tractor according to claim 1, wherein a roof that covers above the driver seat is attached to the ROPS.

6. A tractor comprising:

a driver seat on which a driver can sit;

an antenna unit that receives satellite positioning information; and a support member extending forward or rearward from the lateral frame portion and supporting the antenna unit, wherein, when viewed from the front, an upper end portion of a rollover protection structure (ROPS) and at least part of the antenna unit overlap with each other, wherein the ROPS has right and left vertical frame portions and a lateral frame portion that joins upper ends of the right and left vertical frame portions to each other, when viewed from the front, at least part of the antenna unit and at least part of the lateral frame portion overlap with each other, and wherein wiring that connects the antenna unit and a controller for traveling control is drawn out from a wiring take-out position of the antenna unit at a high position, and this wiring is held by the support member or the lateral frame portion at an intermediate position between the antenna unit and the lateral frame portion.

7. The tractor according to claim 6, wherein the support member has a mounting face on which the antenna unit is mounted, reinforcement frames are erected on both right and left ends of the mounting face, and the antenna unit is disposed at an intermediate position between the right and left reinforcement frames.

8. A tractor comprising:

a driver seat on which a driver can sit;

an antenna unit that receives satellite positioning information; and wiring that connects the antenna unit and a controller for traveling control, wherein, when viewed from the front, an upper end portion of a rollover protection structure (ROPS) and at least part of the antenna unit overlap with each other, wherein the ROPS has right and left vertical frame portions and a lateral frame portion that joins upper ends of the right and left vertical frame portions to each other, and wherein the wiring is routed along the vertical frame portion.

9. The tractor according to claim 8, wherein the vertical frame portion is hollow, and the wiring is routed so as to pass through the inside of the vertical frame portion.

10. The tractor according to claim 9, wherein the vertical frame portion is configured to be foldable by swinging around a laterally oriented swing pivot, and the wiring is routed so as to pass through the inside of a movable portion of the vertical frame portion above the swing pivot.

11. The tractor according to claim 10, wherein the wiring is routed inside the vertical frame portion, and is routed from the inside of the vertical frame portion to the outside through a through hole provided above the swing pivot.

12. A tractor comprising:

a driver seat on which a driver can sit; and an antenna unit that receives satellite positioning information, wherein when viewed from the front, an upper end portion of a rollover protection structure (ROPS) and at least part of the antenna unit overlap with each other, wherein a roof that covers above the driver seat is attached to the ROPS, wherein the ROPS has right and left vertical frame portions and a lateral frame portion that joins upper ends of the right and left vertical frame portions to each other, and when viewed from the front, the antenna unit is provided in a center portion of the lateral frame portion, and the roof is fixed to the lateral frame portion at locations closer to the vertical frame portions than the location where the antenna unit is provided in the lateral frame portion.

* * * * *